US012578684B2

(12) United States Patent
Gubelmann et al.

(10) Patent No.: US 12,578,684 B2
(45) Date of Patent: Mar. 17, 2026

(54) VISUAL INDICATOR AND FLUID DISPENSER

(71) Applicant: Preciflex SA, Neuchâtel (CH)

(72) Inventors: Jean Gubelmann, Auvernier (CH); Lucien Vouillamoz, Feusisberg (CH); Alain Jaccard, Ste-Croix (CH)

(73) Assignee: PRECIFLEX SA, Neuchâtel (CH)

( * ) Notice: Subject to any disclaimer, the term of this patent is extended or adjusted under 35 U.S.C. 154(b) by 0 days.

(21) Appl. No.: 15/877,520

(22) Filed: Jan. 23, 2018

(65) Prior Publication Data

US 2019/0072901 A1     Mar. 7, 2019

Related U.S. Application Data

(60) Continuation-in-part of application No. 14/872,183, filed on Oct. 1, 2015, now abandoned, which is a
(Continued)

(51) Int. Cl.
*G04B 19/00* (2006.01)
*G02B 26/00* (2006.01)
(Continued)

(52) U.S. Cl.
CPC ........... *G04B 25/00* (2013.01); *G02B 26/005* (2013.01); *G04B 19/00* (2013.01); *G04C 17/00* (2013.01)

(58) Field of Classification Search
CPC ......... G04B 25/00; G04B 19/00; G04C 17/00
See application file for complete search history.

(56) References Cited

U.S. PATENT DOCUMENTS 3,486,109 A * 12/1969 Schmidt ................. G04G 9/065
                                                          324/94
4,585,443 A     4/1986 Kaufman
                    (Continued)

FOREIGN PATENT DOCUMENTS

CN          1513132 A     7/2004
CN        101452114 A     6/2009
                    (Continued)

OTHER PUBLICATIONS

International Search Report, International patent application No. PCT/IB2010/002055, Dec. 27, 2010.
(Continued)

*Primary Examiner* — Edwin A. Leon
*Assistant Examiner* — Jason M Collins
(74) *Attorney, Agent, or Firm* — DA VINCI PARTNERS LLC; John Moetteli

(57)          ABSTRACT
A device for fluid display comprising a fluid, wherein the fluid is displaced by an electrowetting process. The device is filled with at least 2 immiscible fluids, whereas one fluid is located within the electrical field generated by a reference electrode and a control electrode and partially within the electrical field generated by the same reference electrode and at least one second control electrode so that the electric activation of the second control electrode generates a deformation or movement of the fluid in the direction of the second control electrode. Also provided is a method of switching the control electrodes of the device above-mentioned device in a sequence so that a portion of the fluid is displaced within the device.

18 Claims, 74 Drawing Sheets

Displacement of a droplet of water in silicone oil. Electrode pitch: 1 [mm], height: 400 [µm]

Related U.S. Application Data division of application No. 13/391,387, filed as application No. PCT/IB2010/002055 on Aug. 20, 2010, now abandoned.

(60) Provisional application No. 62/579,235, filed on Oct. 31, 2017, provisional application No. 61/349,897, filed on May 31, 2010, provisional application No. 61/235,725, filed on Aug. 21, 2009.

(51) Int. Cl.
    *G04B 25/00*          (2006.01)
    *G04C 17/00*          (2006.01)

(56)                References Cited

U.S. PATENT DOCUMENTS

| | | | | |
|---|---|---|---|---|
| 6,361,502 | B1 * | 3/2002 | Puolakanaho | A61B 5/222 |
| | | | | 600/502 |
| 6,911,132 | B2 * | 6/2005 | Pamula | C25B 9/00 |
| | | | | 204/600 |
| 7,712,954 | B2 * | 5/2010 | Bourban | G04G 21/08 |
| | | | | 368/294 |
| 8,111,465 | B2 * | 2/2012 | Heikenfeld | G02B 26/005 |
| | | | | 359/665 |
| 2004/0031688 | A1 * | 2/2004 | Shenderov | B01L 3/502746 |
| | | | | 204/600 |
| 2004/0058450 | A1 * | 3/2004 | Pamula | B01L 3/502792 |
| | | | | 436/52 |
| 2004/0231116 | A1 | 11/2004 | Goldberg | |
| 2007/0075922 | A1 * | 4/2007 | Jessop | G09G 3/348 |
| | | | | 345/49 |
| 2007/0109918 | A1 | 5/2007 | Furetta et al. | |
| 2008/0169197 | A1 * | 7/2008 | McRuer | B01L 3/502792 |
| | | | | 29/25.03 |
| 2008/0297880 | A1 | 12/2008 | Steckl et al. | |
| 2009/0185255 | A1 * | 7/2009 | Cheng | G02B 26/005 |
| | | | | 359/228 |
| 2012/0092383 | A1 * | 4/2012 | Hysek | G04G 9/00 |
| | | | | 345/684 |
| 2014/0151232 | A1 * | 6/2014 | Hadwen | G09G 3/348 |
| | | | | 204/547 |
| 2016/0178889 | A1 | 6/2016 | Massard | |
| 2018/0284423 | A1 * | 10/2018 | Huang | C12Q 1/6851 |

FOREIGN PATENT DOCUMENTS

| | | | |
|---|---|---|---|
| CN | 101681584 | A | 3/2010 |
| CN | 102655897 | A | 9/2012 |
| CN | 103592759 | A | 2/2014 |
| DE | 4207122 | A1 | 9/1993 |
| DE | 202004000890 | | 5/2004 |
| FR | 1552838 | | 1/1969 |
| GB | 2077110 | A | 12/1961 |
| JP | 2005510347 | A | 4/2005 |
| TW | 285303 | U | 9/1996 |
| WO | 82/03556 | A1 | 10/1962 |
| WO | 95/14497 | A1 | 6/1995 |
| WO | 02/099527 | A1 | 12/2002 |
| WO | WO-2004/021369 | A2 | 3/2004 |
| WO | WO-2005096032 | A1 | 10/2005 |
| WO | 2006/065976 | A2 | 6/2006 |
| WO | 2006/118479 | A1 | 11/2006 |
| WO | WO-2012039471 | A1 | 3/2012 |

OTHER PUBLICATIONS

International Patent Application PCT/IB2018/058549, International Search Report, Apr. 26, 2019.
International Patent Application PCT/IB2018/058549, International Search Report, Dec. 17, 2010.

* cited by examiner

*30, 27*

*10'*

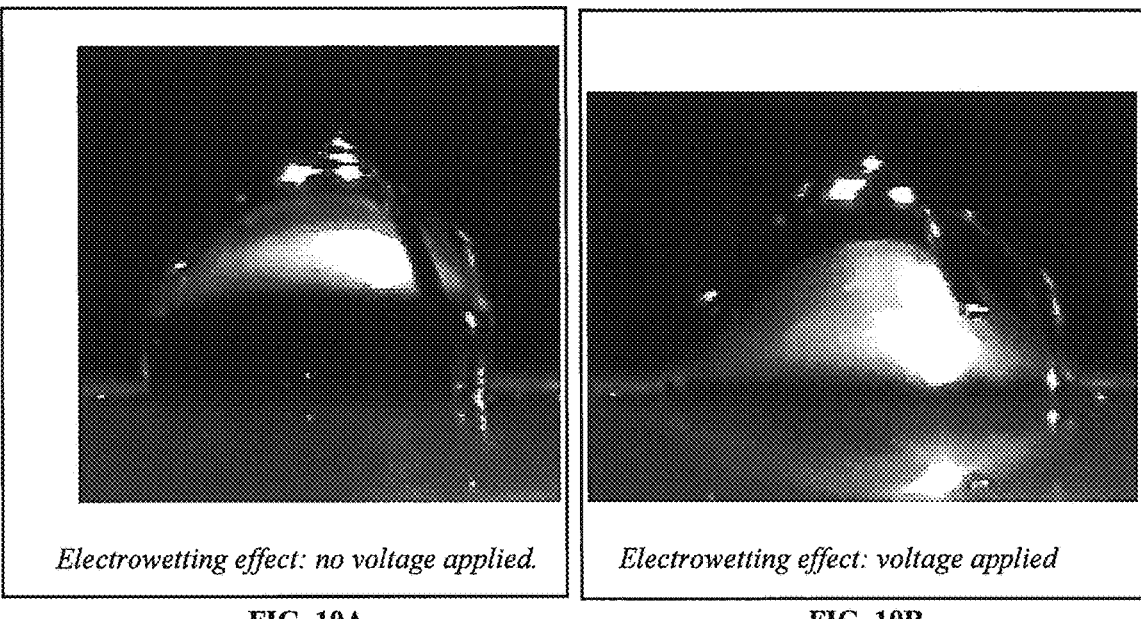
*Electrowetting effect: no voltage applied.*
FIG. 10A
*Electrowetting effect: voltage applied*
FIG. 10B
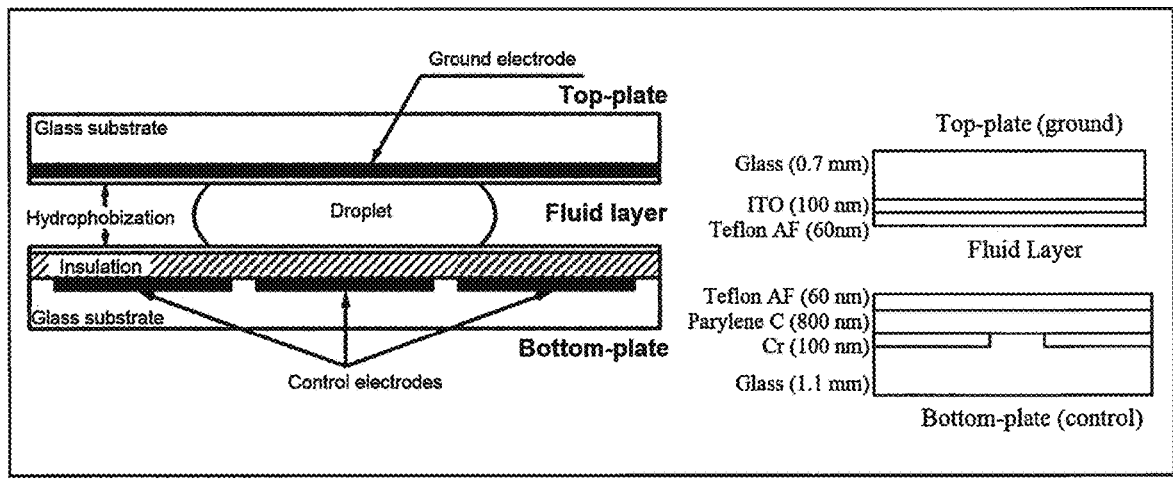
FIG. 11

*Displacement of a droplet of water in silicone oil. Electrode pitch: 1 [mm], height: 400 [µm]*

208

208

205

208

206

202

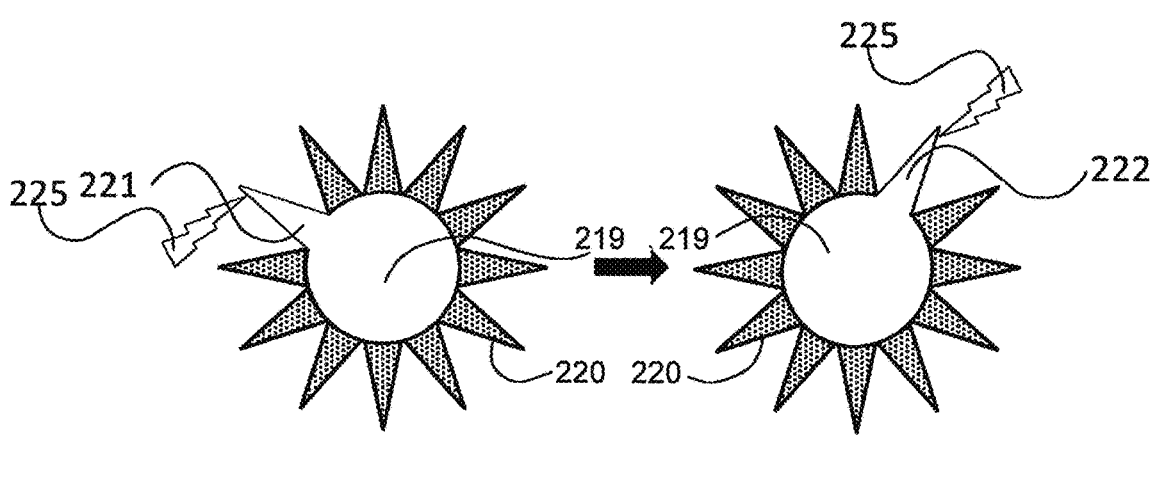
FIG. 20A                    FIG. 20B
FIG. 20C
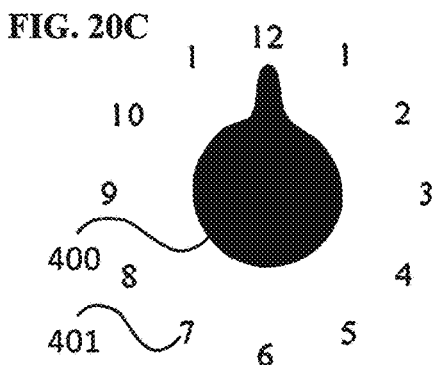
FIG. 20D
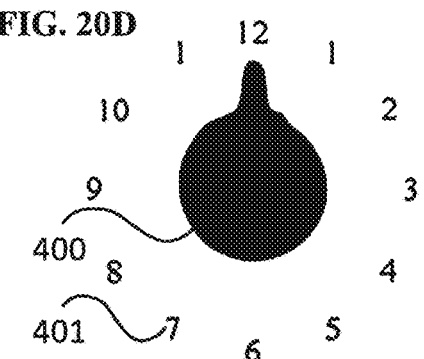
FIG. 20E
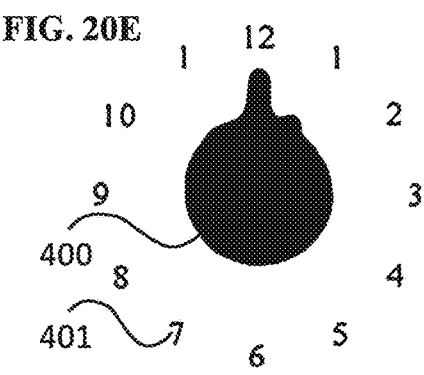
FIG. 20F
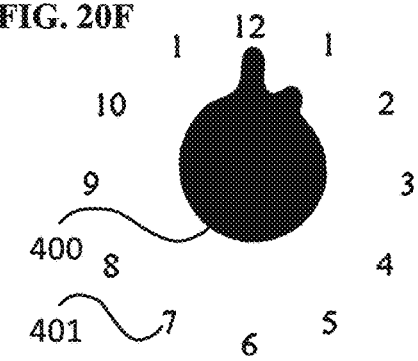

201
202
203
204
205
203
206
207

208       208    226     208

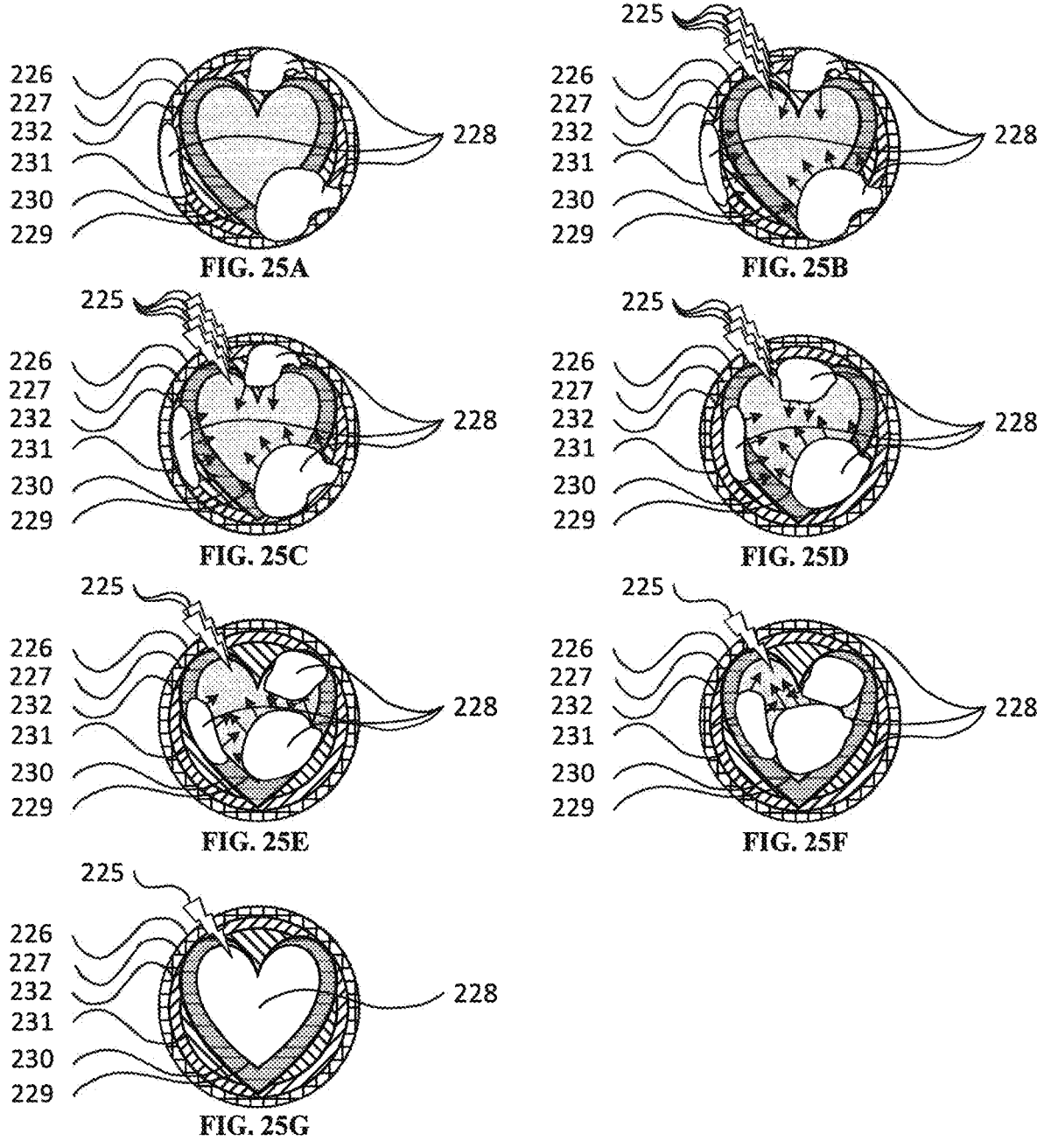

Legend:

01   Micro motor
02   Plunger
03   Screw
04   Liquid container with return spring inside
05   Magnet
06   Movement detection circuit
07   Enclosure
08   Clock
09   Controller circuit
10   Potentiometer
11   Battery
12   Tube
13   Scale
14   Borderline
15   Decompression chamber
16   Lock mechanism
17   Light switch
18   Screw plug for batteries Piezo membrane

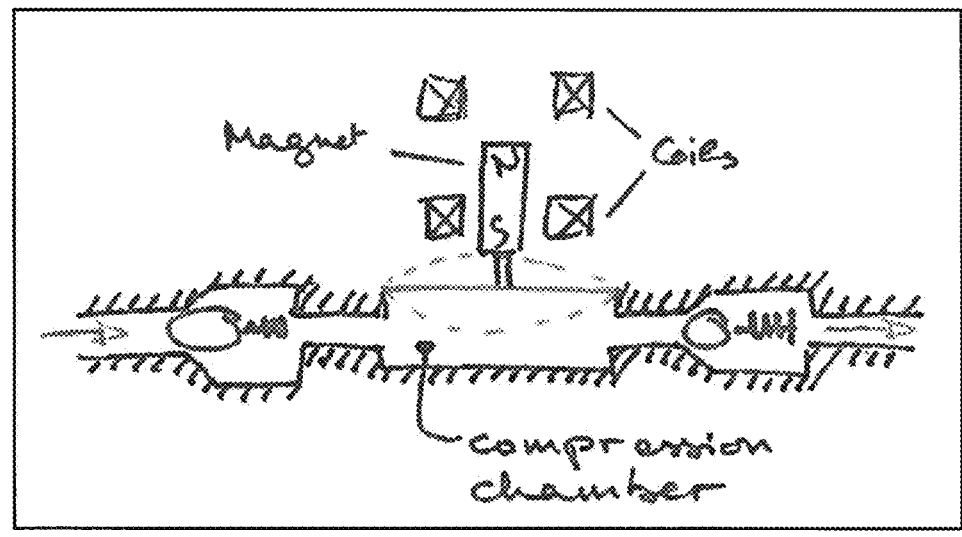
FIG. 37
FIG. 38A                  FIG.38B
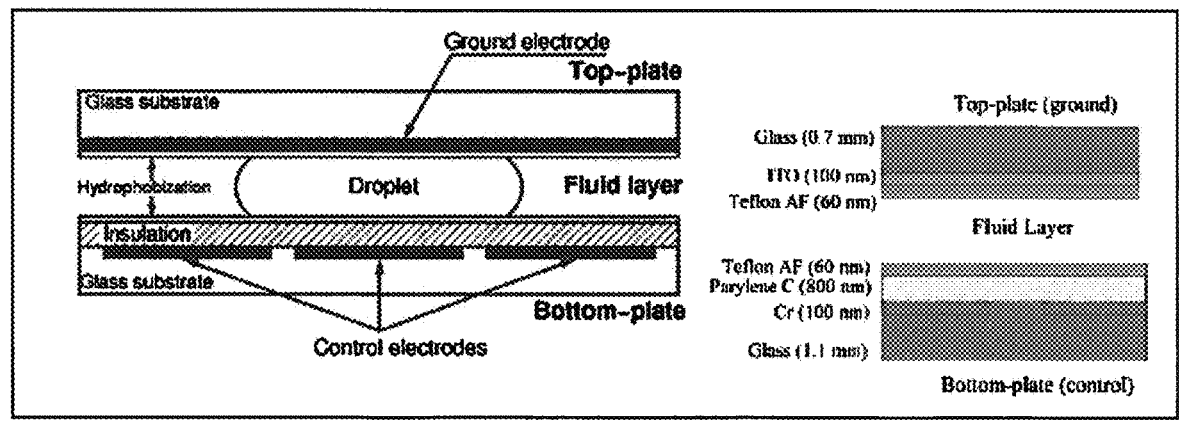
FIG. 39

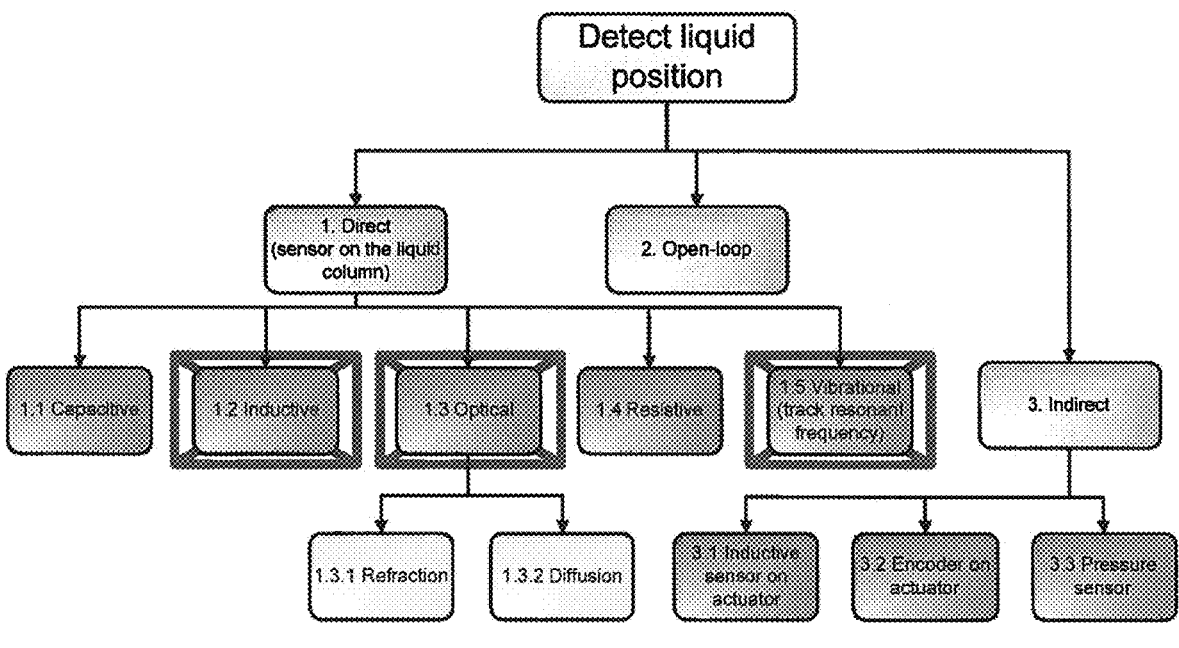
FIG. 43
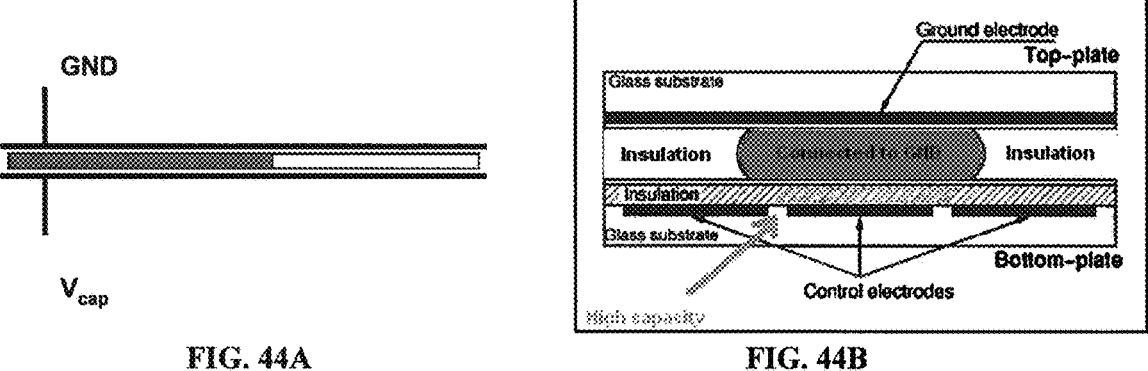
GND
$V_{cap}$
FIG. 44A
FIG. 44B
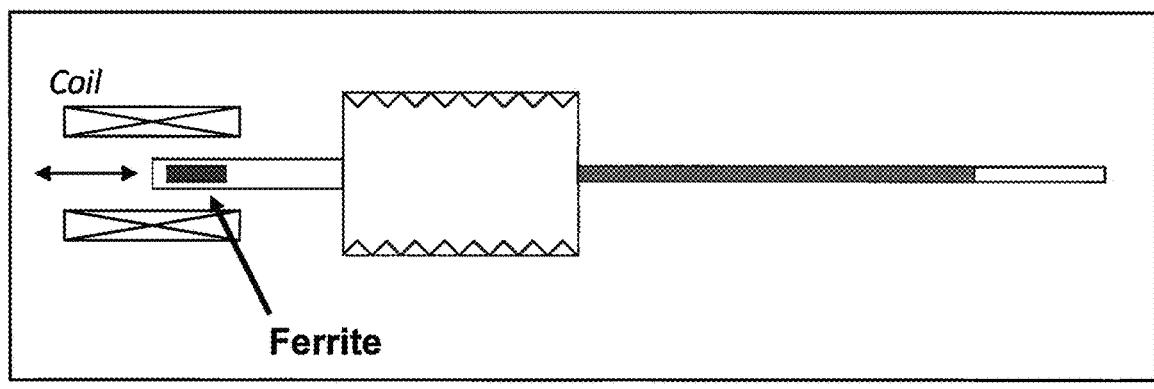
Coil
Ferrite
FIG. 45

$$M = F \cdot tan(\alpha + \rho) \cdot r(\theta)$$

-------- the spiral itself, corrected in order to take into account the friction

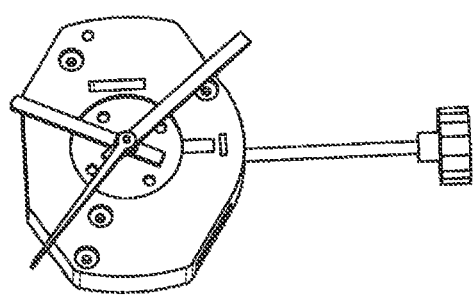

FIG. 68

| | | | |
|---|---|---|---|
| Longain LG-02 | Panyu pearl SL-28 | Longain Y628 | ETA 802.101 |
| Ø22 x 3.2mm | Ø16 x 3.2mm | ? x 16 x 3.2mm | 17.8 x 15.3mm x 3.15mm |
| Plastic | Plastic | Plastic | Metallic |

FIG. 69

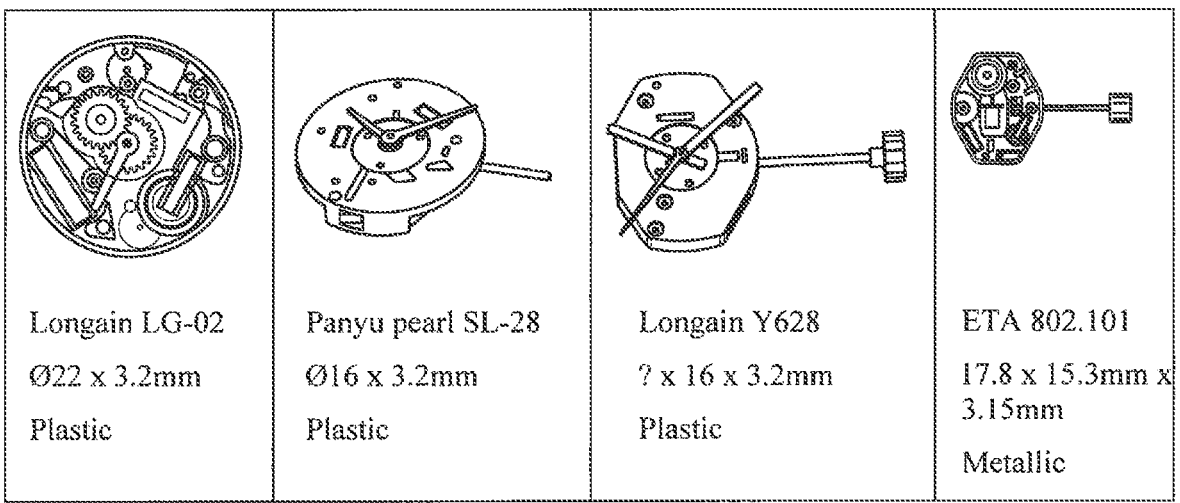

1) Battery, providing the power
2) Integrated curcuit, controlling the quartz and the stepping motor
3) Oscillating quartz, dividing the time
4) Trimmer, regulating the frequency
5) Stepping motor, transforming the electrical impulses into mechanical power
6) Gear train, activating the hours, minutes, seconds hands

FIG.70A

1) Barrel/mainspring providing the power
2) Gear train, transmitting the power
3) Escapement, distributing the impulses
4) Balance wheel & hairspring, oscillating, making the division of time
5a) Winding stem, for manual winding and setting
5b) Oscillating weight, for automatic winding
6) Dial train, activating the hours, minutes, seconds hands

*Source:* http://www.fhs.ch

Ø44 [mm]

h = 8.5 watch movement including coin cell
and time adjustment button cam wheel piston

Lip-seal

Liquid 2 chamber
(empty)

Liquid 1 chamber
(full)

Liquid 1
channel port

Rolling diaphragm

Location for a compression spring or
spiral spring for stroke reset force 28.85mm 15.2mm Liquid 2 channel port
(on the side)

8.1mm 18.2mm

Ø48mm
x 9mm

Channel display at outer edge

Possibility to display seconds

Display of mechanical / fluidic coupling

For a pure mechanical movement, the back side of watch can be transparent as well Time display is not in exact 360° display due to channel overlap Start End 5° unused
Time display on 355°

Actual time

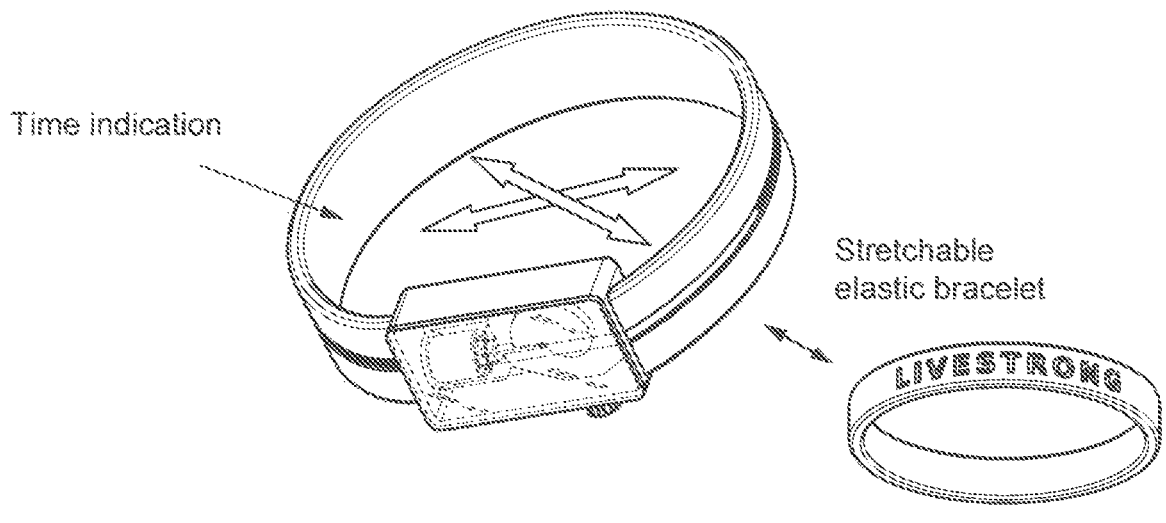
Time indication
Stretchable
elastic bracelet
LIVESTRONG
FIG. 93A
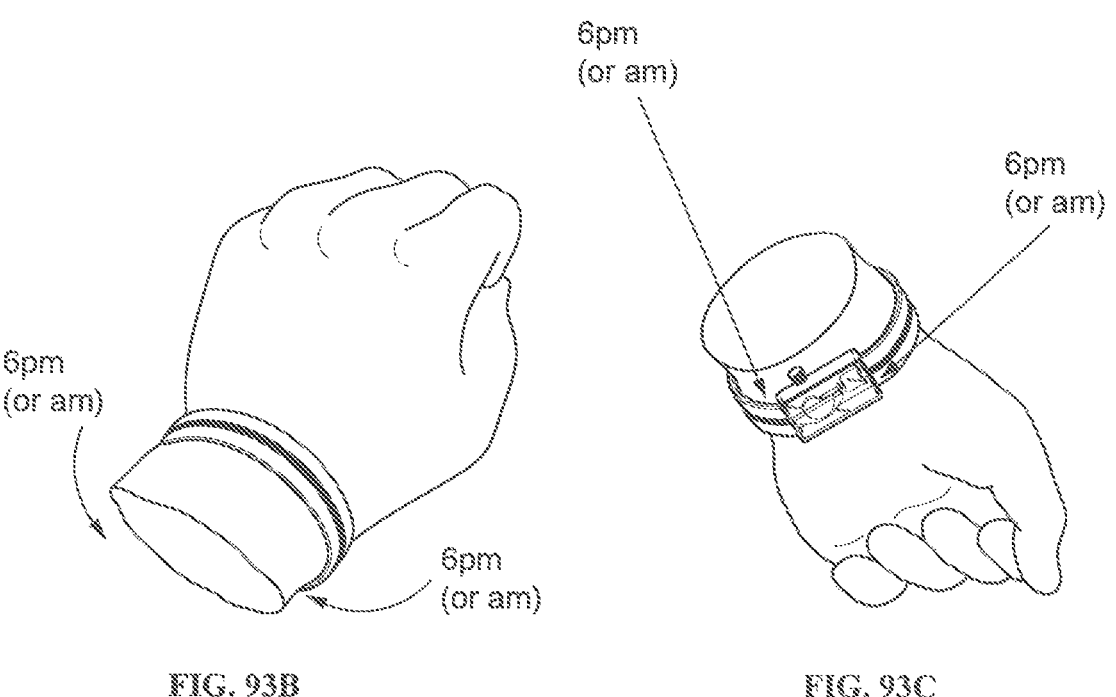
6pm
(or am)
6pm
(or am)
6pm
(or am)
6pm
(or am)
6pm
(or am)
FIG. 93B
FIG. 93C

Watch with hands
Fluidic display

Fluidic display

Channels inside of both branches 6 pm (or am)
12
6 am (or pm)

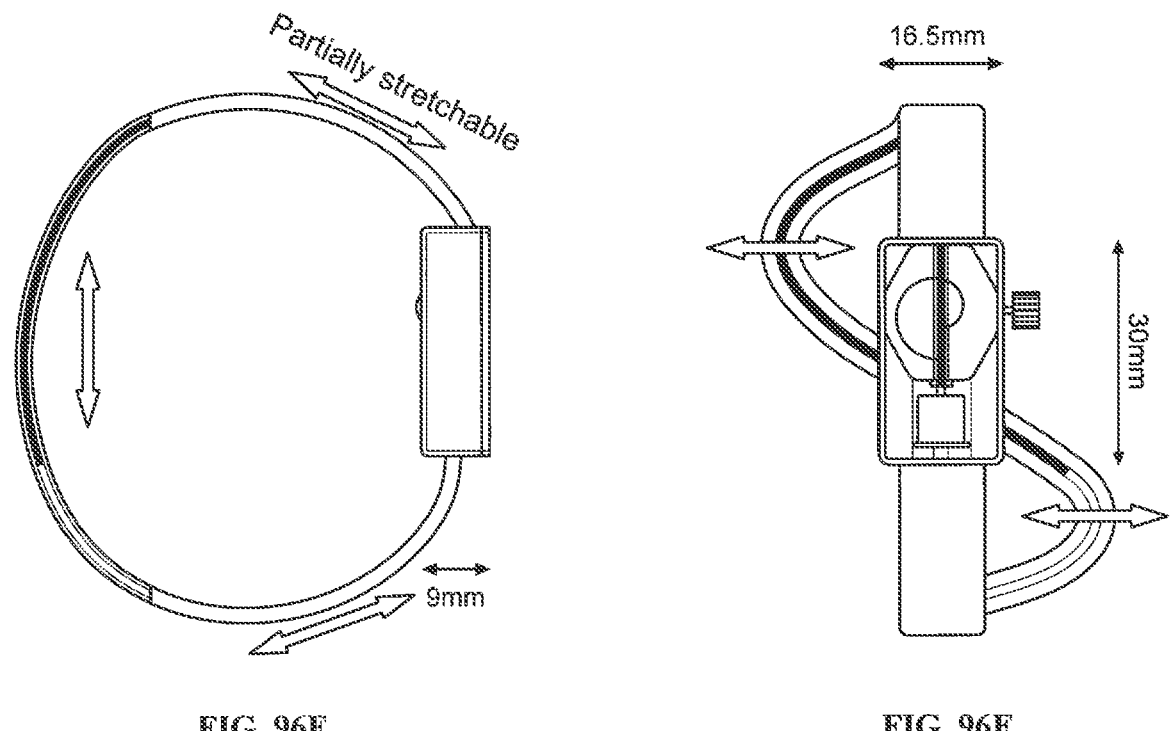
FIG. 96E                             FIG. 96F
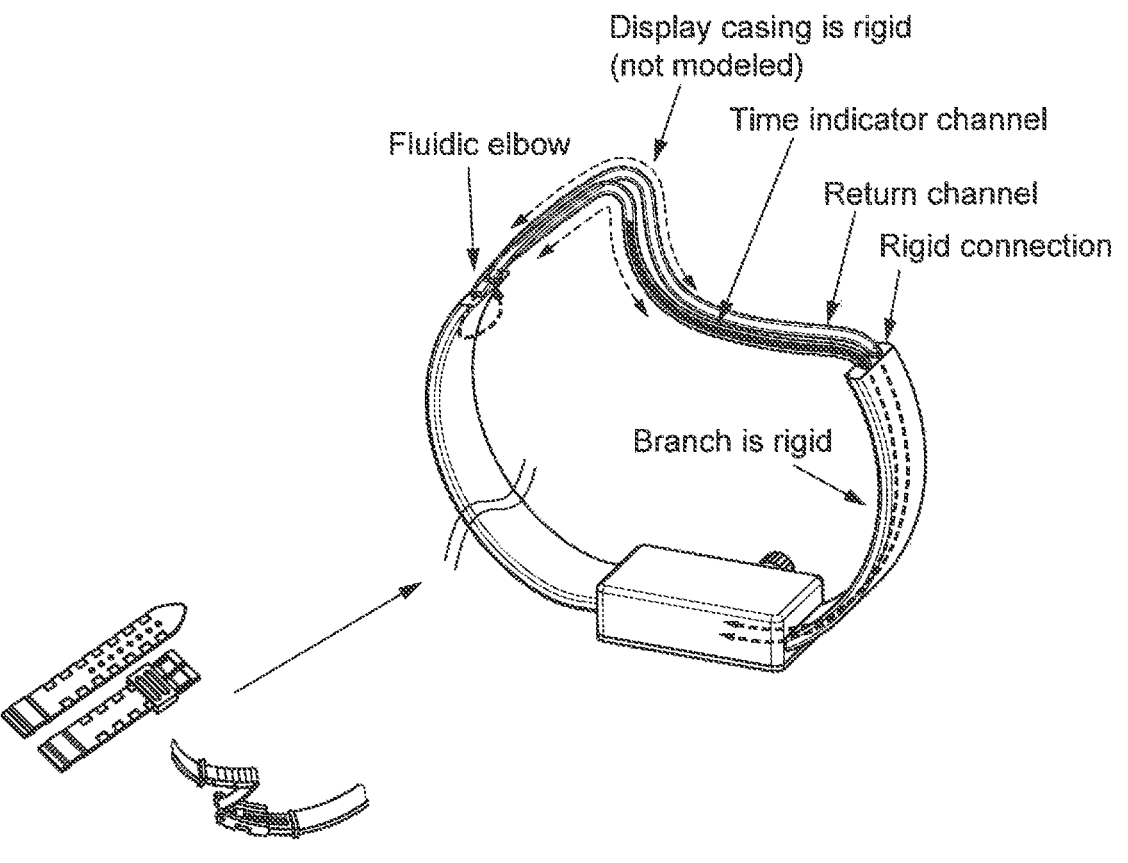
FIG. 97

Time indication

VISUAL INDICATOR AND FLUID DISPENSER

CROSS REFERENCE TO RELATED APPLICATIONS

This application is a continuation-in-part of U.S. application Ser. No. 14/872,183 filed Oct. 1, 2015, which claims the benefit of U.S. Provisional Application No. 61/235,725, filed 21 Aug. 2009, U.S. Provisional Application 61/349, 897, filed 31 May 2010, and U.S. Provisional Application No. 62/579,235, filed 31 Oct. 2017, the contents of which are incorporated herein by reference thereto. This application incorporates by reference the contents of PCT Appl. No. PCT/IB2010/002054 of the same applicant, entitled FLUID INDICATOR, filed on the 20 Aug. 2010.

COPYRIGHT & LEGAL NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. Further, no reference to third party patents or articles made herein is to be construed as an admission that the present invention is not entitled to antedate such material by virtue of prior invention.

BACKGROUND OF THE INVENTION

This invention relates to indicators and in particular analog visual indicators used to dispense a measured amount of liquid.

Analog indicators have existed since time immemorial. The hour glass, for example, uses sand or fluid which, influenced by the weight of gravity, moves from one reservoir to another by passing through a small aperture therebetween. Another example of an ancient analog indicator is the "Clepsydra", as illustrated in "Horloges Anciennes" by Richard Mühe and Horand M. Vogel, French Edition, Office du Livre, Fribourg, 1978, page 9.

Referring to FIG. 1, U.S. Pat. No. 3,783,598 describes an instrument 1 having a movement 2, a drive shaft 3, cams 4, pistons 5, fluid filled capillaries 6 and a relief chamber 7 used to indicate time. Automated fluid dosage devices exist. A typical insulin pump is a computerized device that looks like a pager and is usually worn on the patient's waistband or belt. The pump is programmed to deliver small, steady doses of insulin throughout the day. Additional doses are given to cover food or high blood glucose levels. The pump holds a reservoir of insulin that is attached to a system of tubing called an infusion set. Most infusion sets are started with a guide needle, then the plastic cannula (a tiny, flexible plastic tube) is left in place, taped with dressing, and the needle is removed. The cannula is usually changed every 2 or 3 days or when blood glucose levels remain above target range. However, such devices are bulky and are not always located at a place on the body that is easy to access or read.

Referring to FIG. 2, a wrist worn device, such as the "GLUCOWATCH" is known. This prior art device, said to be developed in 2001, has a casing 8 supported on a bracelet 9. A reservoir dispenses insulin onto a patch similar to a transdermal medication patch used for smoking cessation and hormone therapy. It therefore provides a non-invasive, needle-free method of enhancing and controlling the transport of water-soluble ionic drugs out of the skin and surrounding tissues using a low level of electrical current.

French patent No. 1552838 teaches putting a blob of mercury in an electrical field, i.e., expose it to a voltage differential, which may deform the blob a little but will not displace the blob from one place to another, which Applicant considers is necessary to perform electrowetting. Still further, it has the disadvantage of creating a current flow through the mercury, which effects the mercury by, for example, by heating it. Still further, mercury is considered a hazardous liquid.

These prior devices are cumbersome, requiring significant or dedicated space for indicating the value, lack accuracy, do not function as proposed, or are too costly for many users.

What is needed is a visual indicator that provides a quickly read indication of a measured dosage value and is inexpensive to manufacture.

SUMMARY OF THE INVENTION

A visual indicator display device includes a bracelet, a transparent capillary chamber, and a displacement member. The transparent capillary chamber is matched to an indicia and has a primary length and a width less than the primary length. The displacement member is functionally disposed at one end of the capillary chamber and is responsive to a measureable input for moving a fluid contained therein a defined amount.

An object of the invention is to provide a visual indicator which takes up minimal space.

Another object of the invention is to provide a flexible visual indicator which adapts to requirements which do not readily permit a straight, rigid indicator, such as when such indicator is worn on a wrist, ankles, a head or around or along some part of human body, or on objects such as clothes and sporting articles.

Another object of the invention is to provide an aesthetic, comfortable, reliable and intellectually attractive indicator, Another object of the invention is to provide a dispenser of fluids such as drugs, medication, ointment, oils or perfumes.

BRIEF DESCRIPTION OF THE DRAWINGS

FIGS. 10A-10B are side by side photos of a droplet undergoing the electrowetting effect, in which FIG. 10A shows the droplet with voltage applied to an electrode and, FIG. 10B shows the droplet without voltage applied to an electrode.

FIG. 11 is a cross-sectional, schematic view of an electrowetting display.

FIGS. 25A-25G are progressive schematics showing the method of gathering several droplets on an electrowetting display.

FIG. 37 is a schematic view of an electromagnetic membrane pump of the invention.

FIGS. 38A-38B are photos of the electrowetting effect, where, in FIG. 38A, no voltage is applied, and in FIG. 38B: voltage is applied.

FIG. 39 is a schematic of the cross section of an electrowetting display.

FIG. 43 are solution proposals for the detection of the indicator liquid position.

FIGS. 44A-44B are two different implementations of the capacitive sensor as either analog or a digital sensor on an electrowetting display.

FIG. 45 is a schematic representation of an inductive sensor of the invention.

FIG. 68 are photos of a watch movement of the invention.

FIG. 69 are photos of off-the-shelf movements useable in the invention.

FIG. 70A is a schematics of a digital quartz watch.

FIG. 93A to FIG. 93H are perspective views of embodiment 2 and the integration in an elastic bracelet of the invention.

FIG. 94 is a perspective view of a variant of embodiment 2.

FIG. 95 is a top view of another variant of embodiment 2.

FIG. 96A to FIG. 96F are perspective views of embodiment 3 and the integration in an "S" display of the invention.

FIG. 97 is a perspective view of a variant of embodiment 3.

FIG. 102 is a perspective view of the time indication of FIG. 101 in detail.

FIG. 103 is a perspective view of the closing devices for the bracelet of the invention.

Those skilled in the art will appreciate that elements in the figures are illustrated for simplicity and clarity and have not necessarily been drawn to scale. For example, dimensions may be exaggerated relative to other elements to help improve understanding of the invention and its embodiments. Furthermore, when the terms 'first', 'second', and the like are used herein, their use is intended for distinguishing between similar elements and not necessarily for describing a sequential or chronological order. Moreover, relative terms like 'front', 'back', 'top' and 'bottom', and the like in the description and/or in the claims are not necessarily used for describing exclusive relative position. Those skilled in the art will therefore understand that such terms may be interchangeable with other terms, and that the embodiments described herein are capable of operating in other orientations than those explicitly illustrated or otherwise described.

DETAILED DESCRIPTION OF PREFERRED EMBODIMENTS

The following description is not intended to limit the scope of the invention in any way as they are exemplary in nature and serve to describe the best mode of the invention known to the inventors as of the filing date hereof. Consequently, changes may be made in the arrangement and/or function of any of the elements described in the disclosed exemplary embodiments without departing from the spirit and scope of the invention.

A visual indicator display device includes a bracelet, a transparent capillary chamber, and a displacement member. The transparent capillary chamber is matched to an indicia and has a primary length and a width less than the primary length. The displacement member is functionally disposed at one end of the capillary chamber and is responsive to a measureable input for moving a fluid contained therein a defined amount.

A suitable fluid may be an oil, a lotion, or a liquid such as a drug or other medication. The displacement member is attached to one end of the capillary chamber which is responsive to a measureable input for displacing the indicator surface thus allowing the user to read a measurement from the indicia.

Figure 1:
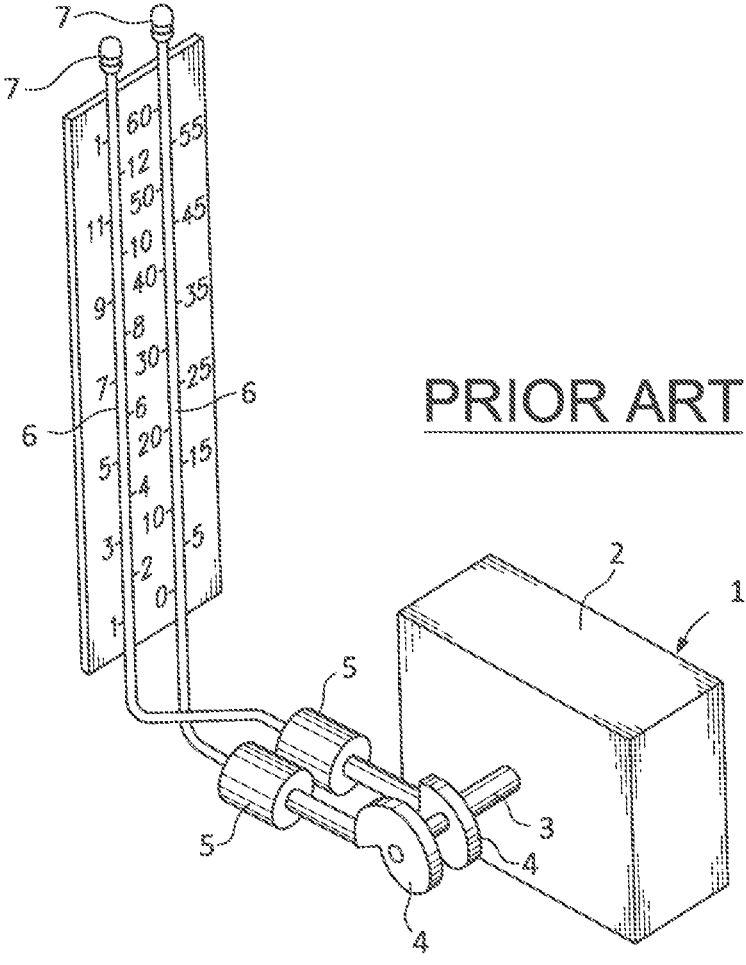
FIG. 1 is a side, cross-sectional view of an analog indicator of the prior art.
Figure 2:
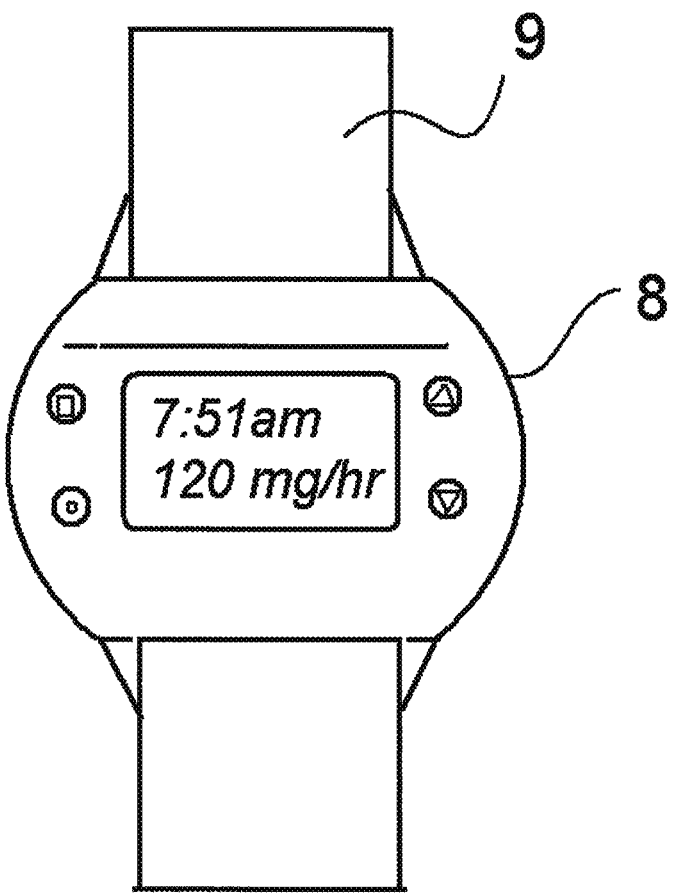
FIG. 2 is a top view of a second indicator of the prior art.
Figure 3:
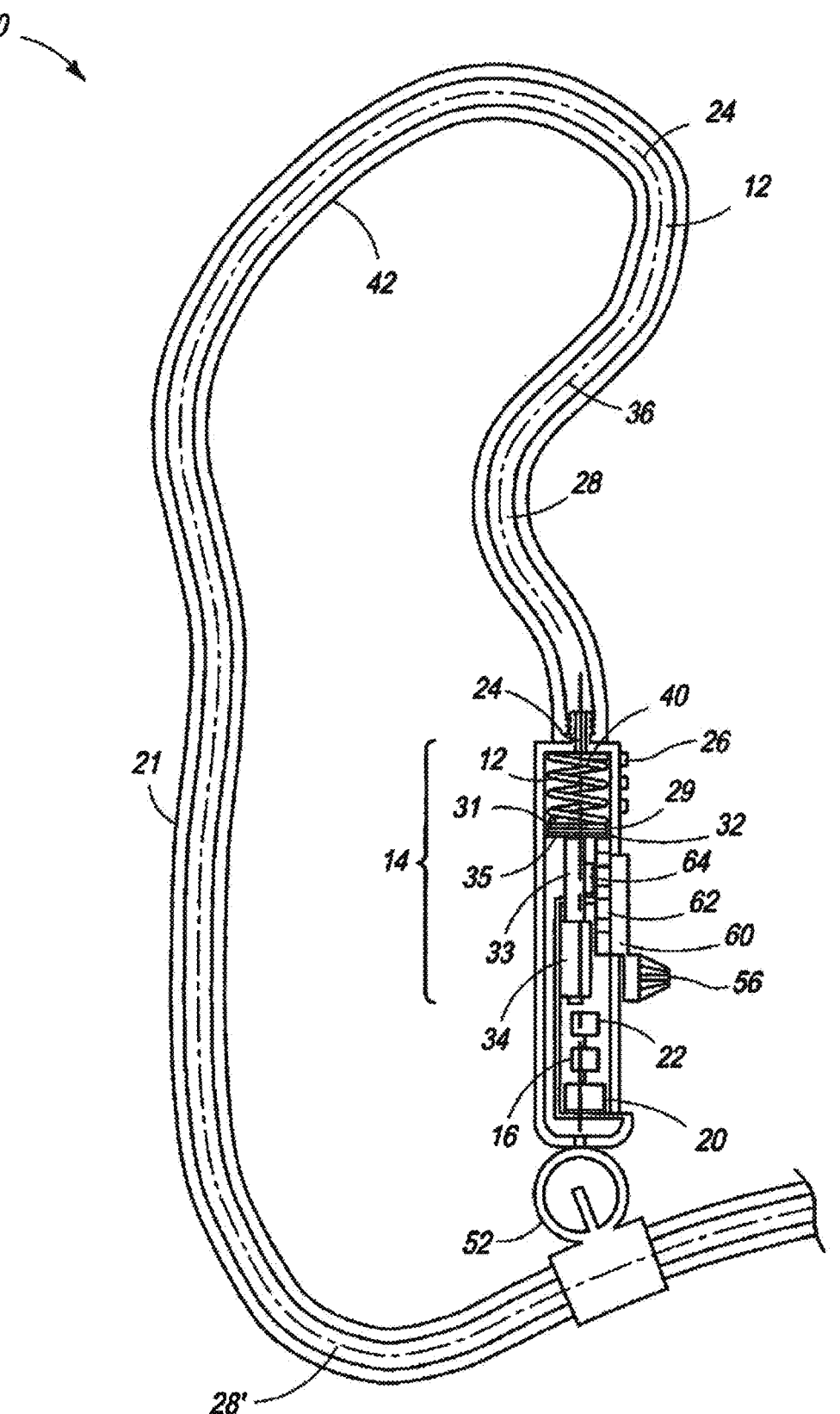
FIG. 3 is a side, cross-sectional view of a first embodiment of the invention.

Referring to FIG. 3, an analog indicator 10 of the invention indicates dosage. The indicator 10 includes a reservoir 12, a pump 14, a measuring device 16, a feedback circuit in a controller 20 and a power supply 22'. The reservoir 12 has a longitudinal axis 24 along which a indicia or a scale device 26 is disposed and is adapted for containing a fluid 28 bounded by at least an indicator surface 30. In a preferred embodiment, the pump 14 is made up of the plunger 32 mounted on a screw 33 driven by a micro motor 34. The plunger 32 generally uses an O-ring seal 29 disposed about its circumference, to seal against the fluid 28 passing between the top and bottom surface 31 and 35, respectively, of the plunger. The pump 14 pumps the fluid 28 out of the reservoir 12, and into the catheter 36. In a preferred embodiment, the measuring device 16 is an electronic clock which measures time and communicates a measured value of time to the feedback circuit 20. The feedback circuit 20, powered by the power supply 22, receives a measured time input from the measuring device 16 corresponding to a position on the scale device 26 and, in response thereto, activates the pump 14 to pump or move the fluid 28 out of the reservoir 12, until the surface 30 reaches a desired position in relation to the corresponding position on the indicia 26 (generally calibrated to equal a desired rate of dispensing of the fluid). The power supply 22 powers the pump 14 and feedback circuit 20. As shown, the reservoir 12 communicates the fluid 28 into the catheter 36. A clasp 52 connects ends of the device 10 to create a bracelet 21.

Further, optionally, an optical fiber and an LED light source illuminate the fluid 28 in the reservoir 12 in a known manner.

A potentiometer 56 regulates the voltage setting to a displacement control system 60. The displacement control system 60 includes an incremental position sensor 62, for example, the tracker NSE-5310 (the specification of which is attached as Appendix A to U.S. Provisional Application No. 61/235,725, filed 21 Aug. 2009, incorporated herein by reference hereto) located adjacent the plunger 32. This control system 60 includes encoding for direct digital output, in which a hall element array on the chip 62 is used to derive the incremental position of an external magnetic strip 64 placed adjacent the chip at a distance of approximately 0.3 mm (typically), the magnetic strip 64 being attached to the plunger 32 in order to translate therewith. This sensor array detects the ends of the magnetic strip to provide a zero reference point.

In an alternate embodiment, the power supply 22 can be solar cells, a wound watch spring, movement captured by an oscillating mass (such as used in automatic watches), or a pneumatic system storing compressed air.

To return the fluid 28 to an initial position, such as 6:00 AM, for example, the plunger 32 may be returned by a return spring 40 or a magnetic device (not shown). Other options are conceivable, of course, which include the return line 42, which allows simple reversing of the motor 34 to reset the indicator 10.

A suitable motor 34 is referred to by its trademark SQUIGGLE™, available from New Scale Technologies, Inc. of New York, USA.

Figure 4A:
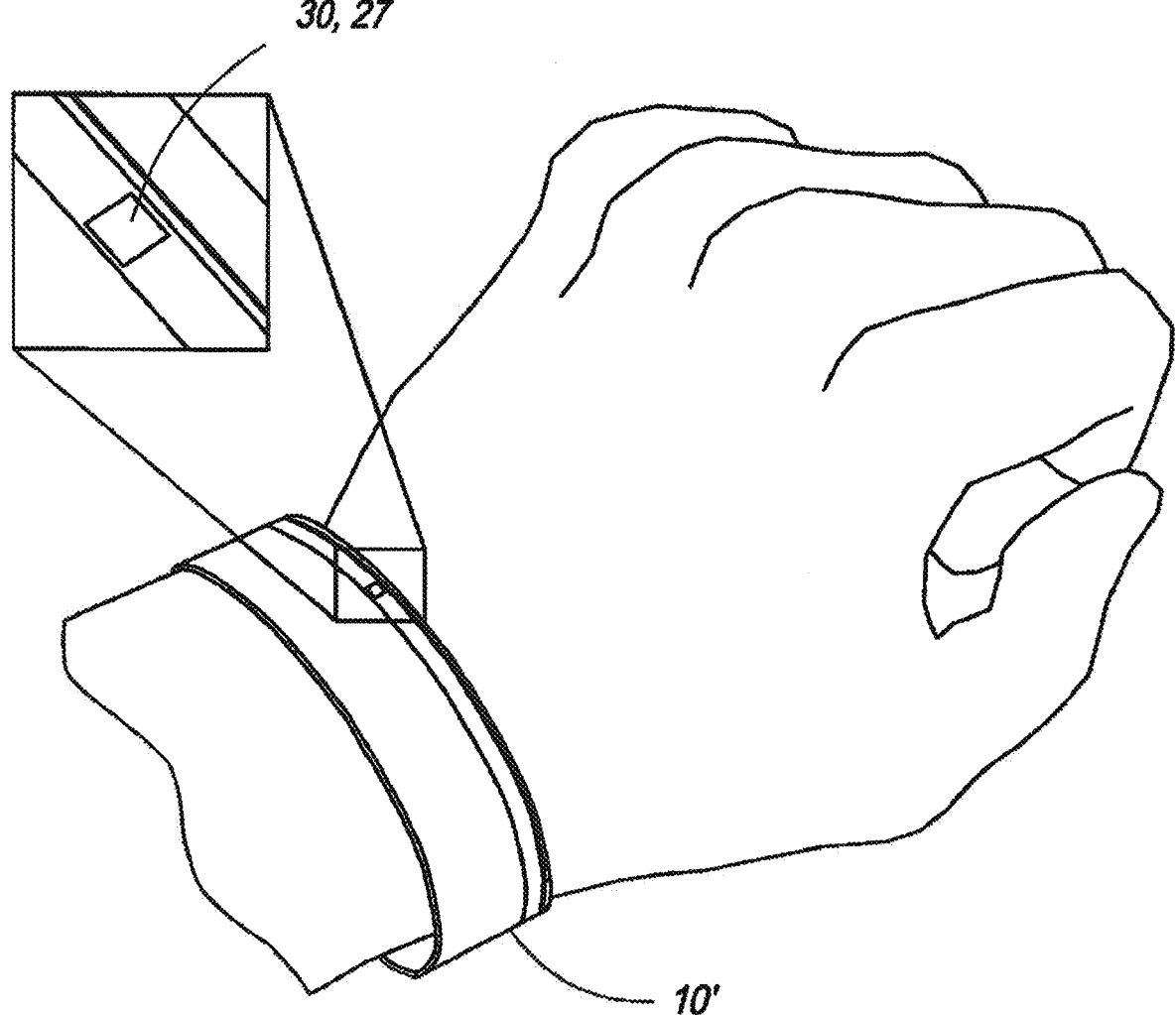
FIG. 4A is a perspective view of a second embodiment of the invention.
Figure 4B:
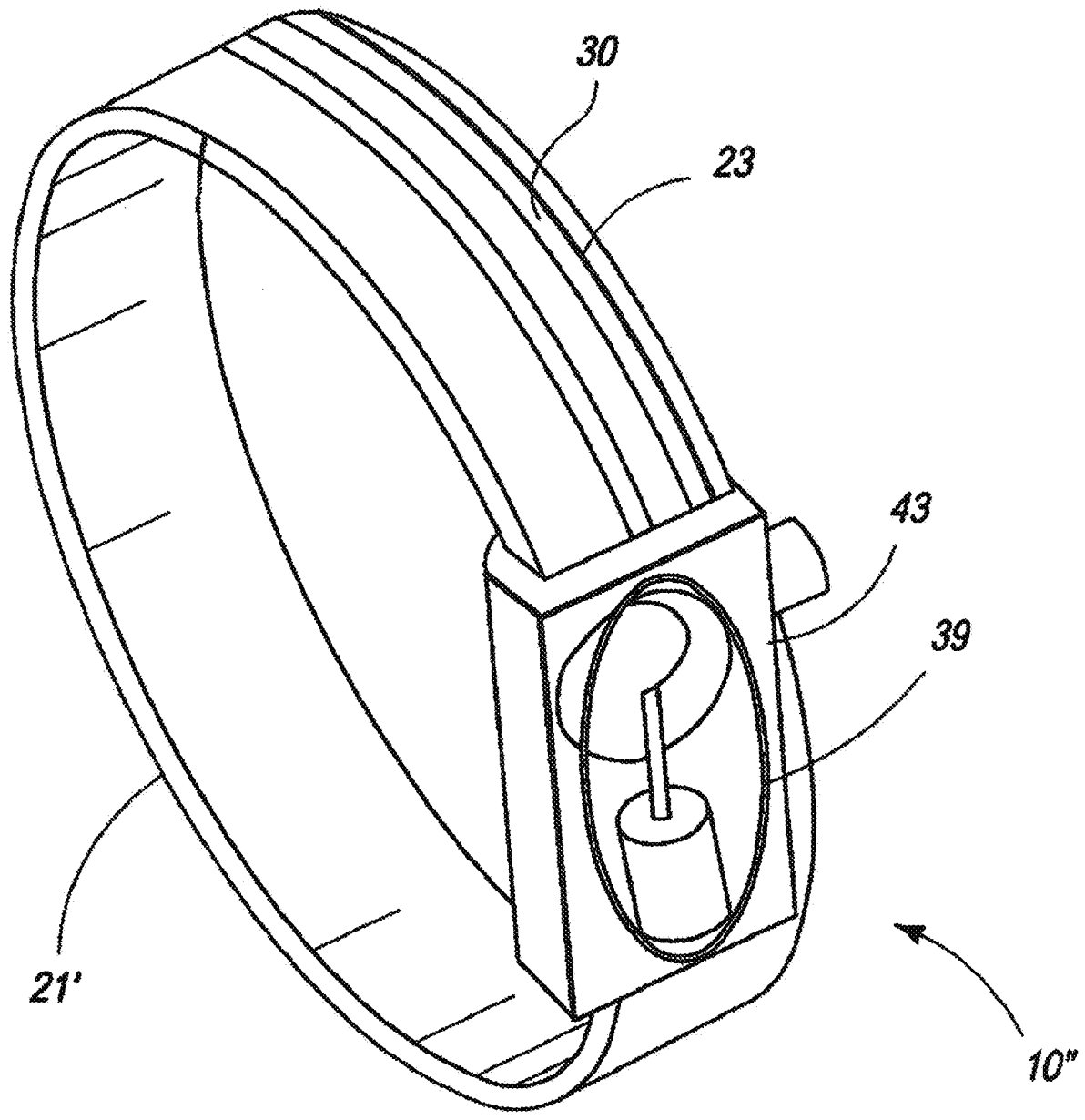
FIG. 4B is a second perspective view of the second embodiment of the invention.

Referring now to FIGS. 4A and 4B, an application of the analog indicator of the invention is a wrist watch or necklace 10 worn around the user's wrist. The reservoir 12' may be made of a transparent or translucent material, or a mixture of transparent and translucent material, formed in any desired shape. It may be made of plastic, rubber, silicon or any suitable material. An elastic material has the advantage that the bracelet 21' may be stretched over the user's wrist. In addition, the fluidic display 23 may be supplemented with a standard watch face 39 on the casing 43.

Figure 5A:
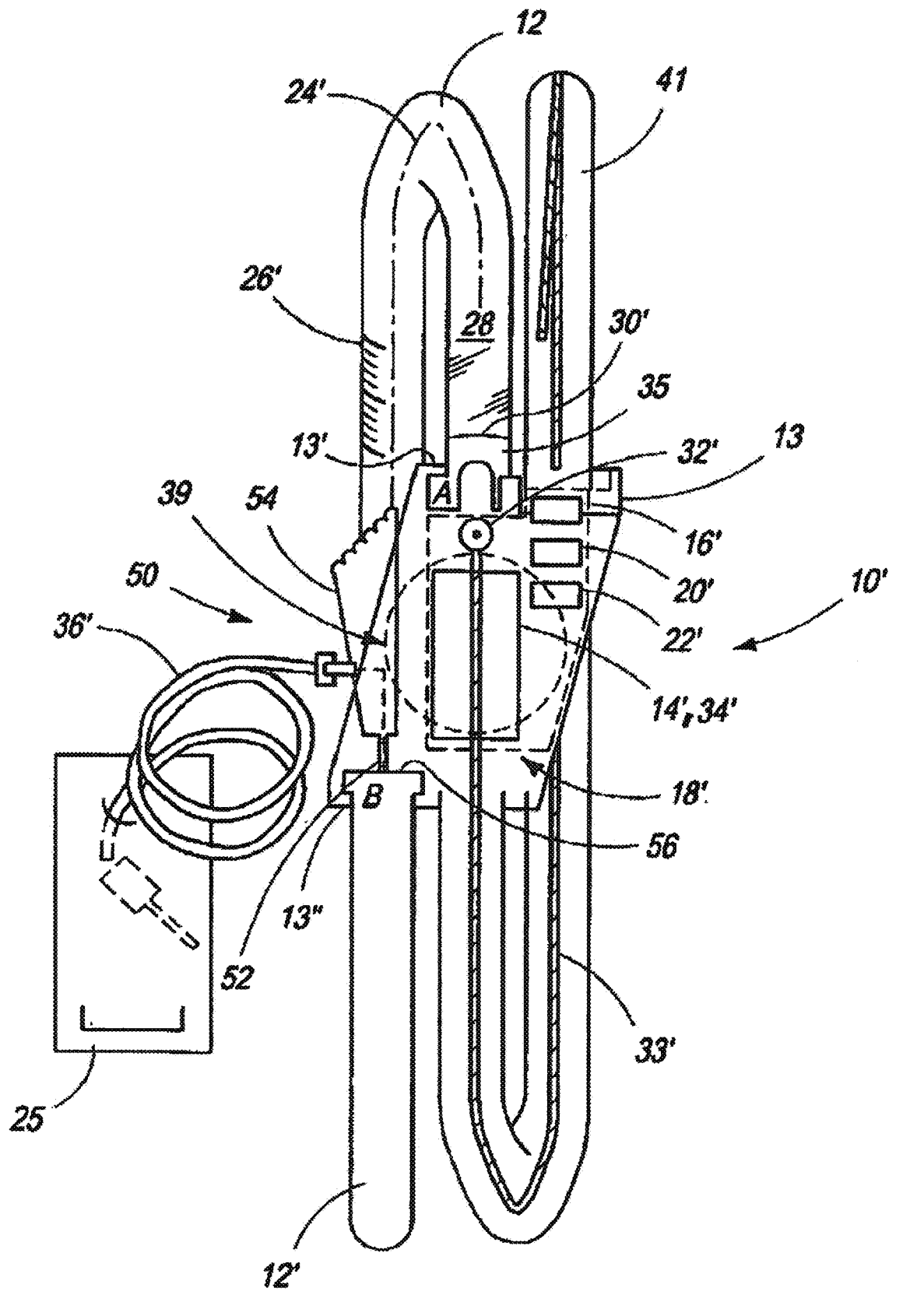
FIG. 5A is a second embodiment of the invention, used as a drug dispenser.
Figure 5B:
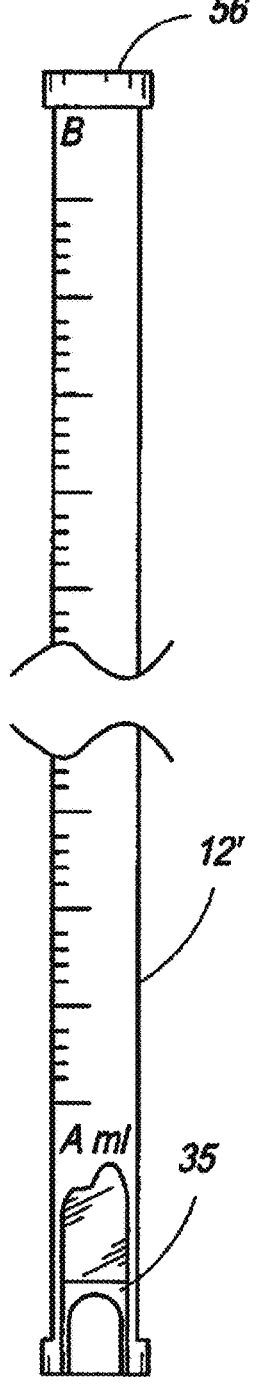
FIG. 5B is a side view of a cartridge for use in the embodiment of FIG. 5A.
Figure 5C:
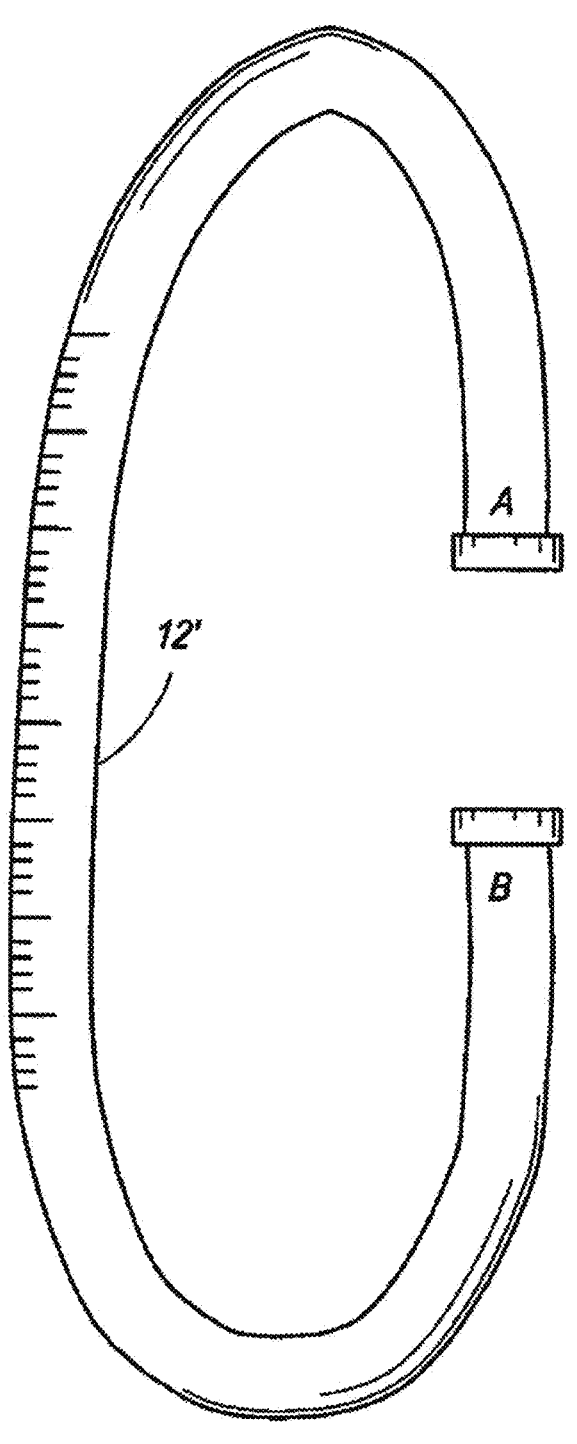
FIG. 5C is a perspective view of a cartridge for use in the embodiment of FIG. 5A, shown in a flexed state.

Referring now to FIG. 5A, the invention may be configured as a device 10" used to administer doses of liquid drugs 28 such as insulin. In such an embodiment, the flexible tube is a disposable drug reservoir cartridge 12' attached to housing 13 containing a dosage control device 18. The device 10" is carried like a wrist watch, with the flexible cartridge 12' serving as a portion of the band thereof. The indicator 10" includes the reservoir 12', a linear drive 14', an optional feedback circuit 16', a controller 20', and a power supply 22'. The reservoir 12' has a longitudinal axis 24' along which indicia 26' is disposed and is adapted for containing the fluid 28 bounded by at least an indicator surface 30'. In a preferred embodiment, the linear drive 14' drives a spherical plunger 32' mounted on a long flexible threaded shaft 33' which is driven by a micro motor 34'. The shaft 33' is preferably made of a superelastic material such as NITINOL. The linear drive 14' drives the plunger 32' against the piston 35 (preferably made of a flexible material such as rubber) which in turn presses the fluid 28 along the reservoir 12' and ultimately through the cannula tube or catheter 36', which then guides the fluid 28 into the patient's body. The electronics of the device 10" ensures that a programmed dosage of fluid is administered at regular intervals or constantly as prescribed by a physician. Note that optionally, the fluid 28, instead of passing into a wearer's body via a cannula, charges an absorptive patch 25 worn by the patient, for slow diffusion of the drug into the patient's body through the skin. Where a medication is administered via a patch 25, the patch may include an outer layer which is semi-permeable, in order to prevent the medication from evaporating before it has its intended effect (i.e. diffusion into the skin), Further, a perfume may be delivered in a similar manner. Particularly for the perfume dispensing embodiment, the patch may be located partially or entirely under the housing 13, or to the side of the housing and may be affixed thereto using a temporary adhesive rather than directly to the living organism, in order to avoid the need to attach the same to the living organism, Such a patch may be sized to be replaced in a defined area (such as circular area marked 39) against the back or any side of the housing 13, adjacent the living organism, much like a "POST-IT" note, so that replacement patches can readily replace soiled patches.

In a preferred embodiment, the number of turns of the linear drive 14' is recorded and controlled so as to ensure the proper dosage. The electronics are powered by the power supply 22'. Alternatively, the position of the piston 35 can be controlled in the manner as described in the above embodiment shown in FIG. 3. The cartridge 12' installs on one side 13' of the housing 13, with its piston 35 adjacent the plunger 32', and on the other side 13", adjacent a piercing mechanism 50 which includes a piercing tube 52 connected to a slidable tab 54. The user may slide the tab 54 to cause the piercing tube 52 to pierce the upper membrane 56 of the cartridge 12', in order to permit the communication of the fluid 28 through the cannula 38 into the patient's body. Where perfume is dispensed, this piercing served to open one end of the cartridge 12' to allow the delivery of perfume into the air, or via a conductive channel (not shown), to, near, or adjacent the skin of the user (for example, directly to and through the patch).

In the embodiment using an external magnetic strip (having a magnetic characteristic where the magnetic field generated thereby increases or decreases along the length of the cartridge) attached to or integrated on the cartridge 12', the computer controller can use this to regulate the dosage administered to the patient.

As with the prior embodiment, the power supply 22' can be a battery, solar power, a wound watch spring, an oscillating mass (such as used in automatic watches), or a pneumatic system storing compressed air.

After a cartridge 12' is fully dispensed, a button (not shown) on the housing 13 can be activated to retract the plunger 32'. The piston 35 remains stationary to prevent any aspiration of fluid from the patient, should the cannula still be connected to the body. Once retracted, the device 10" can be reloaded with a replacement cartridge 12'.

As with the earlier embodiment, a suitable motor 34 is the SQUIGGLE™ motor already described.

Note, that the housing 13 can be fitted with a watch face 39 and corresponding movement (not shown), in order that the drug administration device can also serve as a wrist watch.

Optionally, the threaded rod 33' of the drug administration device 10" is enclosed in a tube 41 which connects on the side 13" of the housing 13' and wraps around the wearer's wrist to reconnect to the side 13' of the housing, giving the visual effect of a two or multi-banded wrist watch.

It is foreseen that the cartridge 12' used in such drug administration device 10" would include a chemical litmus-type indicator which would indicate whether the insulin or other drug is suitable for continued injection. This indication could be expressed by an element of the cartridge 12' changing color, from a color that indicates the fluid is suitable for use, to another color that indicates the fluid is no longer suitable for use.

Still further, the device 10" can be used as a perfume dispenser by replacing the cannula with an aspirating head which can be manually (via a dispenser head or button) or automatically (via the dosage control of the invention) operated.

Figure 6:
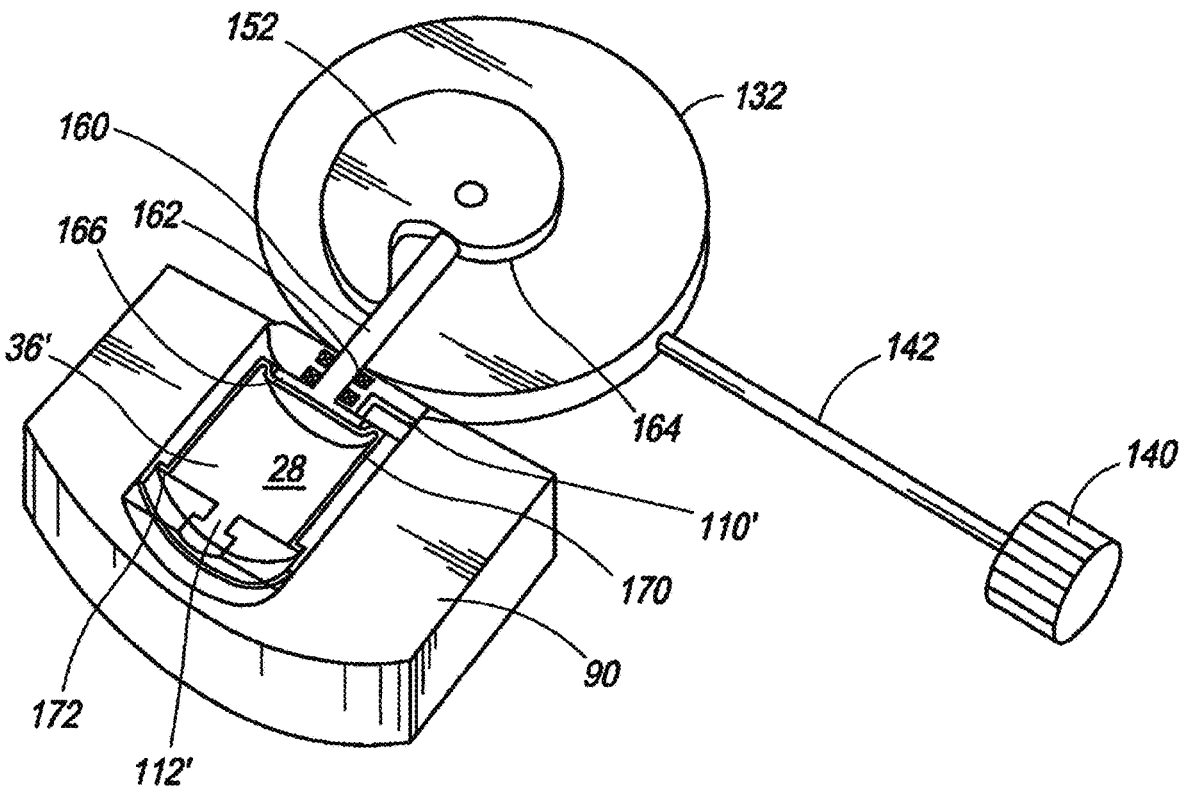
FIG. 6 is a partially disassembled view of the fluid displacement device of the invention, having one reservoir.

Referring now to FIG. 6, in an alternate embodiment, a cam 152 attached to the stem of a watch movement 132, connects to a fluid displacement device 90 via a piston shaft 160, mounted on sealed bearings 162 to axially translate, which is guided in its axial translation by a cam surface 164 thereof. The piston shaft 160 is connected to a piston head 166 which acts against a flexible rolling diaphragm 170 of a reservoir 36' (alternatively, of course the piston may have an O-ring mounted about its periphery or be otherwise sealed, as shown in the embodiment of FIG. 3) The rolling diaphragm 170 has a flange 172 which is sealingly fixed at one end so as to effectively separate a fluid 28 from below the piston head 166, from a fluid 28' (which may include air as a fluid gas) above the piston. The reservoir 36' is shown in an extreme position. A passageway 112' leads to the capillary channel 120, and a passageway 110' provides a return passage to the opposite side of the piston head 166.

The cam 152 is formed resembling a nautilus spiral so as to progressively move the piston shaft 160 and therefore the piston head 166 to displace a determined amount of fluid 28 into the capillary channel 120, at a rate which will indicate the time accurately. Of course, a similar determined amount of drug or perfume may be administered to living organism in this manner as well.

Figure 7:
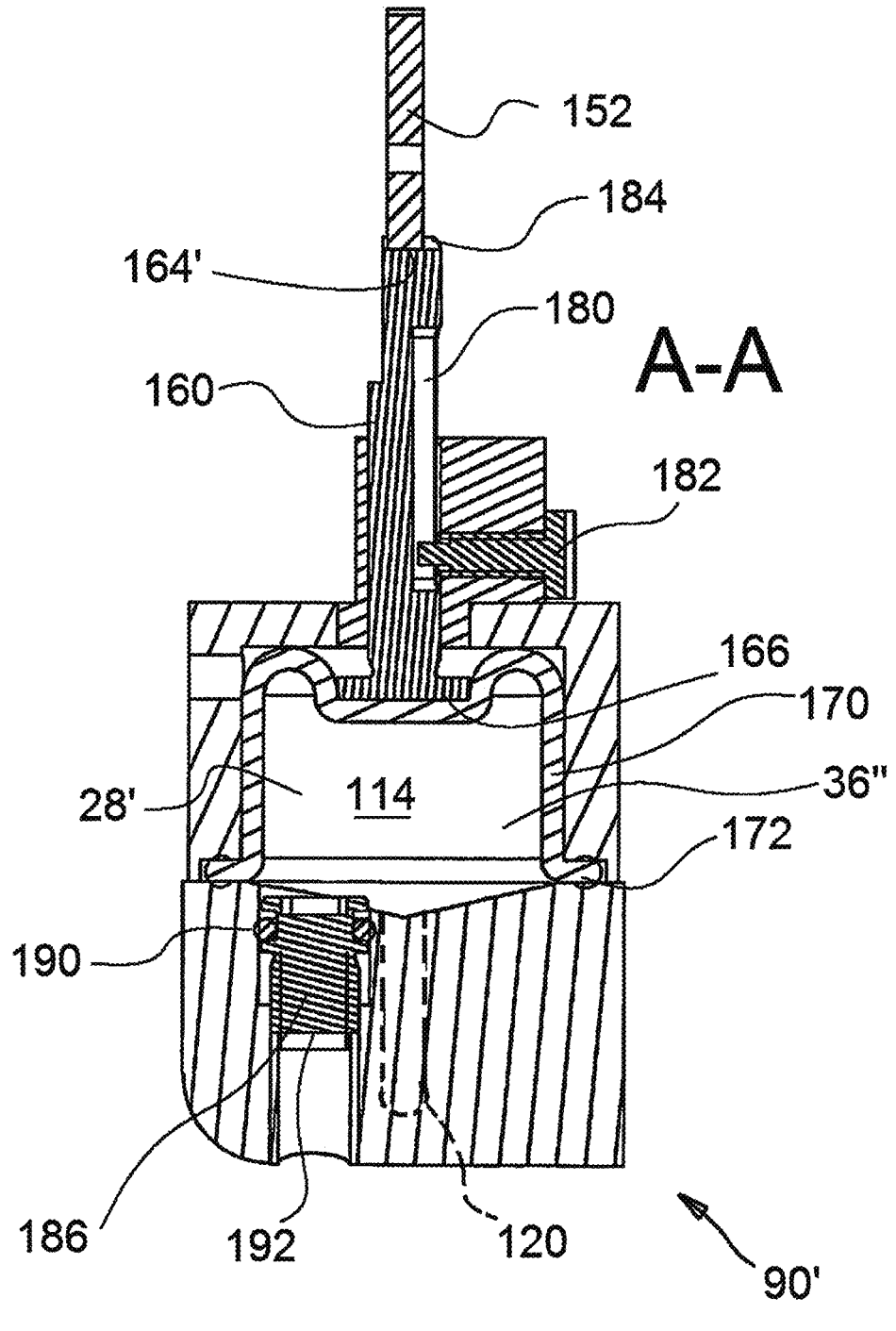
FIG. 7 is a cross-sectional view of a reservoir and displacement member of the invention, showing features which aid in initializing the invention.

Referring now to FIG. 7, again, the alternate fluid displacement device 90 is shown in which the reservoir 36" is in an essentially filled position. A keyway 180 formed on the piston shaft 160 mates with a set screw 182 which screws into the keyway via threads in the fluid display subassembly 90', in order to prevent the piston shaft from rotating on its axis, thereby better maintaining the relationship between the extreme end 184 of the piston shaft and the cam surface 164'. In addition, an adjustment screw 186 having an O-ring seal 190 mounted in a recess therein includes an "ALLEN" or "TORX" interface in an exterior end 192 thereof which allows factory adjustment of the position of the meniscus 30 for calibration purposes. A septum or access port 194 (not shown) or pair thereof, made of an elastic material, may also be used to allow removal and injection of air and fluid 28' and 29' into and out of capillary channel 102 and/or reservoir 36".

It should be noted that the invention 10, 10', 10" may be made exclusive of all electronics (such as would typically be the case where the invention is positioned in the luxury watch market). In such embodiment, the power source 22" may be movement from an oscillating mass, which winds a watch spring, which powers a gear train, for which the rate of rotation is controlled by a pendulum-like regulator or oscillating disk (e.g., a balancier/turbion), which has a characteristic period, as known in the art.

Figures 8A, 8B, 8C, 8D, 8E, 8F:
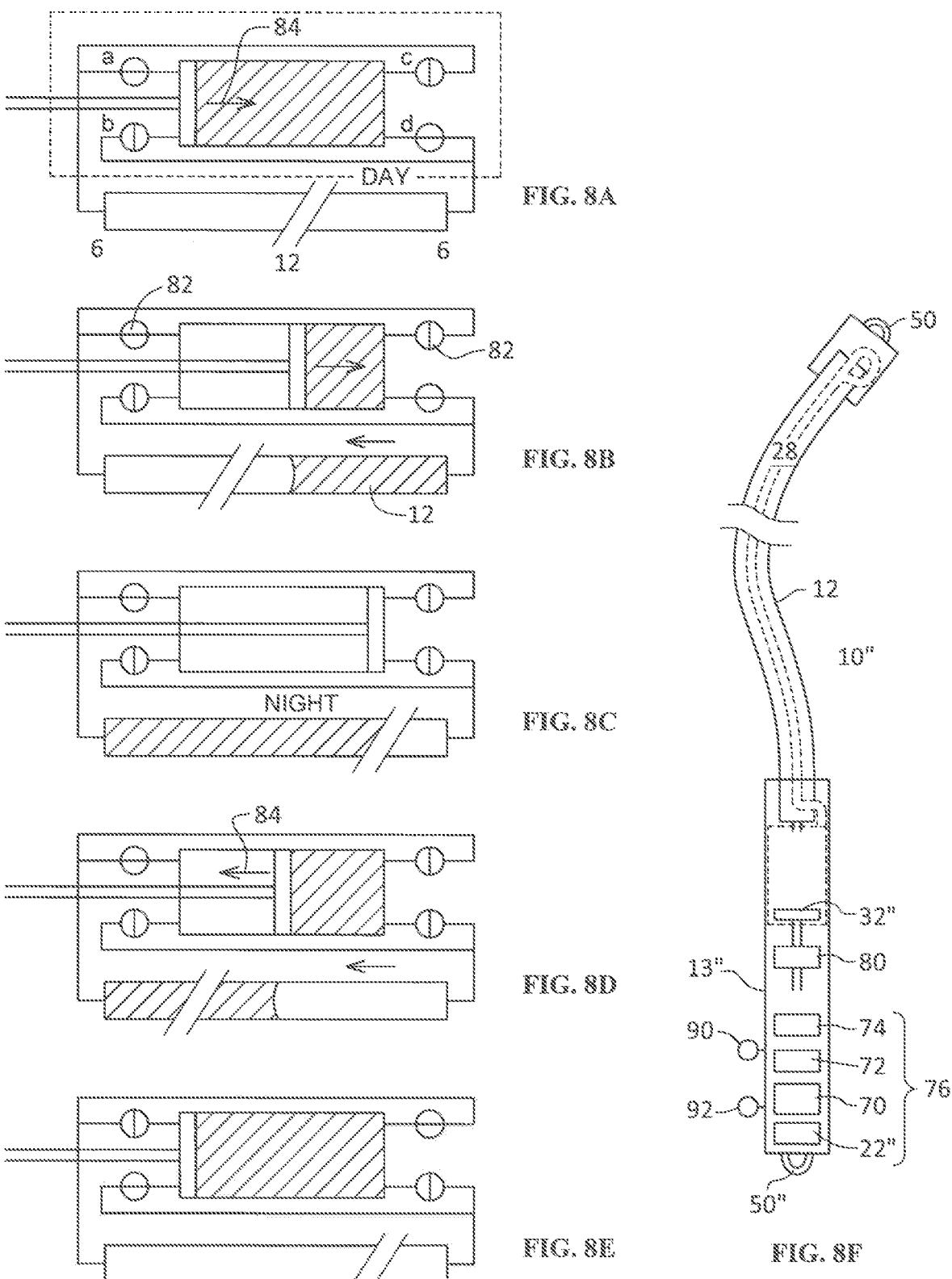
FIGS. 8A-SE are progressive views of different stages of operation of the mechanical embodiment of FIG. 8F.
FIG. 8F is a cross-sectional side view of a fully mechanical embodiment of the invention.

Referring now to FIG. 8F, in a further alternate embodiment, the device 10" may be made exclusive of all electronics, such as would typically be the case where the invention is positioned in the luxury watch market. In such embodiment, the power source 22" may be movement from an oscillating mass, which winds a watch spring 70, which powers a gear train 72, for which the rate of rotation is controlled by a pendulum-like regulator or oscillating disk 74 (e.g., a balancier/turbion), which has a characteristic period. The rotational motion created by the mechanism 76 is transformed into linear motion by the screw 80. This screw 80 drives the plunger 32" which drives a fluid 28 as shown in FIGS. 8A to BE, where valves 82 are opened or closed in order to effect the desired fluid movement in the reservoir 12. The arrows 84 show the direction of movement of the plunger 32". In FIG. 5A, the indicator reservoir 12 is empty. As the plunger 32 advances to the right, in the direction of the arrow, the fluid 28 in the indicator advances to the left. Note the lines and positions of the valves 82 that permit this desired fluid flow. FIGS. 8B and 8C show the continued advancement of the fluid in the indicator to the left. FIGS. 8D and SE show advancement of air to the left, to show day.

In an embodiment without fluid, a threaded rod may be formed as a closed loop and having a surface of which (painted for example) which contrasts with the remaining loop, in order to indicate time on the scale device. A colored reed form, with divots cut at bend points may be actuated along the length of the reservoir so as to resemble a moving liquid.

The reservoir 12' may be made of a transparent or translucent material, or a mixture of transparent and translucent material, formed in any desired shape. It may be made of plastic, rubber, silicon.

In an alternate embodiment, instead of the position sensor 60, a conductive wire (not shown), made of conductive material such as metal, is exposed along at least a portion of its length to fluid in the reservoir 12', as described above.

The conductive wire is therefore in contact with any fluid in the reservoir. The wire may be calibrated using a variable electric resistance along its length as the fluid contacting the wire is pumped in the reservoir, and wherein the fluid is pumped until the electric resistance measured in the wire matches that which corresponds to the measured value, as calibrated. Calibration of the indicator 10 is performed by comparing variable resistance measures with locations along the length of the reservoir, the locations marked with a scale to indicate the corresponding measured value.

Figure 9:
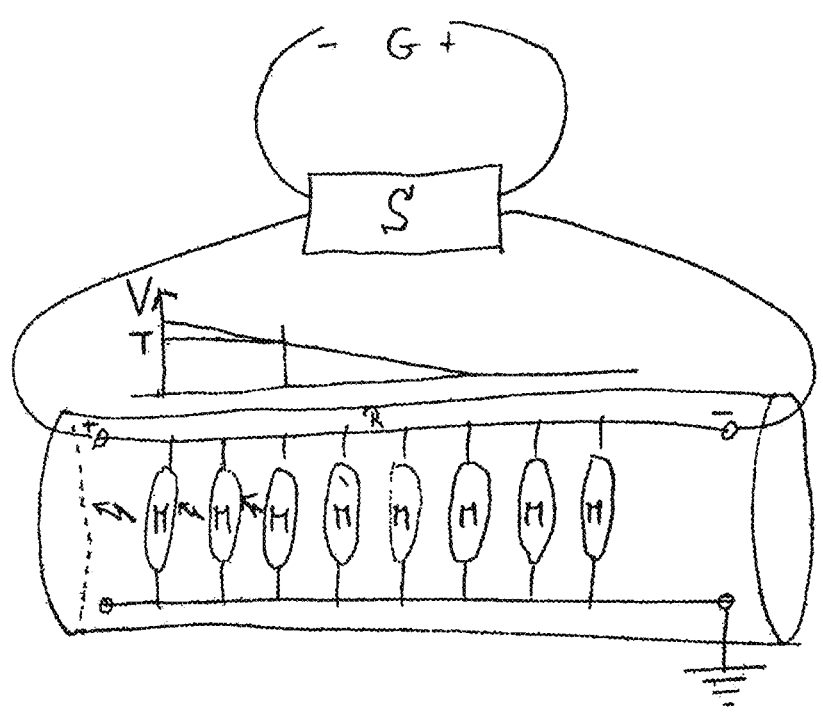
FIG. 9 is a schematic view of an embodiment of the invention for textile applications.
Figure 12:
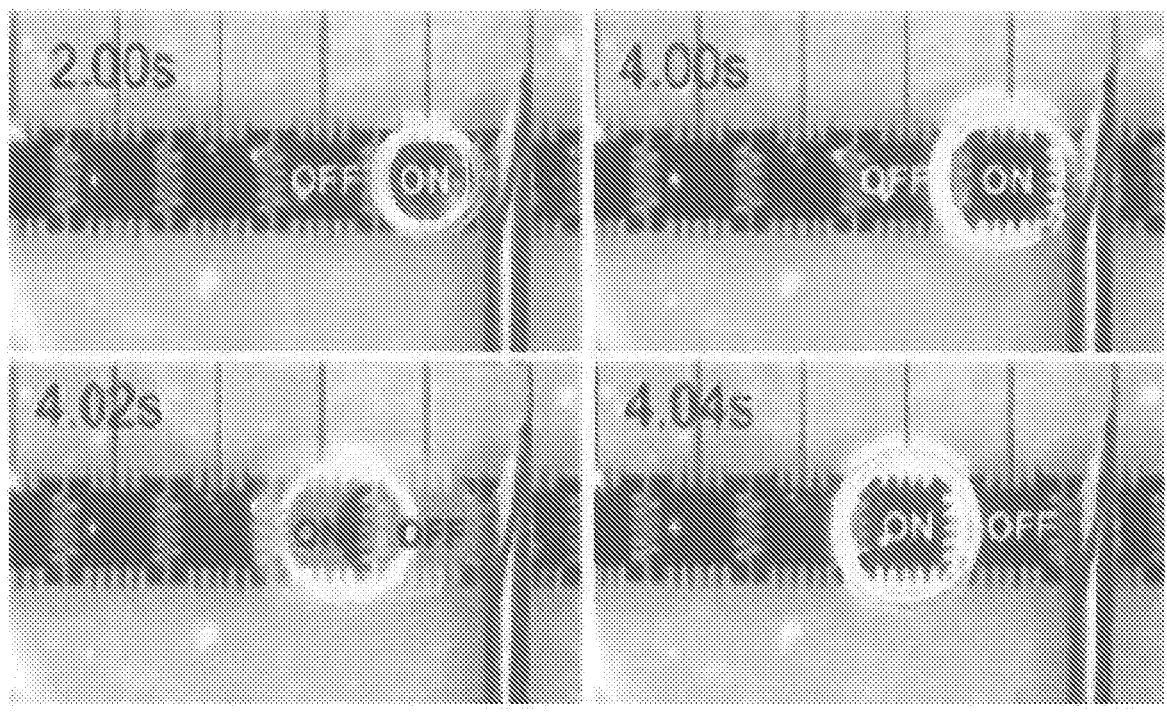
FIGS. 12A-12D are time sequence photos showing the displacement of a droplet of water in silicone oil, with an electrode pitch of 1 mm, and a height of 400 μm.

Referring now to FIG. 9, a textile application of the invention is shown. The goal of this application is to provide a device of the invention which can be sewn in material. A workable embodiment includes:

a molecular chain or fluorescent micro LEDs are included in the reservoir;

a reservoir made of an insulating material;

module or micro LEDs placed along the length of the reservoir at a distance which permits placing at least 12×60=720, for the time piece embodiment;

a connected at the source R and to ground is made;

the LEDs emit light (fluorescence or phosphorescence, shiny glass type) when R attains a voltage of T;

voltage R is provided by an electric power source S;

the electric source S maintains a voltage level of R depending on the electrical resistance of R, but independent of the consumption of the molecules or florescent micro LEDs M;

the florescent molecules M have an infinite resistance as long as the voltage applied is less than T and they become fluorescent as soon as a set voltage level is applied; and the voltage delivered by the source S to R varies as a function of the measured value G.

What remains flexible is the chain of LEDs, which light up and turn off together or via waves, but not for indicating a measured value. It may be as fine and flexible as a thread which may be integrated into a textile item (because it has a small diameter on the order of a millimeter), water resistant, washable, etc.

In another embodiment, fluid may be displaced within a display by a process called electrowetting, Electrowetting is a phenomenon where a normally hydrophobic surfaces loses its properties and becomes hydrophilic as represented in FIG. 10A and FIG. 10B. FIG. 10A shows the droplet with voltage applied to an electrode. FIG. 10B shows the droplet without voltage applied to an electrode.

A schematic representation of an electrowetting display is shown in FIG. 11 along with a detailed schematic of the different layers used to make the actuator. FIG. 12A-FIG. 12D show pictures from a test involving the displacement of a droplet of water in silicone oil with Electrode pitch: 1 [mm], height: 400 [µm].

Figure 13:
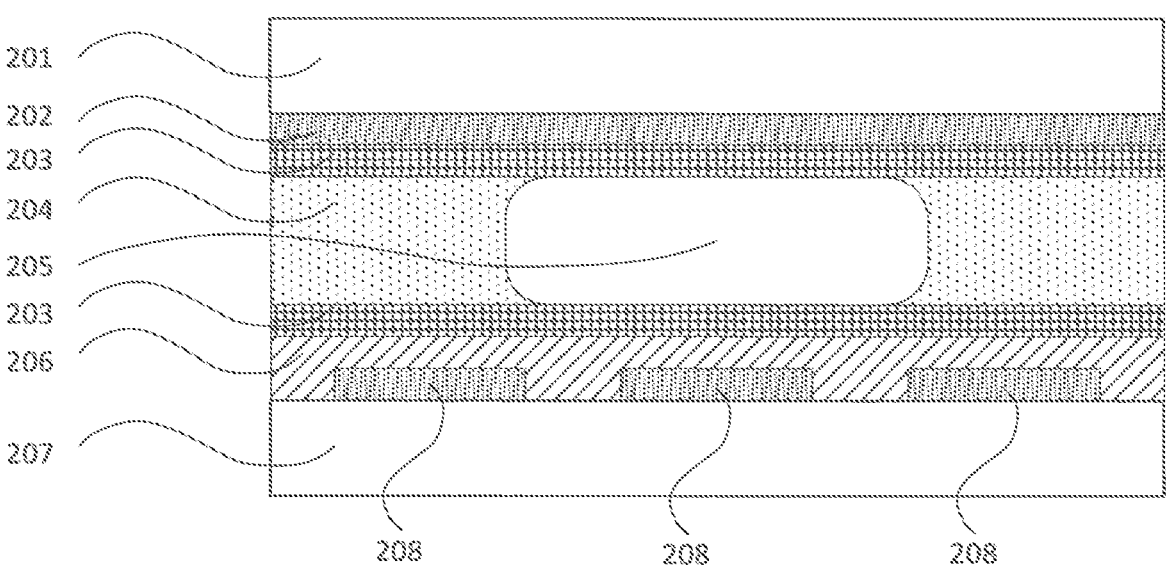
FIG. 13 is a cross-sectional, schematic view of an electrowetting display.

The droplets of fluid 205 are moved in order to obtain a translation to a new position, animating the display. The functionality can have the ultimate goal of indicating a measured value such as time. It can be referenced by an indicia. FIG. 13 is a detailed schematic of an electrowetting display with different layers. It is composed of a top plate 201 that can be rigid or flexible, on which is deposed a common or reference electrode 202, a thin conductive layer that can be structured in different sections. The surface is treated by a coating 203 that assumes phobic surface behavior. All of these elements could be transparent, translucent or even colored in order to keep visible what is below. They can have variable thickness or structure.

The bottom plate 207 is the rigid or flexible substrate on which are deposited and structured the control electrodes 208 that are electrically conductive. These control electrodes are electrically isolated by the dielectric layer 206 on which the phobic coating 203 is deposited. The bottom plate 207 and its inherent layers can have any visual aspect including transparent, translucent, colored, partially opaque, and opaque. They can have variable thickness or structure.

The coating 203 is optional in the display depicted in FIG. 13, as additives in the fluids 204 and 20S could assume the phobic function with the surfaces of the reservoir containing the fluids 204 and 205. In some cases, the electrical contact is guaranteed between the fluid 205 and the common or reference electrode 202, otherwise it is electrically isolated.

The fluid 205 is the active liquid in the electrowetting process. This fluid 205 constitutes a visible separate phase within the passive fluid 204 supposed to fill the space left by the first fluid 205 in the reservoir. The fluid 204 can be liquid or gas. Both fluids 204 and 205 can have any visual aspects Including transparent, translucent, colored, partially opaque, and opaque as long as a strong contrast allows to distinguish them from one another. One or several droplets of fluid 205 could be comprised in the system. Both fluids are contained in a reservoir, a channel or a tube for instance.

Figure 14:
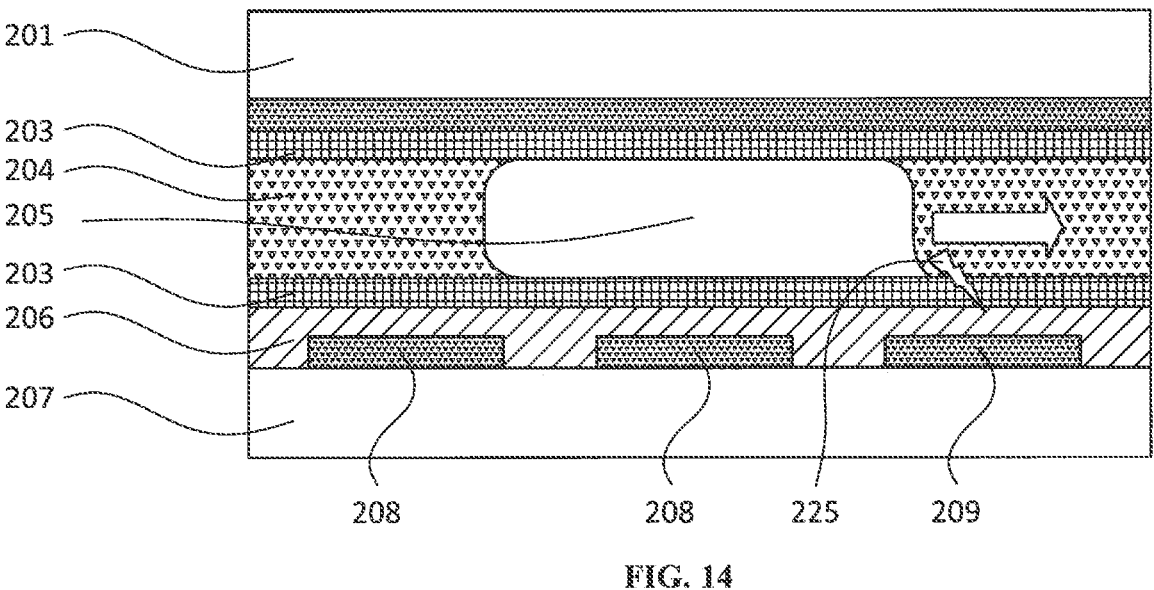
FIG. 14 is a cross-sectional, wherein an adjacent electrode is activated including a surface behaviour change.

FIG. 14 shows how the fluid 205 reacts efficiently under an electrical field represented by the lightning symbol 225 and applied by the electrical activation of the control electrode 209 which is similar to the other control electrodes 208. As an effect, the contact angle of the fluid 205 over the surface of the bottom plate 207 and its inherent layers changes inducing an attraction force by capillarity effect. This attraction force causes the movement of the fluid 205 droplet.

Figure 15:
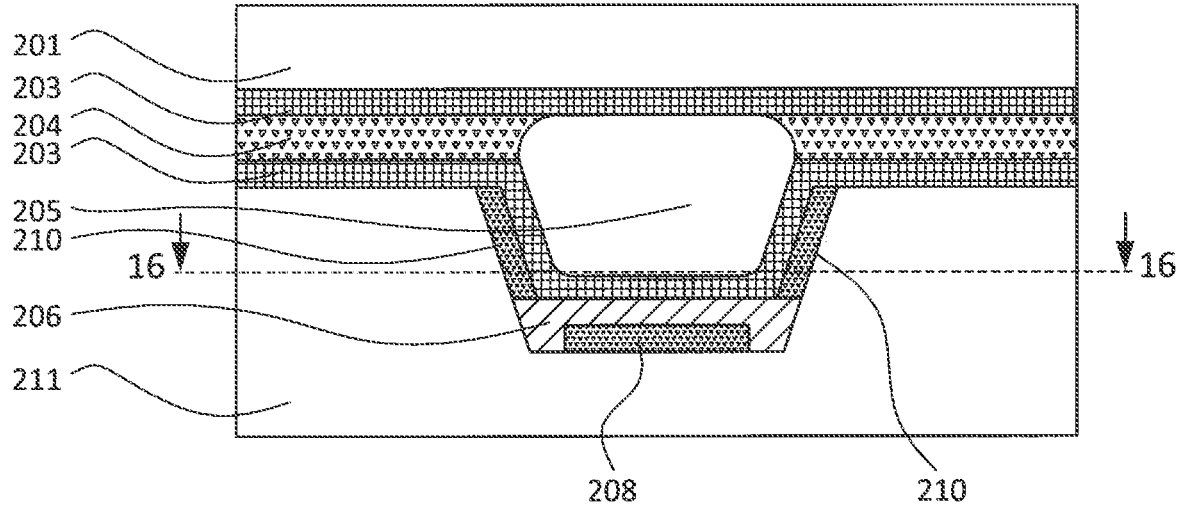
FIG. 15 is a cross-sectional, schematic view of an electrowetting display with structure of the bottom plate on which all the electrodes are formed.
Figure 16:
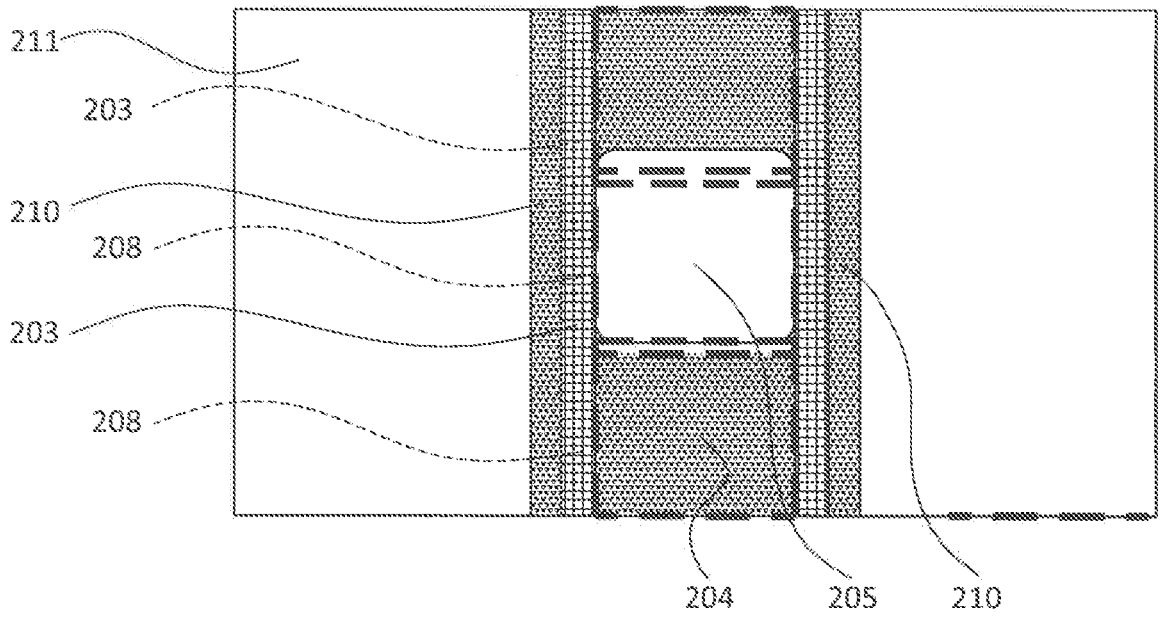
FIG. 16 is a top view of FIG. 15, showing the channel shape and the structure of control electrodes.

FIG. 15 describes another way of implementing the different components of a display where the fluids are displaced by the electrowetting effect. The bottom plate 211 is structured to form a channel where the common or reference electrode 210 is divided in 2 sections placed on the walls of the channel. The surface of the top plate 201 is not closing the channel. The coating 203 is placed everywhere in order to assume that the droplet stays in the channel and hence avoid a capillarity effect that would drag out the droplet in the thin space formed by the bottom plate 210 and the top plate 201. FIG. 16 is a vertical cross section of the implementation example of FIG. 15 where the location of the cross section is indicated. The control electrodes 208 are placed along the channel and the common or reference electrodes 210 are placed along the channel on both side.

Figure 17:
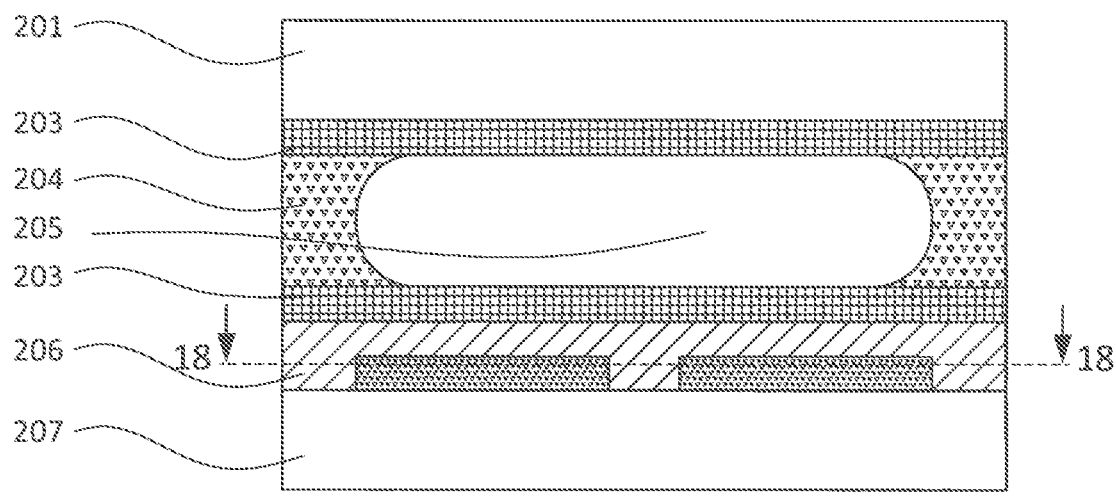
FIG. 17 is a cross-sectional, schematic view of an electrowetting display with all the electrodes structured on the bottom plate.

FIG. 17 shows another way of implementing the different components of a display where the fluids are displaced by electrowetting effect. The common or reference electrode 202 is placed along the control electrodes 208 on the bottom plate 207. All the layers numbered and described as within the FIG. 13 have the same function here in this implementation. In that case, the droplet of active fluid 205 is isolated from the common or reference electrode 202 by the dielectric layer 206 (see FIG. 17).

Figure 18:
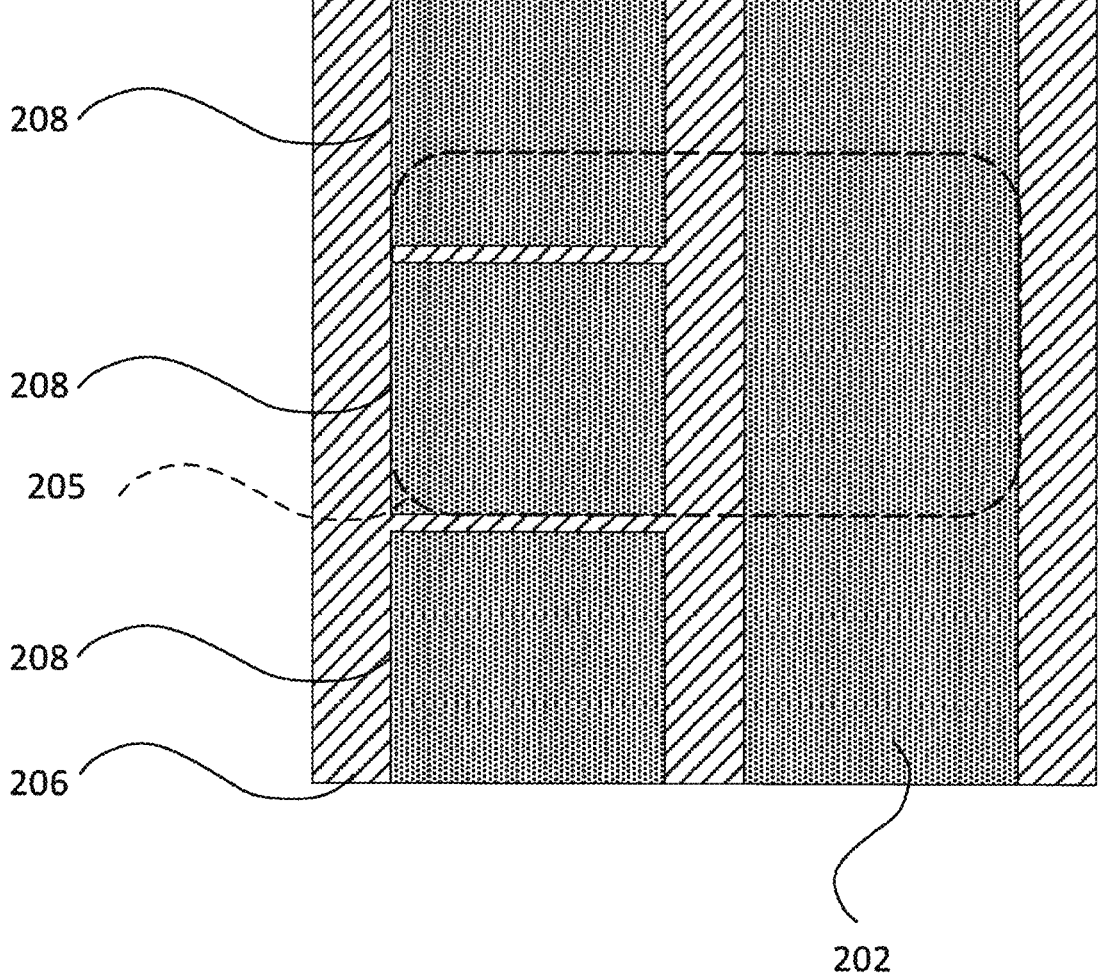
FIG. 18 is a top view of FIG. 17, showing the electrodes structure.
Figures 19A, 19B, 19C, 19D, 19E, 19F:
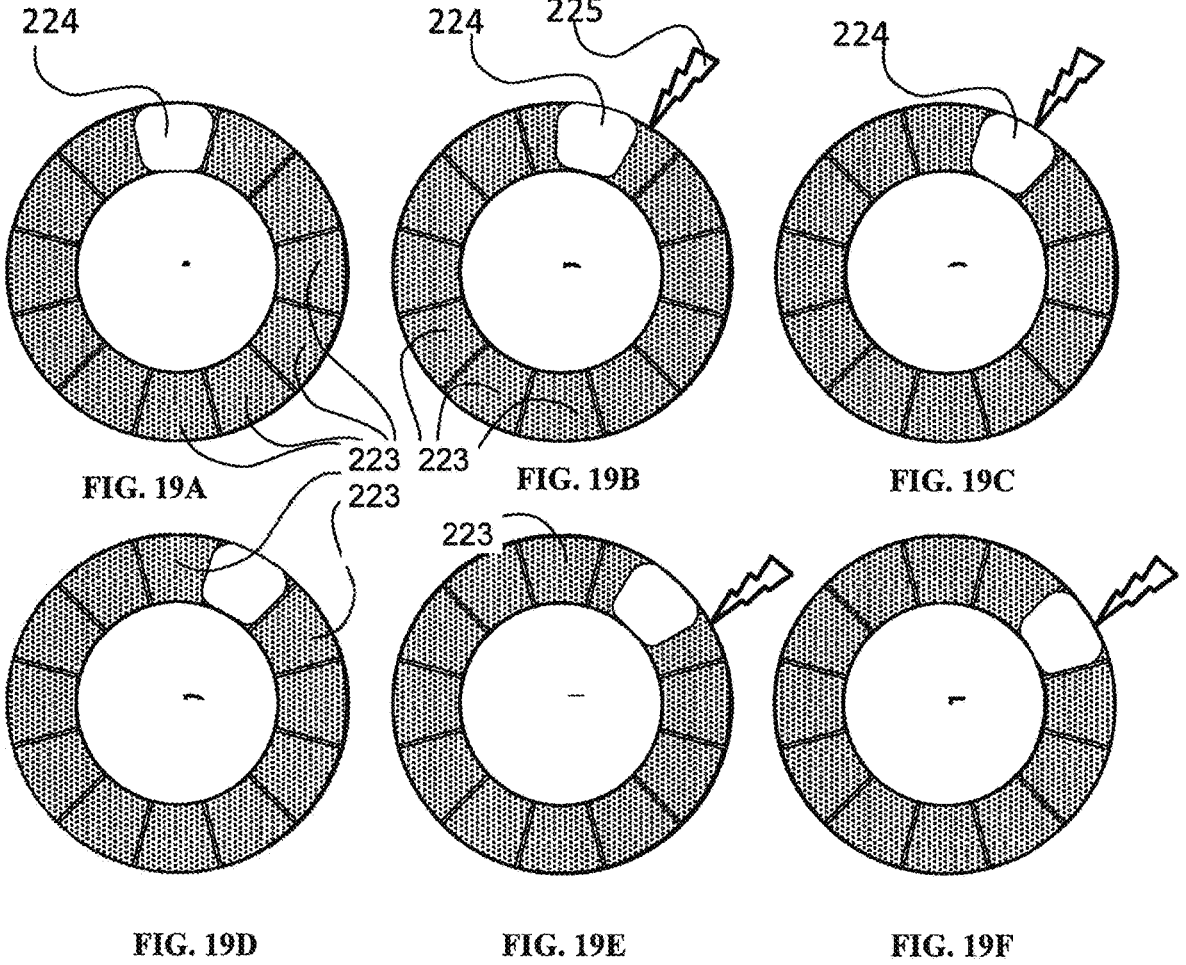
FIGS. 19A-19F are progressive schematics showing the displacement of a droplet according to the control electrodes activation.
Figure 19G:
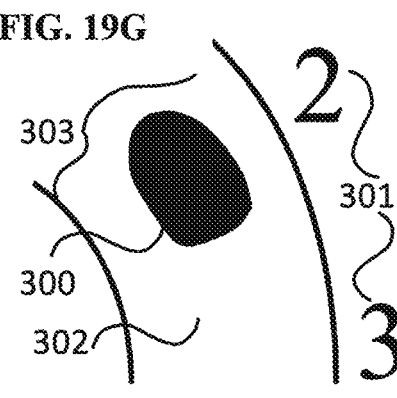
FIGS. 19G-19N are progressive schematics showing the displacement of a droplet according to the control electrodes activation.
Figure 19H:
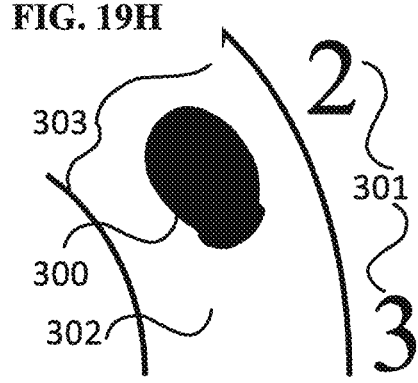
Figure 19I:
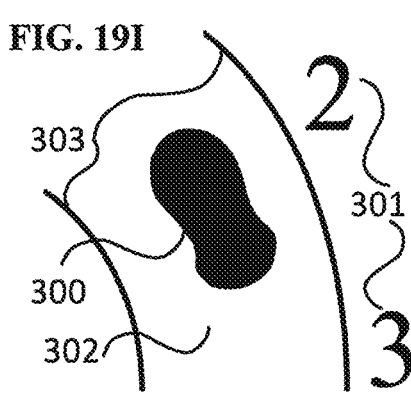
Figure 19J:
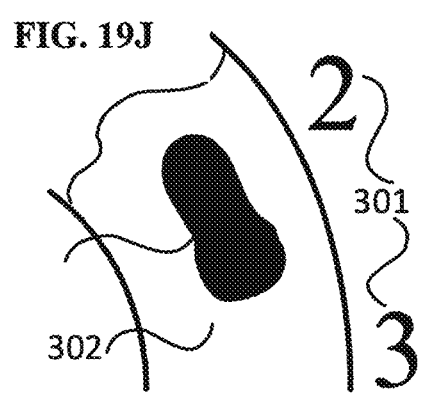
Figure 19K:
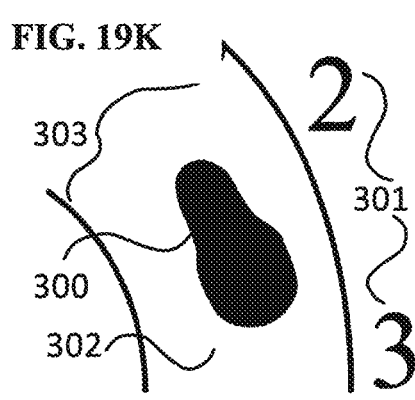
Figure 19L:
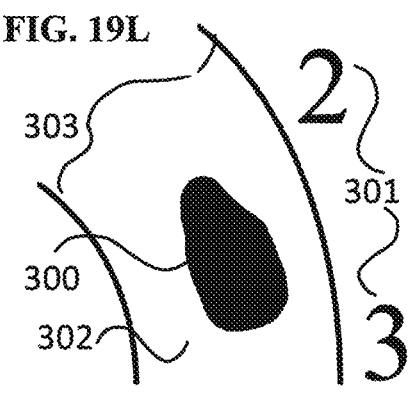
Figure 19M:
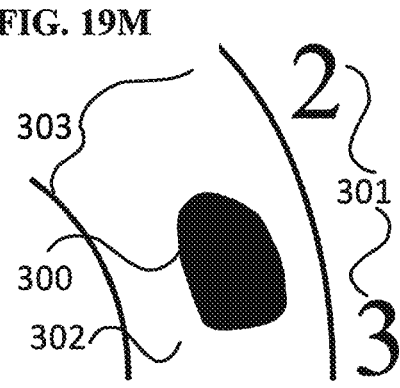
Figure 19N:
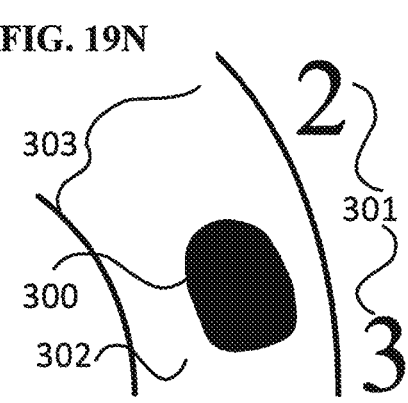

FIG. 18 highlights the details of structure of the common or reference electrode 202 which can be divided in several section. In this case, the common or reference electrode 202 is an elongated electrode placed along the control electrodes 208. The droplet of fluid 205 is spread all over both kinds of electrodes.

FIG. 19 shows the sequence with the stages from A to F explaining how to control the displacement of the fluid that has the shape of a droplet 224. The fluid is similar to the fluid 205 described above. The droplet of fluid 224 is slightly larger than the control electrodes 223, in order to assume that it can move to the adjoining control electrodes 223 when it is supplied with a voltage. This voltage can be of DC or AC type. In stage A, the droplet is static as no control electrodes 223 have been activated, The fluid is moving in stage B because the adjacent control electrode is activated as shown by the lightning symbol 225. The displacement occurs until the droplet reaches an energetic equilibrium (that doesn't imply necessary that it has to cover the activated control electrode 223 completely). As shown in FIG. 19, it does cover the activated control electrode 223 at stage C. In stage D, the process starts again in the new position to move over the next adjacent control electrode 223 described in stages E and F. The control can move the droplet in any direction. In case of several droplets of fluid, they can be controlled independently. Further, FIG. 19 shows the sequences with the stages G to N.

Figure 20G:
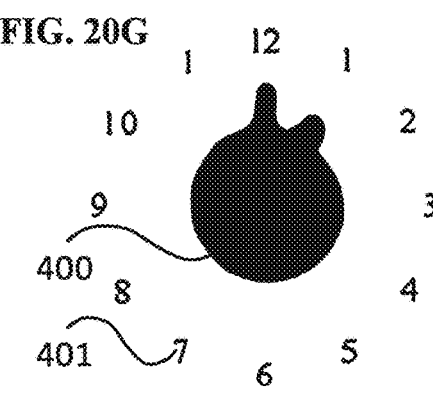
FIGS. 20A-20B are progressive schematics showing the droplet deformation according to the control electrodes activation.
FIGS. 20C-20Q are sequential views of the droplet deformation detailed in FIGS. 20A-20B.
Figure 20H:
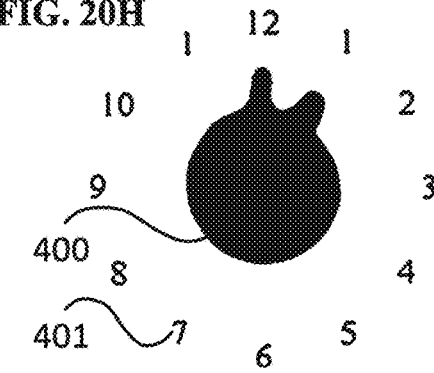
Figure 20I:
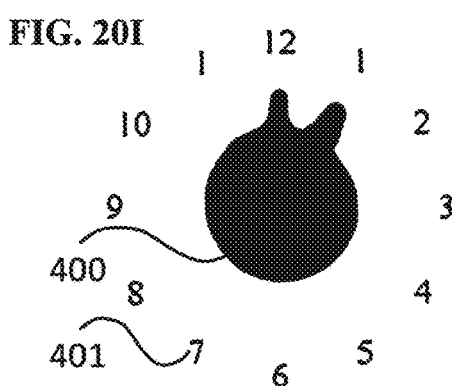
Figure 20J:
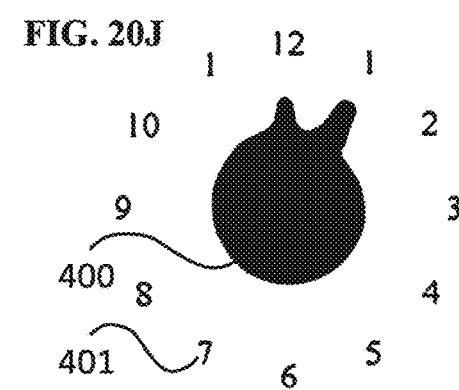
Figure 20K:
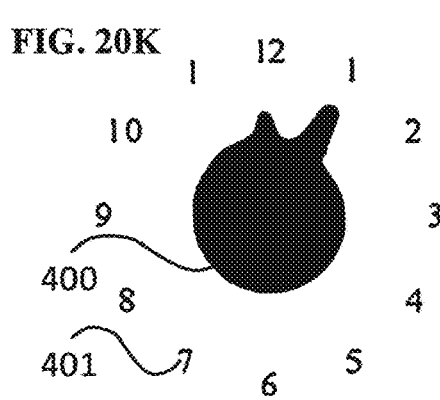
Figure 20L:
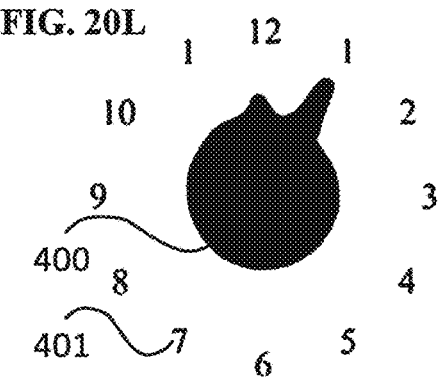
Figure 20M:
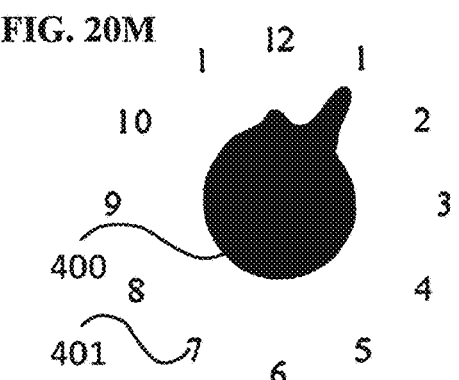
Figure 20N:
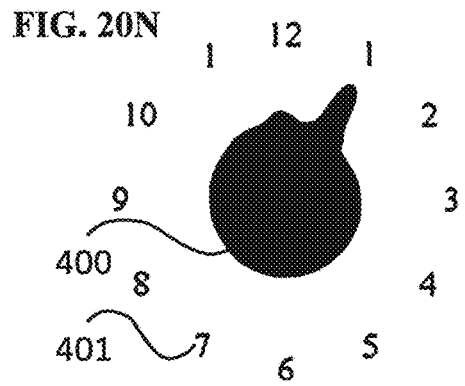
Figure 20O:
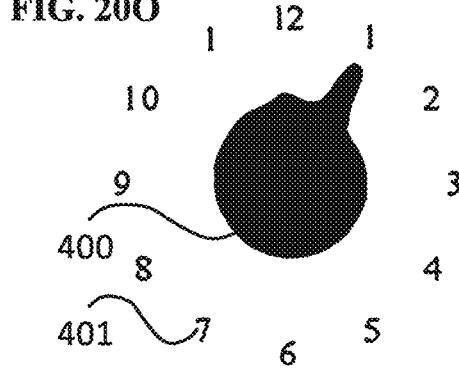
Figure 20P:
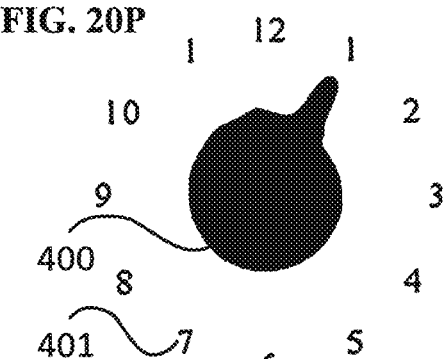
Figure 20Q:
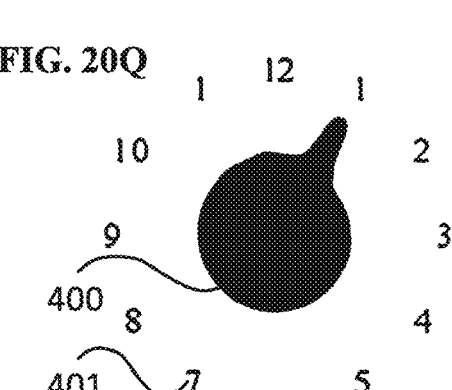

FIG. 20A-B show another way of implementing a display that takes advantage of the electrowetting effect. The droplet, that shows the same properties as the fluid 205 shown in FIG. 13, is not translated but the movement of fluid is inducing a deformation of the droplet. The control electrodes 220 are forming the 12 branches of a star in this particular embodiment, each of them could be activated. The droplet center 219 could be actively held by a control electrode placed below, or passively with an appropriate surface treatment to make the droplet stick on this area. In stage A, the star branch 221 contains the deformation of the droplet because its control electrode 220 below has been activated as shown by the lightning 225. In stage B, another star branch 222 is activated to attract the part of the droplet and hence modify the deformation. Here, it is not necessary to activate the adjacent control electrode 220 which the droplet deformation would be in contact with. It is the droplet center 219 that has to be in contact with the new activated control electrode 220. This principle of droplet deformation is supposed to animate the droplet and if relevant, indicate a measured value that can be referenced by an indicia. Further, FIG. 20C-Q shows a sequence with the stages C to Q.

Figure 21:
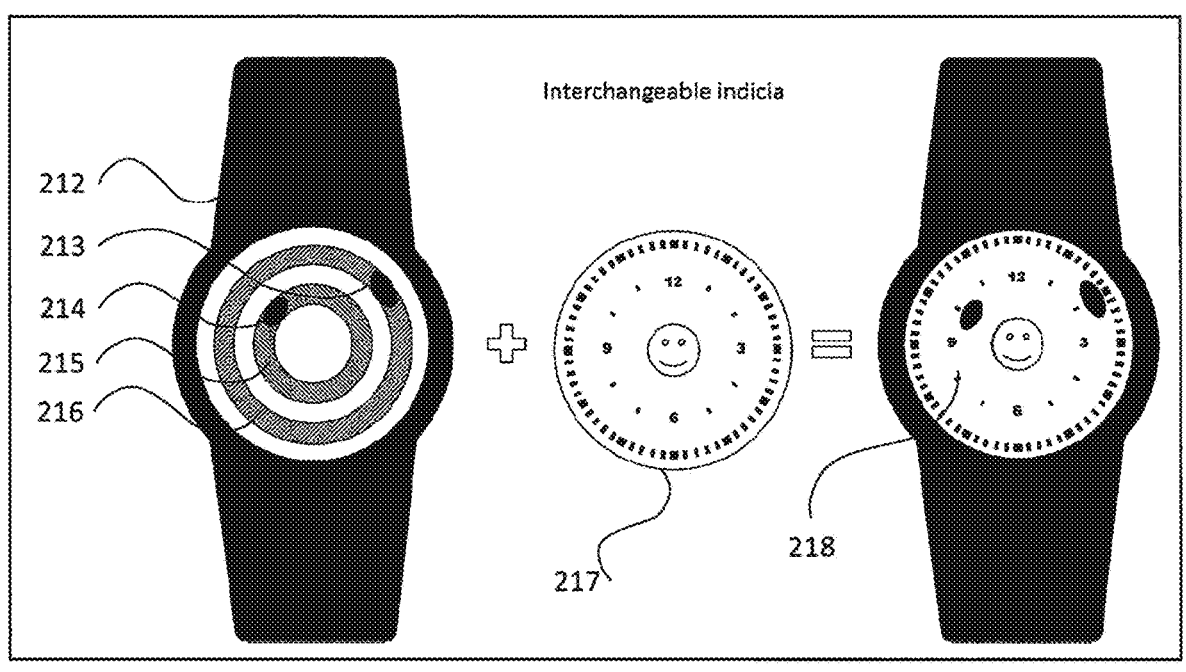
FIG. 21 are progressive views of the assembly of an interchangeable indicia under a transparent display.

A particular implementation of the display is when all the layers and fluids depicted in FIG. 13 are transparent except-ing the fluid 20S that is colored in order to have a good contrast, making the droplet of fluid visible to the user. FIG. 21 describes this embodiment for a wrist timepiece 212. In that particular implementation, there are two droplets indi-cating the hours for droplet 214 and the minutes for droplet 213. The circles 215 and 216 are not visible for the user, they are just showing the path that the droplets are following. Thanks to the transparency of the display, it is possible to have an interchangeable indicia 217 that allows the user to customize his device 218 as shown in FIG. 21.

Still further, two embodiments apply the electrowetting phenomenon using a capacitive sensor.

Figure 22:
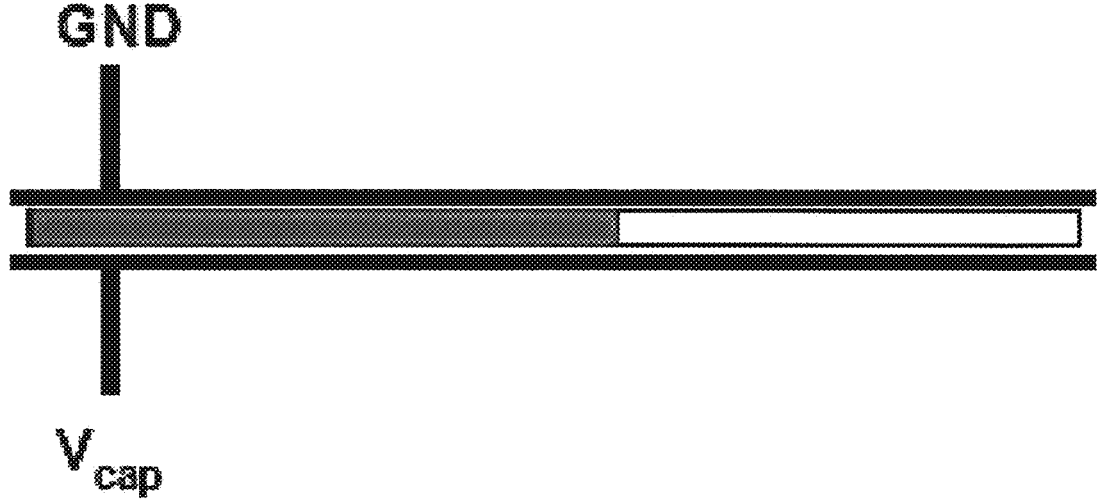
FIG. 22 is a cross-sectional view of an alternative embodiment of the analog sensor over the entire tube.

Referring to FIG. 22, in a first capacitive sensor embodi-ment, a single electrode is used, where the liquid level is inferred from the analogical value of capacitance measured across the whole tube. This embodiment allows the use of a simpler electronic circuit. However, it is more difficult to calibrate given the influence of environmental parameters.

Figure 23:
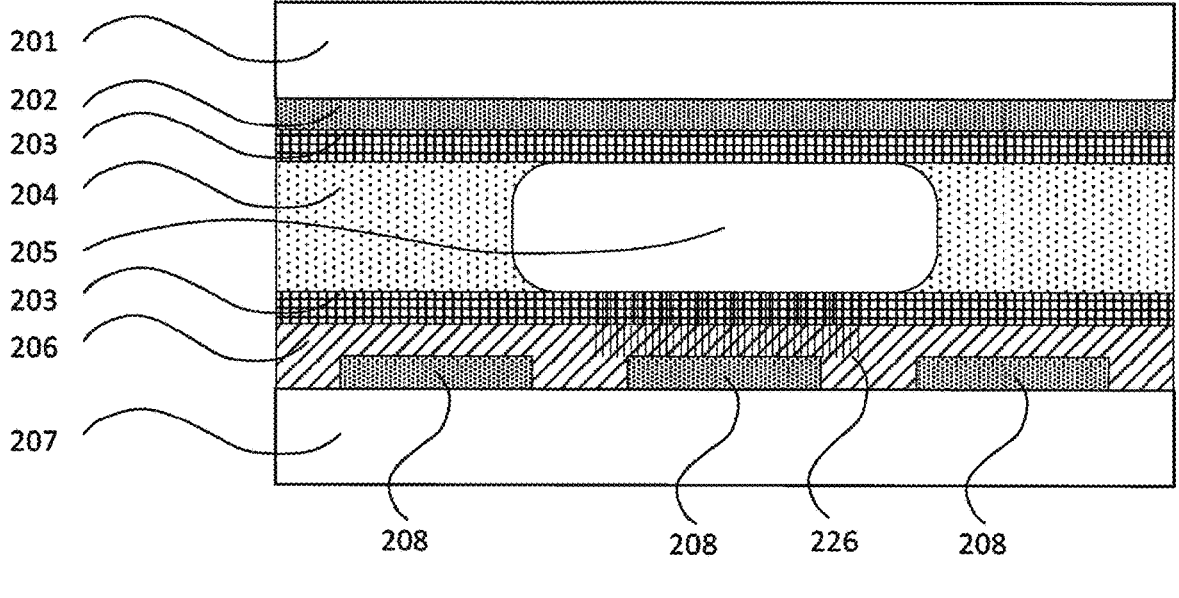
FIG. 23 is a cross-sectional view of an alternative embodiment of a digital sensor of the invention, implemented on an electrowetting display.

Referring to FIG. 23, in a second capacitive sensor embodiment, the liquid level is determined as a digital value, using for example, one hundred and forty-four electrodes, one for each time step.

The above solution is extremely robust, not being influ-enced by environmental parameters as in the first capacitive sensor embodiment. One reason for that resides in the fact that the area 226 of dielectric layer 206 below the droplet of fluid 205 is highly capacitive.

In the following four embodiments, the electrowetting fluid actuation for animation purposes is applied. Their construct follows the same scheme as described of FIG. 13 as well as the electrical activation of FIG. 14. In particular, they contain 2 immiscible fluids, one of them being indi-cated with reference number 228.

Figures 24A, 24B, 24C:
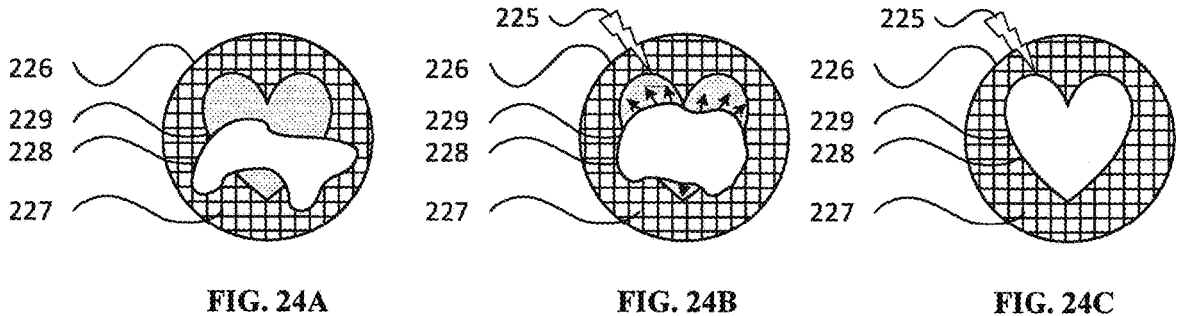
FIGS. 24A-24C are progressive schematics showing the animation of a droplet deformation on an electrowetting display composed of one control electrode.

Referring to FIG. 24, in a first basic animation principle, the electrowetting display is composed of one control elec-trode 229 that is designed in order to represent any aesthetic shape, a heart in this case. It can be translucent or opaque, but preferentially transparent to provide a surprise effect in the animation. In step A, the fluid droplet 228 floats freely in the reservoir 226. The area 227 is coated the same way as above the control electrode 229 such that the fluid droplet 228 moves without constraint. If the control electrode 229 is transparent, its electrical activation in step B induces a surprise effect because the droplet deformation is unex-pected. The deformation ends on a new stable state accord-ing to the shape of the control electrode 229 as depicted in step C.

To work more effectively the fluid droplet 228 or any separated fluid droplet has to overlap the control electrode in order to move correctly onto the control electrode 229. Having only one control electrode is the simplest imple-mentation where the control system can be reduced to an activated power supply. However more complex construc-tion can be made to enhance the fluidic animation.

Referring to FIG. 25, the electrowetting display imple-ments a system able to gather any separated droplets. In step A, all the portions of fluid 228 are floating freely in the reservoir 226. Substantially the whole surface of the reser-voir 226 is treated in order to provide no constraint on the movement of the fluid. In this particular implementation, 4 concentric control electrodes 229 to 232 are provided. Again, they can be opaque or translucent but preferentially transparent to provide the surprise effect. It is not necessary to have a concentric structure as long as the control elec-trodes cover a portion of the surface such as any droplet of fluid 228 will overlap at least a portion of any control electrodes.

The sequence in this implementation starts by the activa-tion of the control electrodes 229 to 232 described in step B. It generates a surprising effect because the droplet of fluid 228 moves unexpectedly. In step C, the droplet of fluid 228 moves in order to leave the inactivated area 227 by capil-larity effect thanks to the difference of contact angle between the droplet edges that are over the activated control elec-trodes 229 to 232 and the Inactivated area 227. From that state, the sequence begins to disable, step by step, all the control electrodes from the external one 232 in step D, the control electrode 231 in step E, and the control electrode 230 in step F. At each step, the droplets of fluid 228 move toward the center for the same reasons as explained in step C. In step F, the droplets touch one another and merge together to form the shape defined by the final control electrode 229 at the end of step G. The merging of droplet can happen at any step as it depends on the initial position and the deformation of each droplet 228. The concentric principle is not the only possible means of gathering droplets as the sequence may be defined in relation with the structure of the control elec-trodes.

Figures 26A, 26B, 26C, 26D, 26E, 26F:
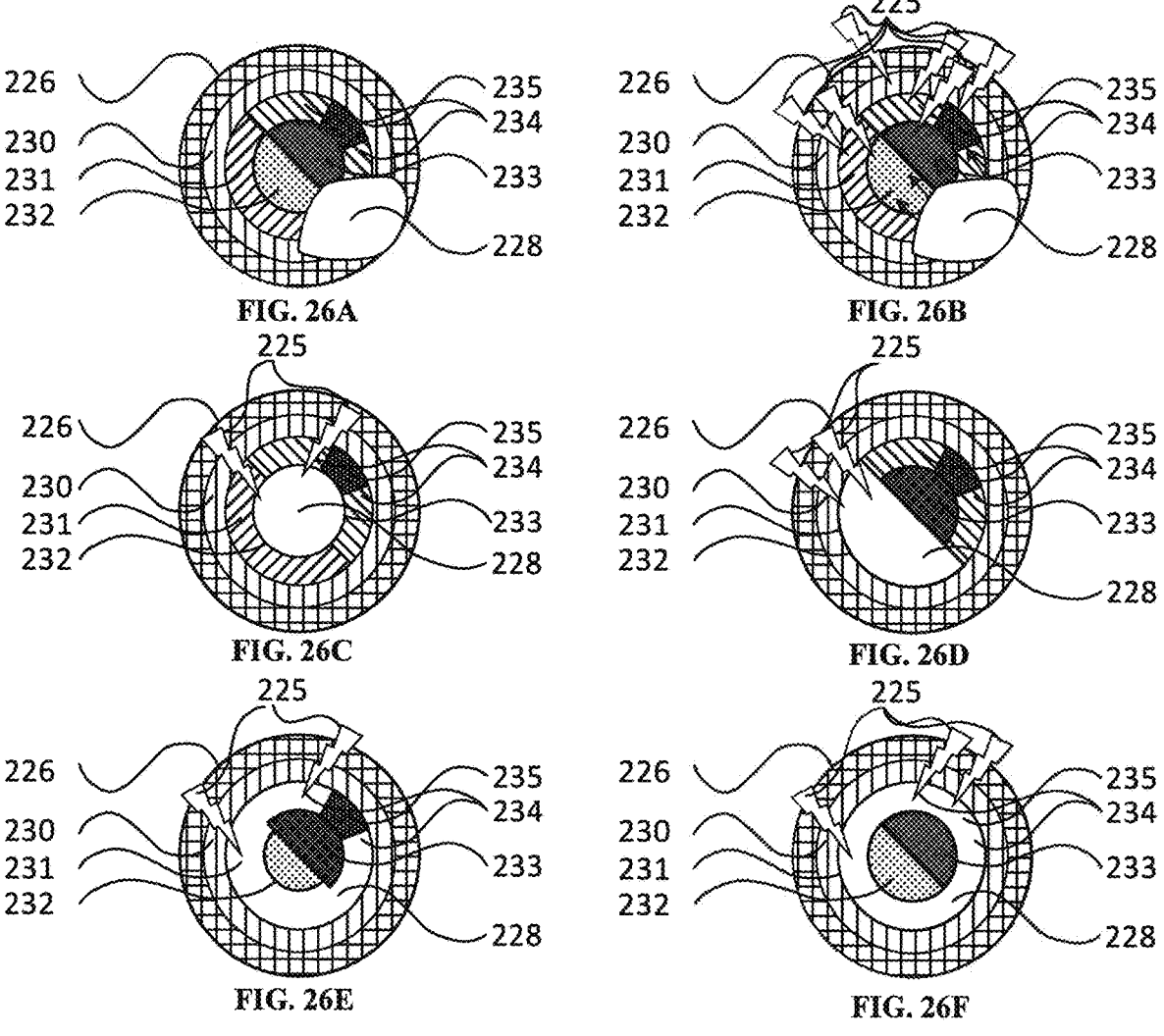
FIGS. 26A-26F are progressive schematics showing the method to shape a fluid droplet with a closed section of the other fluid.

Referring to FIG. 26, the electrowetting display imple-ments a method obtaining a controlled enclosed portion of passive fluid surrounded by active fluid. This method shapes a droplet with at least one cavity enclosing a second fluid that covers essentially the total area of the reservoir 226 excepting the region occupied by the droplet of fluid 228. Like the other implementation described in FIG. 24, substantially the whole surface of the reservoir has been uniformly treated and the control electrodes 230 to 235 can be opaque or translucent but preferably transparent. In step A, the droplet floats freely in the reservoir 226. The surprise effect is triggered in step B where all control electrodes 230 to 235 are activated to start moving the droplet of fluid 228 onto the center of the display above the control electrodes 232 and 233 as described in step C. There are intermediary steps that are not shown in this sequence because they are similar to the one described in FIG. 25. In step D, the droplet is moved on one half-circle over the control electrode 231 and 232. The foregoing describes the initial preparation for hole formation. In other words, the foregoing sequence generates a ring of active fluid surrounded by passive fluid (as for other animations), the inside of the circle also being filled with passive fluid.

In step E, the control electrodes 234 are activated and the center control electrode 232 disabled to let the droplet take a horseshoe shape. The droplet still covers a portion of the electrode 232 in spite of its inactivity. The final control electrode 235 is disabled to let a section be uncovered by the fluid 228, allowing the second fluid to flow inside the future hole. On the other hand, the fluid 228 retracts toward the activated electrodes to allow the other fluid to cover the control electrode 231. In step F, the final control electrode 235 is activated, dragging the droplet of fluid 228 that merges its two arms and take its final shape with a hole of the second fluid inside over the control electrodes 232 and 233.

Other implementations can be envisioned which shape cavities of passive fluids in a droplet of active fluid. It depends on the control electrodes structure and the control sequence.

Figures 27A, 27B, 27C, 27D, 27E:
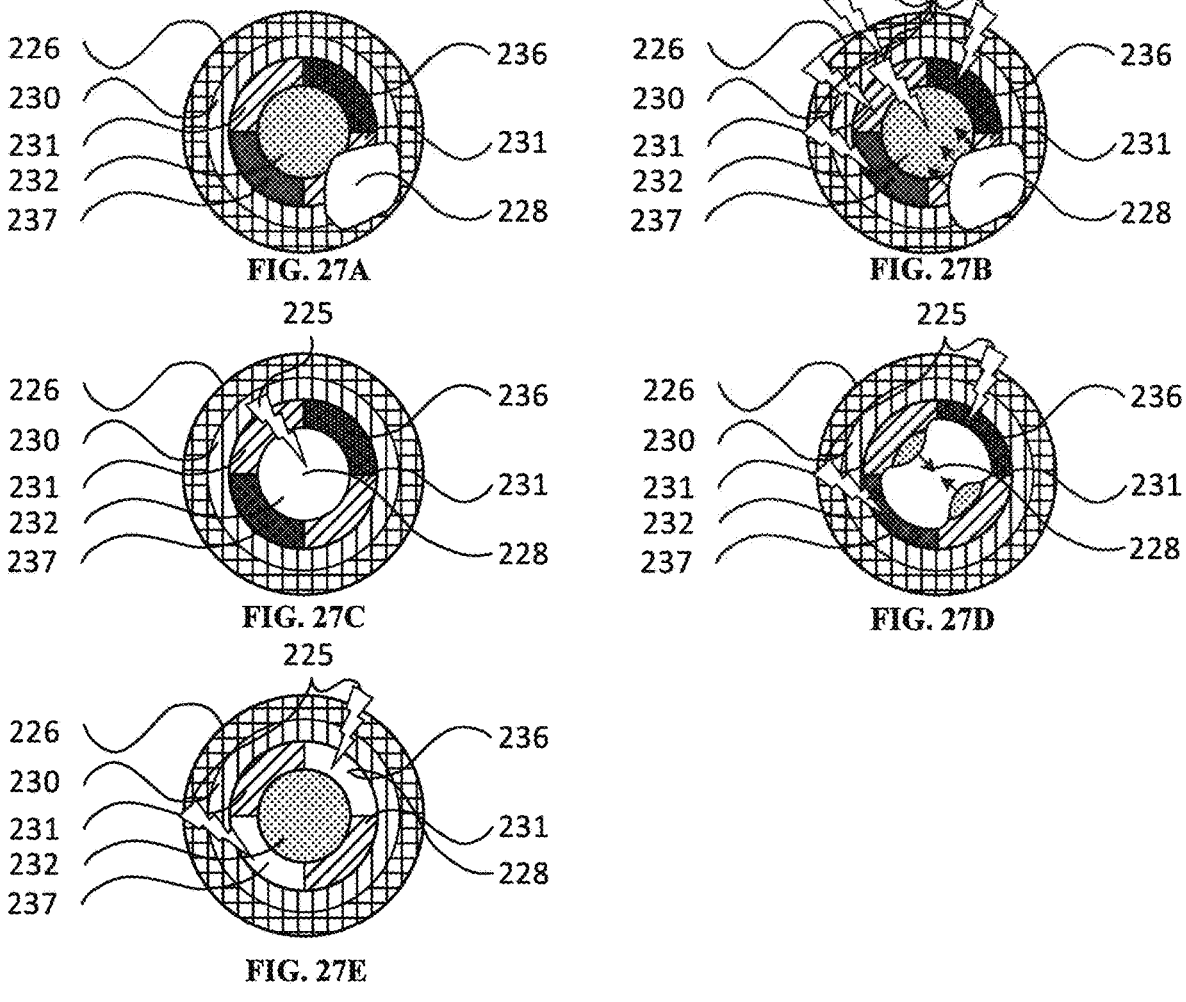
FIGS. 27A-27E are progressive schematics showing the method to separate a fluid droplet in two fluid droplets.

Referring to FIG. 27, the electrowetting display implements an animation where a droplet of fluid 228 is separated into two parts. In step A, the droplet of fluid 228 floats and moves freely thanks to the uniformity of surface treatment all over the reservoir 226. As in the embodiment represented by FIG. 24, the control electrode can be opaque, translucent but preferentially transparent in order to provide a surprise effect during the step B where all the control electrodes 230 to 232 and 236 and 237 are activated to attract the droplet in the center of the display. Following a sequence similar to the one depicted by the FIG. 25, the droplet ends up over the control electrode in the center 232 in step C. Then, the droplet is attracted in two opposite directions by the activation of the control electrode 236 and 237 in step D. The droplet of fluid 228 deforms in the direction of both electrodes and eventually divides in two separate, smaller droplets that will cover the two activated electrodes 236 and 237. To work well, this process has to be fine-tuned between the design of the control electrodes, the control sequence and the size of the droplet of fluid 228.

The invention may be summarized by the following feature sets:

1. A device for fluid display comprising a fluid, wherein the fluid is displaced by an electrowetting process, the device filled with at least 2 immiscible fluids whereas one fluid is located within the electrical field generated by a reference electrode and a control electrode and partially within the electrical field generated by the same reference electrode and at least one second control electrode so that the electric activation of the second control electrode generates a deformation or movement of the fluid in the direction of the second control electrode.

2. The device of feature set 1, wherein the displaced fluid is at least one droplet of liquid.

3. The device of feature set 1, wherein the fluids are transparent or translucent or opaque.

4. The device of feature set 1, where the fluids are showing an animation.

5. The device of feature set 1, where the fluids move along an indicia to indicate a measured value, 6. The device of feature set 1, wherein the reference electrode is undivided or divided in several portions.

7. The device of feature set 1, wherein the reference electrode is in direct electrical contact with, or isolated from the fluids, 8. The device of feature set 1, wherein the control electrodes are isolated from the fluids by a dielectric layer.

9. The device of feature set 1, where the reference electrode is located opposite to and/or adjacent to the surface of the control electrodes.

10. A method of switching the control electrodes of the device of feature set 1 in a sequence so that a portion of the fluid is displaced within the device.

11. The method of feature set 10, where the control electrodes are activated by AC or DC voltage.

12. A method of powering the control electrodes of the device of feature set 1 in a sequence so that the position of the fluid relative to the control electrodes is detected.

13. A device including the device of feature set 5, where all electrodes are transparent and where the indicia are placed below the electrodes.

14. The device of feature set 13, where interchangeable indicia are provided for the user to customize his device.

15. A timepiece comprising the device of any one of the foregoing feature sets, said measured value being time.

16. The device of feature set 1, filled with at least 2 immiscible fluids whereas one fluid is located within the electrical field generated by a reference electrode and a control electrode and partially within the electrical field generated by the same reference electrode and at least one second control electrode so that the electric activation of the second control electrode generates a deformation or movement of the fluid in the direction of the second control electrode.

17. The device of feature set 16, wherein the displaced fluid is at least one droplet of liquid.

18. The device of feature set 16, wherein the fluids are transparent or translucent or opaque.

19. The device of feature set 16, where the fluids are showing an animation.

20. The device of feature set 16, where the fluids move along an indicia to indicate a measured value.

21. The device of feature set 16, wherein the reference electrode is undivided or divided in several portions.

22. The device of feature set 16, wherein the reference electrode is in direct electrical contact with, or isolated from the fluids.

23. The device of feature set 16, wherein the control electrodes are isolated from the fluids by a dielectric layer.

24. The device of feature set 16, where the reference electrode is located opposite to and/or adjacent to the surface of the control electrodes.

25. A method of switching the control electrodes of the device of feature set 16 in a sequence so that a portion of the fluid is displaced within the device.

26. The method of feature set 25, where the control electrodes are activated by AC or DC voltage.

27. A method of powering the control electrodes of the indicator of feature set 16 in a sequence so that the position of the fluid relative to the control electrodes is detected.

28. A device including the device of feature set 20, where all electrodes are transparent and where the indicia are placed below the electrodes.

29. The device of feature set 28, where interchangeable indicia are provided for the user to customize his device.

30. A timepiece comprising the device of any one of the foregoing feature sets, said measured value being time.

31. A device comprising a fluid which indicates a measured value or creates an aesthetic shape, wherein the fluid is displaced by an electrowetting process, the device filled with at least 2 immiscible fluids whereas one fluid is located within the electrical field generated by a reference electrode and a control electrode and partially within the electrical field generated by the same reference electrode and at least one second control electrode so that the electric activation of the second control electrode generates a deformation or movement of the fluid in the direction of the second control electrode, wherein optionally at least one control electrode is of a size greater than 0.01 mm and so large enough to be seen by human eyes.

32. The device of feature set 18, wherein there is at least one control electrode that is designed in order to represent aesthetic shape.

33. The device of feature set 32, wherein there are control electrodes serving to gather the fluids droplets guiding them onto the area where the control electrodes are forming the aesthetic shape.

34. A method of switching the control electrodes of the device of feature set 32 so that the fluid is deformed in order to get at least one closed section of the other fluid.

35. A method of switching the control electrodes of the indicator of feature set 34 so that the fluid droplet get separated in two or more droplets.

36. A device for fluid display comprising a fluid, wherein the fluid is displaced by an electrowetting process, the device filled with at least 2 immiscible fluids whereas one fluid is activated by an electrical field generated by a control electrode wherein activation of the electrode generates a deformation or movement of at least one of the fluids.

Other embodiments are shown and described in the attached appendix, which is incorporated herein in this written description.

It should be appreciated that the particular implementations shown and described herein are representative of the invention and its best mode and are not intended to limit the scope of the present invention in any way. Furthermore, the connecting lines shown in the various figures contained herein are intended to represent exemplary functional relationships and/or physical couplings between various elements. It should be noted that many alternative or additional functional relationships or physical connections may be present in a practical system.

Moreover, the system contemplates the use, sale and/or distribution of any goods, services or information having similar functionality described herein.

The specification and figures are to be considered in an illustrative manner, rather than a restrictive one and all modifications described herein are intended to be included within the scope of the invention claimed, even if such is not specifically claimed at the filing of the application. Accordingly, the scope of the invention should be determined by the claims appended hereto or later amended or added, and their legal equivalents rather than by merely the examples described above. For instance, steps recited in any method or process claims may be executed in any order and are not limited to the specific order presented in any claim. Further, the elements and/or components recited in any apparatus claims may be assembled or otherwise operationally configured in a variety of permutations to produce substantially the same result as the present invention. Consequently, the invention is not limited to the specific configuration recited in the claims.

Benefits, other advantages and solutions mentioned herein are not to be construed as critical, required or essential features or components of any or all the claims.

As used herein, the terms "comprises", "comprising", or any variation thereof, are intended to refer to a non-exclusive listing of elements, such that any process, method, article, composition or apparatus of the invention that comprises a list of elements does not include only those elements recited, but may also include other elements described in this specification. The use of the term "consisting" or "consisting of" or "consisting essentially of" is not intended to limit the scope of the invention to the enumerated elements named thereafter, unless otherwise indicated. Other combinations and/or modifications of the above-described elements, materials or structures used in the practice of the present invention may be varied or otherwise adapted by the skilled artisan to other design without departing from the general principles of the invention.

The patents and articles mentioned above are hereby incorporated by reference herein, unless otherwise noted, to the extent that the same are not inconsistent with this disclosure.

Other characteristics and modes of execution of the invention are described in the appended claims.

Further, the invention should be considered as comprising all possible combinations of every feature described in the instant specification, appended claims, and/or drawing figures which may be considered new, inventive and industrially applicable.

Multiple variations and modifications are possible in the embodiments of the invention described here. Although certain illustrative embodiments of the invention have been shown and described here, a wide range of modifications, changes, and substitutions is contemplated in the foregoing disclosure. For example, such indicators can be used as speed or RPM indicators in vehicles. Further, such indicators can be used to indicate body temperature or other parameters, like heart rate in sports, or in indicators used in medical devices or diagnostic equipment. While the above description contains many specifics, these should not be construed as limitations on the scope of the invention, but rather as exemplifications of one or another preferred embodiment thereof. In some instances, some features of the present invention may be employed without a corresponding use of the other features. Accordingly, it is appropriate that the foregoing description be construed broadly and understood as being given by way of illustration and example only, the spirit and scope of the invention being limited only by the claims which ultimately issue in this application.

U.S. Pat. No. 5,050,612, to Matsumura, and US patent application publication US 2007/0249916 A1, to Pesach et al, are hereby incorporated herein by reference.

Purpose of this Document

Purpose of this document is to summarize development steps of the T103 Project Phase I. Steps such as Minimal requirements, calculations, function analysis and search for solutions. 2-3 promising embodiments will be detailed and documented for the production of functional prototypes.

Minimal Requirements

Device shall fulfil the general watch requirements

ISO 764

ISO 1413

ISO 2281

| ID | Requirement | Type | quantitative/ qualitative | Remarks/Answer |
|---|---|---|---|---|
| 1. | Minimal requirements | | | |
| 1.1 | Device size | TBD | | Target is a wrist watch |
| 1.2 | Device lifetime | W | 4 years MTBF | 425'000 steps over lifetime including resets and adjustments. |
| 1.3 | Device time resolution | G | 5 minutes | Giving 288 steps a day, |
| 1.4 | Device time scale | G | 12 hours | Start at 6 am end at 5:55 pm |
| 1.5 | Device display type | G | Analog | |
| 1.6 | Device display medium | G | Liquid | Liquid in tube as for example a thermometer. Device could also simulate a "digital" display based on actuation of liquid. |
| 1.7 | Corrosion | G | No corrosion | Parts in contact with liquid shall not corrode |
| 1.8 | Device energy supply | TBD, W | | Energy supply is open. Design could be purely or partially mechanically driven. Waiting on calculation to prove embodiments. |
| 1.9 | Device power consumption | TBD, W | | Based on coin cell energy budget, still to be calculated. No data in URS |
| 1.10 | Coin cell set size | TBD, W | | Based on energy budget calculations |
| 1.11 | Moving detection sensor resolution | G | 5 min or 1 step | |
| 1.12 | Digital clock in device | TBD, W | | Depends on embodiment |
| 1.13 | Digital clock accuracy | TBD | | Similar to market available watches. Based on quartz devices? |
| 1.14 | Digital clock time signal frequency for microcontroller | G | 1/minute | |

-continued

| ID | Requirement | Type | quantitative/ qualitative | Remarks/Answer |
|---|---|---|---|---|
| 1.15 | Microcontroller reaction time | G G | <1 s <30 s | Each liquid step is set within 1 s on display Each reset (full range) is set within 30 s on display |
| 1.16 | Potentiometer adjustment range | G | Full range | Adjustable over all display (12 hours) |
| 1.17 | Potentiometer setting accuracy | G | 5 min or 1 step | |
| 1.18 | Potentiometer linearity | W | linear | Time linearly adjustable over full range |
| 1.19 | Decompression chamber size | TBD | | Depends on embodiment Coupled to Liquid container capacity |
| 1.20 | Decompression chamber material | W | | Not defined. According to ISO norms. Should withstand pressure cycling |
| 1.21 | Tube display size | TBD | 120 mm | Full range, 12 steps/10 mm 150 mm |
| 1.22 | Tube display outer shape | TBC, W | cylindrical | Wish for initial URS prototype |
| 1.23 | Tube display hollow channel shape | W | Liquid moves linearly over full range | |
| 1.24 | Tube display material | TBD | Transparent, Flexible | Bending radius 7.5 mm According to ISO norms, should withstand pressure cycling. |
| 1.25 | Scale on enclosure | TBD | Location undefined | Thin line every 5 min, thick line every 15 min, Thicker line every hour |
| 1.26 | Liquid container capacity | TBD | Min Max | Big enough to empty overall scale. Depends on device design Sufficient liquid in case of tube enclosure exchangeability scenario |
| 1.27 | Liquid material | TBD | | Transparency/opacity? |
| 1.28 | Liquid specific material | TBD, W | Fluorescent | Depends on embodiment |
| 1.29 | Liquid color | TBD | | Colors? |
| 1.30 | Gas diffusion into liquid | G | Minimal | No bubble creation due to environmental conditions (ISO) No mixing with counter medium liquid |
| 1.31 | Counter medium to display liquid | TBD | Transparent Air or Liquid | Counter medium encapsulated in decompression chamber can be either air or liquid |
| 1.32 | Borderline | TBD, W | Liquid/ Air or Liquid/ Liquid | "Clear and not too much concave or convex" |
| 1.33 | Borderline stability versus temperature | W | Insensitive [° C.] [−10; +40] | |

-continued

| ID | Requirement | Type | quantitative/ qualitative | Remarks/Answer |
|---|---|---|---|---|
| 1.34 | Borderline stability versus gravitational field | G | Insensitive | Borderline not gravitational dependent |
| 1.35 | Borderline stability versus altitude | TBD | Insensitive [0 m- 3000 m] Above sea level | |
| 1.36 | Light button | W | Time range [6 pm- 5:59 am] | "There shall be a light button which is illuminated from 6:00 pm to 5:59 am. The light must not be very strong the aim is to show in the dark where the light button is. As a light source a blue low power LED can be used, which is powered from the coin cells (see chapter 4.6). By pressing the light button the light in the tube will be turned on." |
| 1.37 | Tube light | W | | "The tube light when turned on shall illuminate the indicator scale evenly. There shall be enough light to read the time without problems. After turning on the light it shall be turned off automatically after 10 seconds. As a power source the coin cells from the enclosure (see chapter 4.6) will be used." |
| 1.38 | Tube enclosure exchangeability | W | Exchangeable enclosure | Tube enclosure shall be easily exchangeable and addressed with a identification pins. Accordingly liquid display length may vary |
| 1.39 | Tube enclosure light display | W | Light source along enclosure | Depends on embodiment |

Figure 28A:
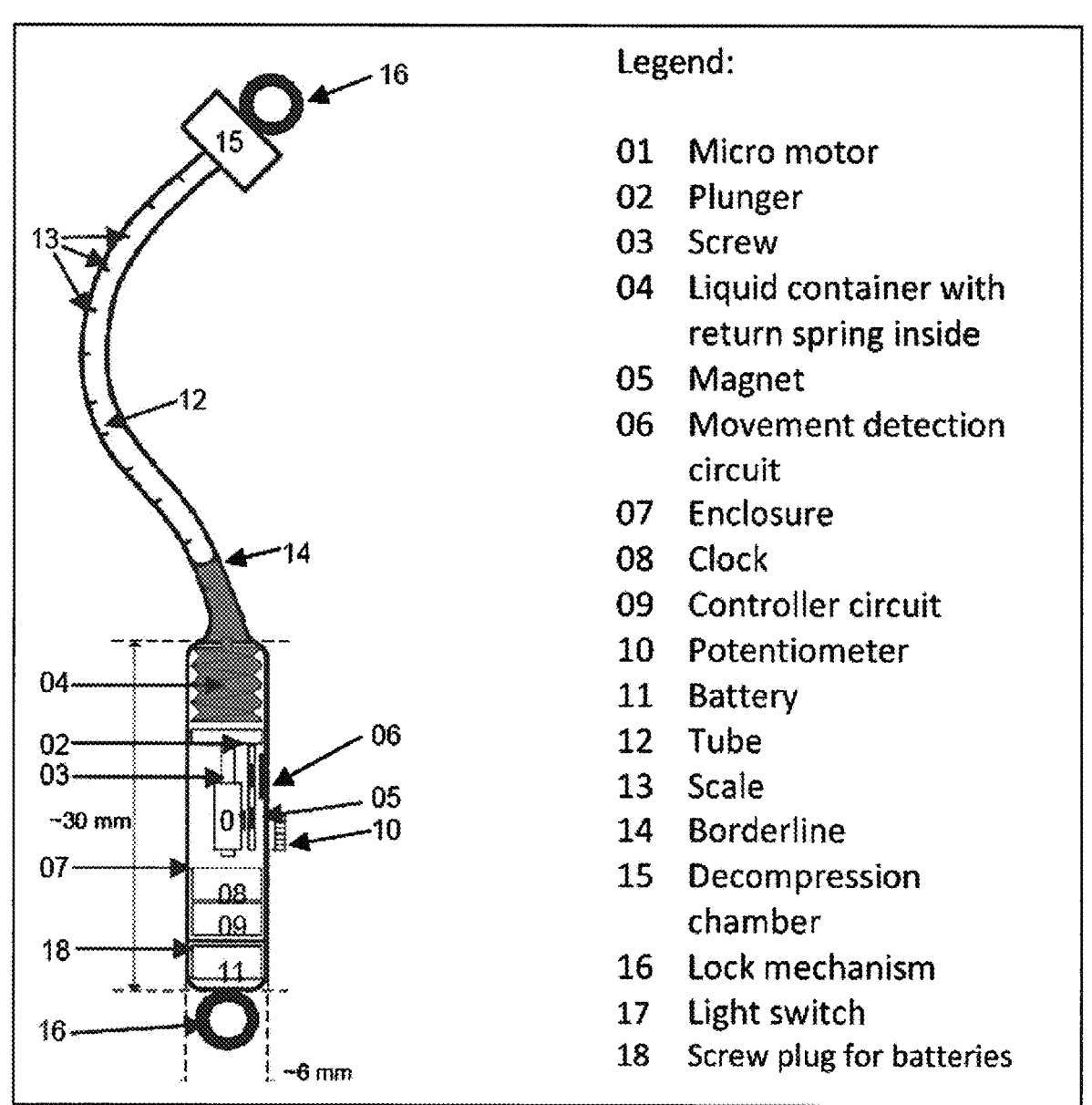
FIG. 28A is a side, cross-sectional view of a first embodiment of the invention, such as in FIG. 3.
Figure 28B:
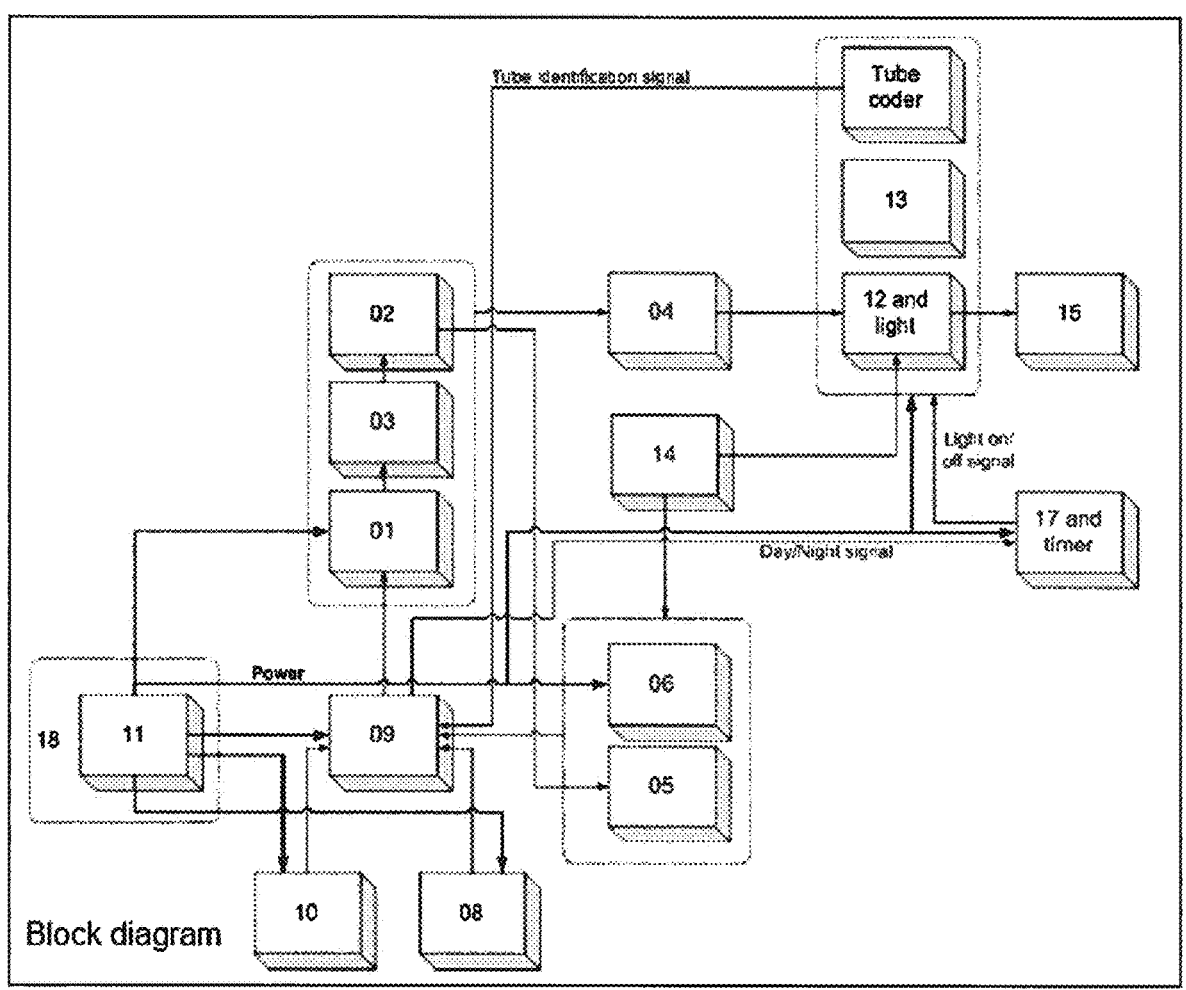
FIG. 28B is a block diagram related to the embodiment shown in FIG. 28A.
Figure 28C:
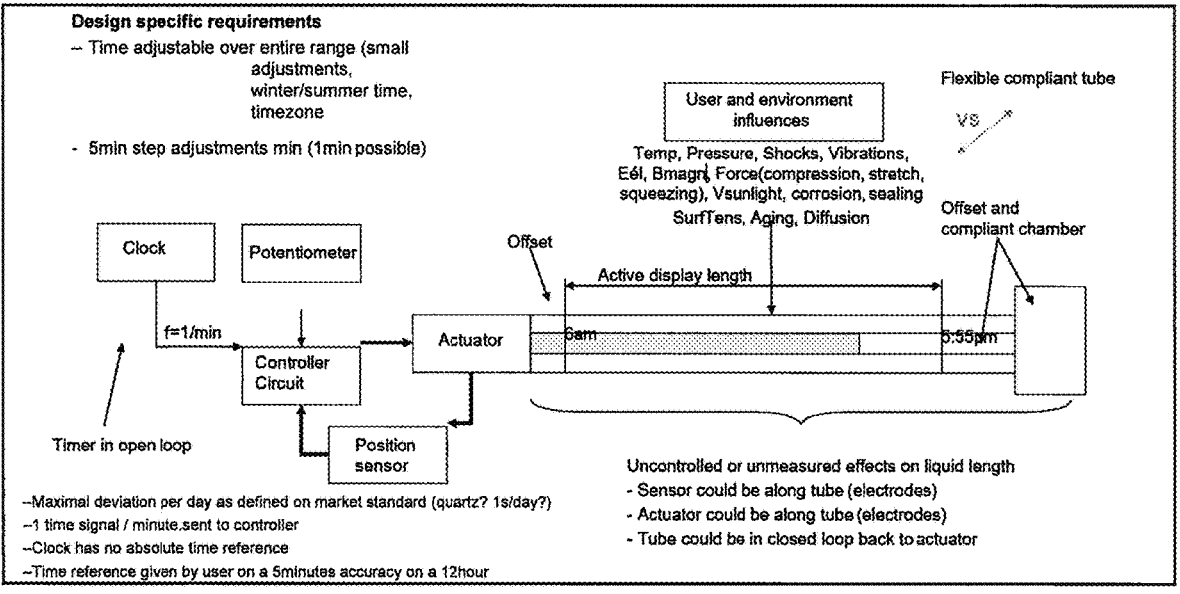
FIG. 28C is a block diagram of a preliminary design of the invention.

FIG. 28A shows a Prototype as after URS (cf. FIG. 3) and FIG. 28B shows a related Black Box FIG. 28C show design analysis for Phase 1

Function Analysis

Block Diagram

Figure 29A:
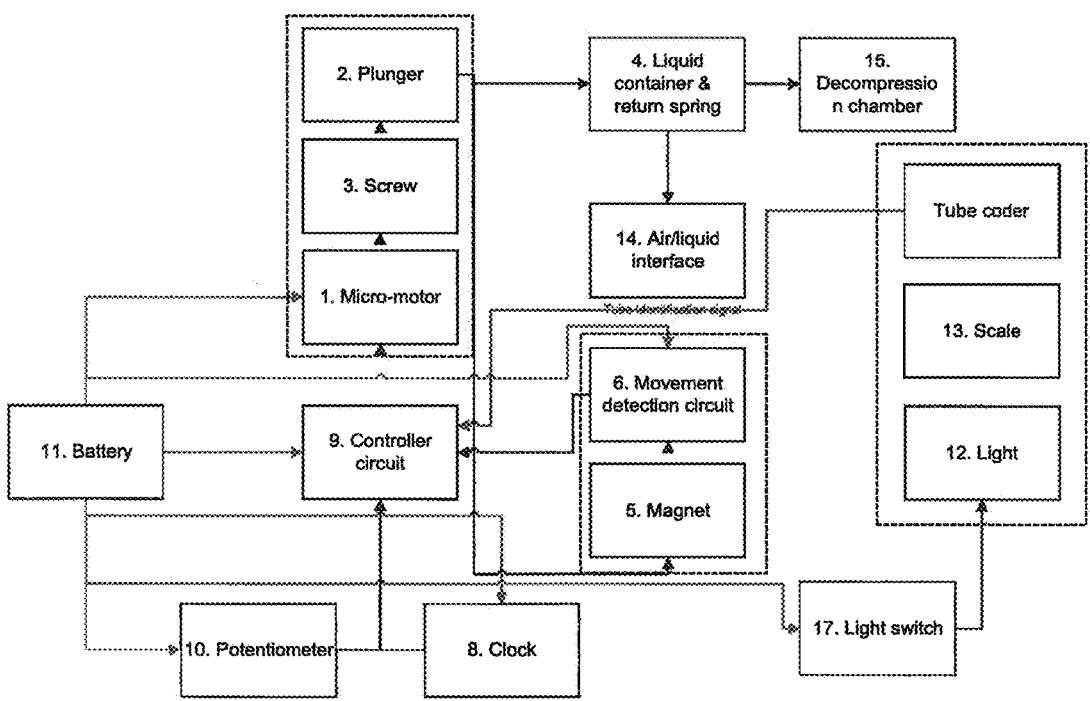
FIG. 29A is another block diagram of the invention.

The original block diagram of the project is presented in FIG. 29A. Some of its parts are oriented specifically towards the application of the Squiggle drive. As one of the objectives of the first phase is to generate further solutions, a generalized block diagram was produced.

Figure 29B:
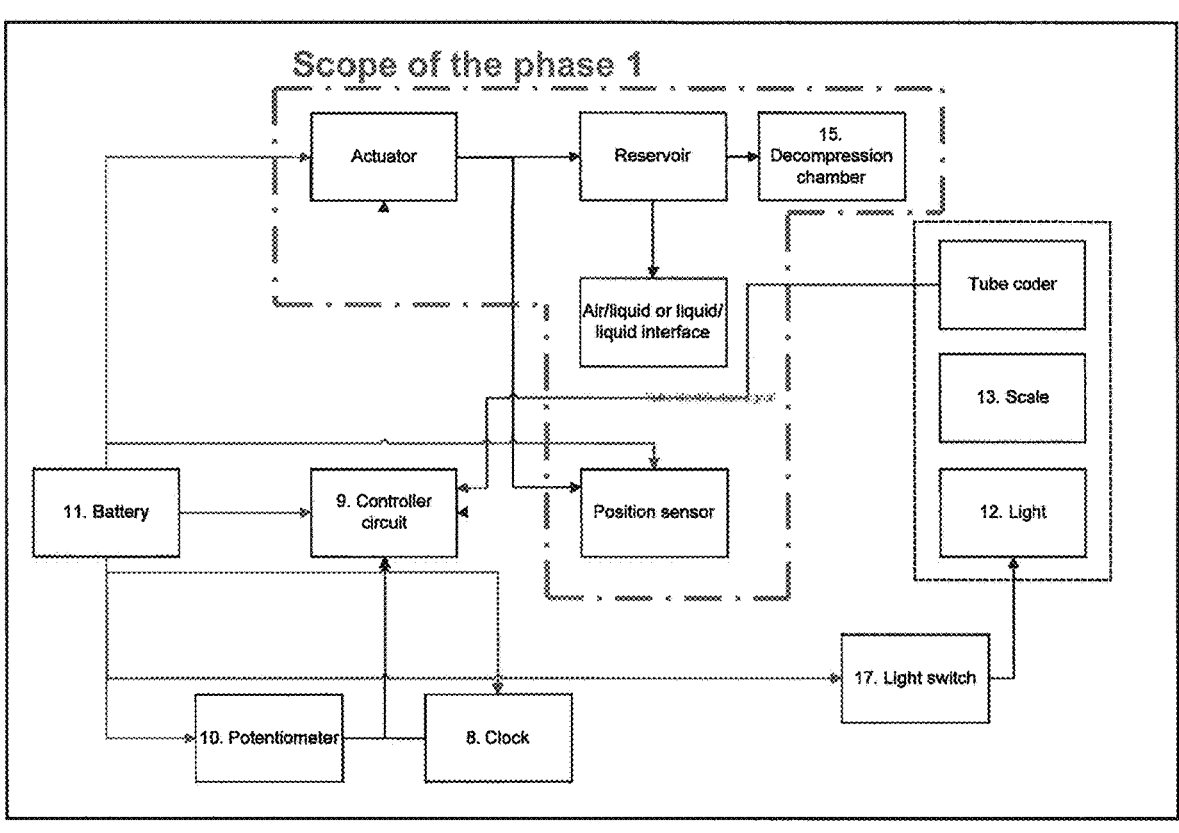
FIG. 29B is a still another block diagram of all actuators of the first phase.

The generalized block diagram is presented in FIG. 29B. In the same figure, the scope of the first phase of this project is outlined. The goal for the moment is to develop the actuator with its direct dependencies, which are the reservoir and possibly the decompression chamber.

As the sensor plays a major role in the design and the control of the actuator, it is also in the scope of this first phase.

Functions Analysis

Figure 29C:
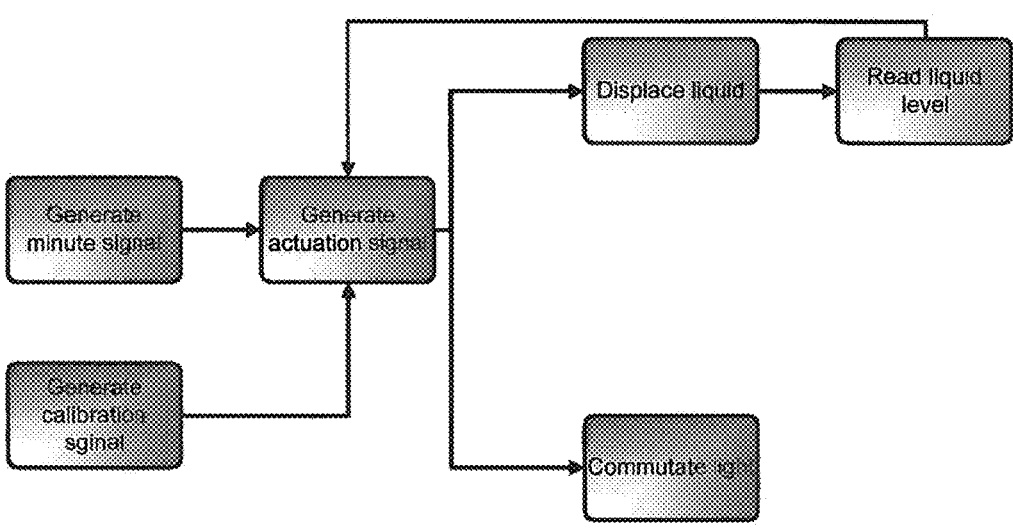
FIG. 29C is a function diagram of phase 1.

A succinct function analysis of the device is presented in FIG. 29C. In this figure, the functions framed in blue are the ones that require development, i.e. which will be treated in the first phase of the project.

Solution Researches

Introduction

In this chapter, solutions for the functions stated in chapter 'Functions analysis' will be proposed and ranked. Following functions will be treated:

Phases interface

Displace liquid

Detect liquid position

The phases interface is not a function, strictly speaking. Nevertheless, as it has a major impact on the design of the actuator, the various possibilities will be presented hereafter.

Phases Interface

Figures 30A, 30B:
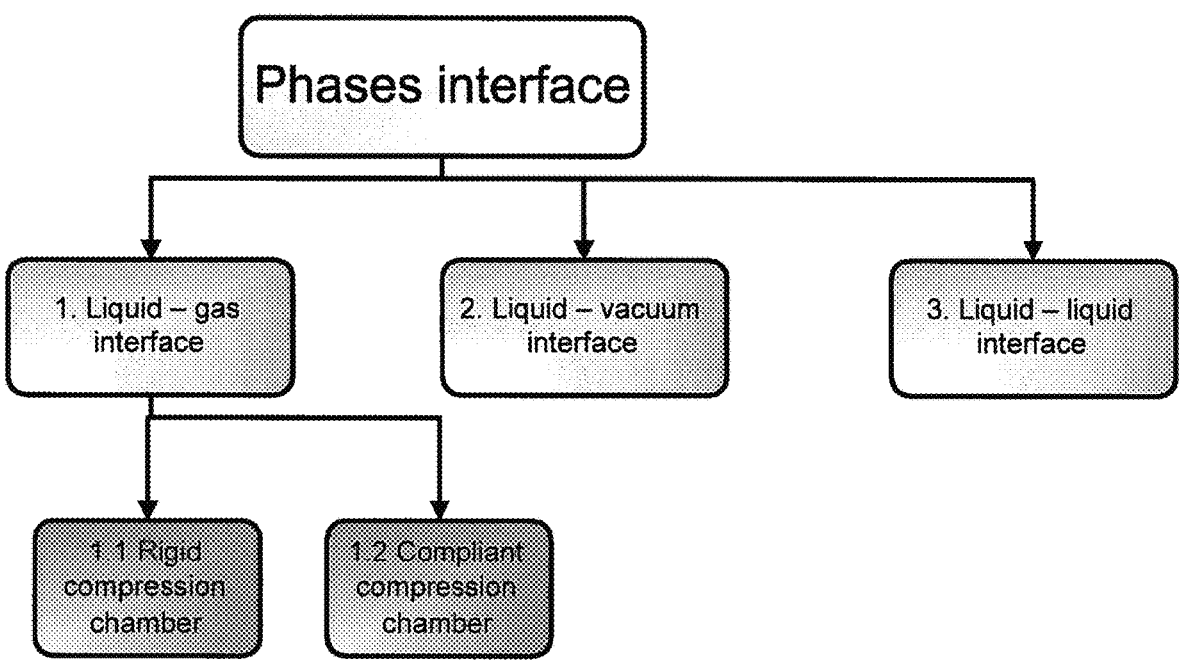
FIG. 30A are optional solutions for the phase interfaces.
FIG. 30B is a diagram showing vapor pressure vs. temperature for different liquids.

The tree of solutions for the phases interface is presented in FIG. 30A.

These solutions are discussed in the following table.

| ID | Phase interface | Advantages | Disadvantages |
|---|---|---|---|
| 1.1 | Liquid-gas with rigid compression chamber | Lower volume than liquid-liquid Easier assembly | Risks with gas dissolution in liquid Risk of forming bubbles at the interface Higher pressures Sensitivity to variations of pressure and temperature |
| 1.2 | Liquid-gas with compliant compression chamber | Lower, constant pressure Easy assembly | Requires two bellows assemblies Highest cluttering |
| 2 | Liquid-vacuum | Minimal volume Constant pressure | High pressure difference with ambient More complex assembly |
| 3 | Liquid-liquid | Low pressure Controlled miscibility whatever the environmental parameters | Higher volume Need two bellows or a closed-loop system Possibly harder detection of the interface |

Note that no ranking can be made of these variants independently of the desired actuation and detection systems.

Liquids for Liquid-Vacuum (Liquid-Vapor) Phase Interface

The so-called liquid-vacuum phases interface would in fact be a liquid-vapor interface, the "empty" space being instead filled with vaporized liquid, at its vapor pressure. The vapor pressure as a function of the temperature, for different liquids, is presented in FIG. 30B. It is visible that this value has a large variation with respect to the temperature. For instance:

In order to have a positive pressure at −10[° C.], with methyl chloride, the pressure would reach 8 [bar] at 40[° C.]

The pressure of propane would jump to even higher levels

This means that the actuator would have to be dimensioned for the pressure it would face of 40[° C.]. It would therefore be over-dimensioned over most of its operational range, and a risk of failure would exist should the device be temporarily heated to superior temperatures.

Conclusion

Out of these reasons, the liquid-vapor pressure should be avoided

Conclusion on the Possible Phases Interfaces

After the preliminary calculations, following phases interfaces were set aside:

The liquid-gas with rigid compression chamber, as it requires either a very large compression chamber, or a very powerful actuator to be able to compress the gas The liquid-vapor interface, as the pressure in the display would vary a lot with the temperature Out of the two remaining interfaces, we believe the liquid-liquid interface is preferable, as:

The liquid has a lesser sensitivity to dilatation

The risk of making bubbles in the case of a shock is reduced

The advance of the meniscus is more regular

In case of rapid changes of temperature and pressure, bubbles risk to be formed in a liquid-gas interface

Displace Liquid

Solution Proposals

Figure 30C:
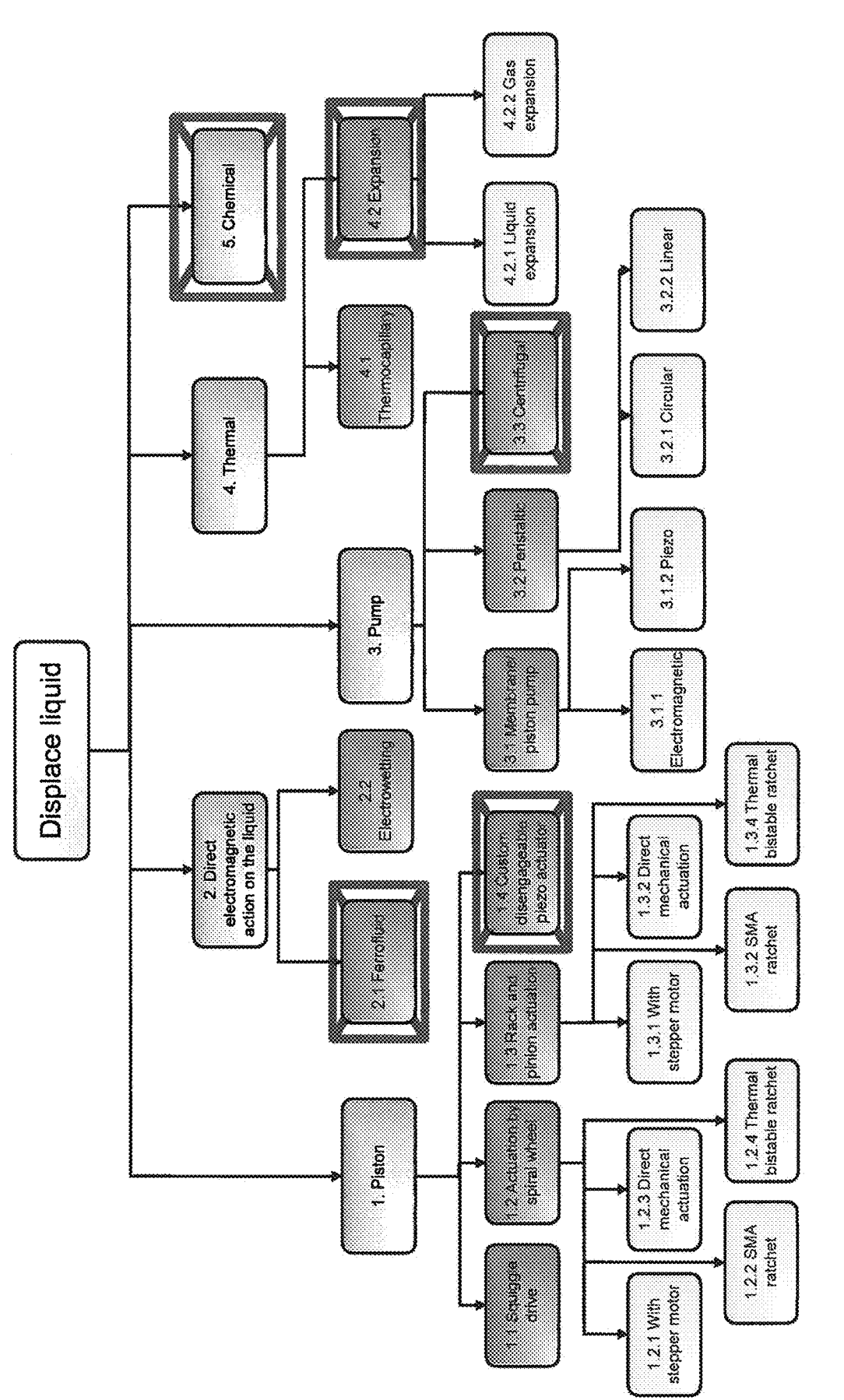
FIG. 30C is a block diagram of alternate means for the displacement of the liquid of the invention.

The tree of solutions for the displacement of the liquid is presented in FIG. 30C. The solutions are clustered in five main categories:

1. Piston systems: where a piston compresses liquid contained in a bellows reservoir
2. Direct electromagnetic action on the liquid: an electromagnetic action on the fluid itself moves it, without an actuator
3. Pump systems: liquid from a bellows reservoir is pumped into the display tube
4. Thermal systems: a thermal effect induces the displacement of the liquid
5. Chemical: the liquid is displaced by a chemical reaction The different solutions are described hereafter. Three solution groups have been a priori set aside as non-practical:

The custom disengageable piezo actuator. This solution would have had as advantage not to require energy for the return. However, the design of such an actuator would be a challenge, with a high technical risk.

The solutions involving ferrofluids. These would not allow having display colors other than black.

The solution involving a centrifugal pump. Centrifugal pumps typically generate a pressure, instead of dispensing a fixed volume, which would lead to higher energy requirements for a constantly running pump, and a more difficult control than with a volumetric pump.

A display working on the thermal expansion of the liquid or of the gas. The energy requirements of such a system is bound to be excessive, in addition of causing possible wearability issues A display based on a reversible chemical reaction would present a huge technological challenge

| ID | Name | Description | Advantages/ disadvantages |
|---|---|---|---|
| 1.1 | Squiggle driven piston | A Squiggle drive actuates a piston, which pushes the liquid in the indicator column. | ☐ Existing actuator <br> ☐ Compact size <br> ☐ High force density <br> ☐ Possibly too high energy consumption <br> ☐ Probably expensive |

-continued

Figure 31:
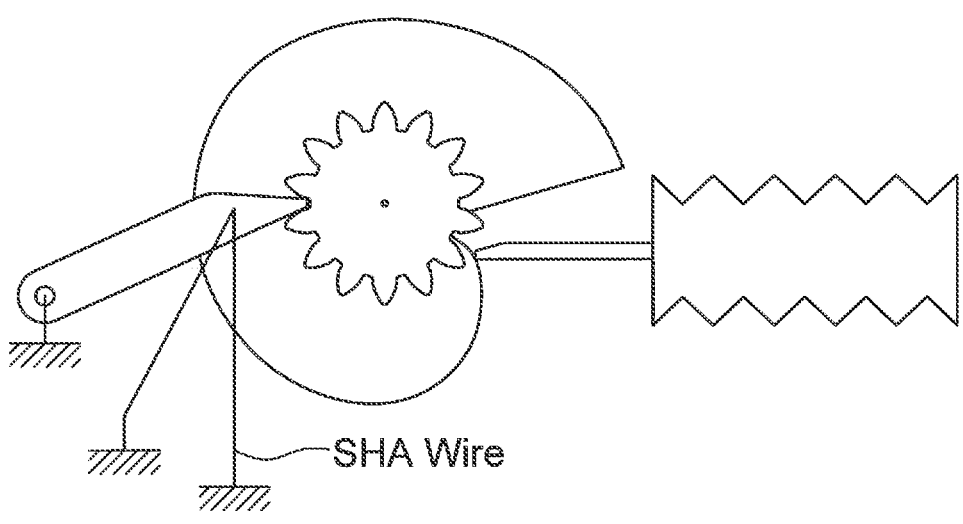
FIG. 31 is a Shape-Memory Alloy (SMA) ratchet actuating a spiral wheel of the invention.
Figure 32A:
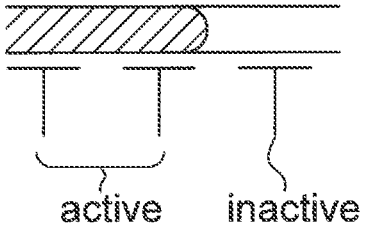
FIGS. 32A-32B are schematics of fluid moved by electrowetting of the invention.
Figure 32B:
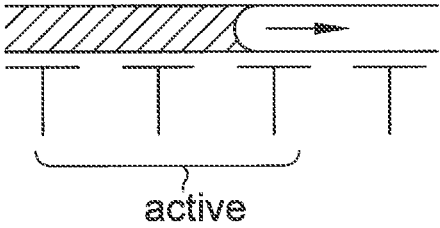
Figure 33:
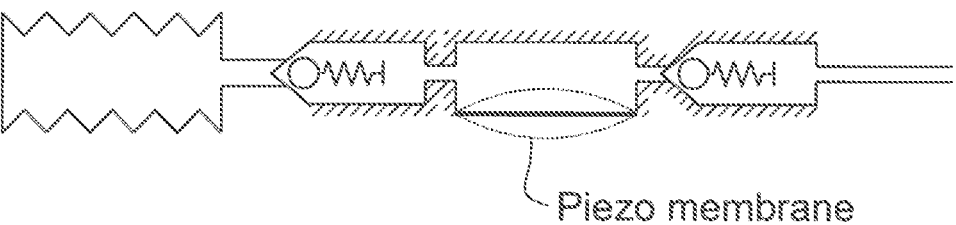
FIG. 33 is a schematic of a piezo membrane pump of the invention.

| ID | Name | Description | Advantages/ disadvantages |
|---|---|---|---|
| | | | ☐ Energy consumption for the return as well |
| 1.2.1 | Stepper motor actuating a spiral wheel | A piston is actuated by a spiral wheel. The wheel itself is rotated using one of many possible mechanical solutions. The global advantage for this class of solutions resides in the fact that the return is almost instantaneous, and requires the same energy as a normal step. In addition, this class, as well as the 1.3 class, are the only ones which can also be driven by a mechanic watch, with only a minor adaptation. | • Simple, reliable actuators exist <br> • Low energy consumption <br> • Low cost |
| 1.2.2 | SMA (Shape-Memory Alloy) ratchet actuating a spiral wheel, as shown in FIG. 31. | | • Robust actuator <br> • High force density <br> • Compact design Possible, without a gearbox |
| 1.2.3 | Spiral wheel actuated by the watch mechanism | | ☐ Simple mechanism coupled to the existing watch mechanism <br> ☐ May require some adaptation |
| 1.2.4 | Thermal bi-stable system actuating a spiral wheel | | ☐ Robust actuator <br> ☐ High force density <br> ☐ Possibly more energy consumption than |
| 1.3.1 | Stepper motor actuating a rack and pinion system | The 1.3 solutions class is similar to the 1.2, except that a rack and pinion are used to actuate the piston, instead of a spiral wheel. Its disadvantage with 1.2 is that the return is not instantaneous. In addition, to perform the return, either a bidirectional actuator or a disengagement system is required. The advantages and disadvantages of each particular solution are similar to the 1.2. | |
| 1.3.2 | Rack and pinion actuated by a SMA ratchet | | |
| 1.3.3 | Rack and pinion actuated directly by the watch mechanism | | |
| 1.3.4 | Rack and pinion system actuated by a thermal bi-stable system | | |
| 2.2 | Fluid moved by electrowetting, as shown in FIG. 32A and 32B. | Electrowetting allows changing the surface tension of some materials by applying an electric potential on them. By lining up electrodes, it allows displacing liquid. | ☐ No mechanical actuator <br> ☐ Actuation distributed on the whole display tube <br> ☐ Possible limitations in the usable liquids |
| 3.1.1 | Electromagnetic membrane/piston pump | Each pulse of the pump displaces the liquid in the indicator column. The return is performed by opening the valves of the pump | ☐ Open-loop actuation possible <br> ☐ Possibly large device |
| 3.1.2 | Piezo membrane pump, as shown in FIG. 33. | The membrane of the pump is a piezo actuator. | • Very compact design <br> • Open-loop actuation possible <br> • Applications exist in the medical do- |

-continued

Figure 34:
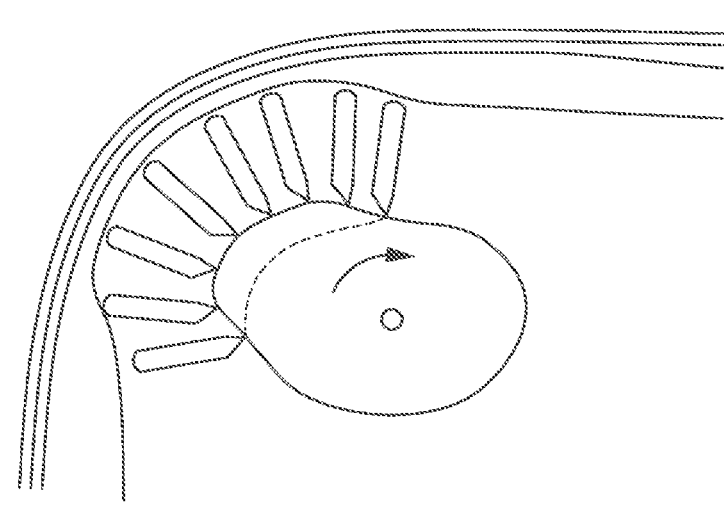
FIG. 34 is a schematic view of a circular peristaltic pump of the invention.

| ID | Name | Description | Advantages/ disadvantages |
|---|---|---|---|
| 3.2.1 | Circular peristaltic pump, as shown in FIG. 34. | In both solutions of the 3.2 class, the liquid is pushed through the tube with a peristaltic actuation. The choice between linear and circular will depend on the geometry of the final device. | ☐ Compatible with closed-loop liquid-liquid interface<br>☐ The actuator can be placed anywhere in the device, not only at the end<br>☐ Applications exist in the medical domain |
| 3.2.2 | Linear peristaltic pump | | ☐ The return of the liquid has to be actuated<br>☐ Issues may arise from the wear on the tube |
| 4.1 | Theimocapillary actuation | Similar to the electrowetting: the surface tension of the material is changed by changing its temperature | ☐ No mechanical actuator<br>☐ Actuation distributed on the whole display tube<br>☐ Possibly slower than electrowetting<br>☐ Possibly affected by outside |

The ranking criteria are presented in Table 4.1. The ranking is done using the 1-3-9 method in which every solution is assigned a grade of 1, 3 or 9 for each considered ranking criterion. The ranking criteria themselves have a weight, also 1, 3 or 9. This way, any contribution can bring a value between 1 and 81 to the total grade of the solution.

Remark: The robustness to the environmental parameters is not displayed here, as it will be defined by a conjunction of the actuation, the type of interface, and the sensing.

Following criteria were a priori given weightings below the maximal of 9:

The complexity: due to the anticipated high-end segment to which the product is designed for, the complexity is not considered to be a criterion of the utmost importance.

The scalability: the product is for the moment foreseen for watch displays. Although possible further applications could require scaling to other dimensions, it is not for the moment a key criterion, The manual setting speed: Some solutions do not allow to set the display manually at any speed. This might prove problematic as the user would not have an immediate feedback on his action on the display. This criterion is given a weighting of 3 for the moment, but could have to be increased.

The cost: once again, due to the high-end segment for which the product is designed, the cost does not appear to be a criterion of the highest importance. A highly costly and complex device may even attract interest of the watch customers.

TABLE 4.1

Evaluation criteria for the liquid displacement systems

| ID | Criterion | Description | Weight | Ranking 1 | 3 | 9 |
|---|---|---|---|---|---|---|
| 1 | Energy consumption | Average, overall energy consumption over the life of the device | 9 | Very high energy consumption, requires frequent changes of batteries | The device has a risk of running low on batteries before 2 years | The device can run two years on a coin cell |
| 2 | Robustness to ageing | MTBF | 9 | MTBF << 4 years | MTBF ~= 4 years | MTBF >> 4 years |
| 3 | Size | Volume occupied by the actuator assembly | 9 | Very large actuator, constrains the shape of the device | Small actuator | Insignificant actuator volume with respect to the reservoir/tube |
| 4 | Technological risk | Risk for the chosen solution not to work | 9 | The solution is a novel application. Little experience is available on it. | Some challenge exists with the solution | The solution is well established, with known examples |
| 5 | Complexity | Complexity of the final device | 3 | The device is extremely | The device presents moderate complexity | The device has no particular complexity |
| 6 | Scalability | Possibility to mount different tube diameters | 3 | The device is restricted to a thin range of tube | The device can be scaled to a wider range | The device can be scaled at will |
| 7 | Manual setting speed | Reaction speed of the system in case the user wants to set it by hand | 3 | Slow reaction | Possible to actuate the system faster than 1step/second, but still lagging behind manual setting | No delay with respect to the manual setting |
| 8 | Cost | Production cost of the device | 1 | The device components are expensive and/or cannot be mass- | The device relies on relatively expensive, albeit known fabrication processes | Low cost device that can be mass-produced |

| Ref | Name Importance | Energy consumption 9 | Robustness to ageing 9 | Size 9 | Techno- logical risk 9 | Com- plexity 9 | Manual setting 3 | Scalability 3 | Cost 1 | TO- TAL | RANK |
|---|---|---|---|---|---|---|---|---|---|---|---|
| 1.1 | Squiggle driven piston | Low energy efficiency of dynamic plazo actuators due to hysteresis losses The return has to be powered 3 | No known effect of ageing 9 | Very small actuator possible 9 | Known technology 9 | Existing product 9 | Slower than actuation 3 | Inadapted for very large displays 3 | Relatively costly actuator 3 | 318 | 6 |
| 1.2.1 | Stepper motor actuating a spiral wheel | Low energy consumption 9 | Very reliable actuators exist 9 | The whole assembly has a non- negligible size 3 | Existing actuators 9 | Existing actuator, low mechanical complexity 9 | As fast as actuation 9 | Scalable at will 9 | Low cost 9 | 360 | 1 |
| 1.2.2 | SMA ratchet actuating a spiral wheel | Low energy consumption 9 | Some uncertainty exists regarding the behavior of SMA over 500k cycles 3 | The whole assembly has a non- negligible size 3 | Known technology 9 | Low mechanical complexity 9 | As fast as actuation 9 | Scalable at will 9 | Low cost 9 | 306 | 6 |
| 1.2.3 | Spiral wheel actuated by the watch mechanism | Low energy consumption 9 | MTBF equal to that to the watch mechanism 9 | The whole assembly has a non- negligible size 3 | No specific technology 9 | Low mechanical complexity 9 | As fast as actuation 9 | May require several sieps per increment for larger tubes 3 | Low cost 9 | 342 | 3 |
| 1.2.4 | Thermal bistable system actuating a spiral wheel | Low energy consumption 9 | No known effect of ageing 9 | The whole assembly has a non- negligible size 3 | No applications of thermal bistable systems in this domain 9 | Low mechanical complexity 9 | As fast as actuation 9 | May require several steps per increment for larger tubes 3 | Low cost 9 | 268 | 7 |
| 1.3.1 | Stepper motor actuating a rack and pinion system | The return has to be powered 3 | Very reliable actuator exists 9 | The whole assembly has a non- negligible size 3 | Existing actuators 9 | Low complexity 9 | As fast as actuation 9 | Scalable at will 9 | Low cost 9 | 306 | 6 |
| 1.3.2 | Rack and pinion actuated by SMA ratchet | The return has to be powered 3 | Some uncertainty exists regarding the behavior of SMA over 500k cycles 3 | The whole assembly has a non- negligible size 3 | Known technology 9 | Low complexity 9 | As fast as actuation 9 | Scalable at will 9 | Low cost 9 | 252 | 9 |
| 1.3.3 | Rack and pinion actuated by SMA ratchet | The return has to be powered 3 | MTBF equal to that of the watch mechanism 9 | The whole assembly has a non- negligible size 3 | No specific technology 9 | Low mechanical complexity 9 | As fast as actuation 9 | May require several steps per increment for larger tubes 3 | Low cost 9 | 270 | 8 |
| 1.3.4 | Rack and pinion actuated by thermal bistable system | The return has to be powered 3 | No known effect of ageing 9 | The whole assembly has a non- negligible size 3 | No applications of thermal bistable systems in this domain 3 | Low mechanical complexily 9 | As fast as actuation 9 | May require several steps per increment for larger tubes 3 | Low cost 9 | 234 | 10 |
| 2.2 | Fluid moved by electro- wetting | Low energy consumption 9 | No known effect of ageing 9 | Minimal size 9 | Few existing applications, concerns regarding the manipulation of a column of liquid 1 | Low complexity 9 | Very fast setting possible 9 | Medium scalability 3 | Micro- machining techniques are require 3 | 318 | 5 |
| 3.1.1 | Electro- magnetic membrane/ piston pump | Low energy consumption 9 | Very reliable actuators exist 9 | Relatively large assembly 9 | No known risk 9 | Low complexity 9 | Slower than actuation 3 | Scalable at will 9 | Low cost 9 | 324 | 4 |

-continued

| Ref | Name Importance | Energy consumption 9 | Robustness to ageing 9 | Size 9 | Techno-logical risk 9 | Com-plexity 9 | Manual setting 3 | Scalability 3 | Cost 1 | TO-TAL | RANK |
|---|---|---|---|---|---|---|---|---|---|---|---|
| 3.1.2 | Piezo membrane pump | Low energy consumption 9 | No known effect of ageing 9 | MEMS pumps exist 9 | Known technology 9 | The MEMS may require a de-velopment effort 3 | Slower than actuation 3 | Low scalability 3 | Piezo actuators tend to be costly 3 | 348 | 2 |
| 3.2.1 | Circular peristaltic pump | The return has to be powered 3 | Issues may arise with the wear of the tube 3 | The whole assembly has a non-negligible size 3 | Known technology 9 | Low complexity 9 | Slower than actuation 3 | Scalable at will 9 | Low cost 9 | 234 | 10 |
| 3.2.2 | Linear peristaltic pump | The return has to be powered 3 | Issues may arise with the wear of the tube 3 | The whole assembly has a non-negligible size 3 | Known technology 9 | Low complexity 9 | Slower than actuation 3 | Scalable at will 9 | Low cost 9 | 234 | 10 |
| 4.1 | Thermo-cappilary actuation | Higher energy consumption than electrowetting 3 | No known effect of ageing 9 | Minimal size 9 | Few applications of thermo-capillarity, as yet 1 | Low complexity 9 | Slower than actuation 3 | Capillary width, scalable, height not 3 | Low cost 9 | 252 | 9 |

The ranking of all the considered solutions, with the aforementioned ranking criteria, is presented in Table 4.2. The five leading solutions are:

1. The stepper motor actuating a spiral wheel comes first in this ranking. It is a very simple solution, relying on a relatively simple mechanism and known actuators. In addition, the manual setting of the indicator can be done very quickly, using a mechanical clutch to disengage the spiral wheel from its gear train. It is only handicapped by its relatively larger size.

2. The piezo membrane pump is second. It has a good ranking due to its low size, robust design and known technology. It is handicapped by a relatively low scalability, possibly higher cost than some other solutions, and development effort. In addition, unless a second actuator is implemented for the manual setting, this function is bound to be accomplished slowly.

3. The spiral wheel actuated by the watch mechanism is third. Note that this solution is displayed indicatively, and will not be pursued here, as it is not the objective of the first phase of the project to develop such a solution. It is however to be noted that the winning solution can also be easily converted in a fully mechanical display.

4. The electromagnetic membrane/piston pump is in fourth position. It has the advantages of the piezo membrane pump, at the cost of a higher size.

5. The electrowetting is in fifth position. This solution is highly seducing for its total lack of mechanical actuator, Its possibility to use the same displacement electrodes for a full closed-loop regulation, and compact size. It also allows a very rapid manual set-ting. However, it is a technology with but little applications in the industry, and there-fore entails a technological risk.

5. The Squiggle driven piston drive is tied for the fifth position. This solution is handicapped by a higher energy consumption, due to its high-frequency piezo actuators and to the necessity to power the return. In addition, such piezo actuators tend to be costly, and it is not fully scalable. Finally, unless a second actuator is implemented the manual setting is bound to be slow with this method.

Remark: It is noteworthy that the technological risk has a very high importance in the outcome of the ranking. Should its weight be brought down to 3, following solutions would take the lead:

1. Electrowetting
2. Stepper motor with spiral wheel
3. Piezo membrane pump

While the stepper motor and piezo membrane move relatively little, the electrowetting is brought to the first position. The weighting of the technological risk should be determined according to the will to pursue a very novel, albeit risky solution.

The leading solutions are presented in details in the following table.

Detailed Presentation of the Leading Solutions

Stepper Motor Actuating a Spiral Wheel

Figure 35A:
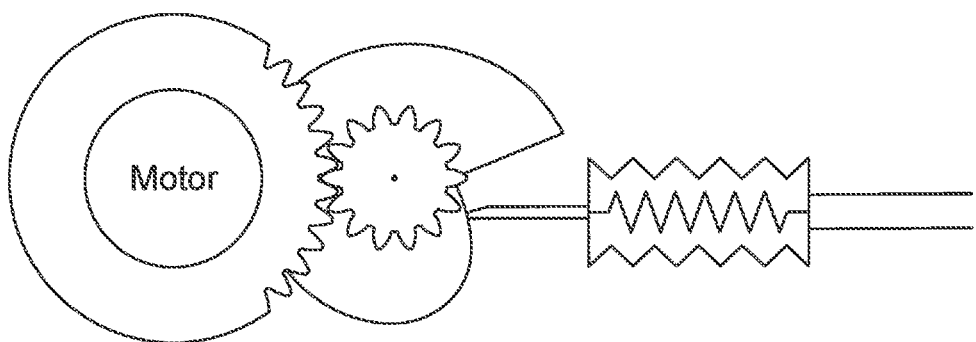
FIGS. 35A-35B are schematic representations of the spiral wheel design, with a possible implementation of a clutch to allow a manual setting of the display.
Figure 35B:
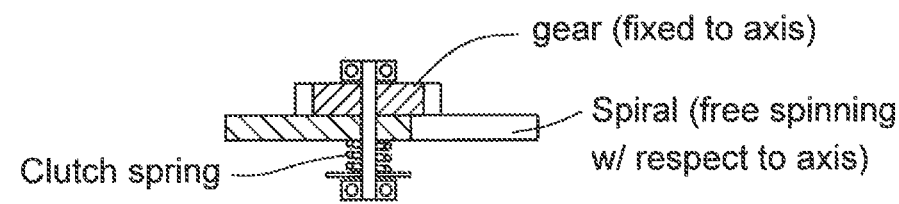

A schematic representation of this solution is presented in FIG. 35A (a top view), as well as in FIG. 35B (a side view) presenting a proposed solution to do the setting quickly. In order to do the set-ting, the user manipulated button would disengage the spiral wheel from its gear train, and al-low an unpowered and quick setting.

This solution would require mechanical design in order to reach an optimal configuration and a good setting method. However, all the components are simple and well-known, including the stepper motor.

Piezo Membrane Pump

Figure 36:
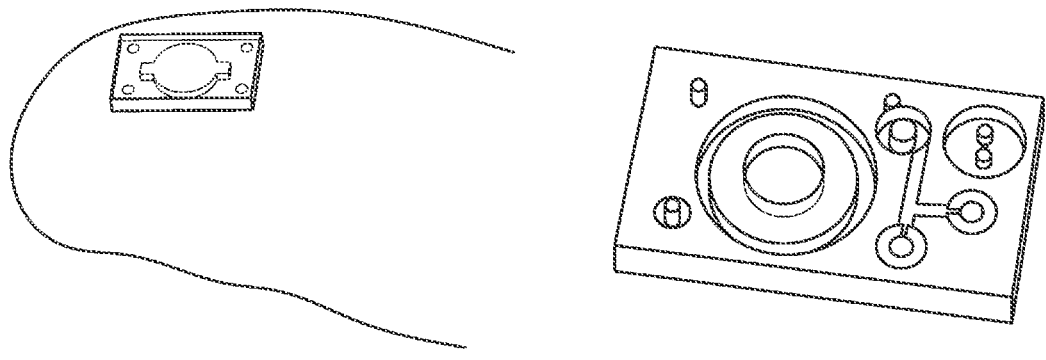
FIG. 36 is a perspective view of a Nanopump, a device designed by Debiotech. of the invention.

In FIG. 36 is presented the Nanopump, a device designed by Debiotech for insulin infusion purposes. This particular device has a 200 [nl] dispense per pulse. It is entirely micro-machined on Silicon On Insulator (SOI) wafers, which grants a high repeatability.

In addition, as the device is self-priming, it would allow for open-loop regulation; at the end of one 12 hours cycle, the liquid can be pulled back in the reservoir by opening the return valves. Then, the pump can be activated until the liquid is detected by a single capacitive sensor placed on its outlet. After this point, the pump can be trusted to provide regular steps during the next 12 hours period.

Note that the capacitive sensor could theoretically be integrated in the device.

Some devices as the Nanopump exist on the market, or are in development. However, it is to be noted that, in order to have a device fully compatible with the desired application, a significant development effort would have to be undertaken.

Electromagnetic Membrane/Piston Pump

A schematic of such a device is presented in FIG. 37, for the case of a membrane pump. It is noteworthy that the piston configuration is also implementable. However, both solutions are for the moment considered together, as the function of both devices is massively similar.

In both cases, the volume of a compression chamber is varied, and two check valves ensure that the flow generated by this variation goes in the desired direction.

One of the main advantages of such pumps is that they generate a volumetric flow; the ad-vance of the liquid in the indicator could therefore be controlled by an open-loop system, pro-vided that the system is recalibrated after each 12 hours cycle.

However, in case of a manual setting of the device, the level is bound to lag behind the ap-plied manual setting, if the device is not heavily over-dimensioned.

In addition, in this case, the return has to be powered, or an additional system has to be implemented that releases the check valves to allow a return of the liquid thanks to the reservoir return spring and/or head pressure generated by the system.

Electrowetting

The electrowetting is a phenomenon where a normally hydrophobic surface loses its proper-ties and becomes hydrophilic. This is presented in FIGS. 38A and 38B. This way, with several electrodes lined up, it is possible to control the displacement of a droplet of water in a display.

A schematic of such a display is presented in FIG. 39, as well as a detailed schematic of the different layers used to make the actuator. Using a droplet slightly larger than the electrode, the droplet moves to the adjoining electrode when it is supplied with current.

Figure 40:
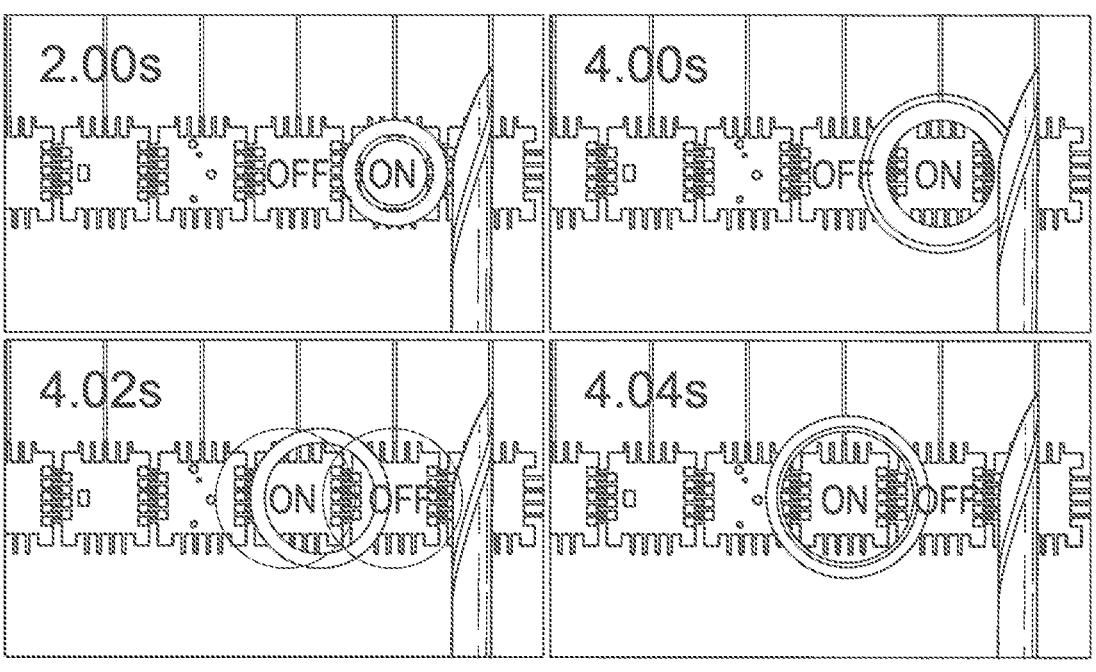
FIG. 40 is a sequence of displacement of a droplet of water in silicone oil with electrode pitch: 1 [mm], height: 400 [μm].

Pictures from a test involving the displacement of a droplet of water in silicone oil are presented in FIG. 40. It is visible that the displacement is extremely quick. In addition, the power involved is relatively low as the electrodes act as capacitors: no conduction of current takes place in the system.

Figure 41:
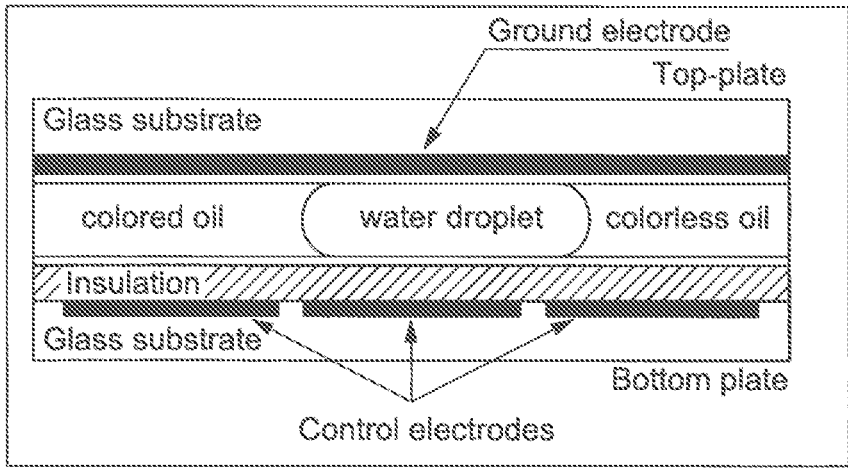
FIG. 41 is an embodiment having an indicator of the invention with a liquid column, while inducing displacement on a droplet only.

Most of the published work, as yet, involves the displace-ment of droplets of water, and not of bulk, as would be required to displace a column of liquid in the case of the liquid display. However, the display behavior can also be achieved by the displacement of a single droplet, such as presented in FIG. 41. The droplet in this case is used to make the separation be-tween a colored and a colorless oil, the colored oil being the indication medium.

This data intends to display some of the so far demon-strated capabilities of the electro-wetting. As was explained in the ranking of the solutions, a development effort is still re-quired to reach a display such as specified for the liquid indicator. Nevertheless, should it prove functional, this technology might allow for a very rapid and low-consump-tion device.

Squiggle Driven Piston

Figure 42:
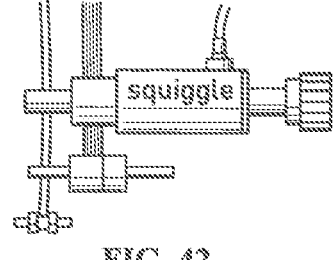
FIG. 42 is a plan view of a Squiggle drive of the invention.

FIG. 42 shows the Squiggle drive.

The initially proposed solution is believed to be handi-capped by several issues:

The energy consumption: for piezo actuators used at high frequency (unlike the actuator of the piezo membrane pump, for instance), the hysteresis of the piezoelectric material takes a high importance, and diminishes the overall efficiency of the actuator by generating a heat-ing. In addition, the return would have to be actuated with this solution, as the actuator has a high braking torque that would prevent the return spring from pull-ing the liquid back The manual setting speed: unless the actuator is highly over-dimensioned, it will not be able to follow quick changes in the display done manually by the user The scalability: unlike electromagnetic actuators, piezo actuators are not scalable at will. The small displace-ment of the piezoelectric material itself would generate huge tolerance challenges for larger drives.

The cost: piezoelectric actuators tend to be costly devices

However, as it relies on an existing product, such an actuator could be tested with relatively little investment and adaptation, with respect to a spiral wheel system, for instance.

Detect Liquid Position

Solution Proposals

The tree of solutions for the detection of the liquid position is presented in FIG. 43. The three large groups are:

1. Direct sensing: the sensor is integrated on the indicator tube, and detects directly the position of the liquid
2. Open-loop: no sensor is used. The system is reset every twelve hours in order to prevent accumulation of errors
3. Indirect sensing: the position of the actuator is tracked, and the position of the liquid column is inferred These solutions are discussed in detail in the following table. Two solutions are a priori set aside as non-practical:

An inductive sensing of the liquid column would require a ferrofluid, which would prevent having various dis-play colours The optical sensors would be complicated in the desired scales, and sensitive to the ambient light The vibration sensor would require a complex apparatus, and its function might be perceived by the user In addition, it is to be noted that a compensation for the temperature may have to be done if an indirect sensor is used with a liquid-gas interface.

| ID | Name | Description | Advantages/disadvantages |
|---|---|---|---|
| 1.1 | Capacitive sensor | A single or multiple electrodes are placed on the tube. The capacity indicates the progression of the liquid | ☐ Simple direct reading of the liquid level<br>☐ Linear variation of the capacity value<br>☐ Possibly affected by external electrical fields |
| 1.4 | Resistive sensor | Multiple electrodes are placed in the tube. The liquid connects them together | ☐ Direct reading of the liquid level<br>☐ May present a technical challenge to assemble |
| 2 | Open-loop regulation | The actuator provides a sufficient precision to be able to avoid using a sensor | ☐ Simplest solution<br>☐ Requires a calibration routine to avoid adding errors<br>☐ Would fail to react to changes in the environment, should it be necessary |
| 3.1 | Inductive sensor on actuator | The actuator displaces a ferrite in a coil. The inductance of the coil is measured and indicates the position of the actuator | • Mechanically simple solution<br>• Already in use in many precision devices |
| 3.2 | Encoder on actuator | An absolute encoder is placed on the actuator | ☐ Simple, exact reading of the position<br>☐ Requires a more complex apparatus than the inductive sensor |

33

-continued

| ID | Name | Description | Advantages/disadvantages |
|---|---|---|---|
| 3.3 | Pressure sensor | The pressure in the compression chamber is measured, and indicates the progression of the liquid | ☐ Compact sensors exist<br>☐ Would require a calibration for the temperature |

34 sensitive, with no possibility of avoid this sensitivity by selecting an appropriate interface, for instance.

For all the considered indirect sensors, as well as for the open-loop regulation, it is considered that the actuator that displaces the liquid is volumetric, i.e. that certain position of the actuator corresponds to a position of the liquid column. This is taken as assumption as no pressure generators made it past the selection of the actuators.

TABLE 4.3

Evaluation criteria for the liquid sensing methods

| ID | Criterion | Description | Weight | Ranking 1 | 3 | 9 |
|---|---|---|---|---|---|---|
| 1 | Sensitivity to environmental parameters | Risk of variation of the display with environmental parameters | 9 | The sensor is highly sensitive to the environment | Some sensitivity exists, but can be compensated for | The sensor is insensitive to the environment |
| 2 | Robustness to ageing | MTBF | 9 | MTBF << 4 years | MTBF ~= 4 years | MTBF >> 4 years |
| 3 | Max likely error | Maximal error that can have a significant probability of appearing on the display | 9 | >1 step | ~=1 step | <1 step |
| 4 | Complexity | Overall design complexity of the device | 3 | Very complex sensor | Moderate complexity | Simple system |

Remarks: A sensitivity to environmental parameters is specified only if the sensing method is inherently The ranking of the selected solutions is presented in Table 4.4

TABLE 4.4

Ranking of the liquid level sensors

| Ref | Name | Sensitivity to environmental parameters | Robustness to ageing | Maximal likely error | Complexity | TOTAL | RANK |
|---|---|---|---|---|---|---|---|
| | | Importance | | | | | |
| | | 9 | 9 | 9 | 3 | | |
| 1.1 | Capacitive sensor | Insensitive: full closed-loop | No known issues | closed-loop: error inferior to 1 step | Very simple system | | 1 |
| | | 9 | 9 | 9 | 9 | 270 | |
| 1.4 | Resistive sensor | Insensitive: full closed-loop regulation | | closed-loop: error inferior to 1 step | More complex system, involves electrodes in the liquid | | 4 |
| | | 9 | 1 | 9 | 3 | 180 | |
| 2 | Open-loop | Insensitive for true volumetric dispensers | No issues on sensing side, particular caution required on actuator side | error ~=1 step | Very simple system | | 3 |
| | | 9 | 6 | 3 | 9 | 189 | |
| 3.1 | Inductive sensor on the actuator | Insensitive: the displacement of the liquid is tracked | No known issues | error ~=1 step | Very simple System | | 2 |
| | | 9 | 9 | 3 | 9 | 216 | |
| 3.2 | Encoder on the actuator | Insensitive: the displacement of the liquid is tracked | No known issues | error ~=1 step | Very simple system | | 2 |
| | | 9 | 9 | 3 | 9 | 216 | |
| 3.3 | Pressure sensor | Very sensitive, temperature variations to be compensated | Possible drift havelreference of the pressure | Large error possible in case of miscalibration | Complex sensor, has to integrate temperature sensor as well | | 5 |
| | | 1 | 3 | 1 | 1 | 48 | |

The results are the following:

The capacitive sensor is the preferred solution, as it allows for a reliable closed-loop control of the position of the liquid column, while relying on a relatively simple technology The indirect sensing methods come in second position. Both are simple, but may lead to slightly higher errors, as no closed-loop regulation is done The open-loop regulation comes in third position. It may present an error, and particular caution has to be taken so that the dispense per step of the actuator does not change with the time. However, its simplicity is a great advantage.

These three first solution groups will be presented in detail in the next section. The resistive sensor will not, as it has similar performances, while it has a significantly more complex de-sign.

Detailed Presentation of the Leading Solutions

Capacitive Sensor

Two possible implementations of the capacitive sensor are possible;

A single-electrode sensor, where the liquid level is inferred from the analogical value of capacity measured across the whole tube A multi-electrode sensor, where the liquid level is determined as a digital value, using 144 electrodes, for all the time steps The first solution would allow using a simpler electronics circuit, but might prove challenging to calibrate due to the sensitivity of the analog circuit to the environmental parameters. The second, however, would be an extremely robust solution. Both solutions are presented in FIG. 44A and FIG. 44B.

The robustness of the second implementation, as well as its compatibility with the electrowetting solution, makes it a preferred one.

Inductive Sensor on the Actuator

The inductive sensor placed on the actuator measures the position of a ferrite in a coil, by measuring the inductance of this coil. It is presented schematically in FIG. 45.

Figure 46A:
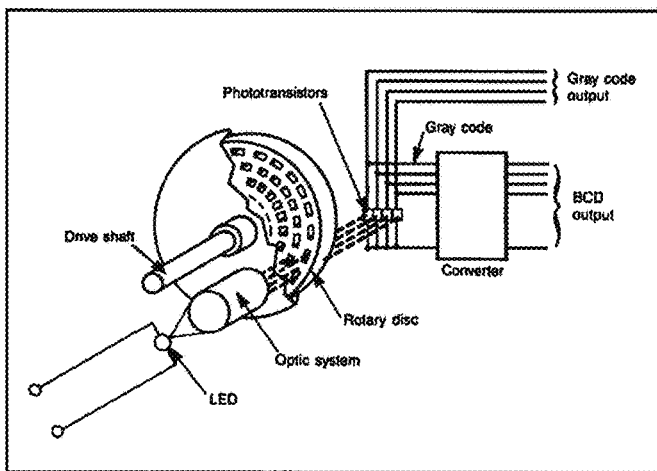
FIG. 46A is a schematic of an encoder system of the invention.
Figure 46B:
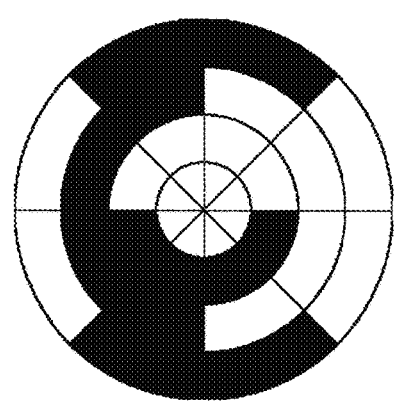
FIG. 46B is another schematic of an encoder wheel of the invention for an absolute positioning.

Such sensors are already widely used and provide very reliable results. Recent work at Helbling allowed the measurement of XXX [mm] displacements using an inductive sensor, Encoder on the Actuator An encoder is a simple system that provides the absolute position, or the displacement, of a rotating actuator. A schematic of such a system, as well as an encoder wheel for an absolute positioning, are presented in FIG. 46A and FIG. 46B respectively. This system can be realised with virtually any de-sired accuracy, depending on the application.

Remark: As seen in the ranking, the encoder and the inductive sensor have similar performances. The former is more adapted to rotating applications, and the latter to linear translation. The main direction of displacement of the actuator should be the rationale for the discrimination between those two sensors Preliminary Calculations Environmental and User Constraints During Use Temperature: [−10; +40]° C.

Ambient Pressure: [0-3000] m above sea level

Sunlight aging

Liquid:

Gas diffusion

Surface tension variations

Stability versus bubble point (shocks, vibrations, pressure, temperature shocks, reset mechanism Design Pending:

Shocks: 1 m fall on hardwood

Vibration

Current magnetic field resistance <4800 A/m

Loads on display

Water resistance, corrosion, condensation

Display sealing

Thermal Expansion Calculation

Thermal Expansion of Materials

Ambient temperature is an external parameter that directly acts on the system and on liquid in the display tube and therefore on its accuracy for time display. Effect is increased for a bigger reservoir volume attach to a small display capillary. Parts such as liquid container, display tube and the liquid itself must be considered along with the $2^{nd}$ liquid container for a liquid-liquid scenario.

Applicable temperature range: ° C. [−10;+40].

Typical thermal linear expansion coefficients of materials and liquids $\alpha$ [$K^{-1}$]

Invar: $2 \times 10^{-6}$

Glass: $10\text{-}70 \times 10^{-6}$

PMMA, PC: $50\text{-}100 \times 10^{-6}$

PUR: $50\text{-}80 \times 10^{-6}$

PP: $100\text{-}150 \times 10^{-6}$

LDPE: $280 \times 10^{-6}$

PVC: $60 \times 10^{-6}$

Typical volume expansion coefficients of liquids $\gamma$ [$K^{-1}$]

Quicksilver: $180 \times 10^{-6}$

Water: $207 \times 10^{-6}$ at 20° C. (anomalous expansion)

Ethanol: $750 \times 10^{-6}$

Ether: $1700 \times 10^{-6}$

Glycerol $500 \times 10^{-6}$

Gasoline: $900 \times 10^{-6}$

Silicone Oil: $1170 \times 10^{-6}$

Liquids volume expansion coefficient is more or less 3 times greater than a however water for example is highly none linear.

Matching of materials and liquids will be defined later on depending on the selected design embodiments. Criteria such as viscosity (versus a pumping device), surface tension, miscibility, freezing temperature and stability over the indicated temperature range.

Calculations will show effect of a liquid with a $\gamma$ coefficient of $500 \times 10^{-6}$ [$K^{-1}$] a reservoir in PP ($\alpha$ $125 \times 10^{-6}$ [$K^{-1}$] (or $3 \times \alpha = 375 \times 10^{-6}$ [$K^{-1}$])) and display tube in PVC ($60 \times 10$ [$K^{-1}$]). Mismatch is of about $125 \times 10^{-6}$ [$K^{-1}$].

Calculations for a PP Reservoir

Figure 47:
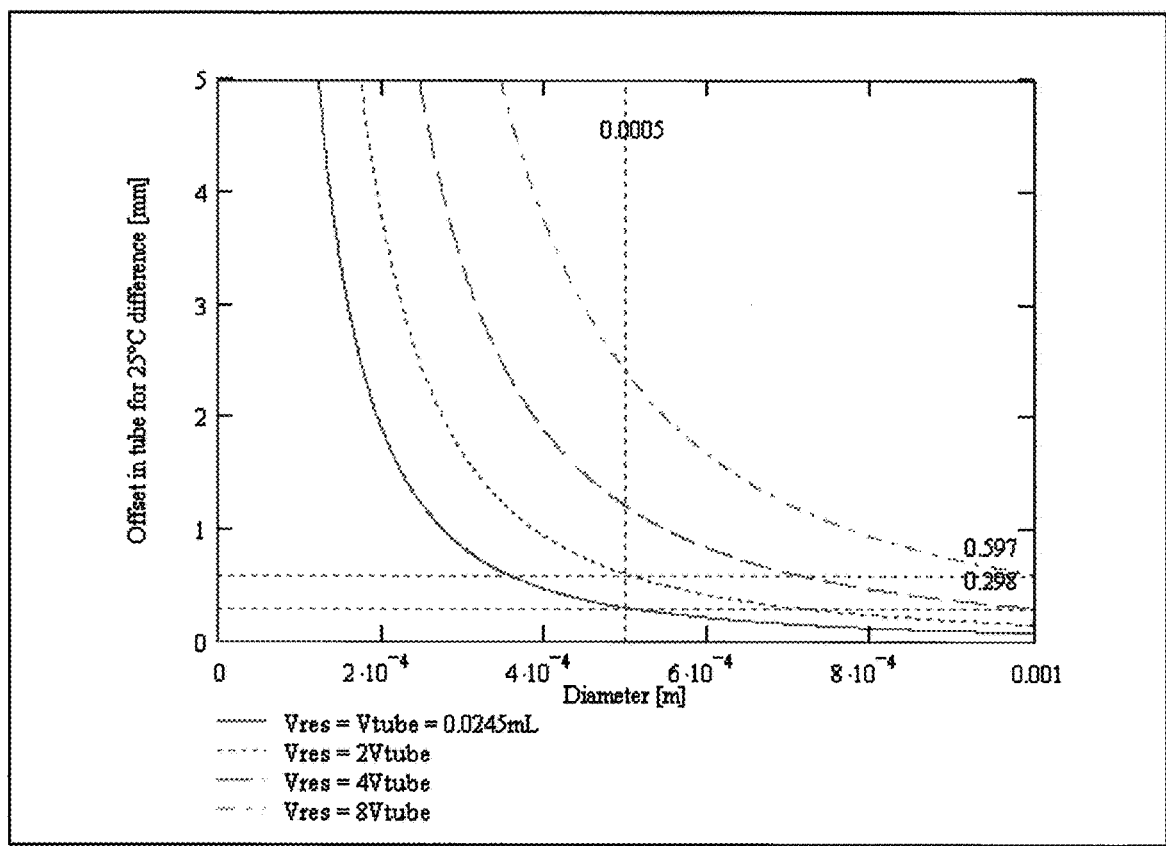
FIG. 47 is a graph of the effect of temperature on liquid length in a tube.

The graph in FIG. 47 shows liquid increase length in indicator tube for a 25° C. temperature change. Temperature applied to the whole system. Reservoir material PP, Tube material PVC, Liquid with volume dilatation coefficient of $500 \times 10^{-6}$ [$K^{-1}$].

Vtube is the maximal liquid volume in display tube (length 120 m, diameter 0.5 mm giving 0.024 mL).

Curves confirm that for a relative bigger reservoir volume, temperature coefficients mismatch between casing and liquid, induces a bigger inaccuracy. Effect is widely increased for a capillary display tube.

Reservoir volume is linearly scaled to the tube volume. If tube diameter is big, reservoir is scaled up to match volume. Therefore, offset in tube due to temperature does not depend on tube diameter. Following equation expresses the offset length versus a reservoir volume depending on display volume. P is the parameter starting from 1 (minimum liquid volume for display tube) to 5 (Reservoir contains up to 5 times the display volume) and Ltube: 120 mm.

$$\text{Offset} = \frac{\Delta V}{\text{Tube\_area}} =$$

$$\frac{P \cdot \text{Tube\_area} \cdot L_{tube} \cdot (1 + \Gamma \Delta T)}{\text{Tube\_area}} = \frac{P \cdot L_{tube} \left[ (1 + \alpha pp \cdot \Delta T)^3 - (1 + \gamma liq \cdot \Delta T) \right]}{(1 + \alpha pve \cdot \Delta T)^2}$$

Figure 48:
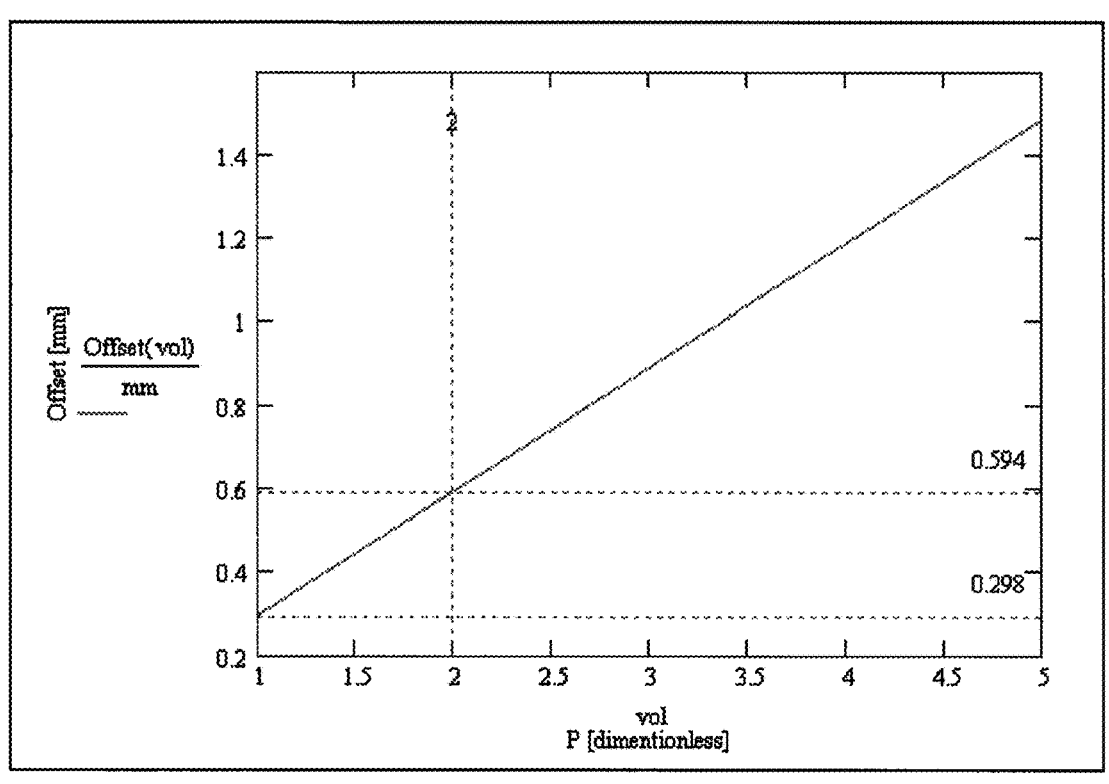
FIG. 48 is another graph of the effect of temperature on liquid length in a tube.

And curves are displayed on the graph in FIG. 48.

As liquids and solids are considered as incompressible, gases are compressed following the ideal gas law.

Conclusions

Offset in display due to temperature is linear to the Volume and corresponding channel diameter.
Volume must be minimized while tube diameter must be maximized, ideally, liquid volume matches required display volume (120 mm long channel and reading confort),
A compliant chamber is required in case of liquid/air (linear channel) or a double liquid/liquid interface (close-looped channel)
Reservoir's material thermal expansion coefficient could match with liquid's thermal expansion coefficient.
Thermal Effects on Gas Gases are contained in the display chamber and decompression chamber in case of a liquid/gas interface. They follow the ideal gas law.

$$P \cdot V = n \cdot R \cdot T$$

For an isochoric process (no material or liquid dilatation) a gas submitted to a temperature change of 25° C. centered around 15° C. sees a pressure change of 8.7% that directly interacts with the compliant part of the design.
Gas Dissolution and Vapor Pressure In the case of a liquid-gas display with rigid compression chamber, some gas would get dis-solved in the liquid as the display advances. This gas would be allowed to outgas after the re-set. The goal of this section is to determine whether there is a risk of a bubble appearing in the display and cutting the display in two.

The number of moles of gas dissolved in a given amount of liquid, at a given pressure, is calculated as:

$$n_{distributed} = P \cdot V_{liquid} \cdot k_H$$

In this equation, $k_H$ is a constant, dependent on the liquid and on the gas.

The pressure reached in the compression chamber when the display is at the end is calculated as:

$$P_{final} = P_{initial} \cdot \frac{V_{chamber} + V_{tube}}{V_{chamber}}$$

$$V_{chamber} = \kappa_1 \cdot V_{tube}$$

$$P_{final} = P_{initial} \cdot \frac{\kappa_1 + 1}{\kappa_1}$$

The total volume of liquid available in the system is equal to the reservoir volume. The reservoir volume itself can be expressed as:

$$V_{reservoir} = \kappa_2 \cdot V_{tube}$$

Therefore, the number of moles that are able to degas after the reset can therefore be calculated as:

$$n_{degassing} = n_{dissolved\_final} - n_{dissolved\_initial}$$

$$n_{degassing} = P_{final} \cdot V_{reservoir} k_H - P_{initial} \cdot V_{reservoir} \cdot k_H$$

$$n_{degassing} = k_2 \cdot V_{tube} \cdot P_{initial} \cdot k_H \cdot \left( \frac{k_1 + 1}{k_1} - 1 \right)$$

$$n_{degassing} = \frac{k_2 \cdot V_{tube} \cdot P_{initial} \cdot k_H}{k_1}$$

The corresponding volume can then be calculated using the law of the perfect gases, that states that:

$$P_{init} \cdot V_{degassing} = n_{degassing} \cdot R_{gaz} \cdot T_{ambient}$$

$$V_{degassing} = \frac{n_{degassing} \cdot R_{gaz} \cdot T_{ambient}}{P_{init}}$$

$$V_{degassing} = \frac{k_2 \cdot V_{tube}}{k_1} \cdot R_{gaz} \cdot T_{ambient} \cdot k_H$$

It is visible that this last expression relies on three parameters:
The volume of the tube
The ratio between tube and decompression chamber volume
The ratio between tube and reservoir volume
If we do not want a bubble to appear in the display, that would remain there, a criterion can be that the volume of degassing gas should not occupy a spherical bubble of a diameter equal or superior to the tube diameter. This way, if the bubble is smaller than the tube, it is likely that it will migrate towards the reservoir or the decompression chamber, thus not being visible in the display. Therefore, we want that:

$$r_{bubble} \leq r_{tube}$$

$$\sqrt[3]{\frac{3 \cdot V_{degassing}}{4 \cdot \pi}} \leq \sqrt[3]{\frac{3 \cdot V_{tube}}{l_{tube} \cdot \pi}}$$

Figure 49:
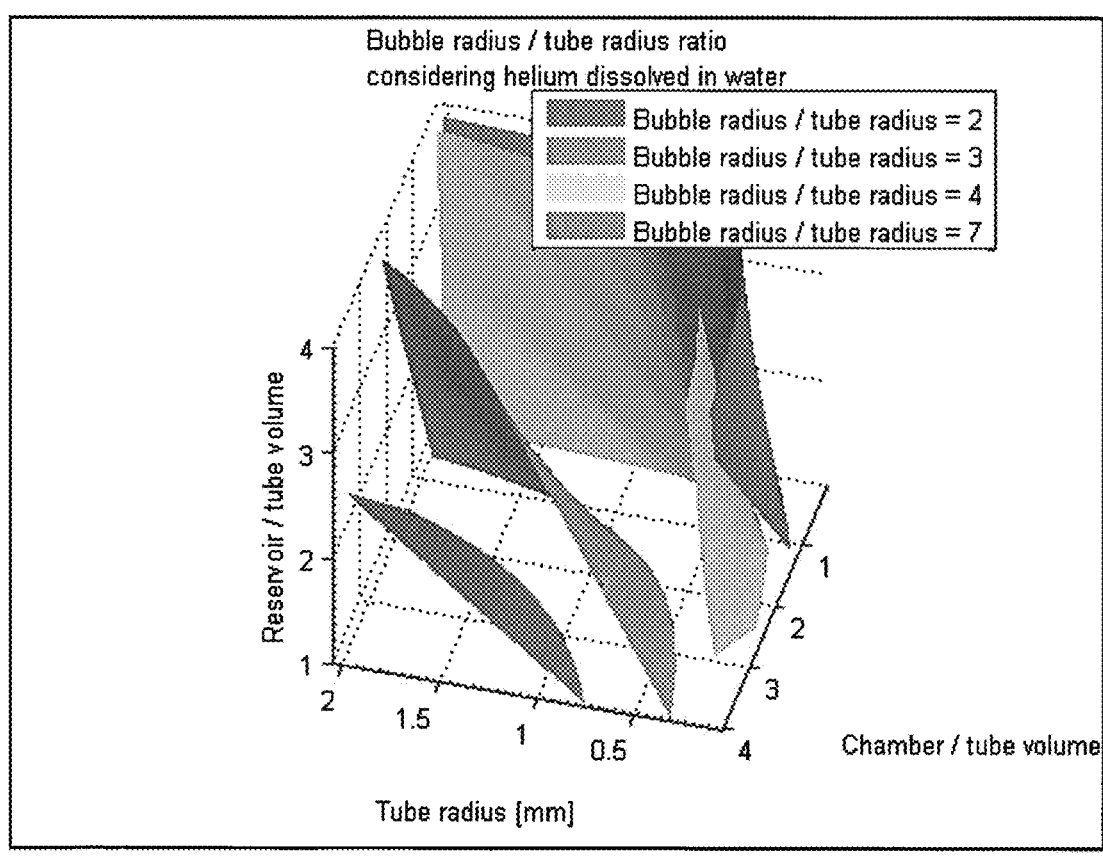
FIG. 49 is a graph of the calculation bubble radius/tube radius ratio for different input parameters, considering helium dissolved in water.

This calculation was done for a range of input parameters, and considering the solubility of helium in water. Helium's solubility in water is:

$K_{H\_He} = 3.7 \cdot 10^{-4}$ [mol/l·atm]
This is a very low value (air: $k_H = 7.8 \cdot 10^{-4}$, ammonia: $k_H \approx 50$). The result of the calculation is presented in FIG. 49

Conclusions

It is not possible, under the considered assumptions, to have an outgassing bubble of a diameter inferior to the tube's
Even bubble/tube ratios of 2 restrict to very large tubes, large chamber volumes and relatively small reservoirs
Under these assumptions, it appears difficult to grant that no bubble will disrupt the liquid display
This tends to indicate that a liquid-vacuum or liquid-liquid display should be preferred
Energy Budget Calculation Market available coin cells of Lithium/Manganese and Lithium/CarbonMonofluoride provide a nominal voltage 3V (End point 2V) and a battery capacity of about 100-600 mAh. Battery cells models CR2025 through CR2450 and BR, with outer dimensions 2.5 mm×Ø20 mm to 5 mm×Ø24.5 mm.

Following calculations shows the available energy budget for 2 years with a single coin cell of 3V (end voltage 3V) and 210 mAh (in parentheses worst case):

Amount of 5 min strokes: 210'400 (<1 s)

Amount of 12 hours "return" strokes: 1461 (<30 s)

Amount of adjustments (5/months): 120 (<5 s)

Giving:

Steps lifetime: 70.675 hours, worst case

Steps lifetime with a mechanical return (actuator not active during reset): 58.3 hours Calculation for the prototype piezoelectric actuated micromotor Squiggle chosen for the initial prototype URS:

Power consumption: 330 mW

Giving a current consumption: 110 mA

Squiggle total life time: 210 mAh/110 mA=1.9 hour or only 2.7% of expected life time Values show that energy budget is not in the same order of magnitude than the consumption budget. Squiggle could be driven at a lower power consumption but even with 10 times less power lifetime would only be extended to 27%. Datasheet indicates a minimal driving power of about 150 mW for a 15 gf axial load to achieve a 1 mm/s displacement.

With defined energy budget given by 1 battery cell, theoretical available energy for each step is (worst case):

Coin cell energy: 210 mAh×3V=2270 J

Mean energy consumption: 10.7 ml

Mean power consumption: 8.9 mW (1 s strokes, 30 s reset strokes, 5 s adjustments)

For the worst case conditions, more than 82% of actuation time is in the clock function 5 min steps (1 s actuation) and can be significantly reduced with a shorter actuation method. In this calculation 17% are the remaining actuator resetting time which could also be greatly reduced according to selected design (pressure free, compliant chamber). Adjustments are negligible.

Design must consider space available for additional coin cell (doubling capacity) and reduce as much as possible actuation time for steps and resets. Design could also implement a mechanical-based energy storage in a spiral spring for mechanical reload, nevertheless actuation must work against spring reload.

Other functions requiring electrical energy not included in this calculation:

Microcontroller

Position sensor (min. ⅕ min, more during adjustments)

Digital clock

Backlight LED (1/day, 10 s per use, 2.03 hours/2 years)

Button indicator low consumption blue LED (12 hours a day, 8760 hours/2 years)

LED Power Consumption:

Market available low consumption LEDs need a nominal voltage of 2.2V and a current of 1 mA giving a power of 2.2 mW.

Button LED would have an energy consumption of 1388 J (!)

Backlight LEDS (3V nominal, 20 mA): 438 J

Therefore, LED button light must be redefined in duration time and intensity in order to reduce its consumption. Energy budget for actuator would be less than 20% of capacity.

Pressure Calculation

In the case of a display with a liquid/gas interface, and a rigid decompression chamber, the pressure will augment linearly while the liquid advances, as the gas gets compressed in the compression chamber. The final pressure will depend on two parameters:

The section of the tube, that defines the amount of gas that has to be compressed.

The volume of the decompression chamber

The final pressure can therefore be calculated as:

$$P_{final} = P_{initial} \cdot \frac{V_{chamber} + V_{tube}}{V_{tube}}$$

Figure 50:
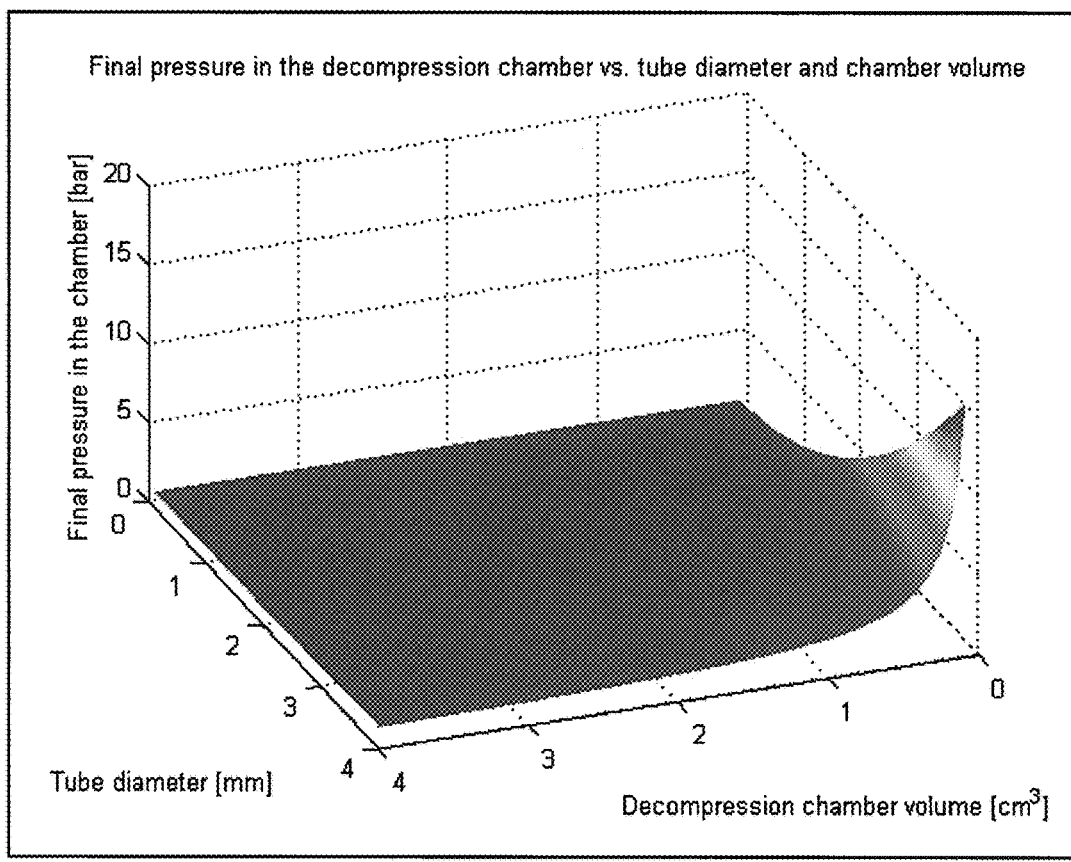
FIG. 50 is a graph of final pressure in the decompression chamber vs. tube diameter and chamber volume.
Figure 51:
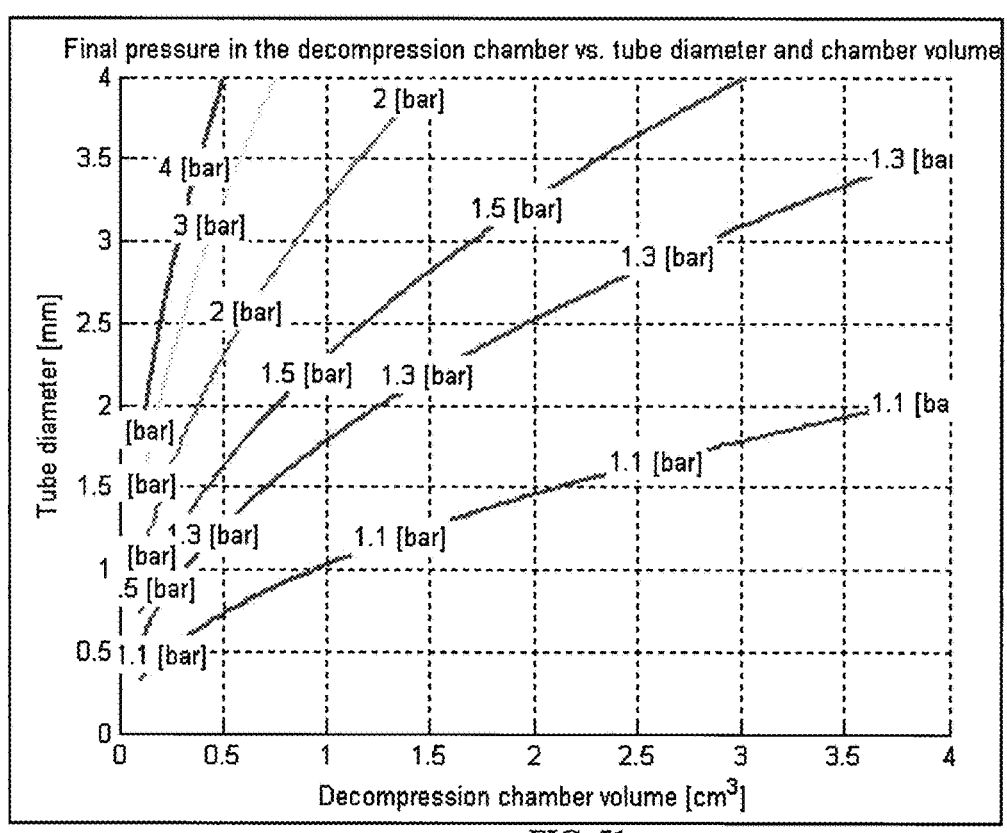
FIG. 51 is a contour plot of the final pressure in the decompression chamber vs. chamber volume and tube diameter.

The final pressure in the compression chamber as a function of these parameters is presented in FIG. 50. The same values are represented as a contour plot in FIG. 51

As it is visible in these figures, large pressures can easily be reached. This would both lead to higher energy consumption in the actuator, and higher mechanical requirements for the indicator. Actions that can be taken to limit these constraints are:

Maximize the decompression chamber volume

Increases the overall size

Minimize the tube section

May affect the visibility

Use a liquid-liquid interface

Requires one compliant reservoir at each end of the tube

Alternatively, an elegant solution can be found with the tube making a loop

This solution would not require any kind of reservoir space

Piston with Rigid Decompression Chamber Force Calculations

Piston Reaction Force

For a system with a piston, and a liquid-gas interface, the force acting on the piston will vary linearly with the progression of the liquid in the indicator. This, in turn, will be converted to a force that depends on the section of the piston, which can be tube written:

$$P_{final} = P_{initial} \cdot \frac{V_{chamber} + V_{tube}}{V_{chamber}} \cdot S_{piston}$$

Figure 52:
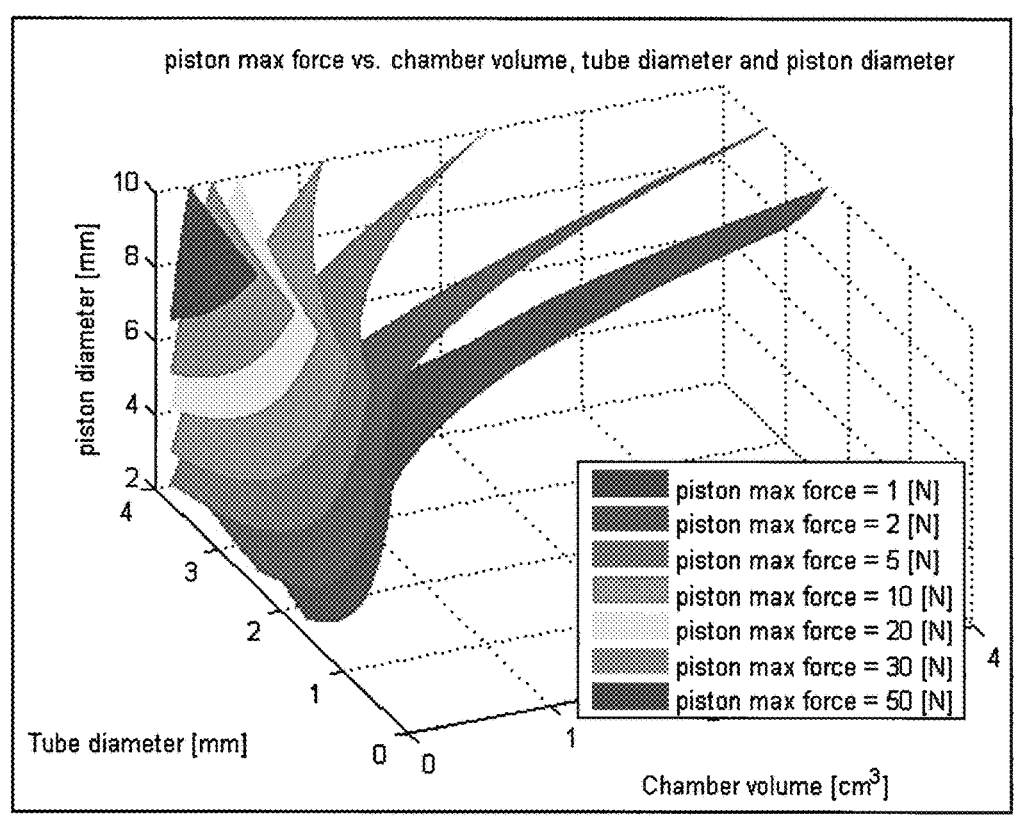
FIG. 52 is a 3D graph of isosurfaces of maximal force on the piston vs. tube diameter, chamber volume and piston diameter.

The maximal force acting on the piston, as a function of the tube diameter, chamber volume and piston diameter, is presented in FIG. 52.

It is visible that on a large part of the graph, the maximal force does not exceed 1 [N], which is encouraging for the dimensioning of the actuator.

Piston Overall Stroke Length

Figure 53:
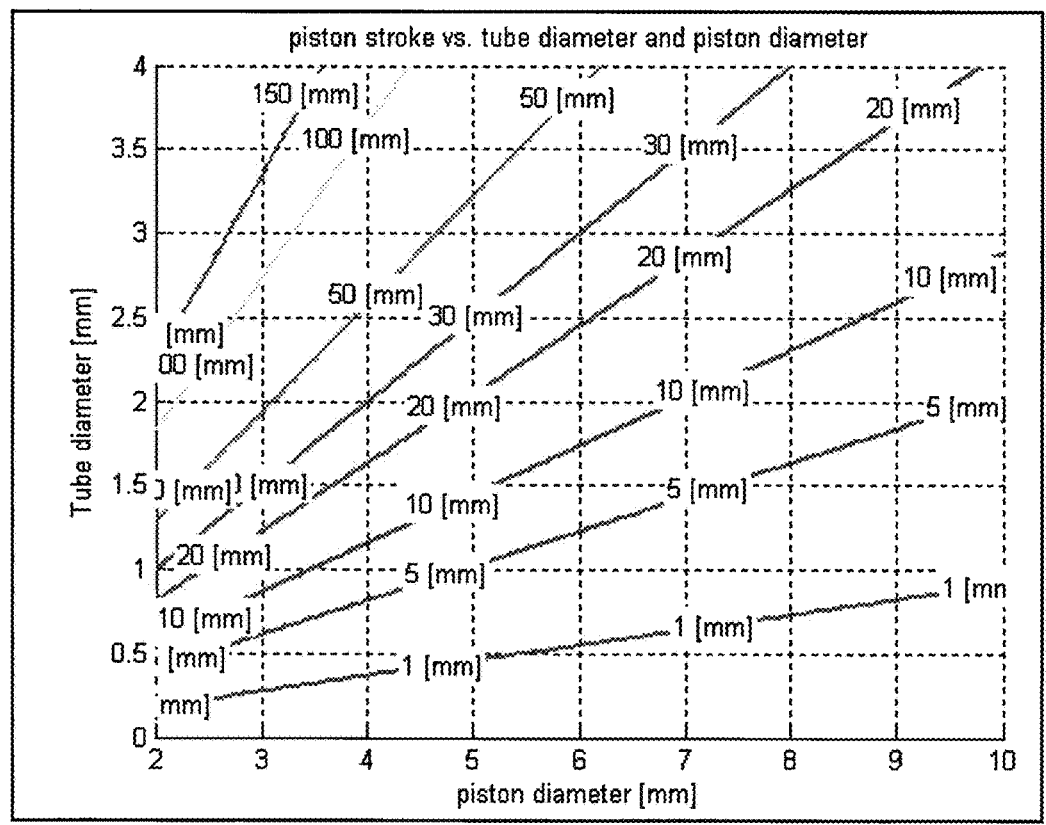
FIG. 53 is a plot of piston stroke vs. tube diameter and piston diameter.

The piston stroke, as a function of the piston diameter and tube diameter, is presented in FIG. 53. It will have to be set depending on the dimensional constraints of the device, but will also affect the pump energy consumption, for a larger piston will require more force to be actuated.

Mechanical Power Required

The mechanical power is defined as:

$$P_{mechanical} = \frac{F_{piston} \cdot d_{stroke}}{t_{stroke}}$$

$$P_{mechanical\_average} = \frac{F_{piston\_average} \cdot d_{stroke}}{t_{stroke}}$$

$$P_{mechanical\_average} = \frac{\frac{F_{piston\_max}}{2} \cdot \frac{d_{overall\_stroke}}{144}}{t_{stroke}}$$

With $d_{stroke}$ the distance that has to be provided by the piston for one 5 minutes increment, $d_{overall\_stroke}$ the previously computed overall stroke length of the piston, and $t_{stroke}$ the stroke duration defined as 1 [s]. As the actuator force rises linearly with the progression of the display, half of the maximal calculated force is considered to be the average required force.

The required electrical power can then be computed as:

$$P_{electrical\_average} = \frac{P_{mechanical\_average}}{\eta_{total}}$$

Figure 54:
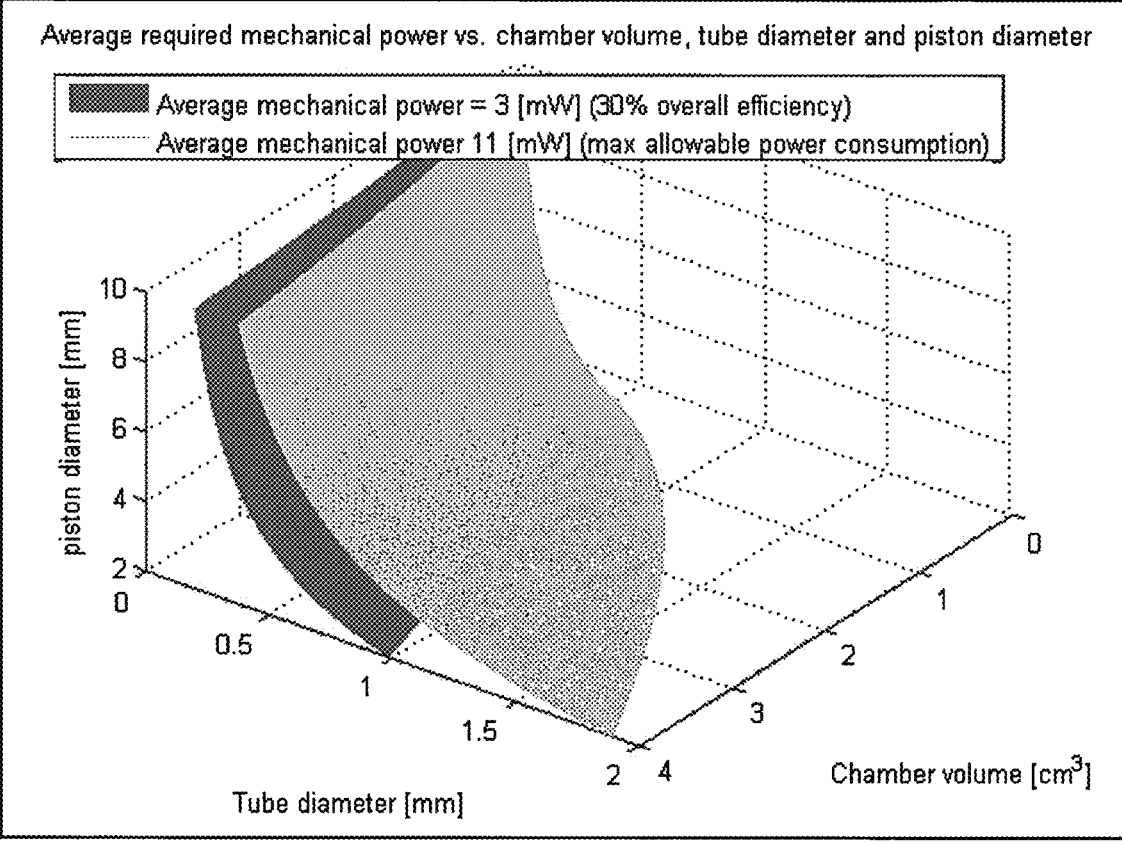
FIG. 54 is a graph illustrating configurations allowing a function below 11 [mW] average power consumption (maximal admissible power), and below 3 [mW] (considering a 30% overall efficiency).

With $\eta_{total}$ the overall efficiency of the system, considering both electrical and mechanical power losses. Isosurfaces of power consumption can then be drawn, such as presented in FIG. 54. The overall allowable power consumption is estimated to be 11 [mW], such as one coin cell can supply the system during two years of continuous operation.

Considering an overall efficiency under 30% to set a reasonable limit for the average energy consumption, one reaches a value of 3 [mW].

Remark: For the calculation of the maximal allowable power consumption, the assumption is taken that the return is done using the pressure generated during the forward motion, i.e. that the actuator does not have to be activated for the return.

It is visible that the trend for the power consumption is not the same as for the force. This is due to the fact that, while larger pistons require more force, their stroke distance is greatly reduced.

Piston Return Time Vs. Return Force

Figure 55:
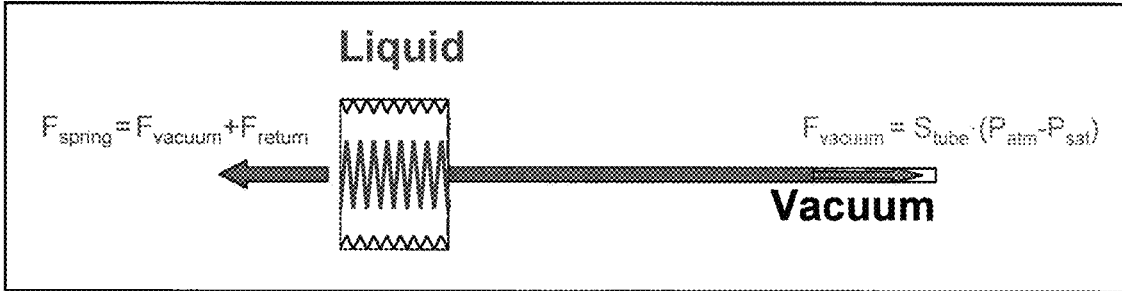
FIG. 55 is a schematic of a liquid-vacuum interface.

A schematic representation of a liquid-vacuum system is presented in FIG. 55. In this system, the force exerted by the vacuum has to be compensated by the force of the return spring, so that the system is in equilibrium. In addition, a force has to be added so that the return is done sufficiently quickly.

Remark: Note that the situation is the same in a liquid-gas interface with compliant compression chamber, or in a liquid-liquid system, except that the suction generated by the vacuum is not present, which lowers the overall forces.

The flow in a tube, under a certain pressure differential, and assuming that the flow is laminar, is calculated as:

$$Q_{liquid} = \Delta P \cdot \frac{1}{R_{tube}}$$

Where $R_{tube}$ is the fluidic resistance of the tube to the advance of the liquid. It can be calculated by Poiseuille's law as:

$$Q_{liquid} = \Delta P \frac{\pi \cdot r_{tube}^4}{l_{tube} \cdot v_{liquid} \cdot 8}$$

$$Q_{liquid} = V_{liquid} \cdot S_{tube}, \quad \Delta P = \frac{F_{return}}{S_{piston}}, \quad S_{tube} = \pi \cdot r_{tube}^2, \quad S_{piston} = \pi \cdot r_{piston}^2$$

$$V_{liquid} = \frac{F_{return} \cdot r_{tube}^2}{8 \cdot \pi \cdot l_{tube} \cdot v_{liquid} \cdot r_{piston}^2}$$

If we consider the complete return of the liquid, from the completely filled display, the fluidic resistance will drop steadily with the advance of the liquid. The average fluidic resistance will be equal to that of a tube half the total length of the tube. However, if the interface is a liquid-liquid one, the fluidic resistance will not change with the advance of the liquid. Following speeds are therefore calculated for both cases:

$$\overline{V}_{liquid,liquid-gas\ display} = \frac{F_{return} \cdot r_{tube}^2}{8 \cdot \pi \cdot \frac{l_{tube}}{2} \cdot v_{liquid} \cdot r_{piston}^2}$$

$$\overline{V}_{liquid,liquid-liquid\ display} = \frac{F_{return} \cdot r_{tube}^2}{8 \cdot \pi \cdot l_{tube} \cdot v_{liquid} \cdot r_{piston}^2}$$

The return speed of the liquid therefore depends on four parameters:

The return spring force

The tube radius

The viscosity of the liquid

The piston radius

The maximal specified time for the return is of 30 [s]. However, this might prove insufficient for a manual setting of the device, as the user would not have a direct feedback of the setting, which might prove necessary.

Figure 56:
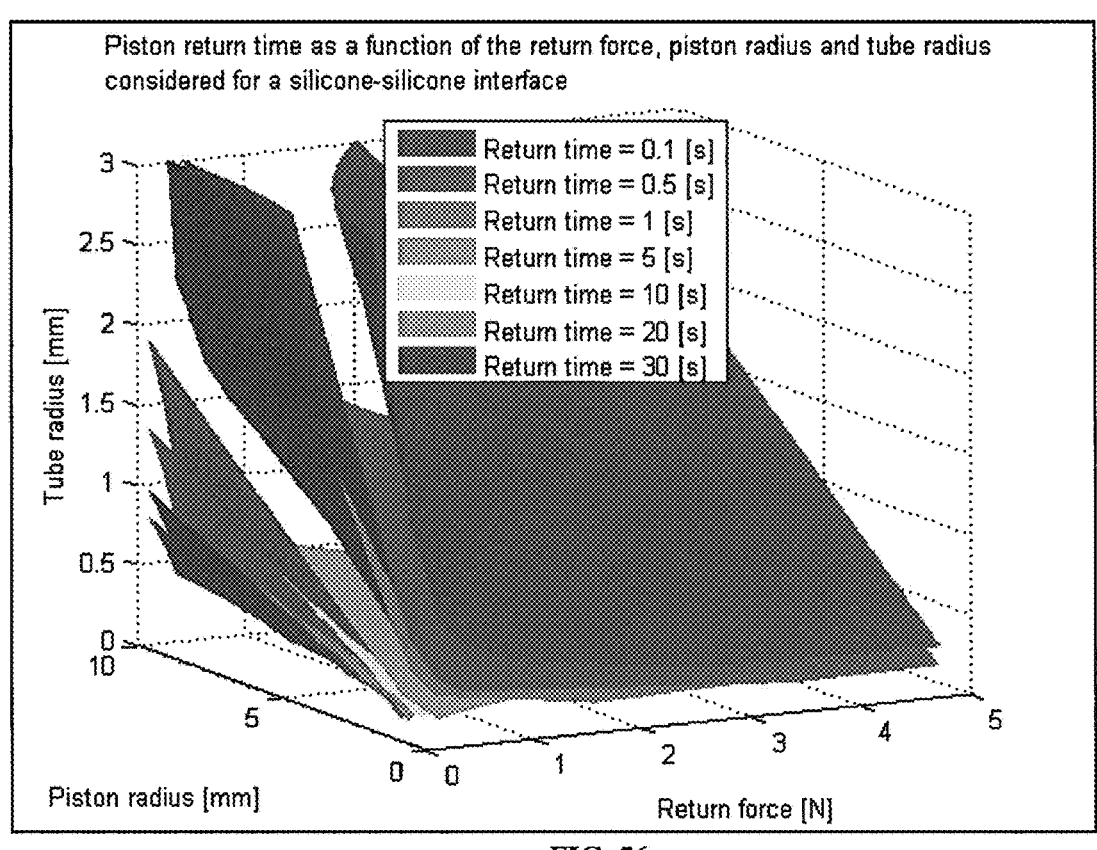
FIG. 56 is a graph of return time isosurfaces for a silicone-silicone interface.
Figure 57:
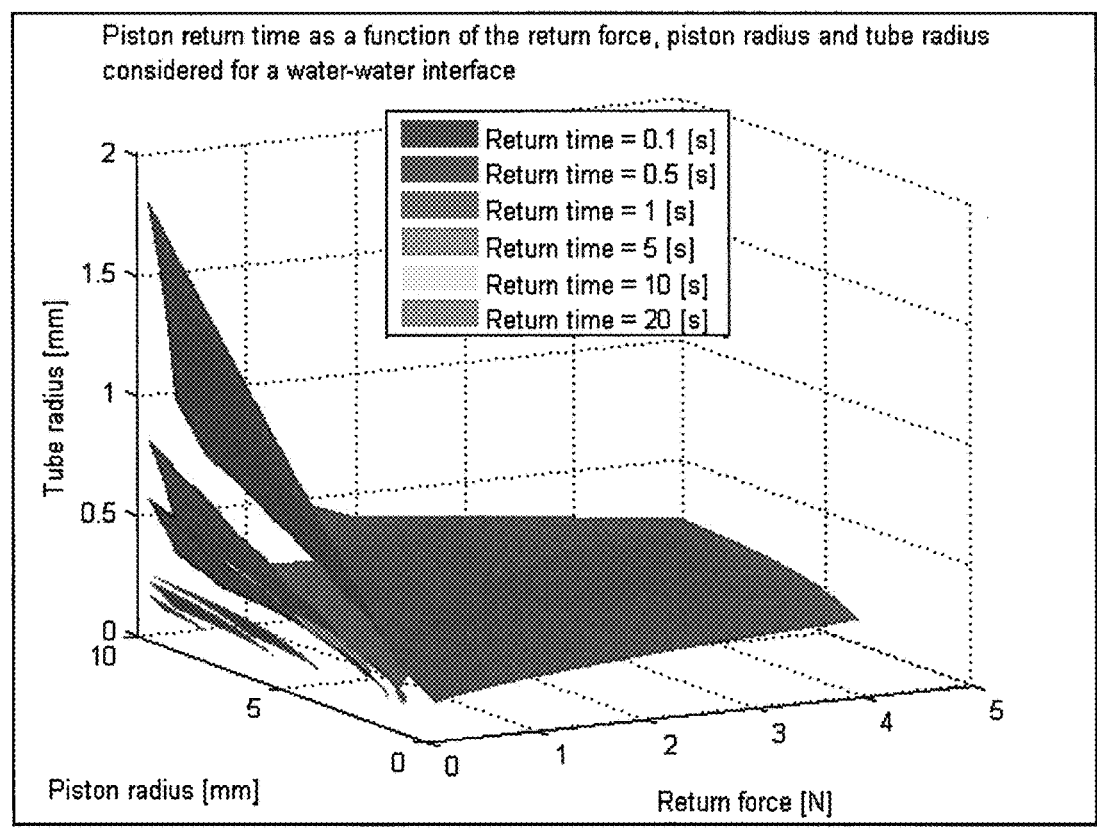
FIG. 57 is a graph of return time isosurfaces for a water-water interface.

Isosurfaces of return times as a function of the tube and piston radius, and of the return force, are presented in FIG. 56 for a silicone-silicone interface, and in FIG. 57 for a water-water interface. It is visible that in both cases, the situation where the return takes 30 seconds or more is exceptional. However, if a much quicker return is required, particular care should be taken on the choice of the dimensions.

Spiral Wheel Torque Calculations

General Spiral Formulae

Figure 58:
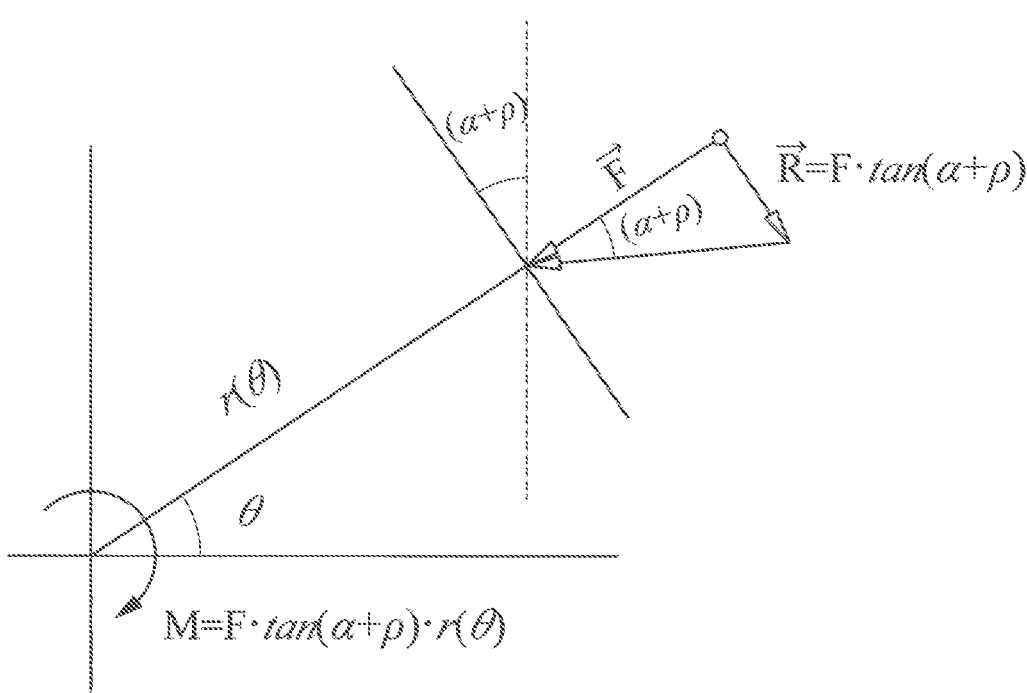
FIG. 58 is a schematic of the forces acting on the spiral ramp.

The forces acting on the spiral at any given time are presented in FIG. 58. The variables in presence are:

F, the force of the piston

R, the equivalent perpendicular force generating the torque on the spiral

α, the angle between the tangent and the spiral and the tangent of a circle passing by this point (calculation follows)

ρ the added angle due to the friction, calculated as ρ=α tan(μ), where μ is the friction M the torque required to turn the spiral wheel α is calculated at any point as:

$$\alpha = a\tan\left(\frac{1}{r(\Theta)} \cdot \frac{dr}{d\Theta}\right)$$

The required torque is therefore written as:

$$M = F \cdot \tan(\alpha+\rho) \cdot r(\Theta)$$

Constant Torque Spiral Calculation

If a rigid compression chamber is to be used, the spiral shape has to be adapted accordingly, in order to keep the torque on the drive constant. If a logarithmic spiral were used in this case, the torque would augment while the display advances, which would require implementing a drive that would be overdimensioned over most of the stroke distance, in order to be capable of providing enough torque at the end of the stroke.

Figure 59:
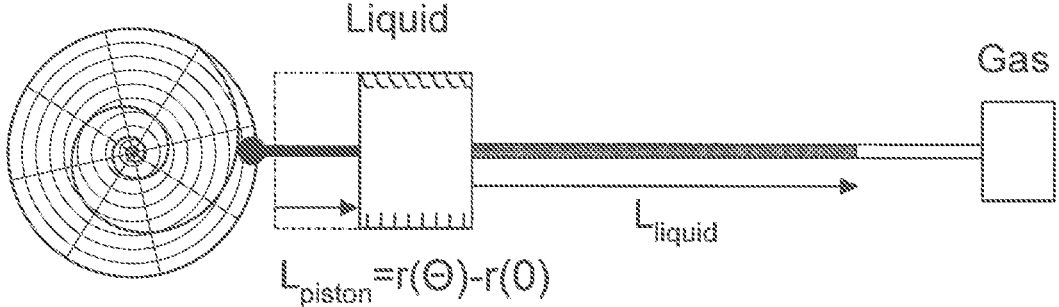
FIG. 59 is a generalized spiral system with rigid compression chamber.

The generalized spiral system is presented with some of its key values in FIG. 59.

The pressure in the compression chamber can be written as:

$$P_{chamber}(L_{liquid}) = P_{initial} \cdot \frac{V_{chamber} + V_{tube}}{V_{chamber} + V_{tube} - L_{liquid} \cdot S_{tube}}$$

known:

$$L_{liquid} = L_{piston} \cdot \frac{S_{piston}}{S_{tube}}, \quad L_{piston} = r(\Theta) - r(0),$$

$$F_{piston}(\Theta) = (P_{chamber}(\Theta) - P_{atmosphere}) \cdot S_{piston}$$

then:

$$F_{piston}(\Theta) =$$

$$\left[ P_{initial} \cdot \frac{V_{chamber} + V_{tube}}{V_{chamber} + V_{tube} - (r(\Theta) - r(0)) \cdot S_{piston}} - P_{atmosphere} \right] \cdot S_{piston}$$

We want in this calculation to have a constant torque on the drive. As seen in the previous section, the torque is calculated as:

$$M(\Theta) = F(\Theta) \cdot \tan(\alpha(\Theta) + \rho) \cdot r(\Theta)$$

In order to solve this equation, we take that, the contribution of the friction is null. We know that $\alpha$, the angle of the spiral, can be calculated as:

$$\alpha = atan\left( \frac{1}{r(\Theta)} \cdot \frac{dr}{d\Theta} \right)$$

Therefore, the torque can be calculated approximately as:

$$M(\Theta) = F(\Theta) \cdot \frac{dr(\Theta)}{d\Theta}$$

A constant torque means that we want the derivative of the torque as a function of the angular position of the spiral to be zero. Therefore:

$$\frac{dM(\Theta)}{d\Theta} = \frac{dF(\Theta)}{d\Theta} \cdot \frac{dr(\Theta)}{d\Theta} + F(\Theta) \cdot \frac{d^2 r(\Theta)^1}{d\Theta^2} = 0$$

As the force depends on the angle, this leads to a complex second order differential equation. Should a solution involving a spiral wheel, and a liquid-gas interface be chosen, the shape of the spiral would be computed numerically.

Remark: Note that, if any shape of spiral but an Archimedean spiral is used, the step size to be performed by the motor will not be constant along the movement of the piston, for the distance increment of the spiral will not be constant with the angle.

Archimedean Spiral Calculations

The Archimedean spiral is one of the simplest shapes, with as equation:

$$r(\Theta) = a + b \cdot \Theta$$

Figure 60:
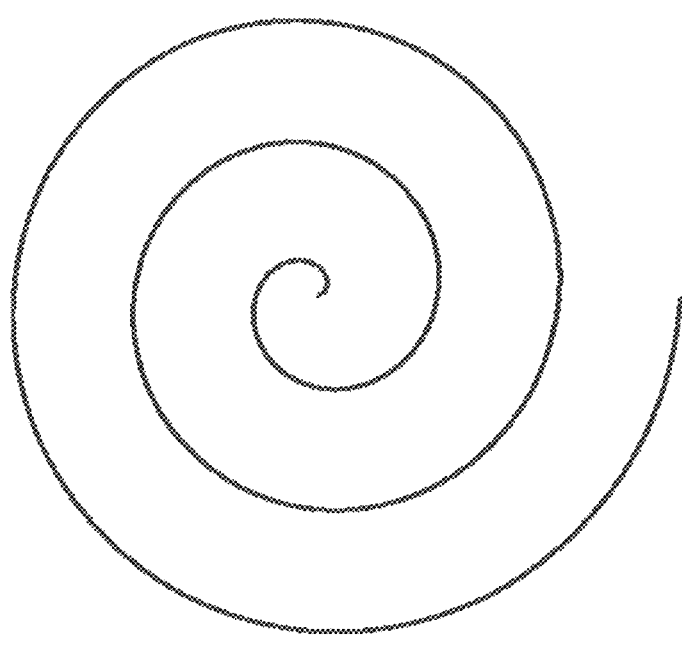
FIG. 60 is an Archimedean spiral.

One such spiral is presented in FIG. 60. It has the particularity that, for a given rotation of the spiral, the linear displacement of the piston pressed against it is always constant, whatever the angle. This situation is not true for other spiral shapes.

Should any other spiral but an Archimedean spiral be used, the rotation speed of the motor would not be constant, in order to achieve a constant displacement of the indicator.

The Archimedean spiral has the property that the spiral slope a decreases with the progression of the angular position $\Theta$, which in turn diminishes the required torque. It is hereafter pre-sented as a possible solution for the situations where gas has to be compressed in a rigid chamber.

As calculated in the precedent chapter, the torque to be provided by the actuator for a general spiral compressing gas is:

$$M(\Theta) = F(\Theta) \cdot \tan(\alpha(\Theta) + \rho) \cdot r(\Theta)$$

In an Archimedean spiral, the spiral slope angle is calculated as:

$$\alpha = atan\left( \frac{1}{r(\Theta)} \cdot \frac{dr}{d\Theta} \right)$$

$$\alpha = atan\left( \frac{b}{a + b \cdot \Theta} \right)$$

While the torque is:

$$M(\Theta) = F(\Theta) \cdot \tan(\alpha(\Theta) + \rho) \cdot r(\Theta)$$

Neglecting the effect of the friction, it is possible to write:

$$M(\Theta) = F(\Theta) \cdot \tan(\alpha(\Theta)) \cdot r(\Theta)$$

$$M(\Theta) = F(\Theta) \cdot \frac{b}{a + b \cdot \Theta} \cdot r(\Theta)$$

$$M(\Theta) = F(\Theta) \cdot b$$

Torque Calculation for a Liquid-Gas Interface

With the force calculations established in 5.9.2, we can write:

$$M(\Theta) = \left[ \frac{P_{initial} \cdot (V_{chamber} + V_{tube})}{V_{chamber} + V_{tube} - b \cdot \Theta \cdot S_{piston}} - P_{atmosphere} \right] \cdot S_{piston} \cdot b$$

In our specific case, the spiral will have only one turn. The parameters of the spiral therefore be defined as follows:
a is the minimal radius of the spiral, which has only a design importance
$b = d_{overall\_stroke} / 2 \cdot \pi$ Therefore, as:

$$d_{overall\_stroke} \cdot S_{piston} = V_{tube}$$

$$M(\Theta) = \frac{P_{initial} \cdot (V_{chamber} + V_{tube}) \cdot \dfrac{V_{tube}}{2 \cdot \pi}}{V_{chamber} + V_{tube}\left(1 - \dfrac{\Theta}{2 \cdot \pi}\right)} - P_{atmosphere} \cdot \frac{V_{tube}}{2 \cdot \pi}$$

It is remarkable that for an Archimedean spiral, if the friction is neglected, the torque characteristic does not depend on the geometry of the spiral. This can be explained as, if the spiral has a high slope, the stroke of the piston will be longer, meaning that its surface will be lower. This in turn will lead to a lower pressure being applied on the piston surface, which compensates for the high slope.

Remark: Note that the volume of the reservoir does not have a role in the calculation, as it is by definition equal to the volume of the tube. The reservoir will merely have to be scaled according to the tube dimensions.

The last equation can be simplified by presenting the chamber volume as a function of the tube volume, such as:

$$V_{chamber} = V_{tube} \cdot \kappa$$

$$M(\Theta) = \frac{P_{initial} \cdot (V_{tube} \cdot \kappa + V_{tube}) \cdot \dfrac{V_{tube}}{2 \cdot \pi}}{V_{tube} \cdot \kappa + V_{tube}\left(1 - \dfrac{\Theta}{2 \cdot \pi}\right)} - P_{atmosphere} \cdot \frac{V_{tube}}{2 \cdot \pi}$$

$$M(\Theta) = \frac{P_{initial} \cdot V_{tube} \cdot (\kappa + 1) \cdot \dfrac{V_{tube}}{2 \cdot \pi}}{V_{tube} \cdot \left(1 + \kappa - \dfrac{\Theta}{2 \cdot \pi}\right)} - P_{atmosphere} \cdot \frac{V_{tube}}{2 \cdot \pi}$$

$$M(\Theta) = \frac{P_{initial} \cdot (\kappa + 1) \cdot \dfrac{V_{tube}}{2 \cdot \pi}}{1 + \kappa - \dfrac{\Theta}{2 \cdot \pi}} - P_{atmosphere} \cdot \frac{V_{tube}}{2 \cdot \pi}$$

Figure 61:
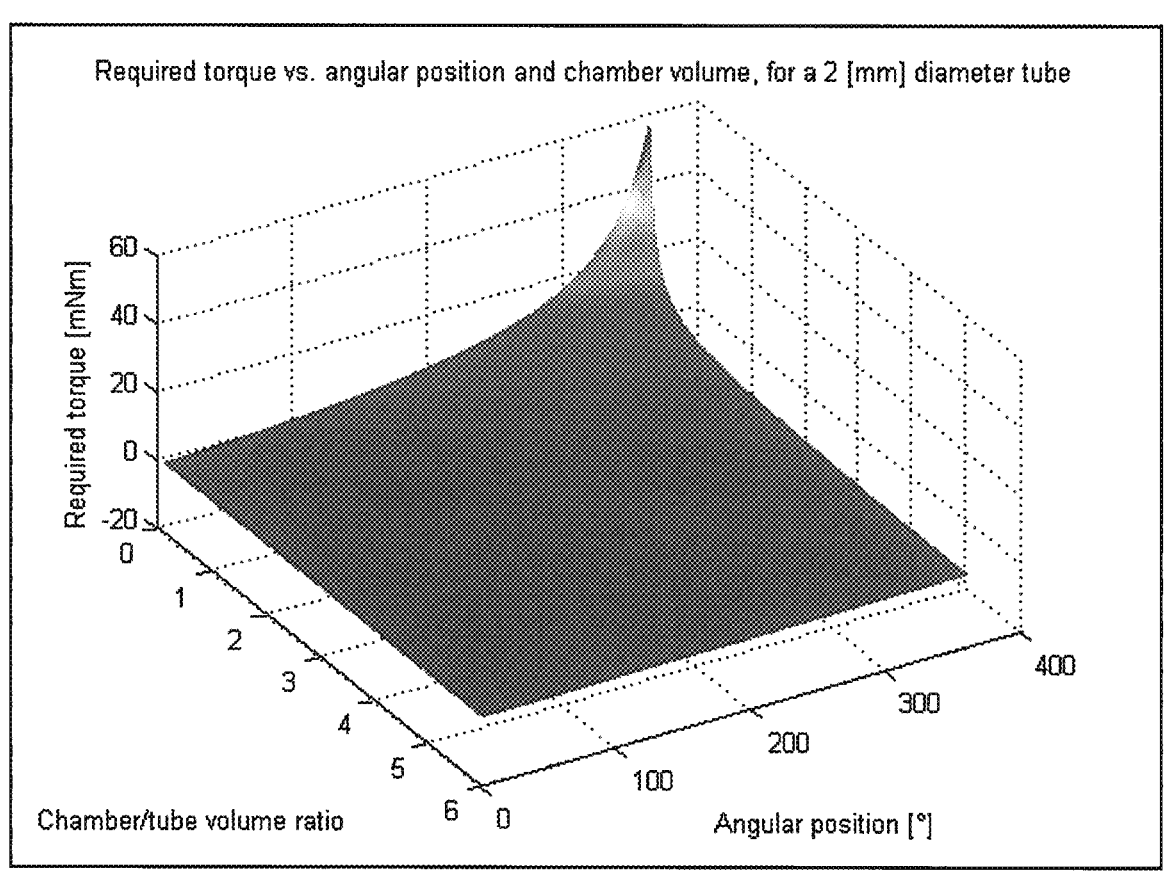
FIG. 61 is a curve presenting required torque vs. angular position and chamber to tube volume ratio for a 2 [mm] tube.

It is noteworthy that the torque still depends on the absolute value of the tube diameter. However, the ratio alone is important regarding the variation of the torque with the angular position. FIG. 61 presents the curve of the torque as a function of the chamber volume to tube volume ratio, and to the angular position, for a 2 [mm] tube diameter.

Figure 62:
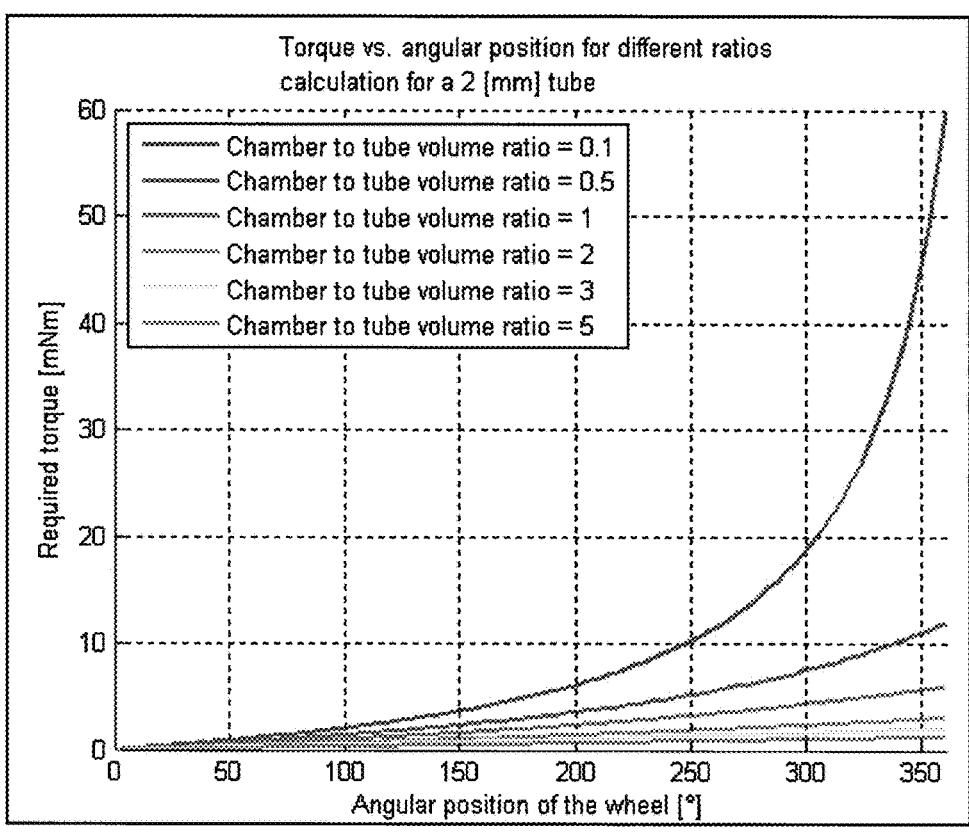
FIG. 62 is a graph of different ratios of torque vs. angular position for different chamber/tube volume ratios, for a 2 [mm] tube diameter.

The same curve is represented as cuts for different ratios in FIG. 62. It is visible that the torque can be kept relatively stable if ratios above 2 are used for the chamber volume.

Remark: As it is visible, those approximate calculations neglect the friction, which leads to a null torque at the beginning of the rotation of the wheel. The friction will be integrated in the detailed calculations.

Conclusion

Using an Archimedean spiral would simplify the motor control, as each motor position increment would correspond to a constant liquid level increment However, this spiral geometry would require a variable torque, depending on its angular position Only if the compression chamber has more than twice the volume of the tube is it possible to keep the torque stable with an Archimedean spiral Whether this is possible will depend on the size specifications of the device Should the device be more compact, a constant torque spiral should be used Alternatively, using a liquid-liquid or liquid-vacuum interface allows circumventing this issue Torque Calculation for a Liquid-Liquid Interface In the case of a liquid-liquid or liquid-vacuum interface, the force acting on the piston is considered constant. The torque can in this case be calculated as:

$$M(\Theta) = F(\Theta) \cdot b$$

$$M = F \cdot b$$

$$M = F \cdot \frac{d_{overall\_stroke}}{2 \cdot \pi}$$

It is visible that the torque is constant, and depends only on the overall stroke of the spiral. The force will be determined as the minimal force ensuring a rapid enough return of the liquid in the reservoir, with the calculations established in 5.8. As was then written, the return spring force can be calculated as a function of the desired return time as:

$$\overline{V}_{liquid,liquid-liquid\ display} = \frac{F_{return} \cdot r_{tube}^2}{8 \cdot \pi \cdot l_{tube} \cdot v_{liquid} \cdot r_{piston}^2}$$

$$\overline{V}_{liquid} = \frac{l_{tube}}{t_{return}}$$

$$F_{return} = \frac{8 \cdot \pi \cdot l_{tube}^2 \cdot v_{liquid} \cdot r_{piston}^2}{t_{return} \cdot r_{tube}^2}$$

Therefore, the torque can be calculated as:

$$M = \frac{8 \cdot \pi \cdot l_{tube}^2 \cdot v_{liquid} \cdot r_{piston}^2}{t_{return} \cdot r_{tube}^2} \cdot \frac{d_{overall\_stroke}}{2 \cdot \pi}$$

$$\pi \cdot r_{piston}^2 \cdot d_{overall\_stroke} = V_{tube}$$

$$M = \frac{4 \cdot l_{tube}^2 \cdot v_{liquid}}{t_{return} \cdot r_{tube}^2} \cdot \frac{V_{tube}}{\pi}$$

$$\frac{V_{tube}}{\pi \cdot r_{tube}^2} = l_{tube}$$

$$M = \frac{4 \cdot l_{tube}^3 \cdot v_{liquid}}{t_{return}}$$

This is a truly remarkable result. The required torque in this situation depends only on the viscosity of the considered fluid, and on the desired return time, the tube length being given.

Remark: For a liquid-vacuum interface, this torque would be divided by two, as is the average fluidic resistance of the tube during the return of the liquid in such a case This in turn will lead to a lower pressure being applied on the piston surface, which compensates for the high slope.

Figure 63:
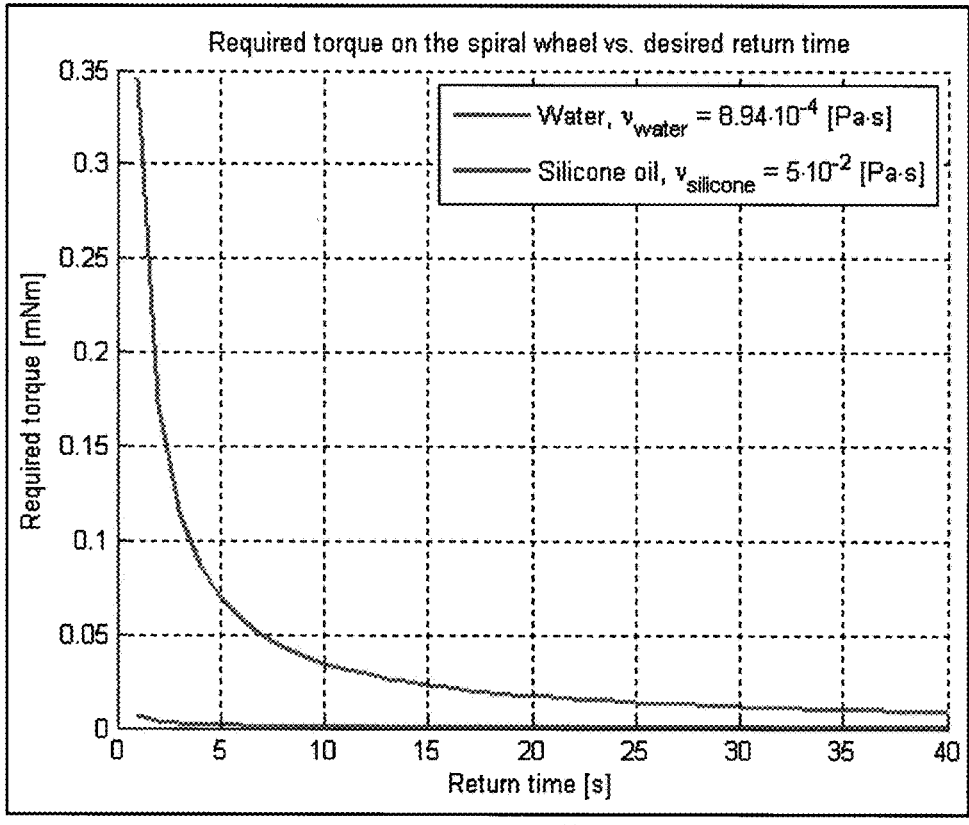
FIG. 63 is a graph of required torque on the spiral wheel vs. desired return time, for water and silicone oil.

It is visible that the required torque depends directly on the viscosity of the liquid. The resulting required torque for water and silicone oil is presented in FIG. 63. It is visible that, due to the difference in viscosity between water and silicone oil, the torque requirements are ultimately significantly different. However, in both cases, the torques are maintained within reasonable limits.

Figure 64:
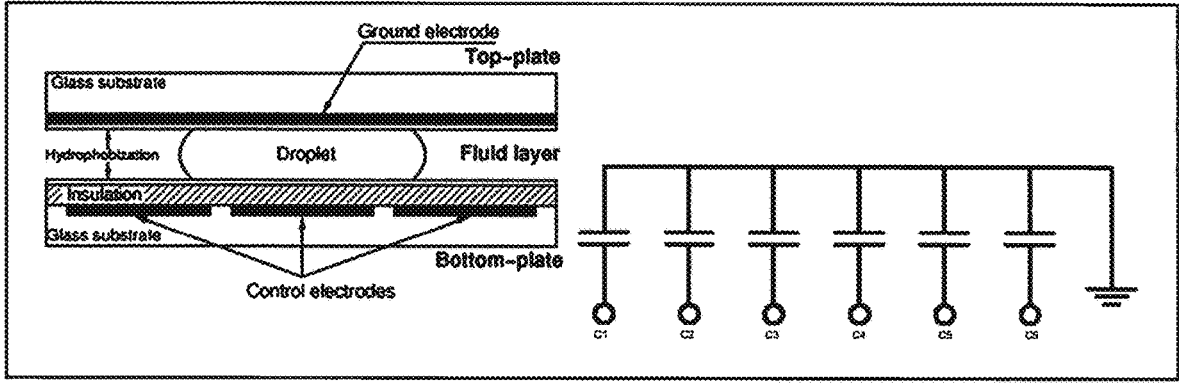
FIG. 64 is a cross-sectional schematic of the electrowetting principle, and equivalent electric schematic.

Remark: It is noteworthy that, in this first approximation where the friction is neglected, the torques are typically an order of magnitude inferior for a liquid-liquid or liquid-vacuum interface than for a liquid-gas interface Electrowetting Power Consumption The schematic of the electrowetting principle is presented in FIG. 64. As presented in the right side of the figure, an electrowetting display can be represented as an array of capacitors. When the droplet has to be displaced, the electrode next to it is supplied with current, which diminishes the surface tension on this spot, dragging the droplet. The electrode supplied with current is connected to a capacitor generated by the insulation and hydrophobization, whose ground electrode is the water droplet itself.

The value of a planar capacitor is calculated as:

$$C = \varepsilon_0 \cdot \varepsilon_r \cdot \frac{S_{capacitor}}{d}$$

In our case, the electrodes are rectangular, and the capacitor is constituted of two consecutive layers (insulation and hydrophobization). The hydrophobization layer, however, is too thin to provide an electrical insulation. The properties of the insulation layer are:

| Layer | Material | Thickness | Dielectric constant |
|---|---|---|---|
| Insulation | Parylene C | 800 [nm] | $3.15^2$ |

The size of the electrodes can be determined as follows:

2 http://www.vp-scientific.com/parylene_properties.htm

Length=0.833 [mm]→120 [mm] divided in 144 electrodes

Width=1 [mm], assumption:

[1]R. B. Fair, "Digital microfluidics: Is a true lab-on-a-chip possible?" Microfluidics and Nanofluidics, vol. 3, pp. 245-283, 2007, available on: http://microfluidics.ec.duke.edu//publications.html The capacitor value is then approximately calculated at C=29 [pF]. This value corresponds to the typical values in the literature, and is also a value easily measurable by the ordinary capacitive sensing chips.

A first assumption of the power consumption for one step increment, assuming that the capacitor gets completely charged in the process, can then be done with the following:

$$Q_{capacitor} = C \cdot U = I \cdot t$$

$$P = U \cdot I = \frac{C \cdot U^2}{t}$$

Figure 65:
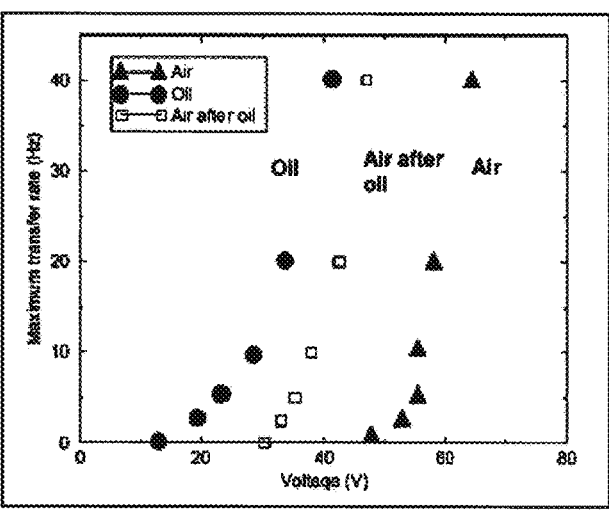
FIG. 65 is a graph of displacement frequency of water in different media, as a function of the voltage.

The goal is to do the displacement with the minimal possible voltage. If one considers the results presented in FIG. 65, it appears possible to move the droplet with a 20 [V] voltage, at 3 [Hz]. The displacement time is therefore of 0.3 [s], and the power required is of 0.038 [μW].

[3]op. cit.

Conclusion

The value of power calculated before should be taken as an indicator of order of magnitude
Refined calculations and tests should be done to confirm this value.
However, the power appears to be extremely low
This order of magnitude is confirmed in the literature[4].
To this consumption should be added the consumption of the electronics

[4]op. cit.

Embodiments Representation and Rankin
Morphological Boxes

Figure 66:
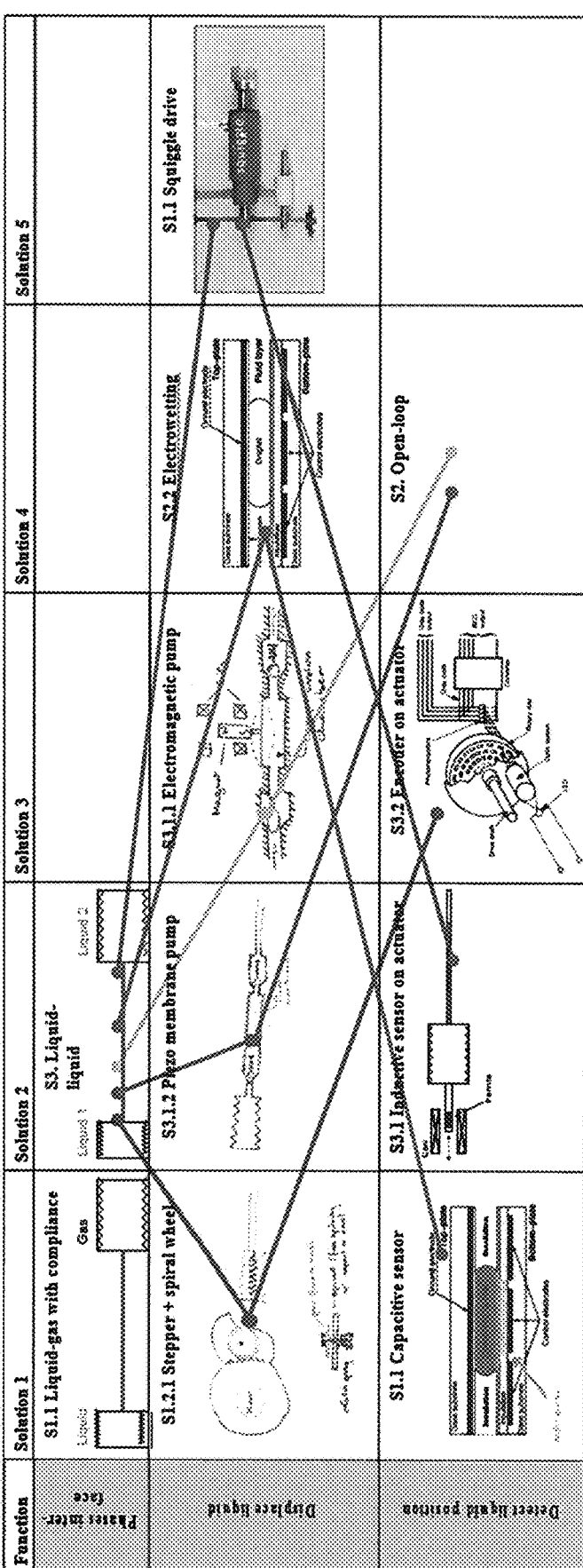
FIG. 66 are morphologic boxes presenting a summary of optional solutions, as well as global combinations.

The morphological boxes method aims to combine solutions presented for the different functions of the device, in order to generate complete concepts. A summary of the retained solutions, as well as the global combinations, are presented in FIG. 66.

As it is visible, one concept was designed per actuation method, as this function is at the core of the device. Five different concepts are therefore presented hereafter.

Note that, while the liquid column sensing is quite dependent to the chosen actuation method, it is not so for the interface. The proposed interface can still be changed, for some of the proposed concepts.

Solution Tables

Figure 67:
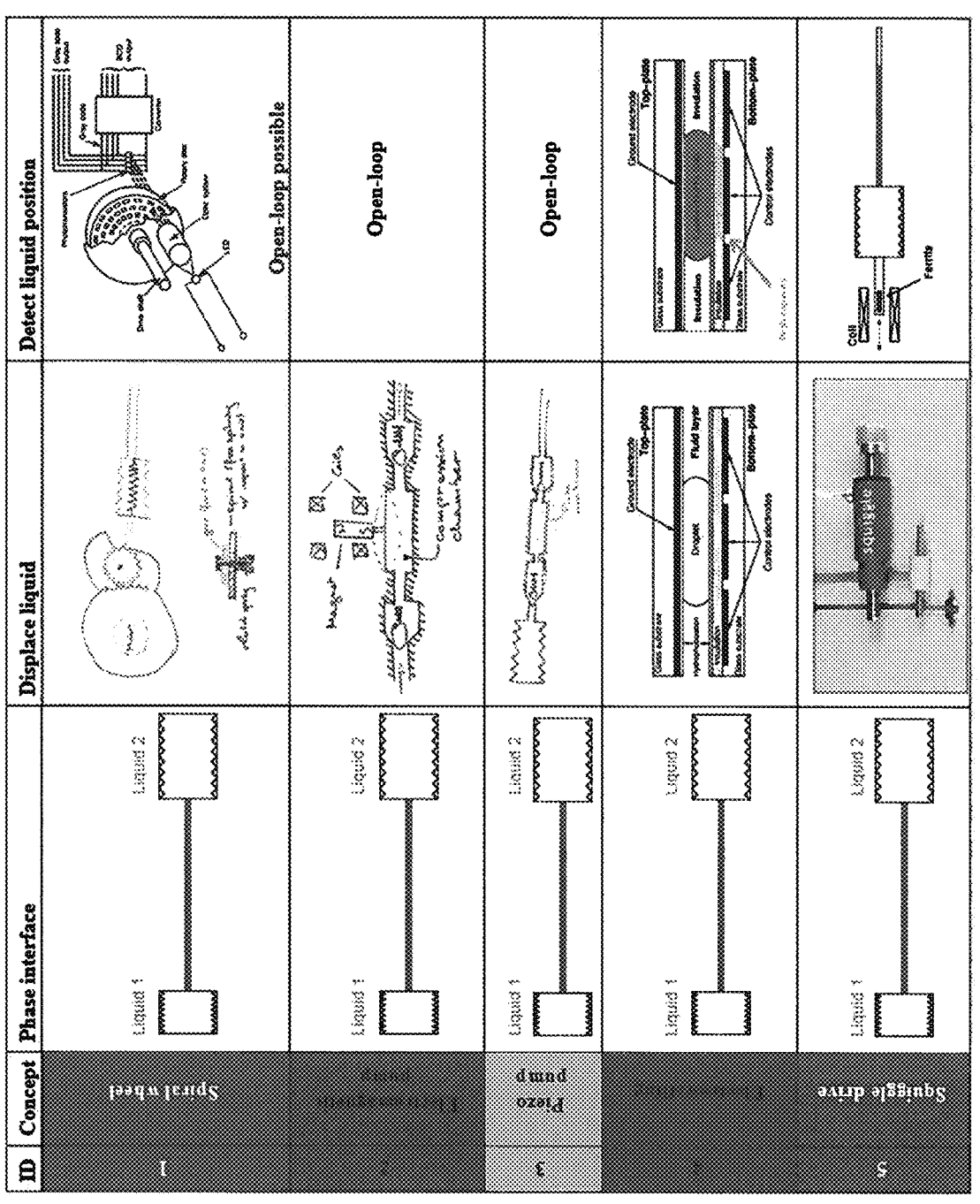
FIG. 67 is a table of five different options of displacement devices of the invention embodiment.

Fife different concepts are presented in FIG. 67.
Solutions to be Pursued

In the latter table, two solutions stand out:
The spiral wheel solution
Simple, known mechanics
Can be adapted to a mechanic watch Can be driven with a low-cost stepper motor
Is fully scalable
Open-loop control possible
The electrowetting:
Technologically interesting
Very compact
Very low power consumption
Possibly implementable in a low cost display
A rough design of the first solution will be done shortly. The electrowetting solution will be kept in standby for the time being, for a possible later implementation.
Preliminary Design

Introduction

This section presents preliminary designs of the two leading solutions presented in the latter chapter. These designs are not optimized, they are merely technical demonstrators.

Part 'Assumptions' presents the parameters that are assumed, for practical reasons or to simplify the calculation Part 'Preliminary design selections' presents the calculations that lead to the other parameters. The final design, after optimization, should be significantly more compact and energy-efficient.

Embodiment 1—Spiral Cam

Assumptions

As no full optimization will be done in this phase, some parameters will be assumed. They are presented in the following table:

| ID | Object | Assumption | Explanation |
|---|---|---|---|
| | Tube inner diameter | 1 [mm] | easily available |
| | Tube material | Polyurethane | easily available high CTE |
| | Reservoir material | PET | easily available high CTE |
| | Liquid #1 | Water | easily available low viscosity low thermal expansion |
| | Liquid #2 | Heptane | colorless easily available low viscosity similar density as water non toxic |
| | Dye | Sulforhodamine B (kiton red) | easily available strong color fully soluble in water, but not in heptane |
| | K2 (ratio between reservoir and tube diameter) | 2 | relatively low while allowing for an easy assembly |
| | Movement | 6¾ " × 8 " watch movement, according to FIG. 68. | easily available low-cost representative of mechanical and electrical performances of watches |

Off the Shelf Movements

Stepper motors are widely used in the watchmaker industry with mainly the "Lavet" motor as after its inventor name. Several off the shelf watch movements are available on the market with following main characteristics:
Torque: 5-18 μNm on second shaft to max 1-3 mNm on hour wheel after gear train re-duction.

Nominal voltage: 1.5V

Typical consumption: 2 μA (no load)

Designed with a battery silver oxide ~28 mAh, expected lifetime: <2 years.

Price per Mio parts/year: 0.45 (plastic) to 2.25 USD (metallic)

Movements cannot address display tubes of variable lengths. Examples are shown in FIG. 69.

Low cost plastic and metallic watch movement typically have a gear train that is addressing the seconds wheel, the minute wheel (optional) and hour wheel. Design is also sometimes including a friction clutch allowing to adjust time (hours and minutes) with help of setting stem without turning the motor.

Figure 70B:
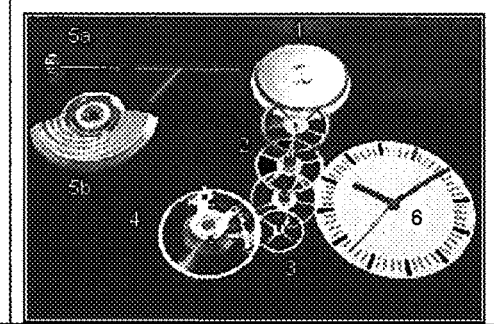
FIG. 70B is a schematic of a mechanical watch.

Design of watch movement is as illustrated for a digital quartz watch in FIG. 70A and for a mechanical watch in FIG. 70B.

Low cost plastic and metallic watch movement typically have a gear train that is addressing the seconds wheel, the minute wheel (optional) and hour wheel. Design is also sometimes including a friction clutch allowing to adjust time (hours and minutes) with help of setting stem without turning the motor.

The hour wheel is of interest as it is on the top of movement assembly and can directly be connected to the spiral cam for the device. Movement has already a dimension of 24 hours/day and can be easily adapted for a demonstrator design.

Time Adjustments with an OEM Watch Movement:

For a market available watch, stepper motor continuously increments time giving a minute resolution of 6°/seconds, 6°/minutes and 15°/hour for 24 hour cycles. In case of adjustments time is relatively adapted to new time by acting on hour and minutes gear train in a 12 hour time resolution. Stepper motor will then increment time with new relative time indication.

For the analog liquid watch embodiment following considerations must be regarded:

Time is relatively adjustable in a 24 hour time range (12 hours for display, 24 hours for button LED indicator).

Time increments are not in open loop as every 12 hours a reset occurs and must match the 6 am or 6 pm value. In this regard, coupling over liquid display and relative hour wheel must perfectly match. (open loop time display)

Liquid display cannot be scaled according to variable channel length unless piston size and reservoir are adapted during device assembly Considerations are identical in case of a fully mechanical watch movement (ETA, lemania, . . . ) integration. Energy budget to be confirmed. Preliminary design focuses on a low cost plastic watch movement.

Preliminary Design Selections

Reservoir Construction

The reservoir is the most critical part of our system. The key criterion is the linearity of the display with the advance of the piston in the reservoir; this linearity would be perfect with a piston running in a straight cylinder, but is challenging to achieve even with bellows reservoir. In addition, as we are bound to run with relatively low forces, the reservoir itself should not have a spring rate.

For this reason, the choice is on a design with a piston, and a sealing done with a rolling diaphragm. This way, the linearity is kept at its maximum with the piston actuation, while the sealing is granted by the rolling diaphragm.

Reservoir Dimensions

The return force required for the reservoir spring depends on:

The desired return time

The capillary force, due to the surface tension at the interface of the two liquids Forces for certain return times were calculated in earlier part. The effect of the capillarity is here integrated. The capillary force is calculated as:

$$F_{capillary}=2 \cdot \pi \cdot r_{tube} \cdot \gamma_{water-heptase} \cos(\Theta_{contact})$$

Following values are taken for the unknown parameters in this equation:

$\gamma_{water-heptase}=51$ [mN·m$^{-1}$]$^5$ $\Theta_{contact}=45° \rightarrow$ assumed value

[5]http://www.kayelaby.npl.co.uk/general_physics/2_2/2_2_5.html

The capillary force in a 1 [mm] diameter tube is therefore of 94 [μN]. This force is negligible with respect to the other contributions.

Figure 71:
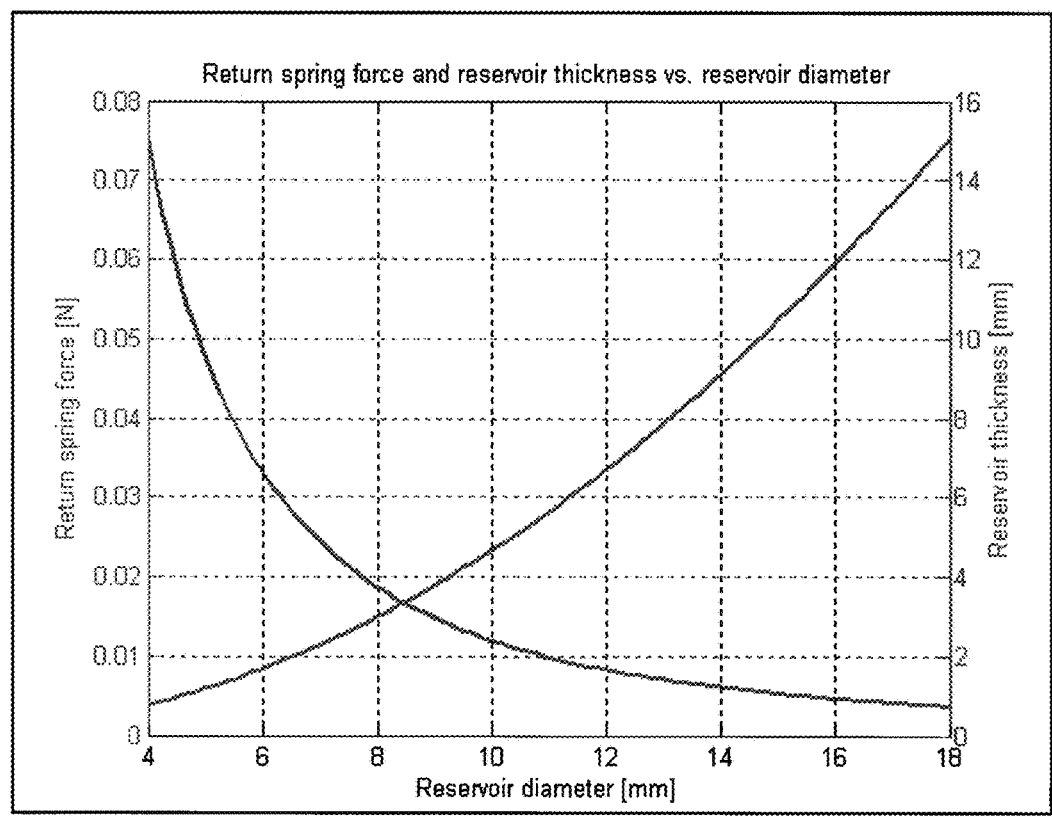
FIG. 71 is a graph of return spring force and reservoir thickness vs. reservoir diameter.

If we consider a cylindrical reservoir, the return spring force and reservoir height, as a function of the reservoir diameter, are presented in FIG. 71. It is visible that in all cases, the return spring force is relatively low. The reservoir is therefore dimensioned in order to be practical to manipulate.

Three different designs of this embodiment will be developed:

11 [mm] reservoir diameter, 1 [mm] stroke, and round display

5 [mm] reservoir diameter, 4.5 [mm] stroke, and round display

5 [mm] reservoir diameter, 4.5 [mm] stroke, and linear display

These two reservoir designs are developed because, regarding the cluttering aspect, a flat reservoir seems to be more appropriate. However, a flat reservoir means a short stroke, which imposes high tolerances on the cam wheel. For instance, the first design, with a 1 [mm] stroke, has a 6.9 [μm] vertical displacement of the piston per time step. This is critical regarding the tolerances of the wheel.

Note that, for all the cases, an average return spring force of 50 [mN] will be considered. This is superior to the requirement, but it would be difficult to reliably control the force of a spring with a nominal force of 10 [mN].

Embodiment 1 Flat

Design Presentation

Figure 72A:
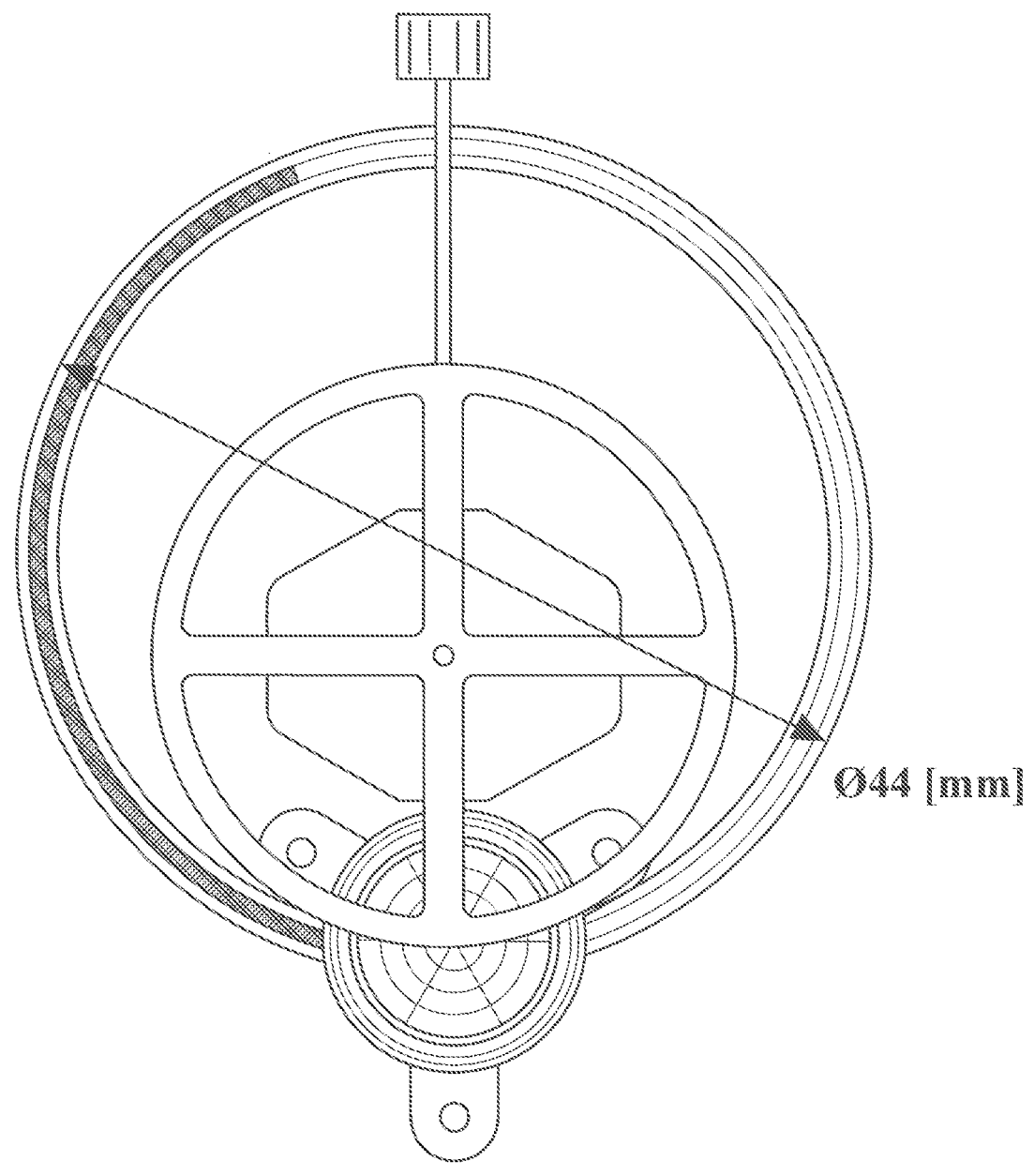
FIG. 72A is a top view of embodiment 1, flat, with the indicator tube and the watch movement.

The embodiment 1 flat is presented in FIG. 72A, with the movement and the indicator tube. It is visible that, with this design, the reservoir occupies only a fraction of the total volume.

Figure 72B:
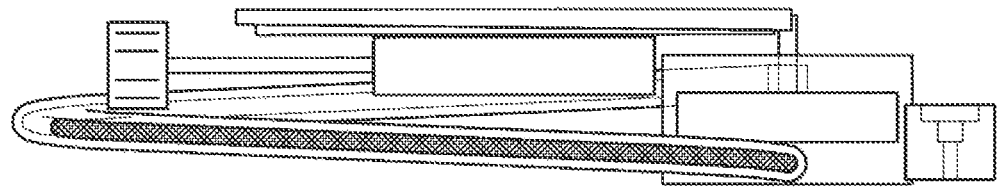
FIG. 72B is a side view of the embodiment 1, flat.
Figure 72C:
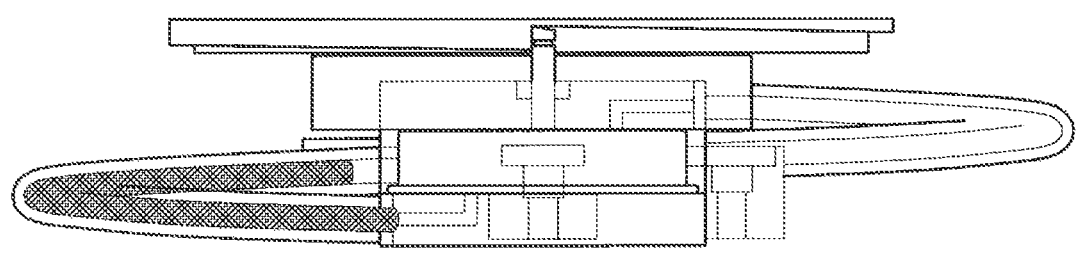
FIG. 72C is a front view of the embodiment 1, flat.
Figure 73:
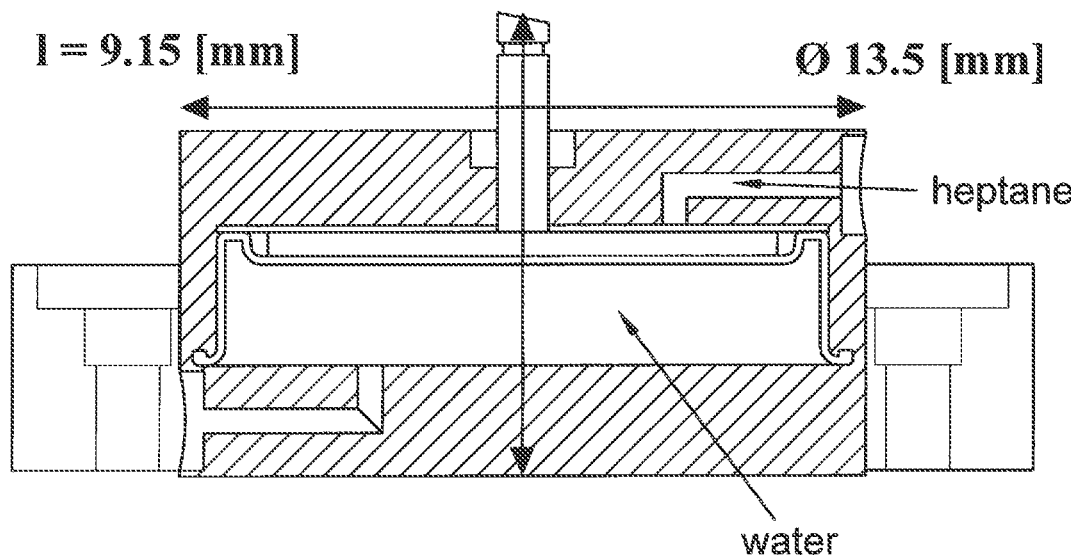
FIG. 73 is a cross sectional view through the reservoir of embodiment 1, flat.

A side view of the assembly is presented in FIG. 72B, and a front view in FIG. 72C. Note that a significant optimization of the total size is still possible. Note also that, in this preliminary design, the setting wheel is in the watch. The cam wheel can be seen in the front view: it is at the "zero" position. As the watch mechanism rotates the cam wheel, it presses on the piston, which actuates the liquid, Reservoir A cut through the reservoir is presented in FIG. 73. The rolling diaphragm is represented in green, and the piston is outlined in red. In this configuration, the reservoir is in its "zero" position, where the indicator liquid is entirely in the reservoir, and the vast majority of the other liquid is in the tube. As the piston advances, it pushes the water out, and frees space for the heptane behind the membrane.

Once again, the design is made such as to be easily machined. It does not represent an optimum.

Cam Wheel

Figure 74:
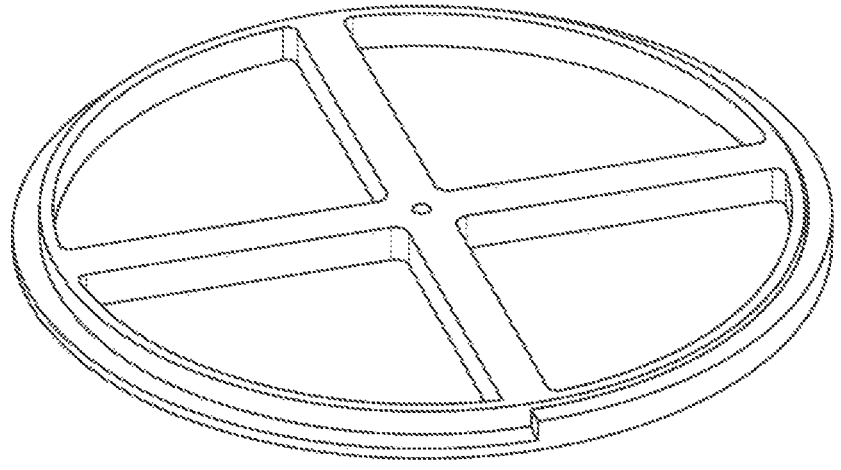
FIG. 74 is a perspective view of the cam wheel of embodiment 1, flat.

A view of the cam wheel alone is presented in FIG. 74. The wheel is designed such as to provide a 1 [mm] stroke over one rotation.

Embodiment 1 Long, Circular

Mechanism

Figure 75A:
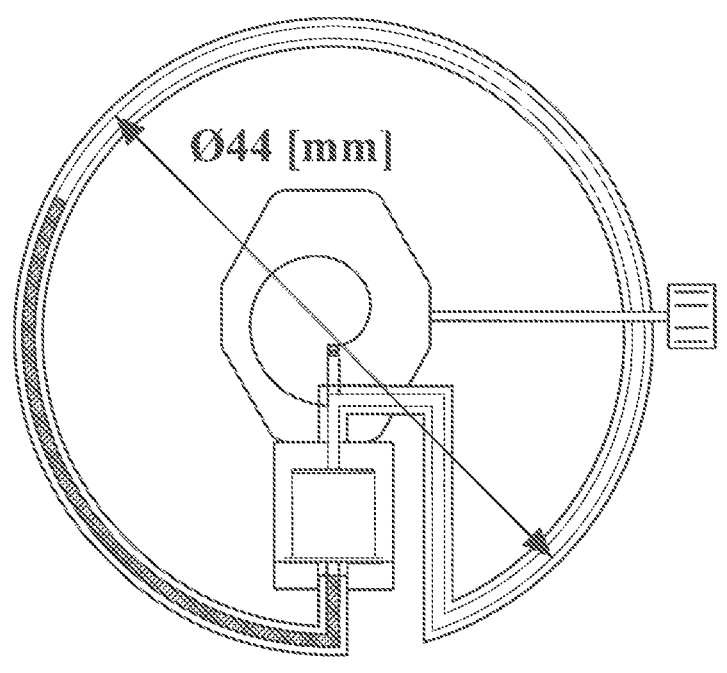
FIG. 75A is a top view of the embodiment 1 with a long reservoir.
Figure 75B:
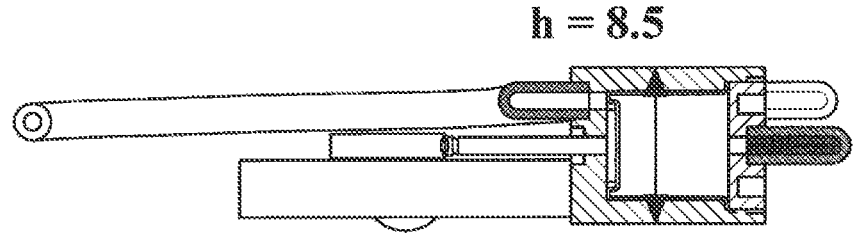
FIG. 75B is a side view of a cross section through the embodiment 1 with a long reservoir.

A top view of the embodiment 1 with long reservoir is presented in FIG. 75A. A side view, with a cut through the reservoir area, is presented in FIG. 75B. The reservoir design is identical to the case with a flat reservoir.

It is noteworthy that the configuration with a long reservoir allows for a more compact overall packaging, which was unexpected. All the components of the display are integrated within the 44 [mm] diameter of the display, and the assembly has an overall lesser thickness, even in this unoptimized case. In addition, no added volume has to be granted to allow for the stroke of the piston.

Packaged View

Figure 76:
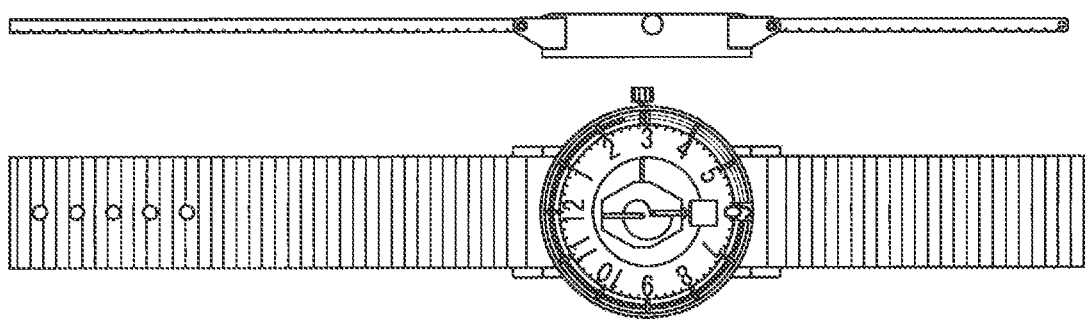
FIG. 76 is a top view of embodiment 1, packaged in a watch.
Figure 77:
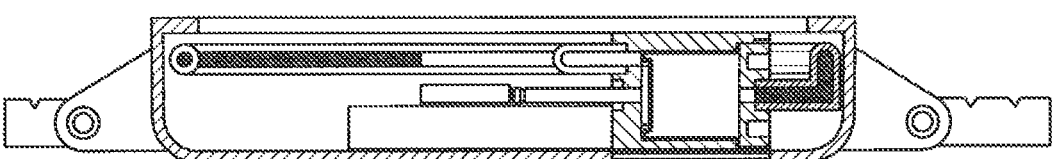
FIG. 77 is a cross sectional view through the mechanism of the watch of FIG. 76.

FIG. 76 presents the embodiment 1, with the previously presented mechanism, packaged in a watch. In this embodiment, the front of the watch is a flat, opaque panel, with twelve glasses indicating the twelve hours. A cut through the mechanism is presented in FIG. 77. Note that the casing is roomy for the current design of the mechanism. The overall size and cluttering of the watch could be reduced by making an oval display, instead of a round one, for in-stance,

Embodiment 1 Long, Linear

Variant 1

Figure 78A:
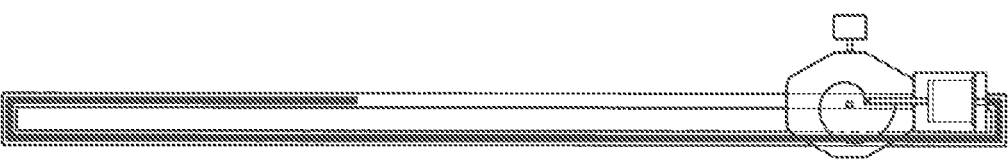
FIG. 78A is a top view of embodiment 1 with a linear display, without the display mask.
Figure 78B:
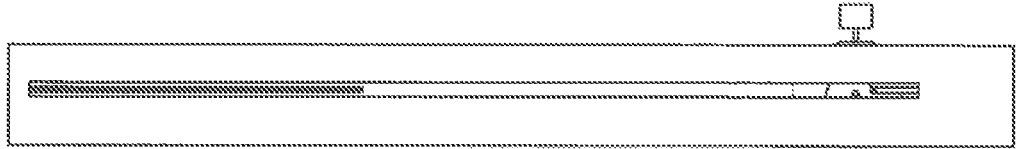
FIG. 78B is a top view of embodiment 1 with a linear display, with the display mask.
Figure 78C:
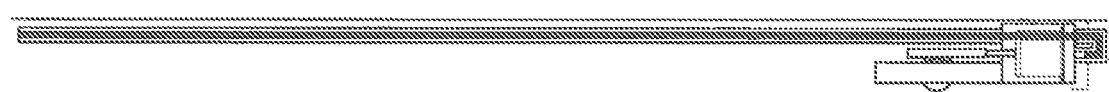
FIG. 78C is side view of the embodiment 1 with the linear display of the invention.

The linear display of the embodiment 1 is presented in FIG. 78A and FIG. 78B in a top view, and in FIG. 78C in a side view. In this embodiment, the tube has twice the length required for the display. Alternatively, the system could be built with a slave reservoir at the end of the tube. However, this approach is not presented here as:

- The width of the system is constrained by the actuator, leaving space for a loop of tube
- In the case of a band watch, it might be better to concentrate the thick part on one end.
- The total volume occupied by the system is lower in this case

Embodiment 1 Long, Linear, Variant 2

Figure 79:
FIG. 79 is a flexible plastic bracelet of the invention.

Another was to implement the linear version of the embodiment 1 in a low-cost watch, while circumventing the limitations imposed by the need to close the bracelet, would be to build it into a flexible bracelet watch, such as the one presented in FIG. 79.

Figure 80:
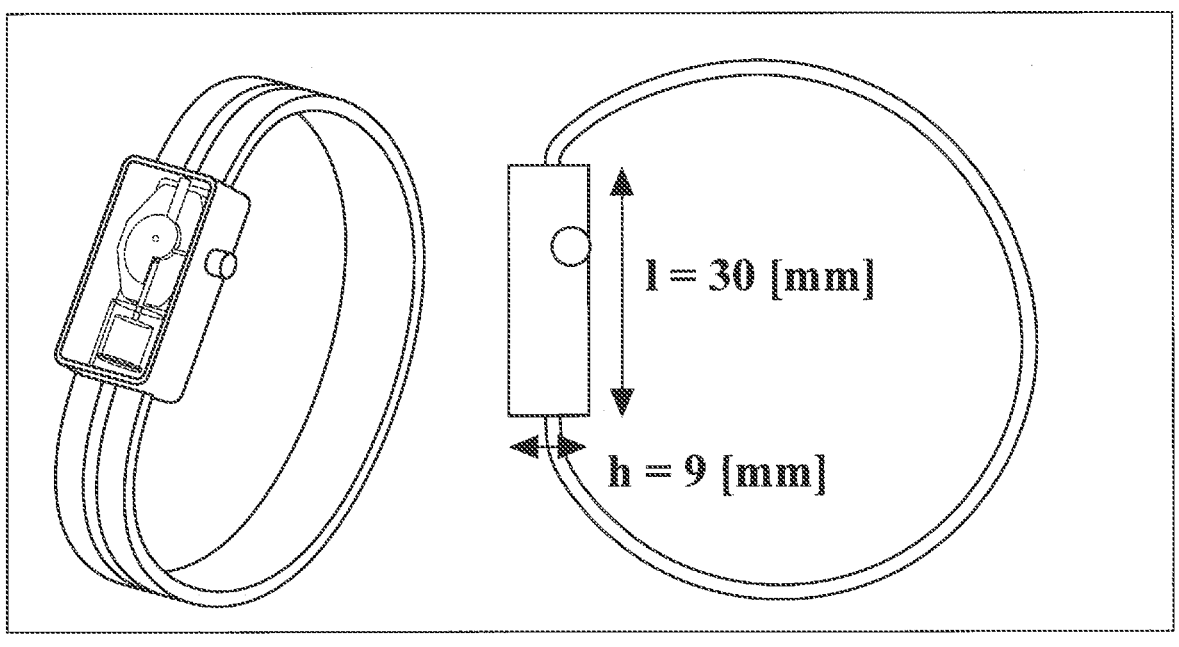
FIG. 80 is a side-by-side perspective and side view of an implementation of the spiral movement in a flexible bracelet.

An implementation of the spiral cam mechanism in this design is presented in FIG. 80. It is visible that the mechanism itself can be integrated in a relatively small capsule, that would in a final device be shaped as an outgrowth of the bracelet itself. The surface of this capsule can be opaque, maybe bearing the logo of the manufacturer.

The device would be manufactured to different sizes, in order to fit different users.

Embodiment 1, S Shaped

Figure 81:
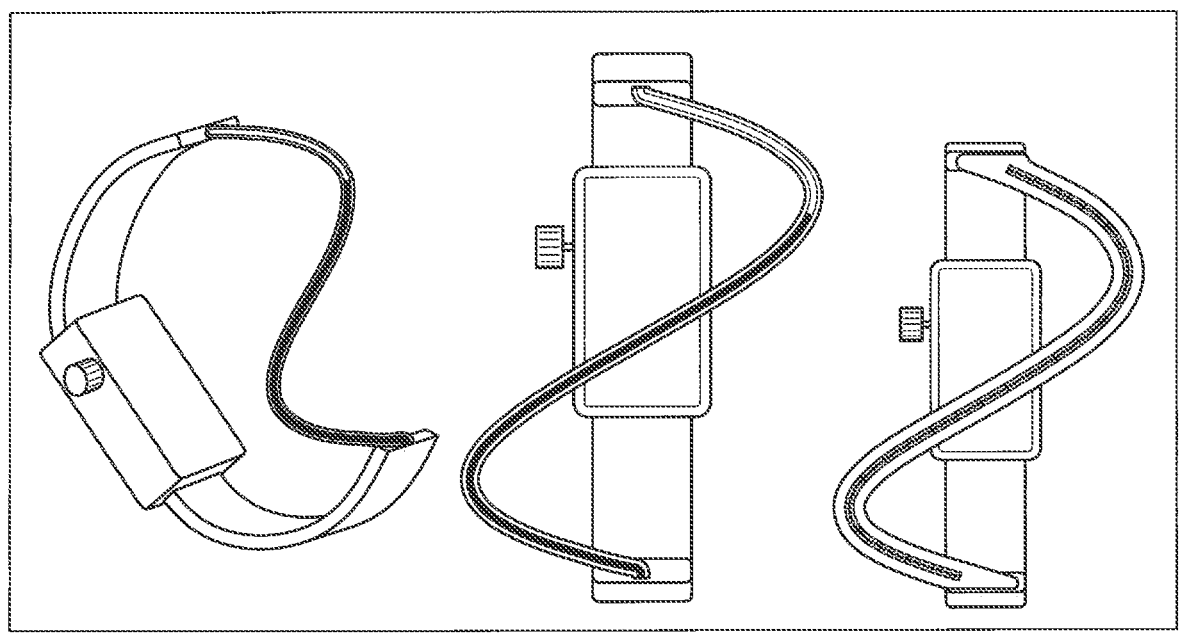
FIG. 81 is an optional implementation of the S shaped display, with the mechanism below the wrist.

Based on the latter, bracelet design, a variation with a S shaped display is presented in FIG. 81. In this design, a flexible tube is fully embedded in a flexible bracelet, allowing to pass the watch on the wrist. The mechanism rests below the wrist, as it is too large to be placed on either end of the S shape.

The display itself should be of a stiffer material such as to keep its shape. Note that this could also be achieved by embedding the flexible tube in a harder display casing, that could also bear the time marks.

Torque Requirements for Embodiment 1

Forces Acting on the System

Figure 82:
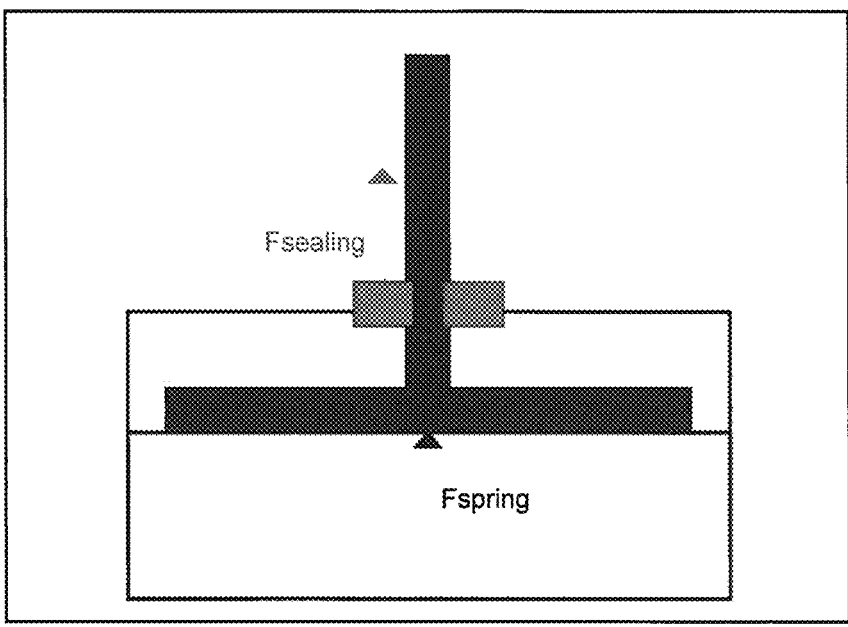
FIG. 82 is a schematic diagram of forces acting on the piston of the invention.

In a generalized piston case, the forces acting on the piston are presented in FIG. 82. The total force is equal to the sum of the force of the spring, and of the friction force applied by the sealing ring.

The force of the spring is defined as 50 [mN].

The force of the sealing has to be estimated. Considering that the pressure at the interface between the sealing and the piston is of 0.5 [bar], in order to grant a sufficient sealing, and considering that the sealing has a 1 [mm] inner diameter, and a 1 [mm] height, the radial force applied on the piston is of 0.157 [N]. Taking a worst-case friction coefficient between the rubber of the sealing and the Teflon of the piston of 1, this leads to 157 [mN] of additional force on the piston.

Torque Calculation

As presented in part 5.9.1, the torque on a spiral is calculated as:

$$M = F \cdot \tan(\alpha + \rho) \cdot r(\Theta)$$

$$\rho = a\tan(\mu)$$

$$\alpha = a\tan\left(\frac{h_{stroke}}{2 \cdot \pi \cdot r}\right)(\text{axial cam wheel design}),$$

$$\alpha = a\tan\left(\frac{1}{r(\Theta)} \cdot \frac{dr}{d\Theta}\right)(\text{spiral cam wheel})$$

Flat Design Torque Requirements

In our case, following values can be used:

F=200 [mN], considering the spring and the friction $h_{stroke}$=1 [mm]

r=14.5 [mm]

μ=0.05, considering a steel cam wheel, and a Teflon piston

This leads to a required torque of: M=176 [μNm].

Long Design Torque Requirements

Following parameters are to be used for the long design:

F=200 [mN], considering the spring and the friction $h_{stroke}$=4.5 [mm]

Spiral equation: r(theta)=2 [mm]+4.5 [mm]·theta/(2·π)

μ=0.05, considering a steel cam wheel, and a Teflon piston

Figure 83:
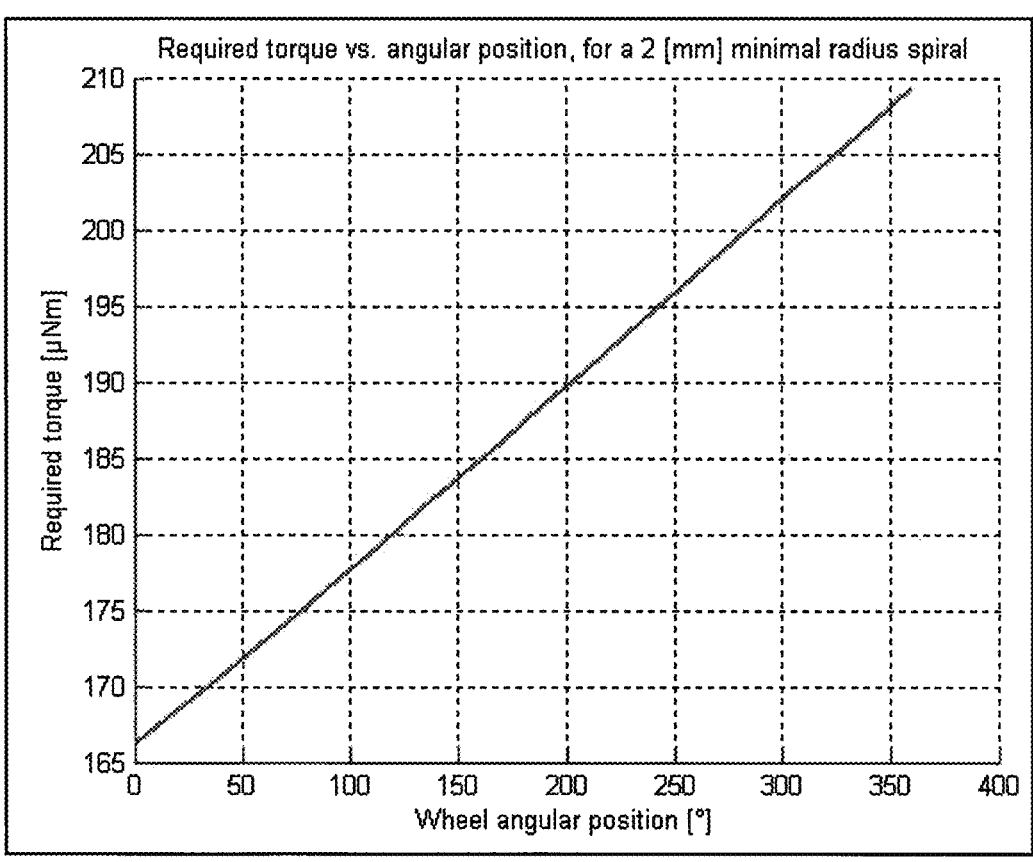
FIG. 83 is a graph of torque vs. angular position for a 2 [mm] inner diameter wheel, 4.5 [mm] stroke.

The torque as a function of the angular position of the wheel is therefore presented in FIG. 83. The mean torque is of 187 [μNm].

Remark: The long design, with the linear display, should have a twice higher spring force, as the tube is twice as long. However, the spring force is overestimated in the case with a circular display, therefore the same force can be applied to the linear display as well.

Global Results, with Different Friction Coefficients

The torques for both embodiments are presented in the following table:

| | Mean torque | | |
|---|---|---|---|
| | Teflon-steel, $\mu = 0.05$ | WC-WC, $\mu = 0.2$ | WC-steel, $\mu = 0.4$ |
| Flat design | 176 [μNm] | 595 [μNm] | 1100 [μNm] |
| Long design, circular | 187 [μNm] | 324 [μNm] | 520 [μNm] |

It is noteworthy that the flat design requires a lower torque than the long design for the lowest friction, but a higher torque with the other friction coefficients. This can be explained as follows; the torque M is calculated as:

$$M=F\cdot\tan(\alpha+\rho)\cdot r(\Theta)$$

In addition, the term $\tan(\alpha+\rho)$ can be decomposed as:

$$\tan(\alpha + \rho) = \frac{\tan(\alpha) + \tan(\rho)}{1 - \tan(\alpha)\cdot\tan(\rho)}$$

Therefore, if the angle is larger, as it is the case with the long design, an increase of the friction angle ρ will have a lesser impact on the overall result, However, the torque values are reasonable for both embodiments, and both considered friction coefficients. As a comparison, the ETA 802.001, 6¾"×8" watch movement, has a typical torque on the minute shaft of 250 [μNm]. The torque on the hour shaft, not considering the friction, should be 12 times that. A large margin therefore exists.

The same movement has a typical current consumption of 0.95 [μA], Therefore, a 16.6 [mAh] capacity of battery is required to power the movement for two years (not considering the energy consumption of other elements, such as the LED).

Remark: Calculations were done considering tungsten carbide (WC) as the Teflon piston would risk to wear off over the life of the device, especially considering a high-end device that should have a high durability. A sapphire-sapphire interface would also have a low friction, but machining the cams out of sapphire would be challenging. Tungsten carbide, however, is almost as hard as sapphire, and its machining is known, as many drill bits are machined out of this material.

Embodiment 2—Electrowetting

Introduction

The second embodiment relies on a novel actuation technique, on which significant testing and de-sign effort is required. This embodiment merely represents the cluttering that the whole system would generate, with its main components.

Driving Circuit

Figure 84:
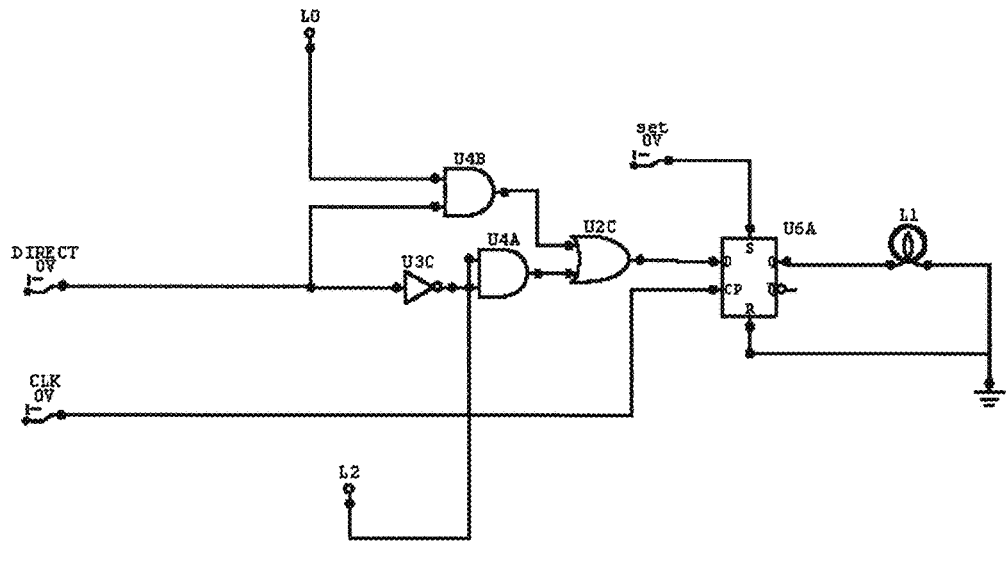
FIG. 84 is a schematic diagram of a 3 flip-flop based driver of the invention.

A schematic representation of a simplified driver circuit for the electrowetting display is presented in FIG. 84. Following elements are visible in this figure:

The light bulb L1 corresponds to the state of an electrode

The supply L0 corresponds to the state of the preceding electrode

The supply L2 correspond to the state of the next electrode

This system requires only two parameters to work, namely:

The clock signal CLK, that indicates when to switch

Figure 85:
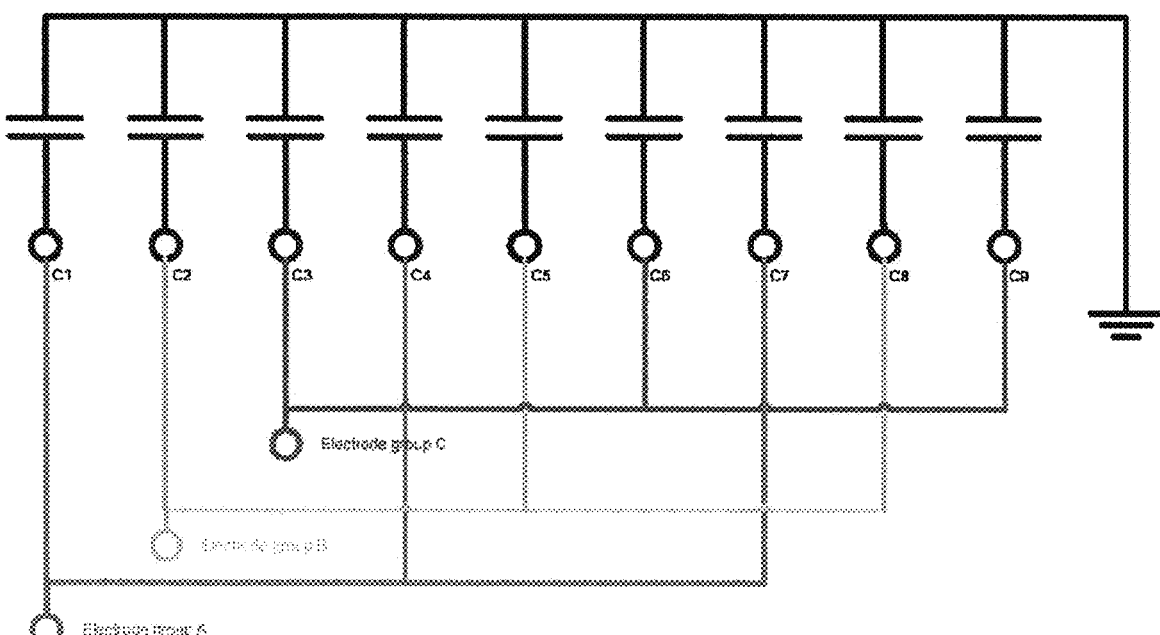
FIG. 85 is a schematic diagram of the connection of the electrodes of the invention.

The direction DIRECT, that indicates in which direction the droplet should be moved The electrodes themselves would be connected as it is schematically represented in FIG. 85. This way, the actuation could be achieved by addressing three groups of electrodes, in-stead of addressing each electrode separately.

Two more components should be mounted downstream of this circuit, for each electrode group:

One gate mounted as an astable, in order to generate a finite length pulse

One relay to apply the driving voltage on the electrodes

Simplified Sensing Circuit

Figure 86:
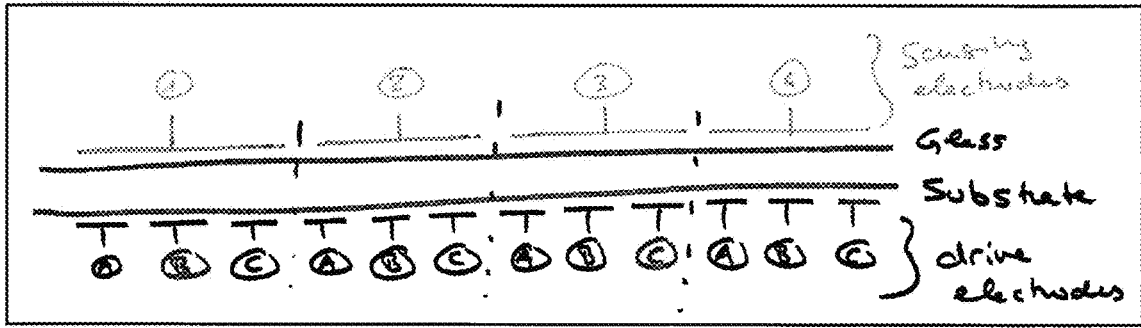
FIG. 86 is a schematic diagram of the simplified sensing circuit of the invention.

A full sensing on all the electrodes wouldn't allow having the electrodes connected to a simplified driving circuit such as presented in the preceding chapter. In addition, it would require using 144 electrodes, which would make the whole system electrically very complex. For this reason, the assembly presented in FIG. 86 is proposed. In this system:

In order to drive the droplet, all the sensing electrodes are connected to the ground, and the drive signal is applied to the driving electrodes.

In order to detect the position of the droplet, the driving electrodes are connected to the ground, and the position is read on the sensing electrodes.

This system allows detecting an approximate position only. It can therefore be used only in the case where the droplet can safely be assumed to remain in its position over a 15 minutes time lapse. This hypothesis should be tested.

Full Electronics Schematic

Figure 87:
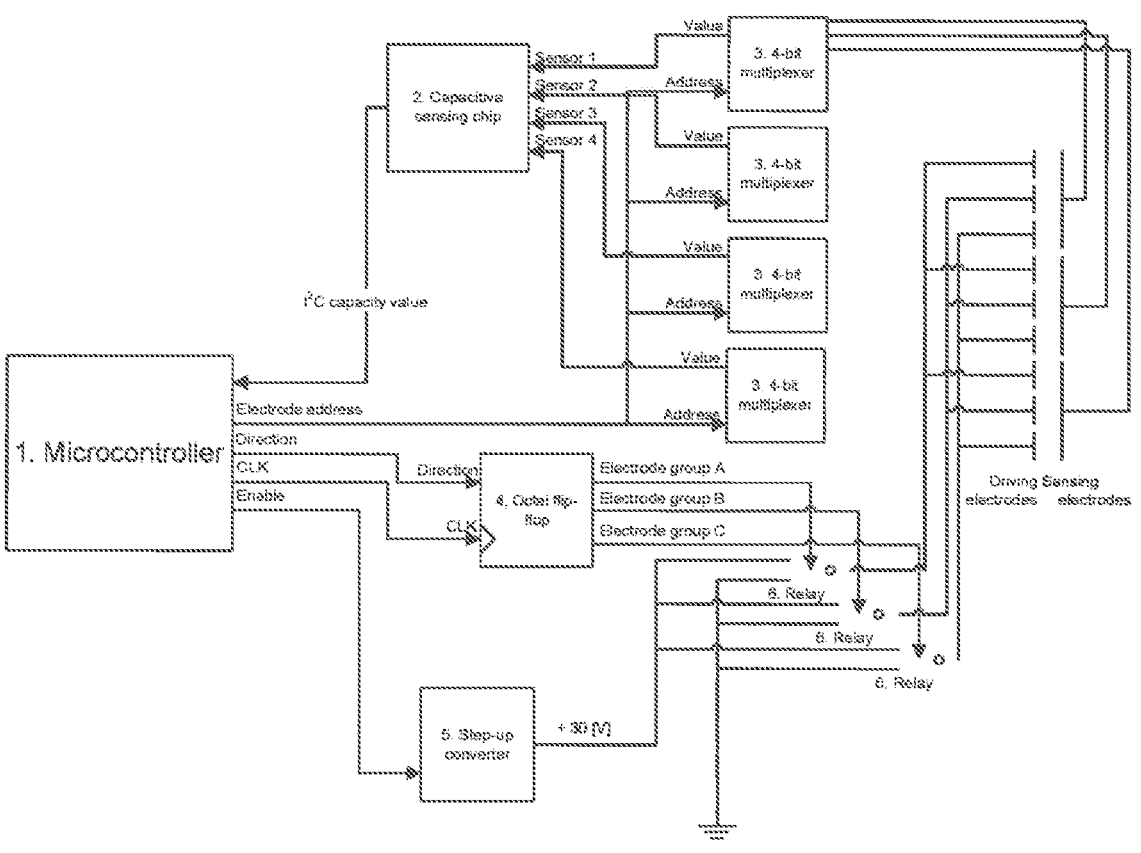
FIG. 87 is a more complete schematic diagram of the driving electronics of the invention.

The schematic of the full driving electronics is presented schematically in FIG. 87. This representation integrates the principal components and some electrodes. Note that not all the wires are represented, and neither are the passive components required to have the system running.

List of Components

This following is a list of all the components required to drive the system.

| ID | Component | # | Specifications | Manufacturer | Model | Size [mm³] |
|---|---|---|---|---|---|---|
| 1 | Microcontroller | 1 | Ultra low power consumption | OKI | ML610Q4xx Family | 9 × 9 × 1.2 |
| 2 | Capacitive sensor reading chip | 1 | i²c interface 13 channels | Analog Devices | AD7147ACPZ-1 | 4 × 4 × 1 |
| 3 | Multiplexer | 4 | 4 bit analog multiplexer | Analog Devices | ADG1606 | 5 × 5 × 1 |
| 4 | Flip-flop | 1 | 3 gates for the commutation 3 gates for the astable circuit for the pulse | ST Microelectronics | 74LCX574 | 6.4 × 6.2 × 1.2 |
| 5 | Driving voltage source | 1 | 28 [V] max output voltage low power Low quiescent current (28 [μA]) | Texas Instruments | TPS61040DRVT | 2.1 × 2.1 × 0.8 |

-continued

| ID | Component | # | Specifications | Manufacturer | Model | Size [mm³] |
|----|-----------|---|----------------|--------------|-------|-----------|
| 6 | Switch | 1 | 3 channels<br>25 [V] max voltage | Analog Devices | ADG1233YRUZ | 4 × 4 × 1 |
| 7 | Coin cell | 1 | 25 [mAh], 3 [V] | Varta | CR1216 | Ø 12 × 1.6 |

Figure 88:
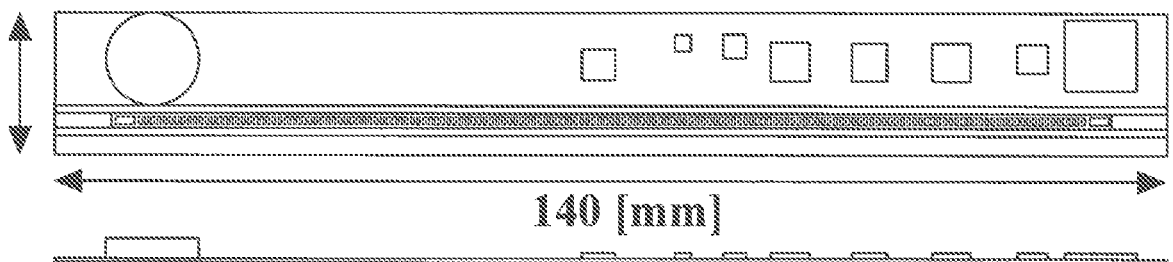
FIG. 88 is a top and side view of an embodiment of the electrowetting display watch of the invention.
Figure 89A:
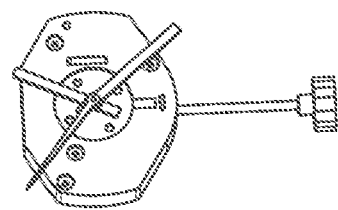
FIG. 89A to FIG. 89E is a schematic of an integration of a low cost electrical or high-end mechanical movement.
Figure 89B:
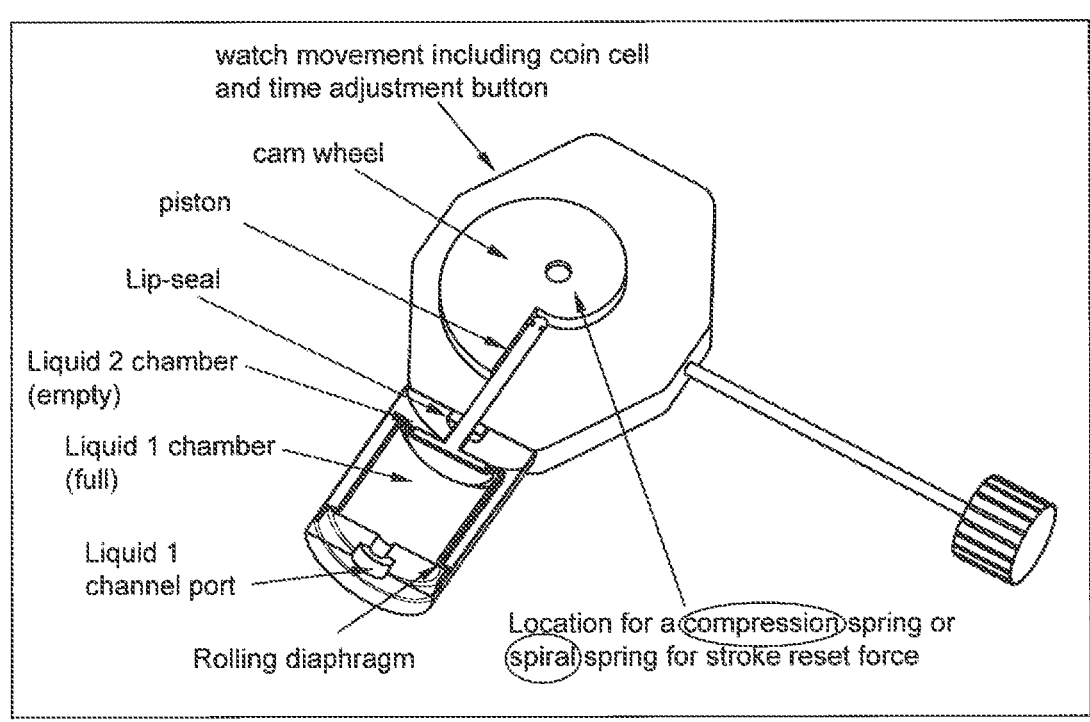
Figure 89C:
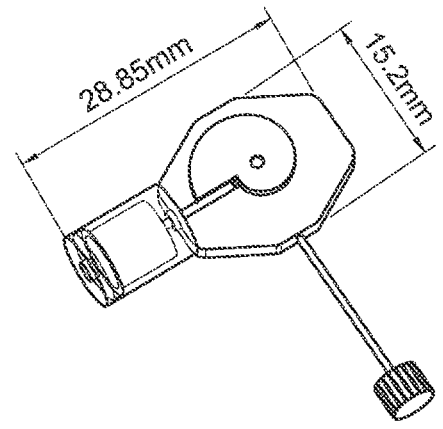
Figure 89D:
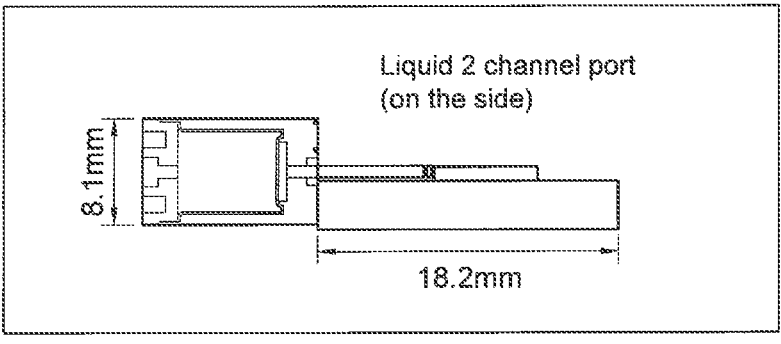
Figure 89E:
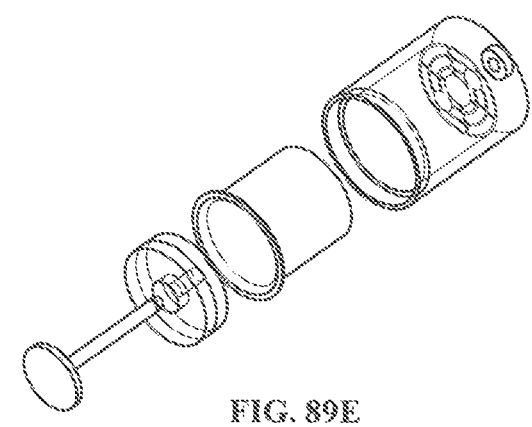
Figure 90A:
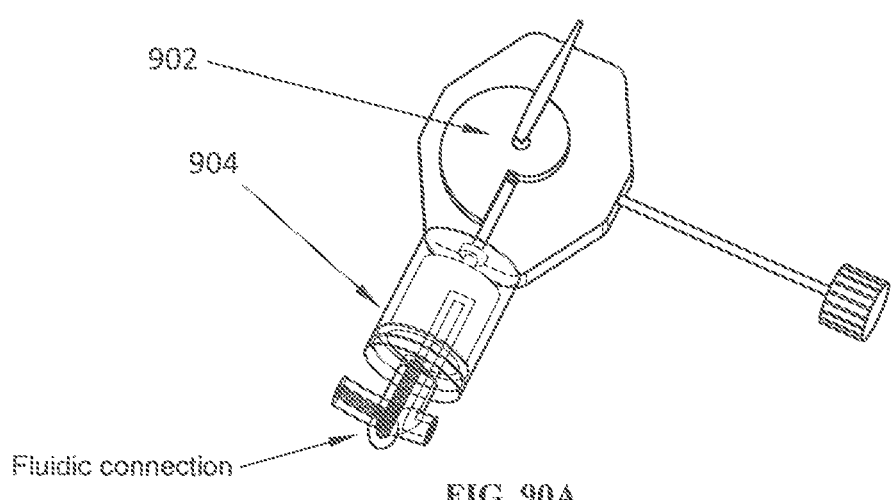
FIG. 90A to FIG. 90D are views of assembly steps of the invention.
Figure 90B:
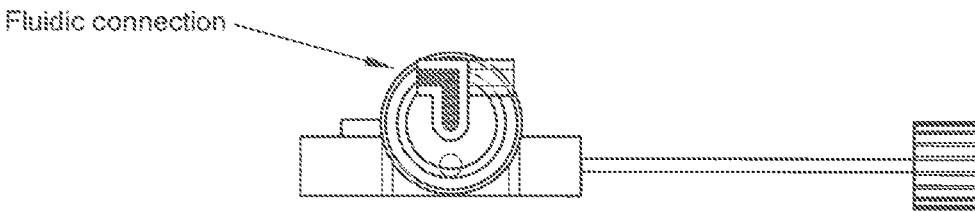
Figure 90C:
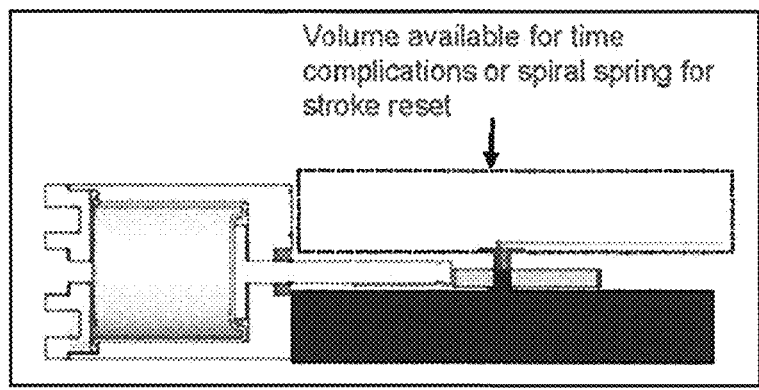
Figure 90D:
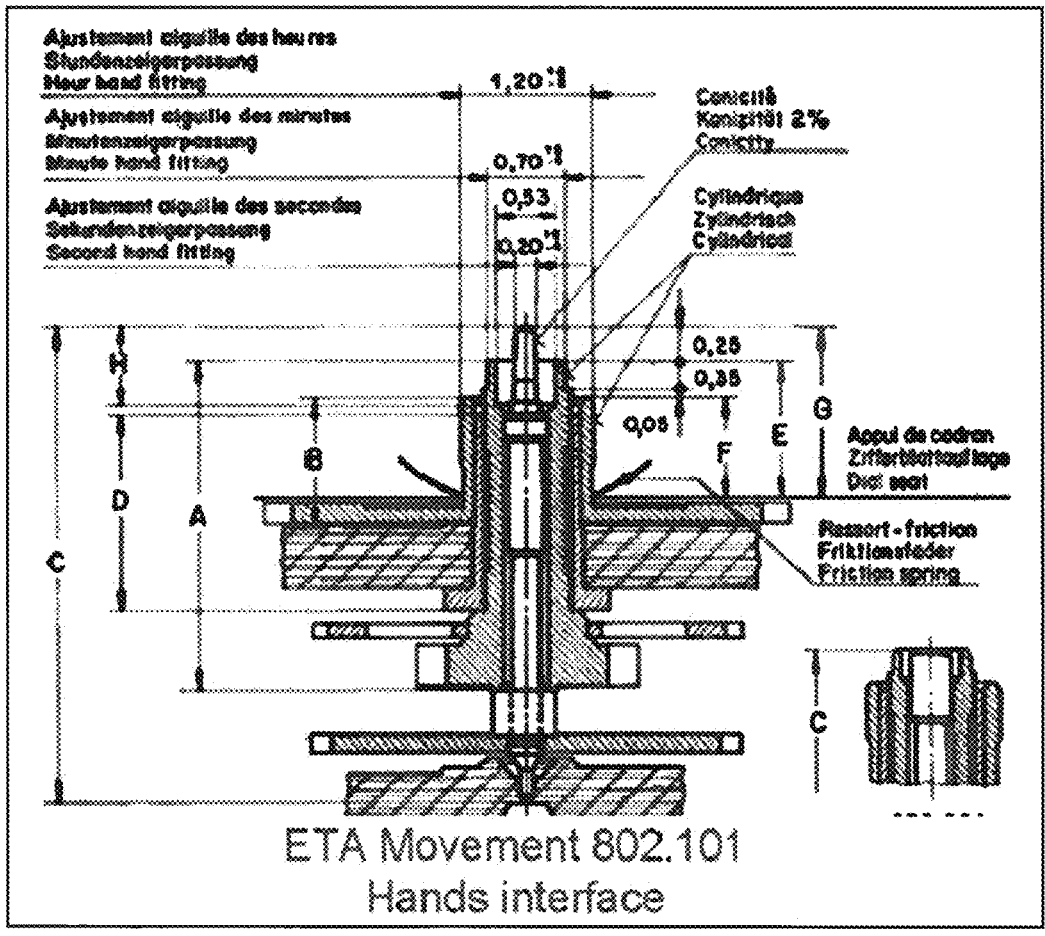
Figures 91A, 91B:
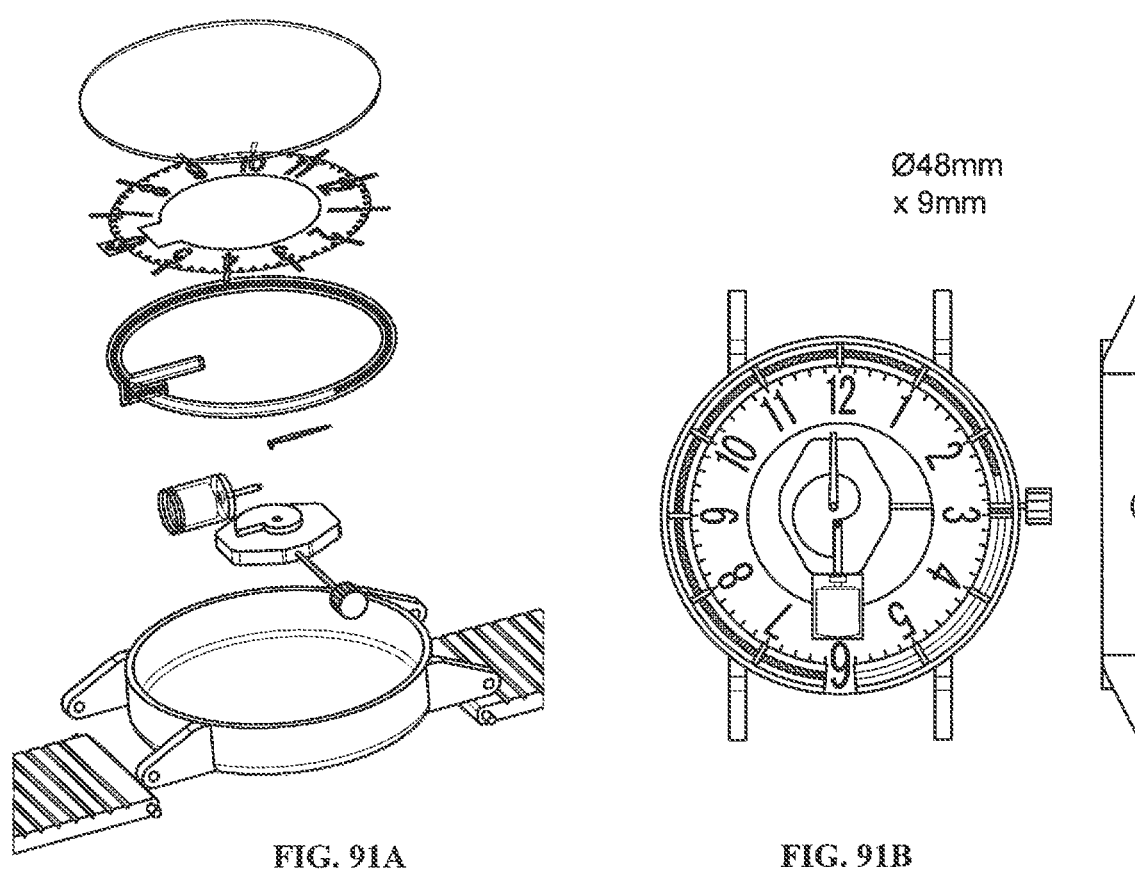
FIG. 91A to FIG. 91F are views of embodiment 1 and the integration of a circular fluid channel in a watch of the invention.
Figures 91C, 91D:
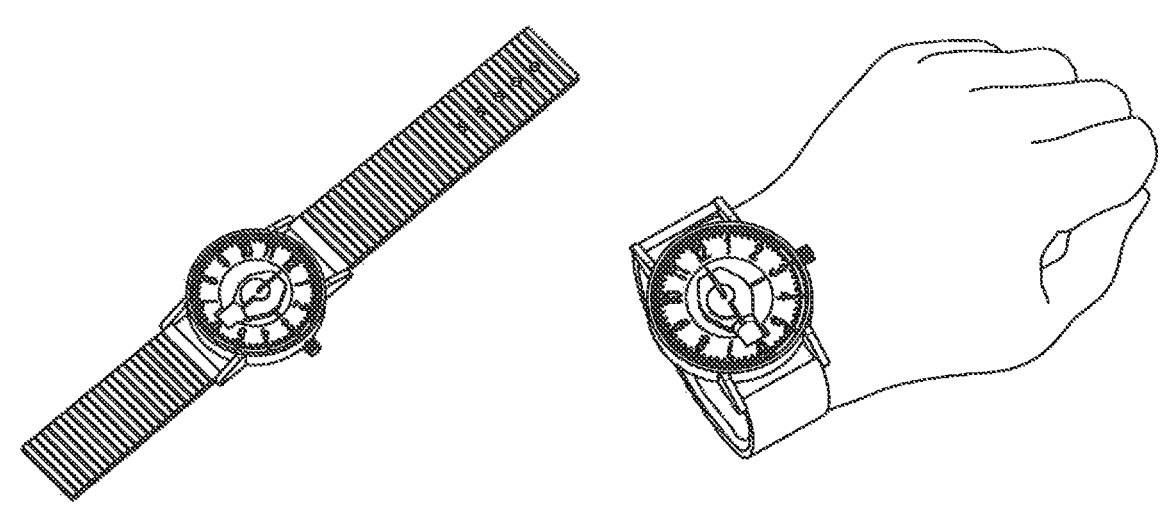
Figure 91E:
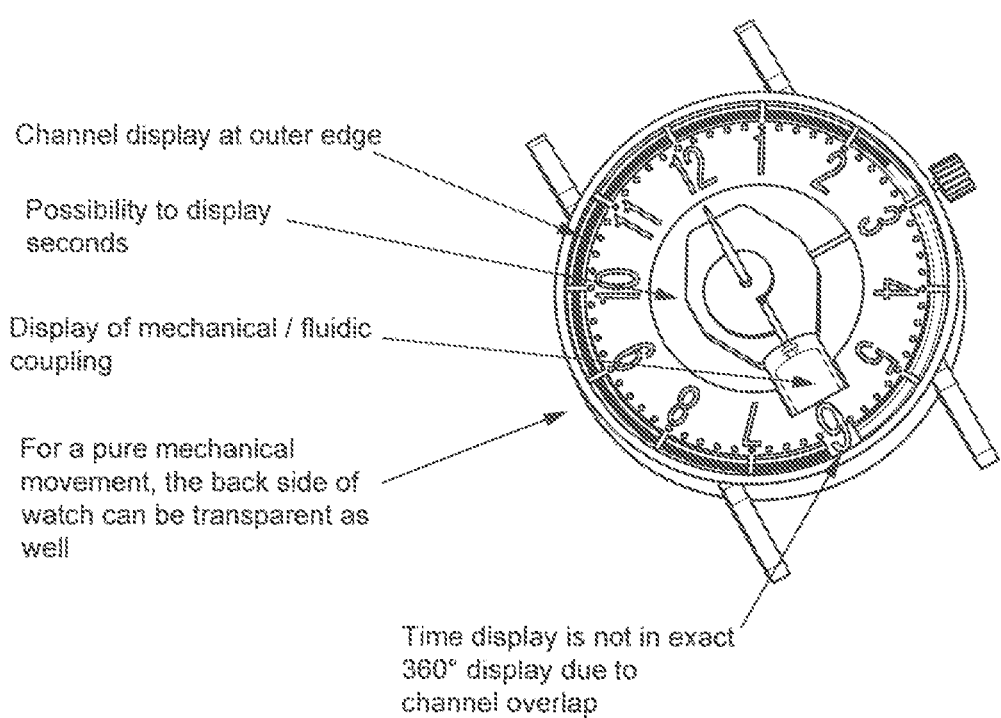
Figure 91F:
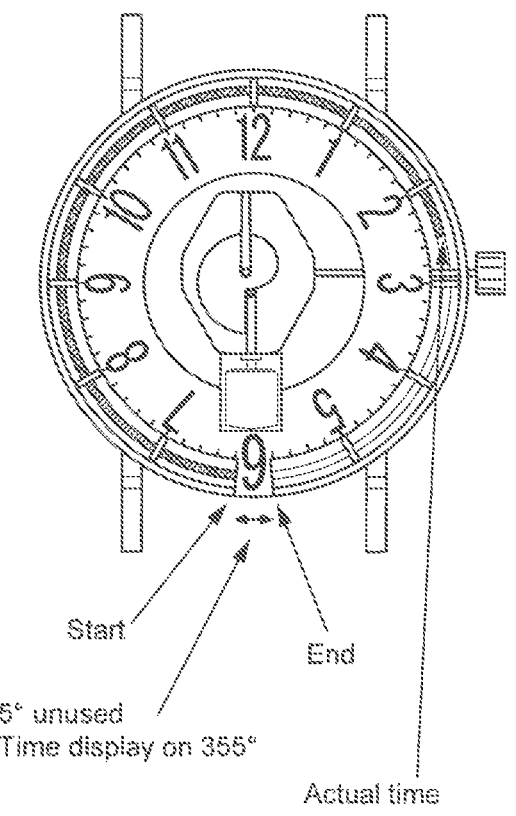

Remark: Note that if this product were to be mass-produced, the size and the cost could be reduced by developing a custom IC In addition, the components presented in the latter table are a tentative list for purposes of rough design, not an optimized solution Schematic Design The top and side view of a possible implementation of the electrowetting display are presented in FIG. 88, with the aforementioned components. It is noteworthy that the size limitations for the length of the display, and the width of the coin cell, allow for a large place for the electronics.

Note in addition that, although represented as a flat device in this figure, the substrate could be a flex print circuit, allowing it to be wrapped around the wrist.

Power Budget

A rough estimate of the power consumption of the aforementioned assembly is presented in the following table:

| ID | Element | Mean consumption |
|----|---------|------------------|
| 1 | Capacitive sensing chip | 5 [nA][6] |
| 2 | Microcontroller | 0.5 [μA][7] |
| 3 | Step-up | 7 [μA][8] |
| 4 | Display | Negligible |
| | TOTAL | 0.5 [μA] |

With this calculation, we can conclude that a 10 [mAh] battery set is required to have the system functioning for two years without change of batteries. This is possible to achieve with standard coin cells. However, although the power consumption of the display itself is very limited, it is visible that the consumption of the different components makes this solution more energy consuming that a simple mechanical solution.

[6]I reading=10 [ms], 16 addresses pro multiplexer, 8 readings in average=80 [ms] every 5 minutes, at a 21.5 [μA] power consumption

[7]I [μA] for 80 [ms] every 5 minutes, 0.5 [μA] standby the rest of the time

[8]28 [μA] for 80 [ms] every 5 minutes

Note that the power consumption would be further reduced, should a custom IC be used for this application.

Figures 92A, 92B:
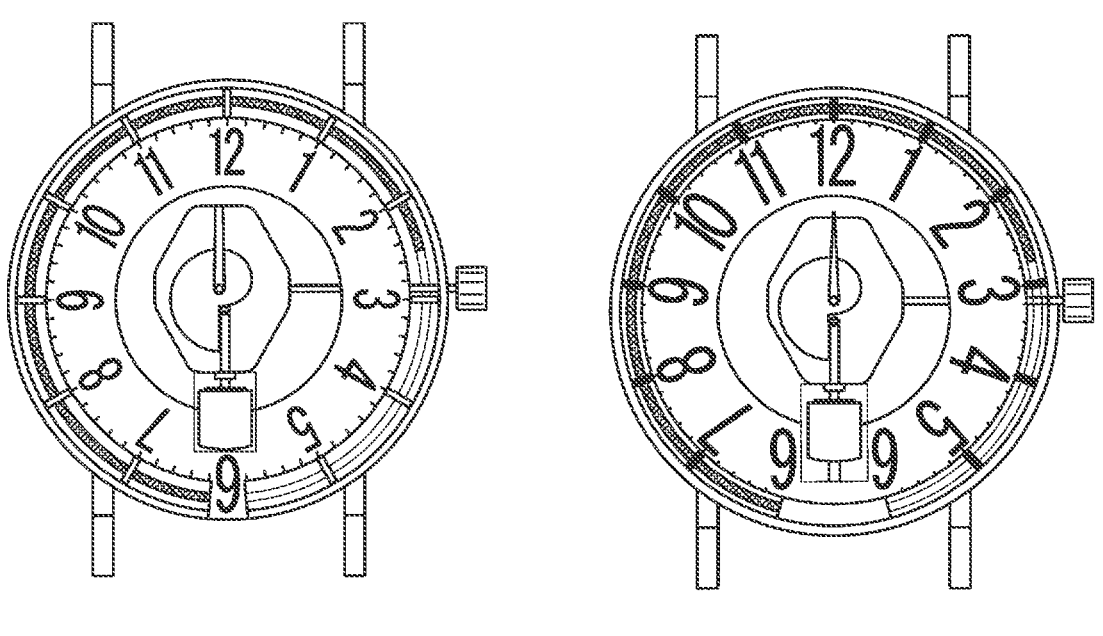
FIG. 92A to FIG. 92C are views of variable display variants and channel shapes of embodiment 1.
Figure 92C:
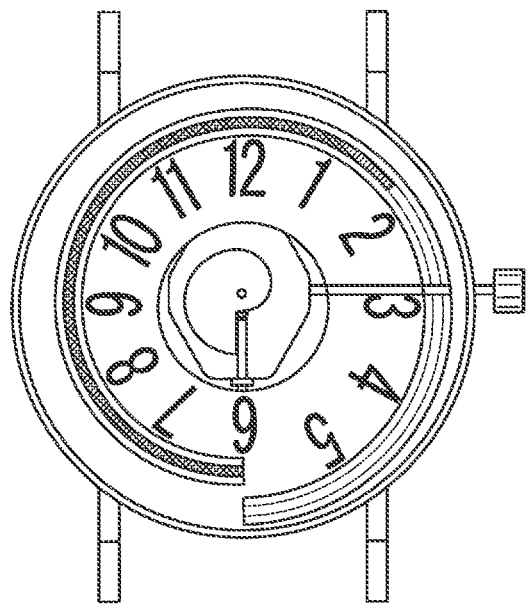
Figures 93D, 93E, 93F, 93G, 93H:
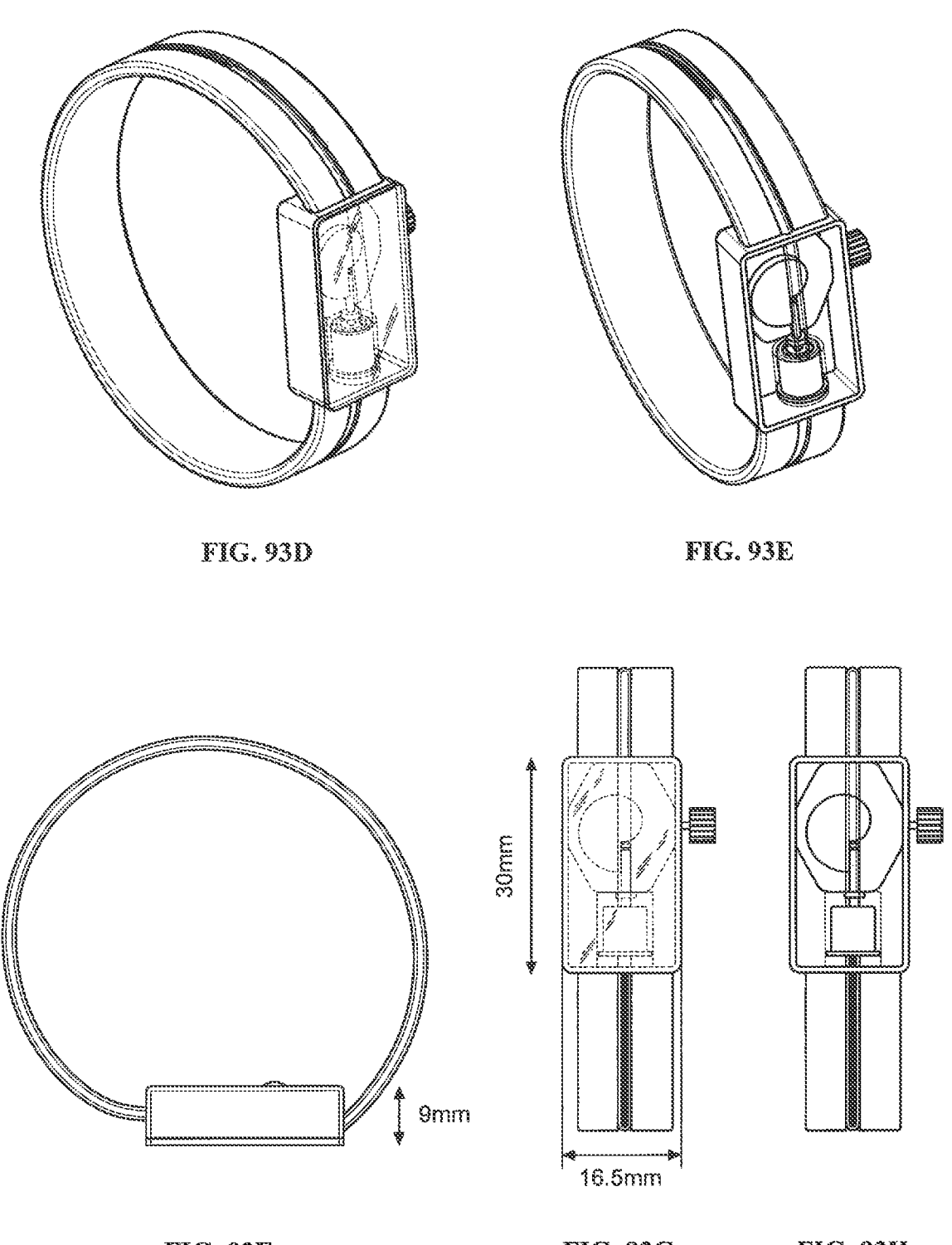

Design Concepts
1. Fluidic concept based on a watch movement
   1 Fluidic concept
   2. Concept 1. Circular fluidic channel in a standard wrist watch casing
   3. Concept 2. Elastic linear fluidic channel incorporated in a flexible bracelet
   4. Concept 3. Fluidic channel in a shaped "S" display
2. Electrowetting concept
   1. Electrowetting concept
   2. Concept 4. Electrowetting design Design Concepts
Fluidic concept based on a watch movement
   1. Fluidic concept
   2. Concept 1. Circular fluidic channel in a standard wrist watch casing 3. Concept 2. Elastic linear fluidic channel incorporated in a flexible bracelet
   4. Concept 3. Fluidic channel in a shaped "S" display
Electrowetting concept
   1. Electrowetting concept
   2. Concept 4. Electrowetting design
Fluidic Concept/Watch Movement Coupling
   Fluidic concept based on a watch movement
   Integration of an low cost electrical or high-end mechanical movement.
   This is shown in FIG. 89A to FIG. 89E.
Fluidic Concept/Assembly
Assembly:
   Cam wheel assembled on movement's hour fitting 902
   Assembly of fluidic channel coupled to reservoir and filling 904
   Assembly in watch casing with mechanical references as for OEM movements
   Possible assembly of seconds hands on corresponding fittings or additional movement based time complications
   This is shown in FIG. 90A to FIG. 90D.
Design Concepts
   1. Fluidic concept based on a watch movement
      1. Fluidic concept
      2. Concept 1. Circular fluidic channel in a standard wrist watch casing
      3. Concept 2. Elastic linear fluidic channel incorporated in a flexible bracelet
      4. Concept 3. Fluidic channel in a shaped "S" display
   2. Electrowetting concept
      1. Electrowetting concept
      2. Concept 4. Electrowetting design
Concept 1/Circular Fluidic Channel
Concept 1:
   Design close to a "normal" wrist watch
   Channel circular in casing
   Fluidic design protected from outside
   Variable channel shape possible under, above or inside of display window
   Possible display of fluidic/mechanic assembly
   Possible display of higher-end watch mechanism or complications
   Integration of concept in a watch is shown in FIG. 91A to FIG. 91F.
Concept 1/Circular Fluidic Channel/Display Variants
Concept 1: Variable Display Possibilities and Channels Shapes
   FIG. 92A shows a 355° display variant 6 am/pm centered.
   FIG. 92B shows a 330° display variant Fluidic mechanism centered.
   FIG. 92C shows a 360° display variant/!\ hour length increases as channel expands along radius.
Design Concepts
   1. Fluidic concept based on a watch movement
      1. Fluidic concept
      2. Concept 1. Circular fluidic channel in a standard wrist watch casing 3. Concept 2. Elastic linear fluidic channel incorporated in a flexible bracelet 4. Concept 3. Fluidic channel in a shaped "S" display 2. Electrowetting concept 1. Electrowetting concept 2. Concept 4. Electrowetting design Concept 2/Elastic Linear Concept 2:

Design "reversed" compared to a watch, casing is worn bellow wrist

Channel is in bracelet, both bracelet and channel are elastic

Bracelet cannot be opened

Bracelet has no fixation clips. User has to stretch bracelet over fingers and palm to fit his wrist.

Channel circular around wrist, could be double winded or of different shape

Fluidic design is not protected from outside

Must resist to multiple stretching cycles

Mechanism could be damaged if user applies pressure on channel

Front and backside of casing could be transparent to show mechanism

Integration of concept 2 is shown in FIG. 93A to FIG. 93H.

Concept 2/Elastic Linear/Concept Variants

Concept Variants:

Concept 2B:

Mechanism could also include seconds and minutes hand inside of casing.

Cam wheel (hour hand) could integrate an indicator (hour hand).

Watch would have fluidic time display in bracelet and a hands display in casing bellow wrist.

Figures 94, 95, 96A, 96B, 96C, 96D:
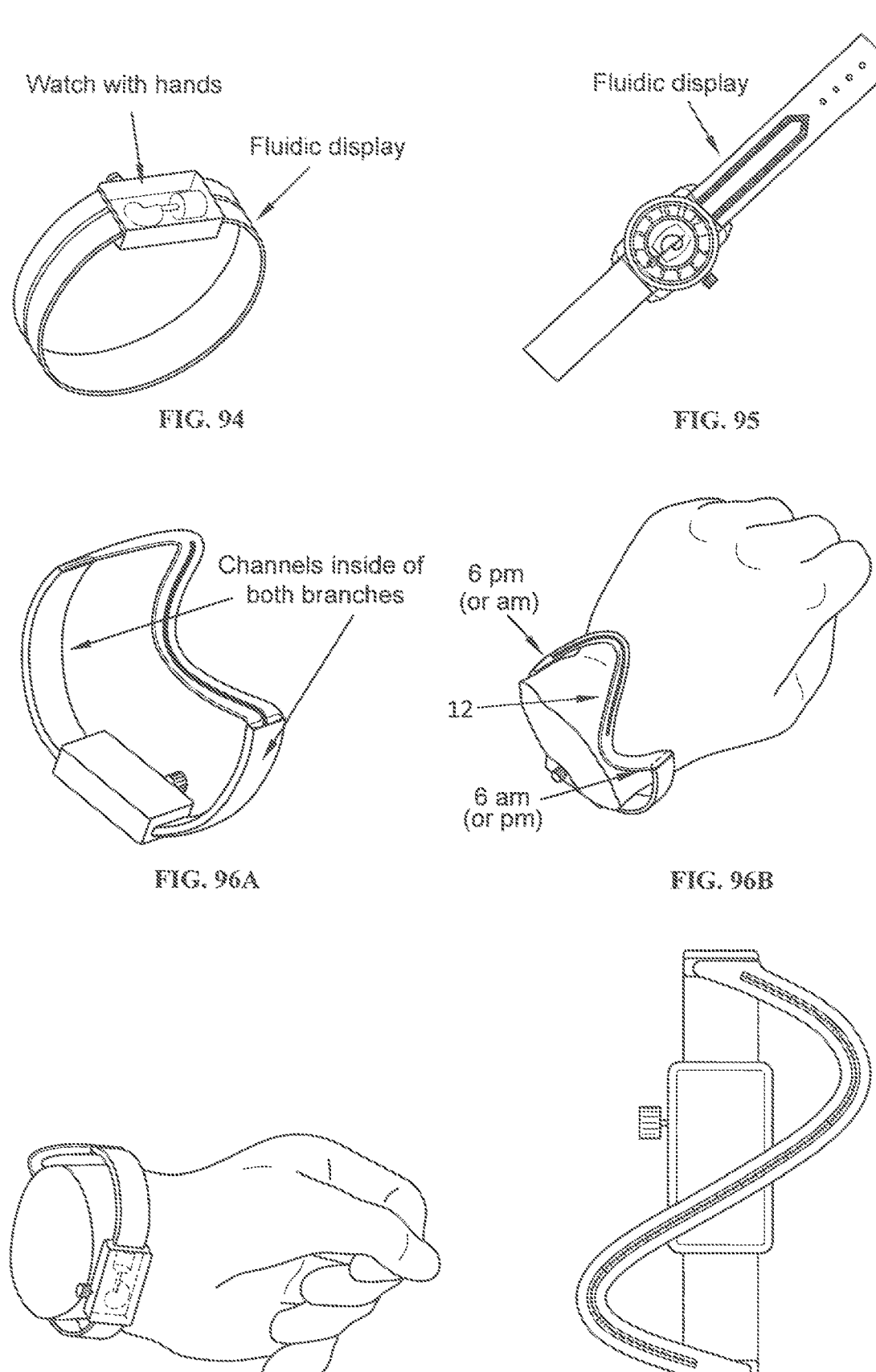

This concept is shown in FIG. 94.

Concept 3B:

Watch can be worn as Concept 1 with fluidic channel in close looped bracelet. This concept is shown in FIG. 95.

Design Concepts

1. Fluidic concept based on a watch movement

1. Fluidic concept

2. Concept 1. Circular fluidic channel in a standard wrist watch casing

3. Concept 2. Elastic linear fluidic channel incorporated in a flexible bracelet 4. Concept 3. Fluidic channel in a shaped "S" display 2. Electrowetting concept 1. Electrowetting concept 2. Concept 4. Electrowetting design Concept 3/Channel in "S" Display Concept 3A:

Design "reversed" compared to a watch, casing is worn bellow wrist

Channel is in bracelet, both bracelet and channel are semi-elastic

Bracelet cannot be opened

Bracelet has no fixation clips. User puts it on by stretching bracelet and display over fingers and palm.

Channel around wrist

Fluidic design is not protected from outside

Must resist to multiple stretching cycles.

Mechanism could be damaged if user applies pressure on channel

Front and backside of casing could be transparent to show mechanism

This concept is shown in FIG. 96A to FIG. 96F.

Concept 3/Channel in "S" Display/Variant 3B

Concept 3B: With Opening System

Channel is doubled and has a return branch back to decompression chamber in casing Bracelet can be opened on other branch Channel partially around wrist Fluidic design is not protected from outside Must resist to multiple stretching cycles.

Mechanism could be damaged if user applies pressure on channel

Front and backside of casing could be transparent to show mechanism

Concept 3B allows display casing exchangeability (high end), not possible for 3A.

This concept is shown in FIG. 97.

Design Concepts

1. Fluidic concept based on a watch movement

1. Fluidic concept

2. Concept 1. Circular fluidic channel in a standard wrist watch casing

Figure 98:
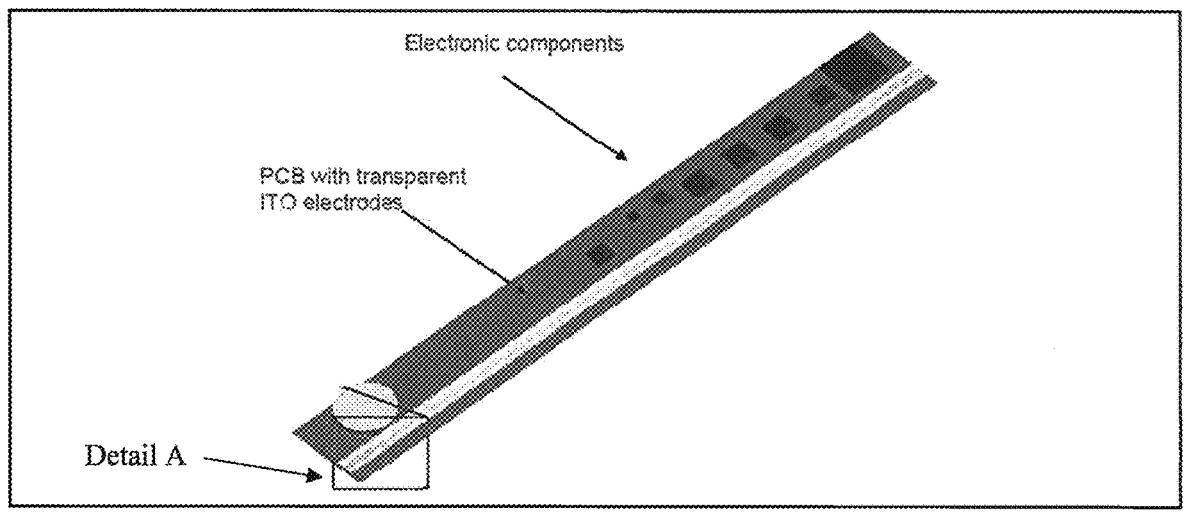
FIG. 98 is a perspective view of a PCB with transparent ITO electrodes and electronic components of the invention.
Figure 99A:
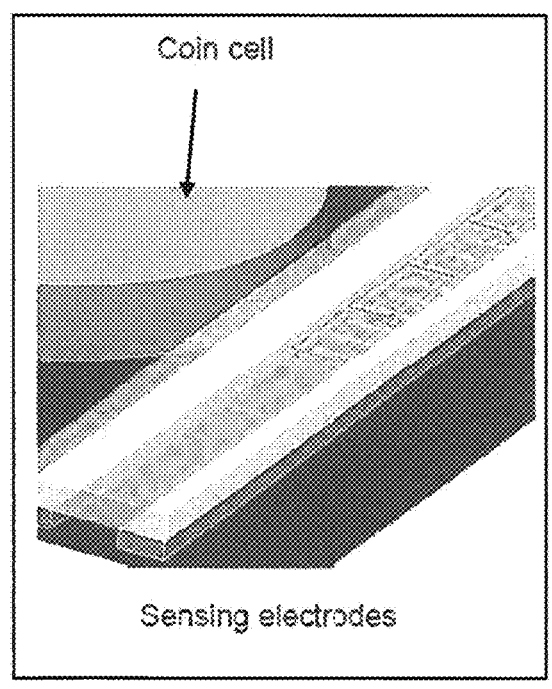
FIG. 99A is a perspective view of detail A of FIG. 98, of the sensing electrodes of the invention.
Figure 99B:
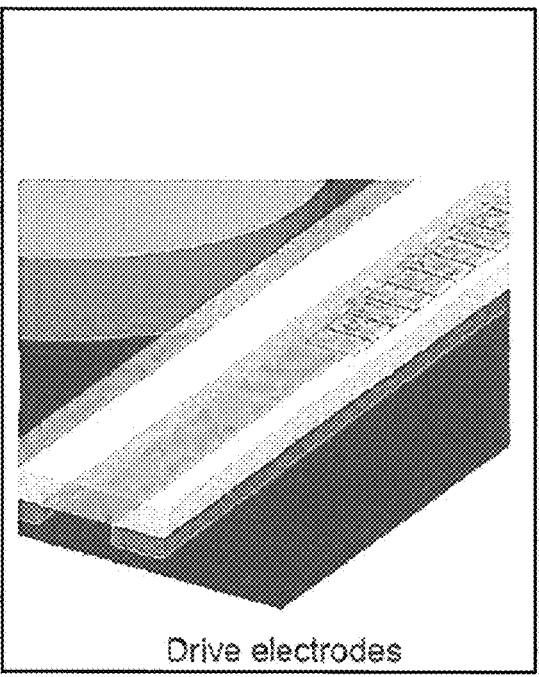
FIG. 99B is the perspective view of detail A of FIG. 98, of the drive electrodes of the invention.
Figure 100:
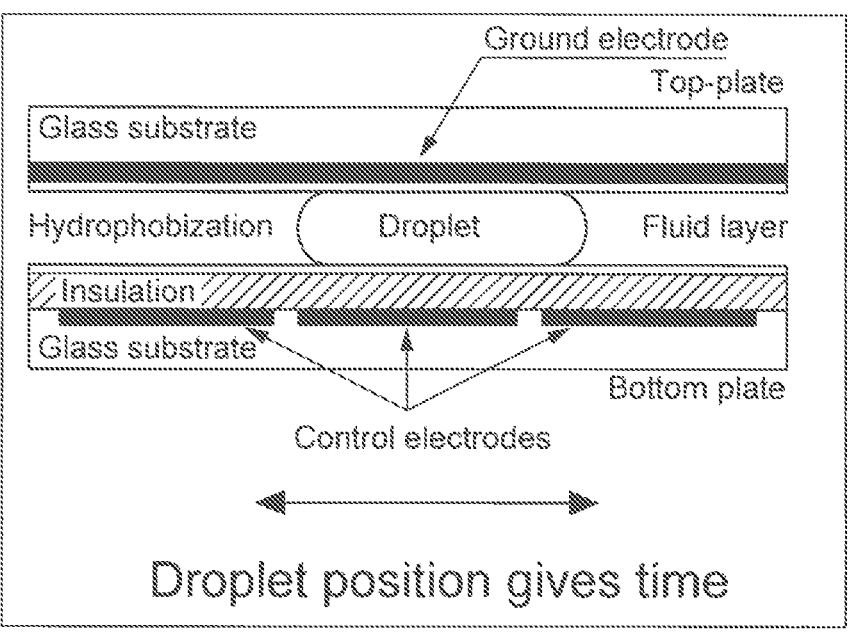
FIG. 100 is a schematic view of electrowetting.

3. Concept 2. Elastic linear fluidic channel incorporated in a flexible bracelet 4. Concept 3. Fluidic channel in a shaped "S" display 2. Electrowetting concept 1. Electrowetting concept 2. Concept 4. Electrowetting design Concept 4/Electrowetting Fluidic concept based on electrowetting Capacitive sensing, actuation with same electrodes See report RP613028900-01_rev7 for design details Design based on rectangular channel Assembly is layered allowing bending Bending around wrist must be verified FIG. 98 shows a PCB with transparent ITO electrodes and electronic components. FIG. 99A and FIG. 99B show the detail A of FIG. 98. In FIG. 99A the sensing electrodes are highlighted. In FIG. 99B the drive electrodes are highlighted. FIG. 100 shows a schematic of the electrowetting, as provided e.g. in FIG. 39, FIG. 41, FIG. 64. Reference is made to FIG. 87, showing a full schematic of the driving electronics.

Design Concepts

1. Fluidic concept based on a watch movement

1. Fluidic concept

2. Concept 1. Circular fluidic channel in a standard wrist watch casing

3. Concept 2. Elastic linear fluidic channel incorporated in a flexible bracelet 4. Concept 3. Fluidic channel in a shaped "S" display 2. Electrowetting concept 1. Electrowetting concept 2. Concept 4. Electrowetting design Concept 4/Electrowetting Design based on academic work Proof of concept on a lab setup is required Lab setup on a flat PCB Proof of lifetime required Concept 4 could have following variants Concept 4A: Timeline around wrist similar to concept 2 Deign cannot be stretched, therefore watch has a conventional clipping bracelet Cross-section dimension: 3×18 mm Concept 4B: Time displayed in a standard watch casing 3 droplets are moved around in different channels. Each channel has scaling and represents seconds, minutes and hour on three concentric circles.

(no CAD model, outer dimensions similar or smaller than concept 1)

Figure 101:
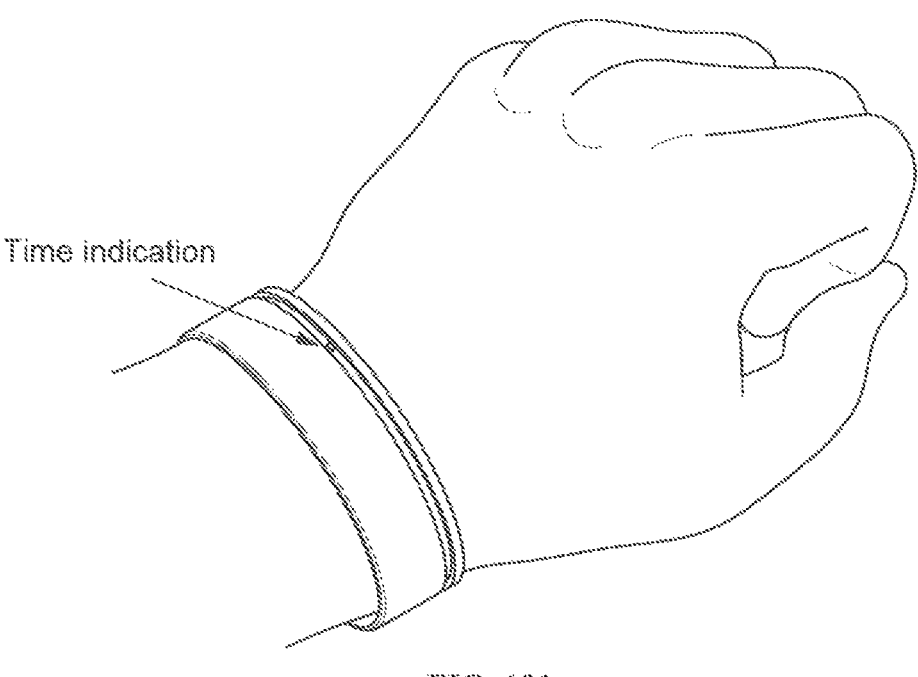
FIG. 101 is a perspective view of the indication of time on a bracelet of the invention based upon electrowetting.
Figure 102:
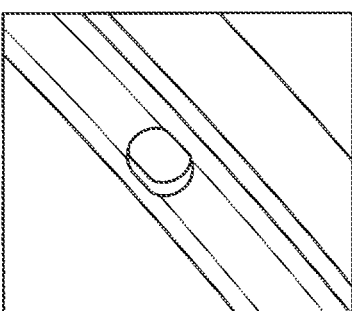
Figure 103:
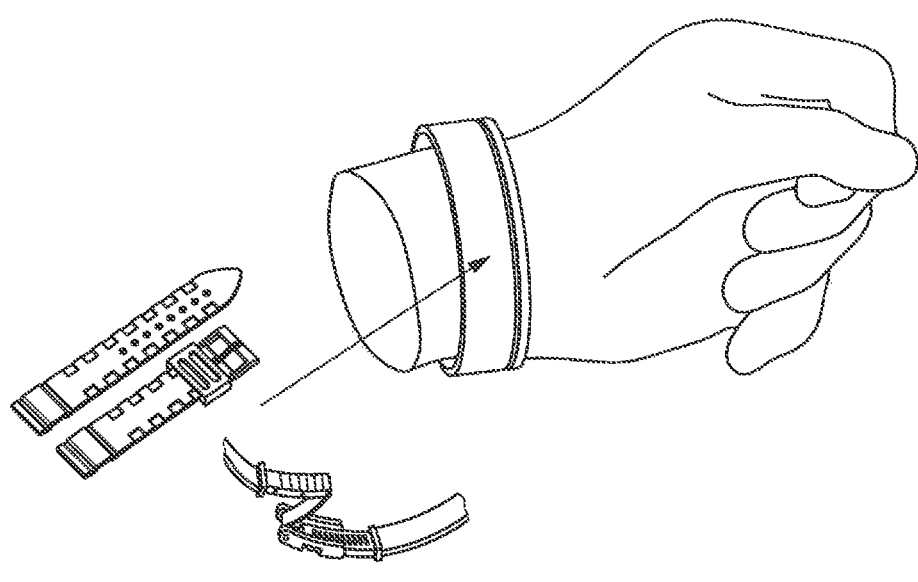

FIG. 101 shows the indication of fire on a bracelet based electrowetting. FIG. 102 shows the time indication of FIG. 101 in detail. FIG. 103 shows closing devices for the bracelet.

The invention claimed is:

1. A device for fluid display comprising a reservoir, the reservoir defining an interior space delimited by an internal surface, the interior space comprising a polar, non-gaseous fluid, the internal surface of the interior space being phobic to the fluid, wherein the fluid is displaced without changing the polarity of the fluid but rather by changing the non-wetting behavior of the fluid and the internal surface of the interior space located between one of a plurality of control electrodes and a common electrode into a wetting behavior, the device filled with at least two immiscible fluids whereas one fluid is located within an area of an electrical field capable of being generated by the common electrode and a first control electrode and partially within the electrical field capable of being generated by the same common electrode and at least one further adjacent control electrode so that the sequential electric activation of control electrodes generates a deformation or movement of the fluid in the direction of the sequentially activated electric fields of the control electrodes, the device being arranged so that the position of the fluid relative to the control electrodes is detectable by one or a plurality of sensing electrodes, wherein at least one control electrode is transparent, wherein the fluids move along an indicia to indicate a measured value and wherein the indicia are placed below the electrodes.

2. The device of claim 1, wherein the displaced fluid is at least one droplet of liquid.

3. The device of claim 1, wherein the fluids are transparent or translucent or opaque.

4. The device of claim 1, wherein the fluids are showing an animation.

5. The device of claim 1, wherein the common electrode is undivided or divided in several portions.

6. The device of claim 1, wherein the common electrode is in direct electrical contact with or isolated from the fluids.

7. The device of claim 1, wherein the control electrodes are isolated from the fluids by a dielectric layer.

8. The device of claim 1, where the common electrode is located opposite to and/or adjacent to the surface of the control electrodes.

9. A method of switching the control electrodes of the device of claim 1 in a sequence so that a portion of the fluid is displaced within the device.

10. The method of claim 9, where the control electrodes are activated by AC voltage.

11. A method of powering the control electrodes of the device of claim 1 in a sequence so that the position of the fluid relative to the control electrodes is detected.

12. The device of claim 1, where interchangeable indicia are provided for the user to customize his device.

13. A timepiece comprising the device of claim 1.

14. The device of claim 1, having at least two further adjacent control electrodes.

15. A device for fluid display comprising a reservoir, the reservoir defining an interior space delimited by an internal surface, the interior space comprising a polar, non-gaseous fluid, the internal surface of the interior space being phobic to the fluid, wherein the fluid is displaced without changing the polarity of the fluid but rather by changing the non-wetting behavior of the fluid and the internal surface of the interior space located between one of a plurality of control electrodes and a common electrode into a wetting behavior, the device filled with at least two immiscible fluids whereas one fluid is located within an area of an electrical field capable of being generated by the common electrode and a first control electrode and partially within the electrical field capable of being generated by the same common electrode and at least one further adjacent control electrode so that the sequential electric activation of control electrodes generates a deformation or movement of the fluid in the direction of the sequentially activated electric fields of the control electrodes, the device being arranged so that the position of the fluid relative to the control electrodes is detectable by one or a plurality of sensing electrodes, wherein at least one control electrode is transparent and wherein the fluids move along an indicia and the indicia are placed below the electrodes.

16. A device for fluid display having a display, the device integrated in a wearable item and comprising a channel or a reservoir enclosing at least a first and a second immiscible fluid, the channel or reservoir respectively comprising a reference electrode and a plurality of control electrodes, at least one of the control electrodes having a visually discernible size and of a form representing an aesthetic shape on the display, a first of the two fluids being at least partially located within the electrical field generated by a control electrode and at least one further adjacent control electrode so that sequential electric activation of the control electrodes generates a deformation or movement of the fluid in the direction of the sequentially activated electric fields of the control electrodes, the device being arranged so that the position of the fluid relative to the control electrodes is detectable by one or a plurality of sensing electrodes so that the fluid takes the shape of the control electrode, the channel or reservoir respectively configured such that the first fluid is freely floatable without constraint within the channel or reservoir respectively.

17. The device of claim 16, wherein the aesthetic shape is a non-rectangular or a non-circular shape.

18. The device of claim 16, wherein the aesthetic shape is a heart shape.

* * * * *